(12) United States Patent
Nguyen et al.

(10) Patent No.: US 11,587,047 B2
(45) Date of Patent: Feb. 21, 2023

(54) TRANSACTION METHODS FOR MOBILE WALLET OPERATIONS IN A GAMING ENVIRONMENT

(71) Applicant: JCM American Corporation, Las Vegas, NV (US)

(72) Inventors: Mike Nguyen, Las Vegas, NV (US); David Kubajak, Las Vegas, NV (US); Mark Adams, Las Vegas, NV (US); Mark Castilo, Las Vegas, NV (US)

(73) Assignee: JCM American Corporation, Las Vegas, NV (US)

( * ) Notice: Subject to any disclaimer, the term of this patent is extended or adjusted under 35 U.S.C. 154(b) by 374 days.

(21) Appl. No.: 16/994,879

(22) Filed: Aug. 17, 2020

(65) Prior Publication Data

US 2021/0110358 A1    Apr. 15, 2021

Related U.S. Application Data

(63) Continuation-in-part of application No. 16/823,677, filed on Mar. 19, 2020, now Pat. No. 11,227,281.
(Continued)

(51) Int. Cl.
*G06Q 20/04* (2012.01)
*G06F 3/12* (2006.01)
(Continued)

(52) U.S. Cl.
CPC ....... *G06Q 20/0457* (2013.01); *G06F 3/1207* (2013.01); *G06F 3/1209* (2013.01);
(Continued)

(58) Field of Classification Search
CPC ............ G06Q 20/0457; G06Q 20/108; G06Q 20/322; G06Q 20/326; G06Q 20/3674;
(Continued)

(56) References Cited

U.S. PATENT DOCUMENTS 10,825,004 B1 * 11/2020 Walker ................. G06Q 20/321
2013/0130778 A1    5/2013 Anderson et al.
(Continued)

FOREIGN PATENT DOCUMENTS

| EP | 3147874 A1 | 3/2017 |
| WO | 2017132686 A1 | 8/2017 |

OTHER PUBLICATIONS

GDS Printer: Communication Protocol V1.2 Gaming Device Standards (Gaming Standards Association (GSA), retrieved from IP.Com, Jul. 22, 2014, 30 pages) (Year: 2014).*
(Continued)

*Primary Examiner* — James D Nigh
(74) *Attorney, Agent, or Firm* — FisherBroyles, LLP; Rob L. Phillips

(57) ABSTRACT

Disclosed herein are systems, methods, and devices for transaction methods for mobile wallet operations in a casino. Various embodiments are directed to applying funds to a user's mobile wallet by transactions at a kiosk, cage, Peripheral System, or other system of the casino. Embodiments are also directed to applying credit to an electronic gaming machine of the casino. Embodiments are also directed to returning or redeeming credit from an electronic gaming machine of the casino to the user. Embodiments are also directed to transferring credit from a mobile wallet to external funds.

20 Claims, 85 Drawing Sheets

Related U.S. Application Data

(60) Provisional application No. 62/914,321, filed on Oct. 11, 2019.

(51) Int. Cl.
　　　*G06Q 20/10*　　　(2012.01)
　　　*G06Q 20/32*　　　(2012.01)
　　　*G06Q 20/36*　　　(2012.01)
　　　*G06Q 20/38*　　　(2012.01)
　　　*G06Q 40/02*　　　(2012.01)
　　　*G07B 1/06*　　　(2006.01)
　　　*G07F 17/32*　　　(2006.01)
　　　*H04M 1/72427*　　　(2021.01)

(52) U.S. Cl.
　　　CPC ......... *G06F 3/1259* (2013.01); *G06Q 20/108* (2013.01); *G06Q 20/322* (2013.01); *G06Q 20/326* (2020.05); *G06Q 20/3674* (2013.01); *G06Q 20/3827* (2013.01); *G06Q 40/02* (2013.01); *G07B 1/06* (2013.01); *G07F 17/3225* (2013.01); *G07F 17/3244* (2013.01); *H04M 1/72427* (2021.01); *G06F 3/1292* (2013.01)

(58) Field of Classification Search
　　　CPC .. G06Q 20/3827; G06Q 40/02; G06F 3/1207; G06F 3/1209; G06F 3/1259; G06F 3/1292; G07B 1/06; G07F 17/3225; G07F 17/3244; H04M 1/72427
　　　USPC .......................................................... 463/25
　　　See application file for complete search history.

(56) References Cited

U.S. PATENT DOCUMENTS

| | | |
|---|---|---|
| 2013/0165209 A1 | 6/2013 | Lemay et al. |
| 2016/0086445 A1 | 3/2016 | Tsutsui |
| 2017/0092062 A1* | 3/2017 | Tsutsui ................. G06F 3/0481 |
| 2018/0047249 A1* | 2/2018 | Nelson ................. G07F 17/3211 |
| 2019/0147695 A1* | 5/2019 | Schwartz ............ G07F 17/3244 463/25 |
| 2019/0206190 A1 | 7/2019 | Higgins et al. |
| 2019/0272704 A1* | 9/2019 | LeMay ............... G07F 17/3223 |

OTHER PUBLICATIONS

International Search Report and Written Opinion dated Feb. 2, 2021 for PCT/US20/55099 (14 pages).

\* cited by examiner

TRANSACTION METHODS FOR MOBILE WALLET OPERATIONS IN A GAMING ENVIRONMENT

CROSS-REFERENCE TO RELATED APPLICATION

This application is a continuation-in-part of U.S. patent application Ser. No. 16/823,677, filed Mar. 19, 2020, which is a nonprovisional of and claims the benefit under 35 U.S.C. 35 § 119(e) of U.S. Provisional Patent Application No. 62/914,321, filed Oct. 11, 2019, the contents of which are incorporated herein by reference as if fully disclosed herein.

FIELD

The present disclosure generally relates to systems, services, and devices related to mobile payment methods and devices. The systems, services, and devices may be implemented in gaming establishments (e.g., casinos), bars, restaurants, and the like, to facilitate monetary transactions by users with other systems and devices of the gaming establishments.

The systems, services, and devices may allow such monetary transactions to be made in conjunction with a user's mobile electronic device, such as a mobile phone, personal digital assistant, or other device. The embodiments may allow a user to transfer monetary value to or from an electronic gaming machine, a mobile wallet system, a banking system, or another device or system.

BACKGROUND

Various establishments operate electronic gaming machines that allow users to make monetary wagers. Examples of such establishments in particular include casinos and other gaming establishments, but also may include bars, clubs, or other types of establishments.

A user may make a monetary wager at an electronic gaming machine by inserting currency (bills and/or coins) or by inserting a ticket having a readable record of monetary value to be debited. In this way, gaming credit, or monetary value in a financial account, may be made available to the electronic gaming machine for wagering. It would be a convenience to such a user to be able to add credit for wagering by other means, or if the user could obtain credit, cash, or other redemptions of credit on the electronic gaming machine.

SUMMARY

Some embodiments described herein generally reference methods and systems for adding funds to a mobile wallet of a user, including transmitting a hash to a mobile device of the user, receiving a communication from the mobile wallet, based on the hash, to obtain an amount of funds from a financial account of the user, obtaining the amount of funds from the financial account of the user, and communicating to the mobile wallet to credit the obtained amount of funds into the mobile wallet of the user. Other embodiments described herein generally reference methods and systems for redeeming credit or funds available on an electronic gaming machine or other electronic device, such as by receiving a gaming ticket or other printed medium for using or redeeming the credit, electronic transfer to a mobile wallet or financial institution of a user, or other redemption methods.

Some embodiments may include a configuration in which the method may be performed by a Peripheral System of a casino, wherein the Peripheral System may be communicatively linked with a kiosk of the casino.

Some embodiments may include a configuration in which the communication to the mobile wallet to credit the obtained amount of funds uses a mobile cellular network.

Some embodiments may include a configuration in which the transmission of the hash to the mobile device of the user may be retrieved from an electronic gaming machine of the casino.

Embodiments described herein generally reference methods and systems of generating a gaming ticket operable to be applied as a credit to an electronic gaming machine at a casino. The methods may include receiving information related to the gaming ticket from a mobile wallet of a user; transmitting a first communication to a TITO System associated with the casino; receiving a second communication from the TITO System that the gaming ticket may be valid; transmitting a third communication to a Peripheral Adapter to cause a printer to print the gaming ticket; receiving from the Peripheral Adapter a fourth communication that the gaming ticket has been printed; and transmitting a fifth communication to the mobile wallet to cause the information related to the gaming ticket to be removed or deleted.

Some embodiments may include a configuration in which the information related to the gaming ticket from the mobile wallet of the user includes a hash, and the method further includes verifying the hash.

Some embodiments may include a configuration in which the information related to the gaming ticket includes information related to a virtual gaming ticket stored on the mobile wallet.

Some embodiments may include a configuration in which the first communication from the TITO System and the second communication from the TITO System are through a TITO Gateway.

Some embodiments described herein generally reference systems and methods operable to add gaming credit to an electronic gaming machine in a casino. The systems may include: a bill validator operable to be communicatively linked with the electronic gaming machine; a Peripheral System operable to communicate with a mobile wallet of a user; a Peripheral Adapter communicatively linked with the Peripheral System and the bill validator; and a TITO Translation Service operable to send and receive communications between the electronic gaming machine and a TITO System of the casino. The systems may be operable to perform a method that includes: receiving, at the Peripheral System, a first communication from the mobile wallet containing an amount to be added to the electronic gaming machine as a gaming credit; generating, at the Peripheral System, a validation number based at least on the amount; transmitting at least the validation number to the Peripheral Adapter; initiating, by the Peripheral Adapter, a virtual ticket transaction with the electronic gaming machine and sending the validation number to the electronic gaming machine; sending, from the TITO Translation Service to the electronic gaming machine, a second communication validating the virtual ticket transaction; applying, by the electronic gaming machine, the amount as a gaming credit on the electronic gaming machine; and sending, from the TITO Translation Service to the TITO System, a message that the amount has been applied as a gaming credit on the electronic gaming machine.

Some embodiments may include a configuration in which the first communication from the mobile wallet contains information related to a virtual TITO ticket recorded in the mobile wallet.

Some embodiments may include a configuration in which the TITO Translation Service communicates with the Peripheral System to obtain at least part of the information related to the virtual TITO ticket.

Some embodiments may include a configuration in which the TITO Translation Service communicates with the Peripheral System to obtain identifying information related to the mobile wallet, and the TITO Translation Service communicates with the mobile wallet to obtain at least part of the information related to the virtual TITO ticket.

Some embodiments described herein generally reference systems and methods operable to transfer gaming credit on an electronic gaming machine of a casino to a mobile wallet of a user, or to another form of credit or value for the user. The systems may include: a Peripheral System operable to communicate with the mobile wallet; and a TITO Gateway communicatively linked with the Peripheral System and operable to send and receive communications between the Peripheral System and a TITO System of the casino. The Peripheral System may be operable to: receive a scan of a printed TITO ticket, the printed TITO ticket having first information representing the gaming credit on the electronic gaming machine; obtain validation of the first information on the printed TITO ticket by sending a first communication through the TITO Gateway to the TITO System and receiving a second communication from the TITO System through the TITO Gateway; create a virtual TITO ticket based on the first information in the scan of the printed TITO ticket; send a third communication to the TITO System through the TITO Gateway with second information regarding the virtual TITO ticket; and send a notification to the mobile wallet to have funds related to the credit deposited into the mobile wallet.

In various embodiments, a system for mobile wallet operations in a gaming environment includes a peripheral network adapter associated with an electronic gaming machine; a printer communicably connected to the peripheral network adapter and the electronic gaming machine; and a peripheral system. The peripheral system is operable to receive a mobile cash out request associated with a mobile wallet account; identify that the electronic gaming machine is associated with the mobile wallet account based at least on a communication involving a mobile device; and instruct the peripheral network adapter to set the printer to a virtual print mode. In the virtual print mode the printer is operable to respond to a print instruction from the electronic gaming machine by reporting the print instruction to the peripheral network adapter including ticket data that the peripheral network adapter sends to the mobile wallet account and omitting printing a physical ticket instructed by the print instruction.

In some examples, the peripheral system receives the mobile cash out request from a mobile wallet. In various implementations of such examples, the peripheral system receives the mobile cash out request from the mobile wallet based on a request the mobile wallet received from the mobile device.

In a number of examples, the mobile wallet account stores the ticket data. In some examples, the mobile wallet account stores a monetary amount converted from the ticket data.

In various examples, the peripheral network adapter informs the printer that the ticket data is processed upon receipt of a validation from the mobile wallet. In a number of implementations of such examples, the printer notifies the electronic gaming machine that printing is complete after the peripheral network adapter informs the printer that the ticket data is processed.

In some embodiments, a system for mobile wallet operations in a gaming environment includes a printer communicably connected to an electronic gaming machine and a peripheral network adapter communicably connected to the printer and the electronic gaming machine. The peripheral network adapter is operable to detect an electronic gaming machine cash out event and set the printer to a virtual print mode. In the virtual print mode the printer is operable to respond to a print instruction from the electronic gaming machine by reporting the print instruction to the peripheral network adapter including ticket data that the peripheral network adapter sends to a mobile wallet and omitting printing a physical ticket instructed by the print instruction.

In various examples, the peripheral network adapter detects the electronic gaming machine cash out event based on a communication between the electronic gaming machine and an additional device. In some implementations of such examples, the peripheral network adapter monitors communications between the electronic gaming machine and the additional device. In a number of implementations of such examples, the communication relates to a slot accounting service event.

In some examples, the mobile wallet identifies a mobile wallet account for the ticket data based on information received from a mobile app executing on a mobile device. In a number of implementations of such examples, the information is at least one hash that the mobile app received from at least one player interface device associated with the electronic gaming machine. In various implementations of such examples, the mobile wallet identifies the mobile wallet account after receiving the ticket data.

In a number of embodiments, a system for mobile wallet operations in a gaming environment includes a printer, associated with an electronic gaming machine, that is operable to receive a print command generated by a ticket printing system in response to ticket data received from the electronic gaming machine; transmit ticket data extracted from the print command; and omit printing a physical ticket in response to the print command. The system also includes a peripheral system that is operable to send the ticket data received from the printer to a mobile wallet.

In some examples, the electronic gaming machine transmits the ticket data to the ticket printing system in response to detecting that a player selected a mobile cash out. In a number of examples, the printer communicates directly with the peripheral system.

In various examples, the printer notifies the ticket printing system to complete a mobile cash out upon receipt of information from the peripheral system that the ticket data is processed. In some implementations of such examples, the peripheral system is informed that the ticket data is processed by the mobile wallet. In a number of implementations of such examples, the ticket printing system confirms to the electronic gaming machine that the mobile cash out is complete.

BRIEF DESCRIPTION OF THE DRAWINGS

The disclosure will be readily understood by the following detailed description in conjunction with the accompanying drawings, wherein like reference numerals designate like structural elements.

Generally and broadly.

FIG. 1 illustrates a block diagram of components and signal flow for adding funds to a mobile wallet at a kiosk, according to an embodiment.

FIG. 2 illustrates a block diagram of components and signal flow for adding funds to a mobile wallet over a casino network, according to an embodiment.

FIG. 3 illustrates a block diagram of components and signal flow for adding funds directly to a mobile wallet at a kiosk, according to an embodiment.

FIG. 4 illustrates a block diagram of components and signal flow for adding funds to a mobile wallet, according to an embodiment.

FIG. 5 illustrates a block diagram of components and signal flow for adding funds to a mobile wallet, according to an embodiment.

FIG. 6 illustrates a block diagram of components and signal flow for adding funds to a mobile wallet, according to an embodiment.

FIG. 7 illustrates a block diagram of components and signal flow for adding funds to a mobile wallet, according to an embodiment.

FIG. 8 illustrates a block diagram of components and signal flow for adding funds to a mobile wallet, according to an embodiment.

FIG. 9 illustrates a block diagram of components and signal flow for adding funds to a mobile wallet, according to an embodiment.

FIG. 10 illustrates a block diagram of components and signal flow for adding funds to a mobile wallet, according to an embodiment.

Generally and broadly.

FIG. 11 illustrates a block diagram of components and signal flow for adding gaming credit to an electronic gaming machine, according to an embodiment.

FIG. 12 illustrates a block diagram of components and signal flow for adding gaming credit to an electronic gaming machine, according to an embodiment.

FIG. 13 illustrates a block diagram of components and signal flow for adding gaming credit to an electronic gaming machine, according to an embodiment.

FIG. 14 illustrates a block diagram of components and signal flow for adding gaming credit to an electronic gaming machine, according to an embodiment.

FIG. 15 illustrates a block diagram of components and signal flow for adding gaming credit to an electronic gaming machine, according to an embodiment.

FIG. 16 illustrates a block diagram of components and signal flow for adding gaming credit to an electronic gaming machine, according to an embodiment.

FIG. 17 illustrates a block diagram of components and signal flow for adding gaming credit to an electronic gaming machine, according to an embodiment.

FIG. 18 illustrates a block diagram of components and signal flow for adding gaming credit to an electronic gaming machine, according to an embodiment.

FIG. 19 illustrates a block diagram of components and signal flow for adding gaming credit to an electronic gaming machine, according to an embodiment.

FIG. 20 illustrates a block diagram of components and signal flow for adding gaming credit to an electronic gaming machine, according to an embodiment.

FIG. 21 illustrates a block diagram of components and signal flow for adding gaming credit to an electronic gaming machine, according to an embodiment.

FIG. 22 illustrates a block diagram of components and signal flow for adding gaming credit to an electronic gaming machine, according to an embodiment.

FIG. 23 illustrates a block diagram of components and signal flow for adding gaming credit to an electronic gaming machine, according to an embodiment.

FIG. 24 illustrates a block diagram of components and signal flow for adding gaming credit to an electronic gaming machine, according to an embodiment.

FIG. 25 illustrates a block diagram of components and signal flow for adding gaming credit to an electronic gaming machine, according to an embodiment.

FIG. 26 illustrates a block diagram of components and signal flow for adding gaming credit to an electronic gaming machine, according to an embodiment.

FIG. 27 illustrates a block diagram of components and signal flow for adding gaming credit to an electronic gaming machine, according to an embodiment.

FIG. 28 illustrates a block diagram of components and signal flow for adding gaming credit to an electronic gaming machine, according to an embodiment.

FIG. 29 illustrates a block diagram of components and signal flow for adding gaming credit to an electronic gaming machine, according to an embodiment.

FIG. 30 illustrates a block diagram of components and signal flow for adding gaming credit to an electronic gaming machine, according to an embodiment.

Generally and broadly.

FIG. 31 illustrates a block diagram of components and signal flow for adding gaming credit to an electronic gaming machine, according to an embodiment.

FIG. 32 illustrates a block diagram of components and signal flow for adding gaming credit to an electronic gaming machine, according to an embodiment.

FIG. 33 illustrates a block diagram of components and signal flow for adding gaming credit to an electronic gaming machine, according to an embodiment.

FIG. 34 illustrates a block diagram of components and signal flow for adding gaming credit to an electronic gaming machine, according to an embodiment.

FIG. 35 illustrates a block diagram of components and signal flow for adding gaming credit to an electronic gaming machine, according to an embodiment.

FIG. 36 illustrates a block diagram of components and signal flow for adding gaming credit to an electronic gaming machine, according to an embodiment.

FIG. 37 illustrates a block diagram of components and signal flow for adding gaming credit to an electronic gaming machine, according to an embodiment.

FIG. 38 illustrates a block diagram of components and signal flow for adding gaming credit to an electronic gaming machine, according to an embodiment.

FIG. 39 illustrates a block diagram of components and signal flow for adding gaming credit to an electronic gaming machine, according to an embodiment.

FIG. 40 illustrates a block diagram of components and signal flow for adding gaming credit to an electronic gaming machine, according to an embodiment.

FIG. 41 illustrates a block diagram of components and signal flow for adding gaming credit to an electronic gaming machine, according to an embodiment.

FIG. 42 illustrates a block diagram of components and signal flow for adding gaming credit to an electronic gaming machine, according to an embodiment.

FIG. 43 illustrates a block diagram of components and signal flow for adding gaming credit to an electronic gaming machine, according to an embodiment.

FIG. 44 illustrates a block diagram of components and signal flow for adding gaming credit to an electronic gaming machine, according to an embodiment.

Generally and broadly.

FIG. 45 illustrates a block diagram of components and signal flow for obtaining refunds, redemptions, or transfers of gaming credit from an electronic gaming machine, according to an embodiment.

FIG. 46 illustrates a block diagram of components and signal flow for obtaining refunds, redemptions, or transfers of gaming credit from an electronic gaming machine, according to an embodiment.

FIG. 47 illustrates a block diagram of components and signal flow for obtaining refunds, redemptions, or transfers of gaming credit from an electronic gaming machine, according to an embodiment.

FIG. 48 illustrates a block diagram of components and signal flow for obtaining refunds, redemptions, or transfers of gaming credit from an electronic gaming machine, according to an embodiment.

FIG. 49 illustrates a block diagram of components and signal flow for obtaining refunds, redemptions, or transfers of gaming credit from an electronic gaming machine, according to an embodiment.

FIG. 50 illustrates a block diagram of components and signal flow for obtaining refunds, redemptions, or transfers of gaming credit from an electronic gaming machine, according to an embodiment.

FIG. 51 illustrates a block diagram of components and signal flow for obtaining refunds, redemptions, or transfers of gaming credit from an electronic gaming machine, according to an embodiment.

FIG. 52 illustrates a block diagram of components and signal flow for obtaining refunds, redemptions, or transfers of gaming credit from an electronic gaming machine, according to an embodiment.

FIG. 53 illustrates a block diagram of components and signal flow for obtaining refunds, redemptions, or transfers of gaming credit from an electronic gaming machine, according to an embodiment.

FIG. 54 illustrates a block diagram of components and signal flow for obtaining refunds, redemptions, or transfers of gaming credit from an electronic gaming machine, according to an embodiment.

FIG. 55 illustrates a block diagram of components and signal flow for obtaining refunds, redemptions, or transfers of gaming credit from an electronic gaming machine, according to an embodiment.

FIG. 56 illustrates a block diagram of components and signal flow for obtaining refunds, redemptions, or transfers of gaming credit from an electronic gaming machine, according to an embodiment.

FIG. 57 illustrates a block diagram of components and signal flow for obtaining refunds, redemptions, or transfers of gaming credit from an electronic gaming machine, according to an embodiment.

FIG. 58 illustrates a block diagram of components and signal flow for obtaining refunds, redemptions, or transfers of gaming credit from an electronic gaming machine, according to an embodiment.

FIG. 59 illustrates a block diagram of components and signal flow for obtaining refunds, redemptions, or transfers of gaming credit from an electronic gaming machine, according to an embodiment.

FIG. 60 illustrates a block diagram of components and signal flow for obtaining refunds, redemptions, or transfers of gaming credit from an electronic gaming machine, according to an embodiment.

FIG. 61 illustrates a block diagram of components and signal flow for obtaining refunds, redemptions, or transfers of gaming credit from an electronic gaming machine, according to an embodiment.

FIG. 62 illustrates a block diagram of components and signal flow for obtaining refunds, redemptions, or transfers of gaming credit from an electronic gaming machine, according to an embodiment.

FIG. 63 illustrates a block diagram of components and signal flow for obtaining refunds, redemptions, or transfers of gaming credit from an electronic gaming machine, according to an embodiment.

FIG. 64 illustrates a block diagram of components and signal flow for obtaining refunds, redemptions, or transfers of gaming credit from an electronic gaming machine, according to an embodiment.

FIG. 65 illustrates a block diagram of components and signal flow for obtaining refunds, redemptions, or transfers of gaming credit from an electronic gaming machine, according to an embodiment.

FIG. 66 illustrates a block diagram of components and signal flow for obtaining refunds, redemptions, or transfers of gaming credit from an electronic gaming machine, according to an embodiment.

FIG. 67 illustrates a block diagram of components and signal flow for obtaining refunds, redemptions, or transfers of gaming credit from an electronic gaming machine, according to an embodiment.

Generally and broadly.

FIG. 68 illustrates a block diagram of components and signal flow for movement of funds between mobile credit and external funds, according to an embodiment.

FIG. 69 illustrates a block diagram of components and signal flow for movement of funds between mobile credit and external funds, according to an embodiment.

FIG. 70 illustrates a block diagram of components and signal flow for movement of funds between mobile credit and external funds, according to an embodiment.

FIG. 71 illustrates a block diagram of components and signal flow for movement of funds between mobile credit and external funds, according to an embodiment.

FIG. 72 illustrates a block diagram of components and signal flow for movement of funds between mobile credit and external funds, according to an embodiment.

FIG. 73 illustrates a block diagram of components and signal flow for movement of funds between mobile credit and external funds, according to an embodiment.

FIG. 74 illustrates a block diagram of components and signal flow for movement of funds between mobile credit and external funds, according to an embodiment.

FIG. 75 illustrates a block diagram of components and signal flow for movement of funds between mobile credit and external funds, according to an embodiment.

FIG. 76 illustrates a block diagram of components and signal flow for movement of funds between mobile credit and external funds, according to an embodiment.

FIG. 77 illustrates a block diagram of components and signal flow for movement of funds between mobile credit and external funds, according to an embodiment.

Figure 1:
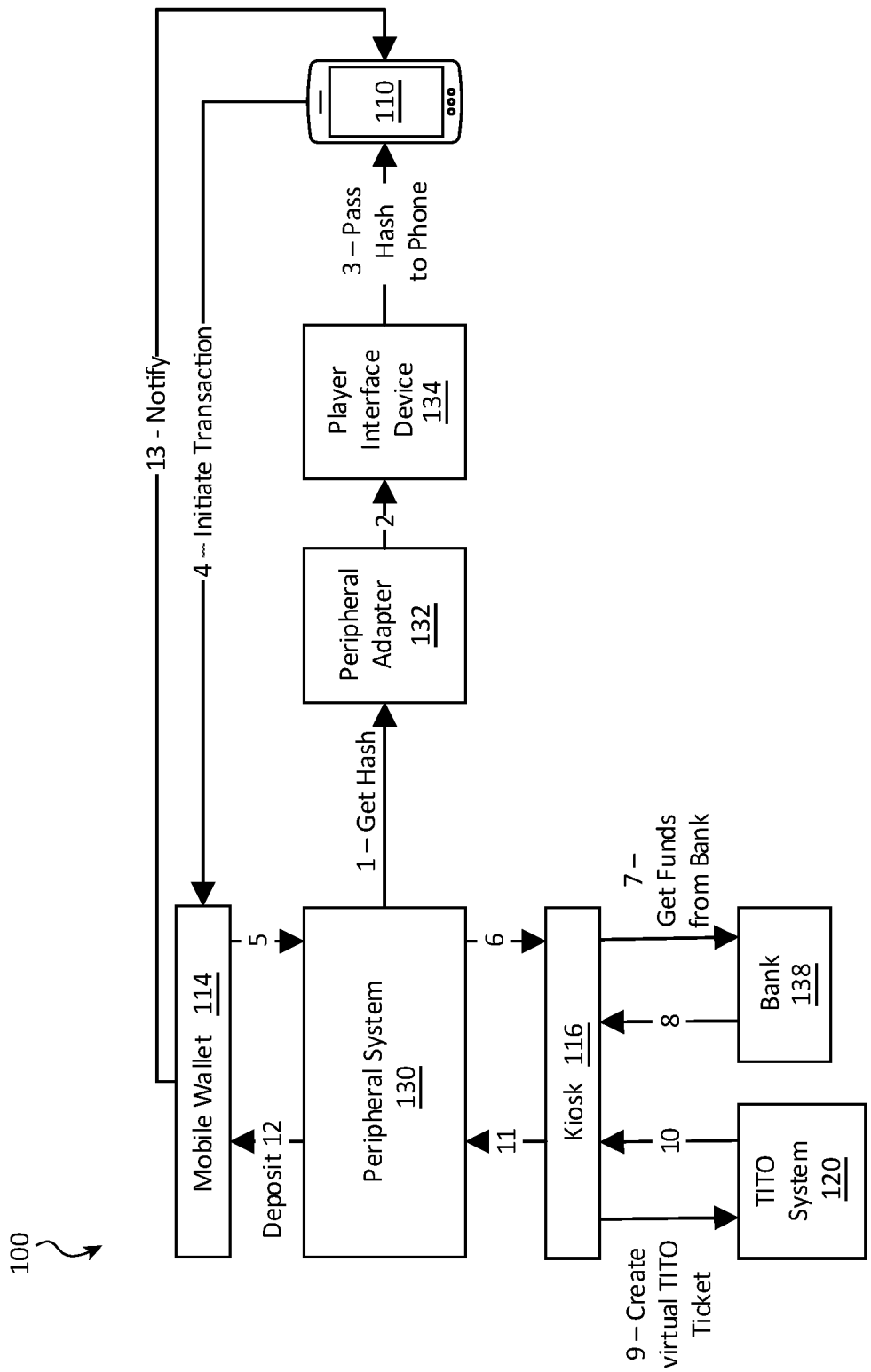
FIGS. 1-10 show block diagrams of various embodiments related to adding funds to a mobile wallet.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are generally, but not necessarily exclusively, directed to systems, devices, and methods to obtain, transfer, and apply funds for wagering within a casino or other gaming establishment. The systems, devices, and methods may allow for interaction(s) between a personal mobile electronic device of a user and various systems and equipment operated by the casino or gaming establishment or a third party.

Hereinafter, "casino" will refer to any establishment that operates electronic gaming machines at which a user may make wagers. Examples of such establishments include casinos, clubs, bars, restaurants, airport lounges or waiting areas, or other establishments where electronic gaming machines are located.

Examples of user personal mobile electronic devices include cell phones, personal digital assistants (PDA), tablet or laptop computers, smart cards, smart watches, smart key chains, devices with an implantable smart chip, and the like. Hereinafter, such personal mobile electronic devices will be referred to as "mobile devices." Mobile devices may implement or otherwise execute or access various mobile wallet applications, which a user may operate to make or receive payments, transfer funds, or other financial transactions, such as with equipment, devices, or systems of the casino. More specific details on such devices and their operations are described in greater detail below.

Examples of the various systems, devices, and equipment operated by a casino in conjunction with an electronic gaming device include bank note or bill acceptor/validators (or "bill validators"), gaming ticket receivers/printers, kiosks at which a user may obtain gaming credit (hereinafter, "credit") or funds for wagering, routers, and antennas to provide wireless communications (such as Wi-Fi®, Bluetooth, radio frequency identification technologies, near field communication technologies, or other technologies), internet connection servers and systems, casino accounting services, and other systems and equipment. Such systems, devices, and equipment may be based in hardware or software. Such systems, devices, and equipment may be implemented, either in hardware or software, to provide secure transactions with the mobile device. Specific devices, methods, and systems operated by the casino are described in greater detail below.

Some embodiments include systems, devices, and methods by which funds (such as credit or cash value) may be added to a mobile wallet application on a user's mobile device. In these embodiments: funds may be added or deposited into a mobile wallet at a casino's kiosk; funds may be added or deposited into a mobile wallet using an in-app bank token; funds may be deposited into a mobile wallet directly without additional systems; and funds may be deposited into a mobile wallet through bill validators using cash (bills) or gaming tickets. The funds may be obtained by communications with a bank or other financial institution having an account of the user. Variations on these embodiments are described in greater detail below.

Some embodiments include systems, devices, and methods by which funds on a mobile wallet application on a user's mobile device may be applied as a credit to an electronic gaming machine by bump transferring, such as by use of near field communication. In one category of embodiments, a user's mobile device may be used to have a physical gaming ticket printed from a virtual gaming ticket stored on the user's mobile device. In a second category, a physical gaming ticket is printed based on electronic credit. In a third category, a bump transfer occurs at a casino kiosk to print a physical gaming ticket. In a fourth category, a cash out of a user's mobile wallet may be performed at a casino's cage. In a fifth category, credit to an electronic gaming machine may be obtained from a previously created virtual gaming ticket by use of a simulated gaming ticket transaction at a bill validator. In a sixth category, credit to an electronic gaming machine may be obtained from a newly created virtual gaming ticket by use of a simulated gaming ticket transaction at a bill validator. In a seventh category, credit to an electronic gaming machine may be obtained from an electronic credit on the user's mobile wallet by using a newly created gaming ticket number as part of a simulated gaming ticket transaction at a bill validator. In an eighth category, credit to an electronic gaming machine may be obtained from an electronic credit using a simulated bill validator bill transaction. In a ninth category, credit to an electronic gaming machine may be obtained using Automated Funds Transfer methods.

Some embodiments include systems, devices, and methods by which funds may be applied to an electronic gaming machine through service between an electronic gaming machine and a Ticket-In/Ticket-Out service. In a first category, credit to an electronic gaming machine may be obtained by a Peripheral System interacting with the user's mobile device, such as through wireless networks. In a second category, credit to an electronic gaming machine may be obtained by redemption of a gaming ticket from a user's mobile wallet interacting with the Peripheral System. In a third category, credit to an electronic gaming machine may be obtained by redemption of a gaming ticket from a user's mobile wallet interacting with a Ticket-In/Ticket-Out Translation service. In a fourth category, credit to an electronic gaming machine may be obtained by a funds transfer from a user's mobile wallet interacting with the Peripheral System, such as over a wireless network. In a fifth category, a credit to an electronic gaming machine may be obtained by a funds transfer from a user's bank or other financial account interacting with the Peripheral System. In a sixth category, credit to an electronic gaming machine may be obtained by the Peripheral System indicating how much to credit the electronic gaming machine. In a seventh category, credit to an electronic gaming machine may be obtained using a separate Ticket-In/Ticket-Out service for mobile transactions.

Some embodiments include systems, devices, and methods by which funds or credits may be redeemed, refunded, or obtained from an electronic gaming machine and applied to a user's mobile wallet. In a first category, a physical gaming ticket may be scanned, and the credit deposited into a user's mobile wallet. In a second category, redemption may occur at a casino's cage into a user's mobile wallet. In a third category, an Automated Funds Transfer may use a bump transfer to redeem credit from the electronic gaming machine to the user's mobile wallet using a wireless network. In a fourth category, a bump transfer may redeem credit from the electronic gaming machine to the user's mobile wallet using a wireless network using a virtual printer transaction. In a fifth category, a bump transfer may redeem credit from the electronic gaming machine by communication over a wireless network from the electronic gaming machine to a casino management system (CMS). In a sixth category, a bump transfer may cause the electronic gaming machine to transfer credit using a Peripheral System in communication with a CMS. In a seventh category, a delay in printing a cash out ticket may be implemented to allow a user to perform a bump transfer from the electronic gaming machine to a mobile wallet. In an eighth category, a mobile wallet that is or was used for adding credit to an electronic gaming machine may be used for cash out operations. In a ninth category, the electronic gaming machine itself has a cash out capability to allow applying credit to a mobile wallet application.

Some embodiments include systems, devices, and methods by which a user may transfer funds or value on a mobile wallet to external funds (such as bank or other financial accounts). In a first category, a user's mobile device may cause printing of virtual gaming tickets at a casino cage. In a second category, funds on a mobile wallet may be transferred using capabilities at a casino kiosk. In a third category, a user is able to transfer funds directly to a bank account (or other financial account) using capabilities of a mobile wallet application. In a fourth category, a user is able to transfer funds to a bank account (or other financial account) using capabilities at a casino cage. In a fifth category, a mobile wallet app is used in conjunction with a casino cage to obtain cash (currency, coins).

For convenient reference, a list of acronyms used herein is provided below:
AFT Automated Funds Transfer
BLE Bluetooth Low Energy
BV Bill Validator
CMS Casino Management System
EGM Electronic Gaming Machine
NFC Near Field Communication
PNA Peripheral Network Adapter
RFID Radio Frequency Identification
TITO Ticket-In/Ticket-Out The systems, methods, and devices described herein make use of a set of similar—but not necessarily identical—components. As used herein, the term "system" can also be used to refer to subsystems that may be used within other systems. As used herein, "component" will refer to a system, whether implemented in hardware or software, a subsystem, a device performing a certain operation, or a method of operation. Operations performed by the systems, methods, and devices may be performed using one or more processing units.

As used herein, a "processing unit" will refer to any of a processor, microprocessor, microcontroller, application specific integrated circuit and related circuitry, or other operational elements as would be known to one skilled in the art. Also encompassed by the term "component" are digital and analog communication elements, circuits, or devices, such as may be operable to send and/or receive signals or messages over a variety of communication channels. Such channels include, but are not limited to, fiber optic links, coax or twisted pair cable, other forms of wired connections, wireless connections such as Bluetooth, Wi-Fi®, cellular communication networks, various near field communication links, and the like.

Described below are components to be used in subsequent block diagrams of the systems, methods, and devices that may be used in various embodiments disclosed herein. It is not implied that all such components are included in each embodiment, nor that the embodiments are limited to these components or devices. Less commonly used components may be described in relation to particular subsequent figures. Similarly named components in the figures may be similar in structure and/or operation, but may have differences; it is not implied they are identical devices.

A first such component is a user's mobile device, which is identified in figures provided herewith as the mobile device 110. A mobile device may be a mobile phone, a smart card, a smart watch, a laptop or tablet computer, a smart key chain, a personal digital assistant, or another user device.

The mobile device may include any of various electromagnetic communication technologies. These electromagnetic communication technologies include, but are not limited to, Bluetooth or Bluetooth Low Energy, infrared or other optical technologies, Wi-Fi®, NFC bump, cellular technologies including, but not limited to CDMA, EDGE, 2G, 3G, 4G, 4G-LTE, or 5G, or other electromagnetic communication technologies. A mobile device 110 may also be able to display a code (e.g., bar code, alphanumeric code, QR code, or other code format) that the user may then manually enter into another device or component.

Another such component is the electronic gaming machine ("EGM"), which is identified in the figures provided herewith as the EGM 112. An EGM may be an electronic slot machine, electronic video game, electronic card game (e.g., video poker), or another device with which a user may make wagers. An EGM may accept monetary value for wagers in multiple forms. These payment forms include, but are not limited to, receiving a physical ticket with a printed or encoded (such as on a magnetic strip) record of value, currency (such as bills and/or coins), receiving an electromagnetic communication from any of various other devices (such as a user's mobile device or a casino's wireless network), or receiving signals over a wired connection (such as a cable, twisted pair, Ethernet, or other wired connection technology).

In the embodiments disclosed in relation to the figures below, the described EGM may not be shown explicitly, but in such cases is assumed to be communicatively linked with a Player Interface Device as described below. The communication link between the Player Interface Device and the EGM may be a wired or wireless communication link.

A mobile device may interact, communicate, or interface with an EGM through any of various components, referred to as player interface devices. These include, but are not limited to, a near field communication device or other device connected with the EGM (such as in an arm of the EGM), a bill validator as described below, a bill validator having a bezel containing communication technologies (NFC, optical code readers, or other technologies), a TITO system as described below, a card (credit card, debit card, specialty card, etc.) reader, or another type of component.

Another such component is a mobile wallet, which is identified in figures provided herewith as the mobile wallet 114. A mobile wallet may be implemented as a software program configured to run on a user's mobile device. The mobile wallet may also be implemented, in whole or in part, in hardware, such as with an RFID system, as a readable chip, or other technologies implemented on or in conjunction with the user's mobile device.

Additionally and/or alternatively, a mobile wallet may be a separate service, such as PayPal®, with which a user's mobile device communicates, such as by cellular telephone service, Wi-Fi®, or another technology. A user's mobile device may communicate with a server of such a separate mobile wallet by any of a variety of methods. Such methods may include, but are not limited to, stages in which the mobile device repeatedly polls the server for updates after initiating a transaction, the mobile device polls the server and waits for a response, the server may push-notify the mobile device any time there are changes in the data in the mobile wallet, and the server may notify the mobile device by email.

Another such component may be the kiosk, which is identified in figures provided herewith as the kiosk 116. A kiosk is a device or system operated by a casino, often on a gaming floor of the casino, as a convenience for users. Often, though not necessarily, these are implemented as self-service machines, analogous to banking automated teller machines. A kiosk can provide various services and operations for users, such as printing of gaming tickets, transfer of funds to or from a mobile wallet, and other operations as detailed below.

Another such component may be a bill validator (BV), which is identified in figures provided herewith as the bill validator 118. A BV is a device that may accept cash (e.g., currency, coin) and work, by itself or in conjunction with other devices or systems, to make the accepted cash available to the user in another form, such as funds on a user's mobile wallet, a printed gaming ticket, or other form. The BV may be a component of an EGM. The BV may perform detection for counterfeit cash. The BV may work in conjunction, such as by various communication technologies, with the other components and systems described herein. A BV may perform other operations as well. A BV, or some of its components and/or subsystems, may be included, in whole or in part, as part of or within an EGM.

Another such component is the Ticket-In-Ticket-Out (TITO) system, which is identified in figures provided herewith as the either TITO System 120 or a TITO Service 120. A TITO system is a device operable to accept a printed gaming ticket and apply a corresponding credit to an electronic gaming machine, a user's mobile wallet, or communicate the credit to another component. The TITO system may also be operable to print a physical gaming ticket with a record of the credit (such as a ticket with a bar code, QR code, or the like). A TITO system may also be able to implement a virtual gaming ticket, with a value or credit that may be stored or recorded in a user's mobile wallet, or communicated or transferred to another component, such as an EGM. A gaming ticket, whether physical or virtual, will also be referred to herein as a "TITO ticket," a "TITO," or simply "ticket." A TITO System, or some of its components and/or subsystems, may be included, in whole or in part, as part of or within an EGM.

Another such component may be a TITO Gateway, which is identified in figures provided herewith as the TITO Gateway 122. The TITO Gateway may be a third party service that operates with a TITO system and a Peripheral System (described below) to facilitate creation, validation, and invalidation of TITO tickets. A TITO Gateway, or some of its components and/or subsystems, may be included, in whole or in part, as part of or within an EGM.

Another such component may be a TITO Translation Service, which is identified in figures provided herewith as the TITO Translation Service 124. A TITO Translation Service may be a device, implemented either in software or hardware, which makes or allows for communications between an EGM and a TITO system. A TITO Translation Service, or some of its components and/or subsystems, may be included, in whole or in part, as part of or within an EGM.

Another such component may be a printer, which is identified in figures provided herewith as the Printer 128. A printer, such as may be a component of an electronic gaming machine, TITO System 120, or may be a separate component. The printer may be operable to print a physical gaming ticket, a receipt, or other physical document as part of the systems and methods described herein. A printer, or some of its components and/or subsystems, may be included, in whole or in part, as part of or within an EGM.

Another such component may be the Peripheral System, which is identified in figures provided herewith as the Peripheral System 130. A Peripheral System is a service or system that may work with or within a casino network (such as the casino management system (CMS) 136 described below). The Peripheral System 130 may assist and/or interface between various peripheral components of a CMS 136, such as the components described herein. A Peripheral System, or some of its components and/or subsystems, may be included, in whole or in part, as part of or within an EGM.

Another such component may be the Peripheral Adapter, which is identified in figures provided herewith as the Peripheral Adapter 132. A Peripheral Adapter may be a processing device, which may be a component of an EGM. The Peripheral Adapter may connect to one or more peripheral components of a casino management system (CMS), described below. Such components include the components described herein. Alternatively, the Peripheral Adapter may be a component within any of the components described herein. A Peripheral Adapter, or some of its components and/or subsystems, may be included, in whole or in part, as part of or within an EGM.

Another such component may be the Player Interface Device, which is identified in figures provided herewith as the Player Interface Device 134. A Player Interface Device will refer herein, as stated previously, to any device connected with the EGM with which a user may interact, such as with a mobile device. A Player Interface Device can refer to, among other devices, a bill validator, a bill validator having a bezel containing communication technologies (NFC, optical code readers, or other technologies), a TITO system as described above, a card (credit card, debit card, specialty card, etc.) reader, or another type of component. A Player Interface Device, or some of its components and/or subsystems, may be included, in whole or in part, as part of or within an EGM.

Another such component may be a Casino Management System (CMS), which is identified in figures provided herewith as the CMS 136. A CMS may be a network service or system used within a casino to link some or all of the components listed above. One role of the CMS is to keep careful accounting of all payments, in whatever form, whether received or disbursed.

As used herein, "bank" may refer to any financial institution with which a user is affiliated. Examples of such financial institutions include, but are not limited to, banks, credit unions, online credit services, and credit card companies. In the following figures, a bank is identified in figures provided herewith as the Bank 138. Hereinafter, a "bank account" will refer to a user accessible financial account at any such financial institution from which funds or credit may be obtained, or to which funds or credit can be deposited.

A cage is a location in a casino, usually manned by a cashier of the casino, at which a user may obtain cash, such as by redemption or refund of gaming tickets (whether virtual or physical), casino chips, exchange of currency, or other records or sources of funds or credit. In the following figures, a cage will be identified in figures provided herewith as the cage 140.

Other components may be described in the descriptions of the following figures.

Embodiments that make use of these components and systems are discussed below with reference to FIGS. 1-85. However, those skilled in the art will readily appreciate that the detailed description given herein with respect to these Figures is for explanatory purposes only and should not be construed as limiting. Many of the embodiments in each section are straightforward variations of others in the corresponding section, and unnecessary repetition of their components and operations will be reduced.

Figure 85:
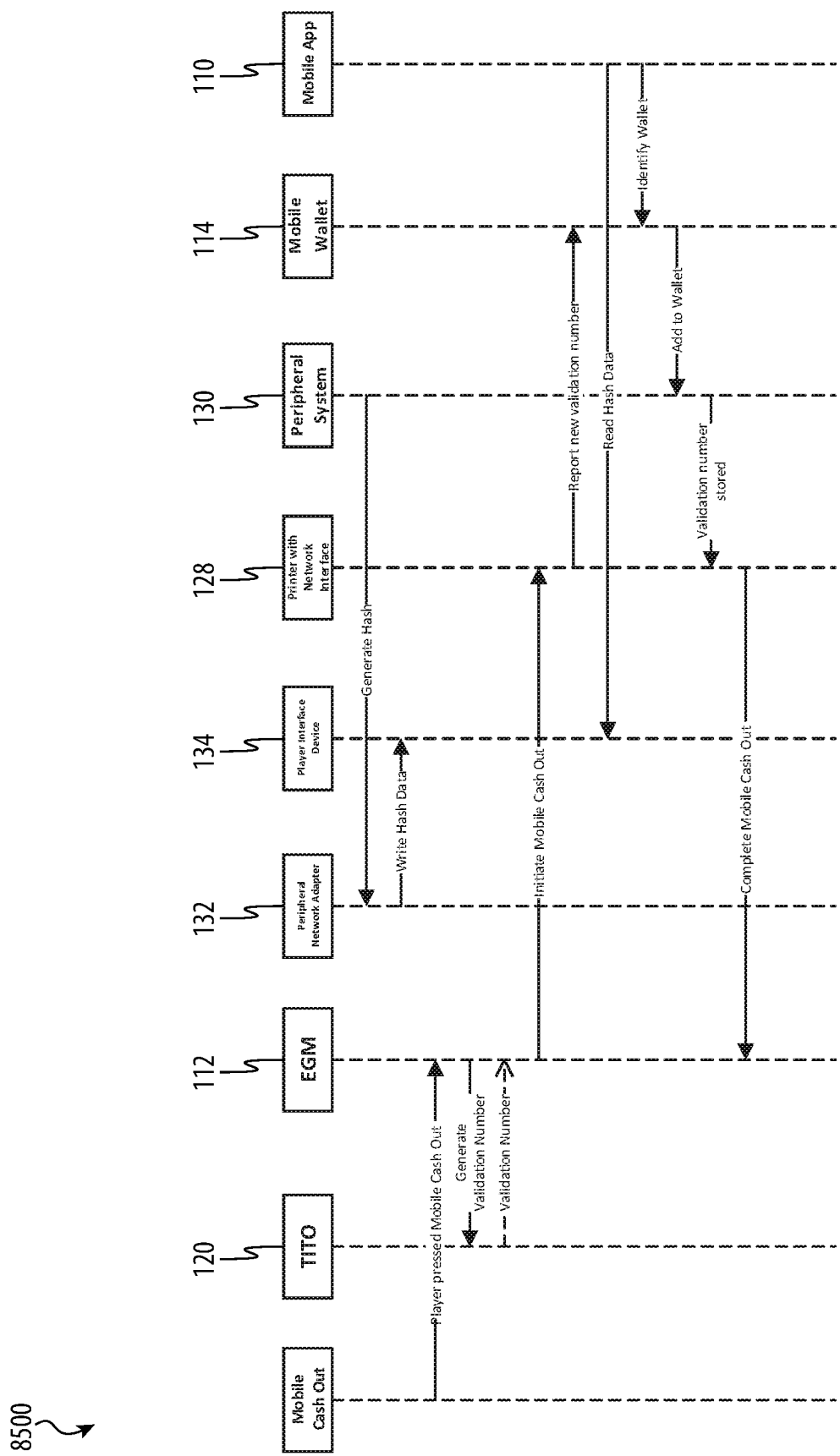
FIG. 85 illustrates a block diagram of components and signal flow for obtaining refunds, redemptions, or transfers of gaming credit from an electronic gaming machine, according to an embodiment.

Each of FIGS. 1-85 shows an enumerated sequence of steps or operations, such as the direction of flow of signals or information, or passing to a next stage in a method. It is not implied that the various operations necessarily must be performed in the enumerated sequence. Further, it is also not implied that a sequential pair of 'back and forth' steps or communications necessarily involves only one communication in each direction. For example, in FIG. 1, the enumerated steps 7 and 8 between the kiosk 116 and the bank 138 may involve multiple transmissions and receptions between those two components to complete an intended transaction. As an example, a transmission over a communication channel may not be received correctly (as determined by error detection) and an automatic repeat request signal may be transmitted.

Section I: Funding a Mobile Wallet

This section describes systems, methods, and devices that allow a user to add funds to a mobile wallet in a casino or gaming environment using a mobile device.

FIGS. 1-4 show block diagrams of components and signal flows of systems and methods by which a user may add funds to a mobile wallet at a kiosk. A user can interact with the kiosk to withdraw money or funds from a debit account (such as a credit card account, bank account, or another account). The kiosk may offer the user an option to have the money deposited into the user's mobile wallet.

FIG. 1 shows a block diagram of a system 100 in the case that the user opts to have the funds deposited into the user's mobile wallet 114. A user initiates the transaction over a network for the mobile device 110 (such a cellphone network). In this option, a hash is or has been obtained from an EGM. A hash is a unique identifier provided by a sender, often including an encryption, provided to a user to allow verifications or authentications of signals or messages between the sender and the user.

In further detail, a Peripheral System 130 supplies a hash to a mobile device 110. This may make use of the Peripheral Adapter 132, which may be a networked device, and the Player Interface Device 134. Once the mobile device 110 has obtained the hash, the transaction to add credit to the EGM is initiated by the mobile device transmitting instructions and/or data, which may include the hash, to the mobile wallet 114. The user may be asked to provide security information to be sent to the mobile wallet 114.

The mobile wallet 114 then communicates corresponding requests and/or information with the Peripheral System 130, which then sends corresponding information to the kiosk 116. The kiosk 116 may then communicate a request for withdrawal of funds from the user's account to the bank 138. The communication may include security information based on information in the received request from the mobile wallet 114. Upon verification of the security information, the bank 138 may send information back to the kiosk 116 that the user's account has been debited and funds can be made available by the kiosk 116, or the bank 138 may send information that the request to debit the user's account is denied, such as due to insufficient funds, or other reasons.

The kiosk 116 may then exchange information with the TITO System 120 that funds are available. The TITO System 120 may generate a virtual gaming ticket (or "virtual TITO ticket") and transfer information regarding the virtual TITO ticket to the kiosk 116. A virtual gaming or TITO ticket may be an electronically stored or transmitted file or data record that may contain the information regarding an amount of monetary credit, date/time of generation, security checks such as validation numbers, format information, and the like.

The kiosk 116 may then communicate, such as through the Peripheral System 130, to the mobile wallet 114 to deposit funds recorded in the virtual TITO ticket into the mobile wallet 114. In some embodiments, the mobile wallet 114 may be configured to record the virtual TITO ticket in an account or record separate from other user funds.

Once funds are available on the user's mobile wallet 114, it may be transferred to an EGM for use in wagering, such as by the systems and methods described in Section II below.

Figure 2:
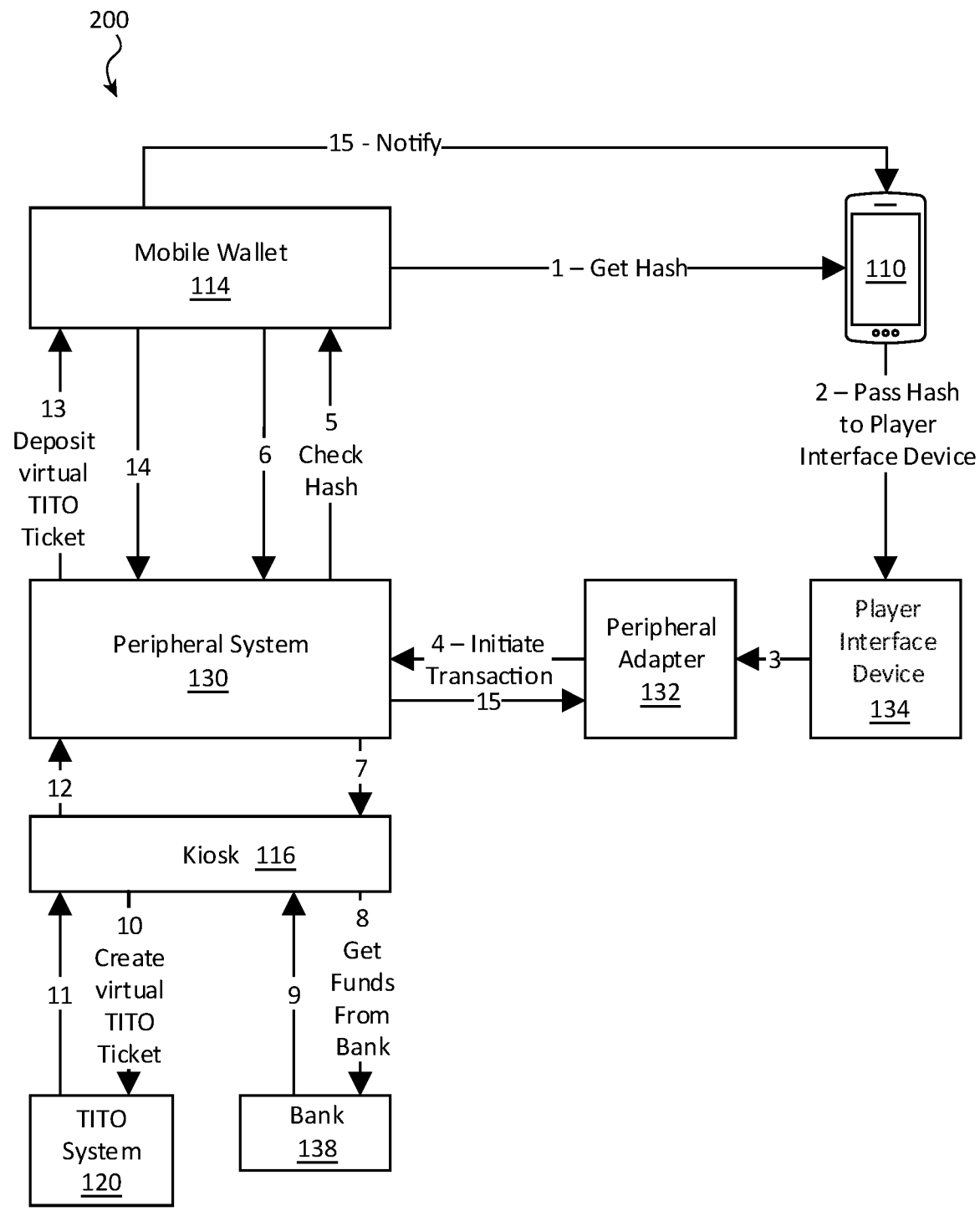

FIG. 2 shows a block diagram of a system 200 structured similarly to the system 100, except that the Player Interface Device 134 obtains a hash from the mobile device 110, and the workflow or signal flow of the initiation stages is then in the opposite direction to that of the system 100. The signal flow may make use of a casino's communication network.

In further detail, the transaction begins by the user's mobile device 110 receiving a hash from the mobile wallet 114. The hash may expire after a fixed time period, be configured for a one-time use, and/or be unique to the account of the user. The mobile device 110 may then communicate the hash to the Player Interface Device 134. The Player Interface Device 134 may then communicate with the Peripheral System 130, such as through use of the Peripheral Adapter 132, to initiate the transaction to obtain funds from a user's bank account. For security, the Peripheral System 130 may communicate with the mobile wallet 114 to verify the hash.

The Peripheral System 130 then communicates transaction information (such as security information, debit amounts, etc.) to the kiosk 116. The kiosk 116 communicates (such as on an internet connection from the casino to the web) with the bank 138 to process the withdrawal amount. The bank 138 can then either debit the user's account and provide or make the funds available at the kiosk 116, or can send a message or information to the kiosk 116 that the transaction is declined. In the former case, the kiosk 116 can communicate with the TITO System 120 so that a virtual TITO ticket is generated.

The TITO System 120 then may use the Peripheral System 130 to have the virtual TITO ticket deposited or recorded onto the user's mobile wallet 114. The mobile wallet 114 may then notify the user's mobile device 110 that the virtual TITO ticket is available on the user's mobile wallet 114 for use, such as for adding credit to an EGM.

Additional and/or alternative systems, methods, devices, and configurations of components for adding credit to an EGM are possible, as will now be described. Though described briefly, one skilled in the art will recognize, based on the descriptions of the components and signal flows presented for the embodiments of FIGS. 1-2, how to implement these additional and/or alternative systems, methods, devices, and configurations of components for adding credit to an EGM. For simplicity, hereinafter the term "system" will refer also to methods used by the described and shown arrangements of components.

Figure 3:
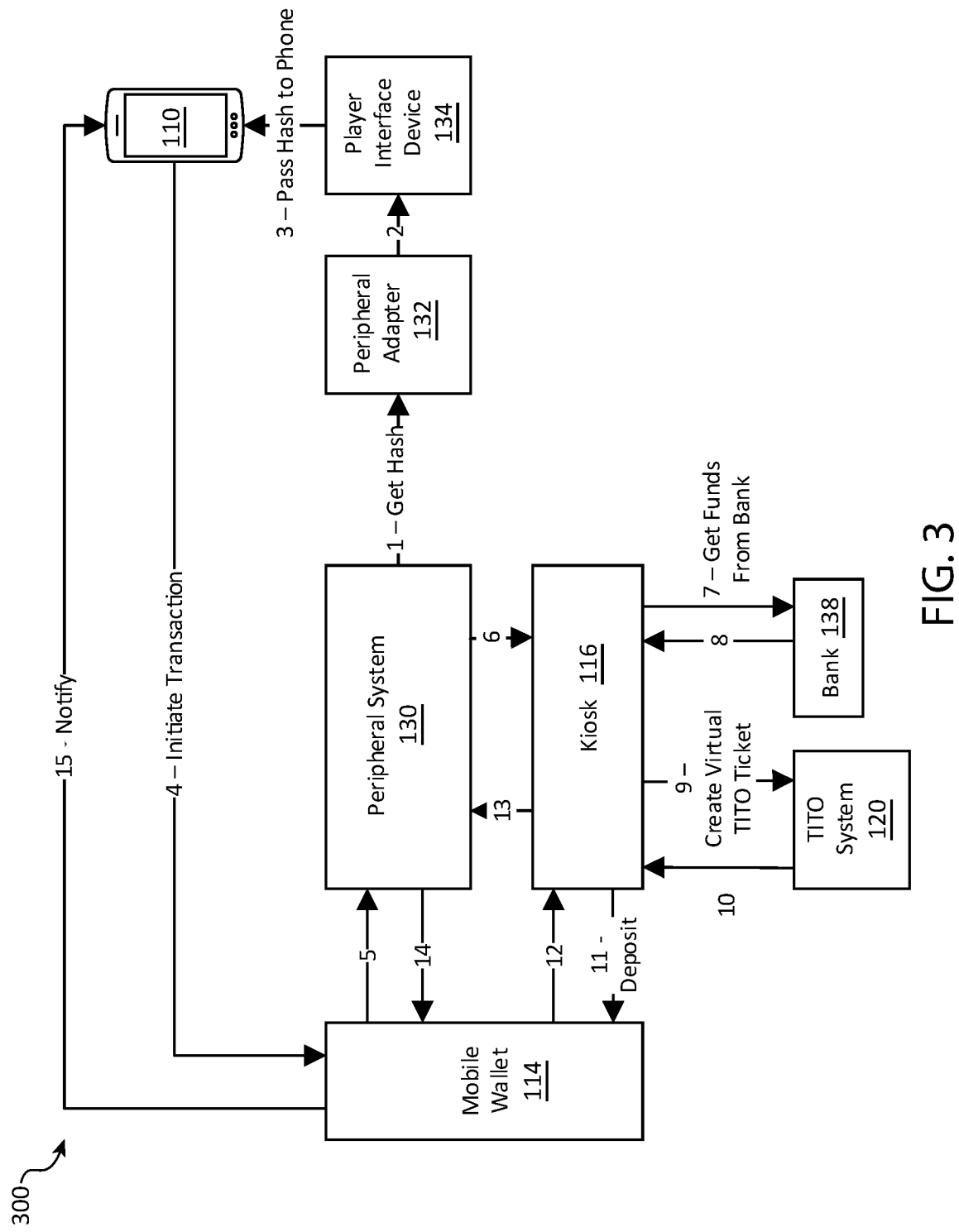

FIG. 3 shows a block diagram for such a system 300. The system 300 shown in FIG. 3 is based on that of FIG. 1. However, in the system 300, the kiosk 116 has available a direct communication link to the mobile wallet 114. The communication link may be a wireless connection, such as a cellular network, Wi-Fi, NFC, or other technology.

The mobile wallet 114 may be running a particular application (app) for such a communication link. The kiosk 116 may directly insert or transmit the virtual TITO ticket into the mobile wallet 114 using the communication link.

Figure 4:
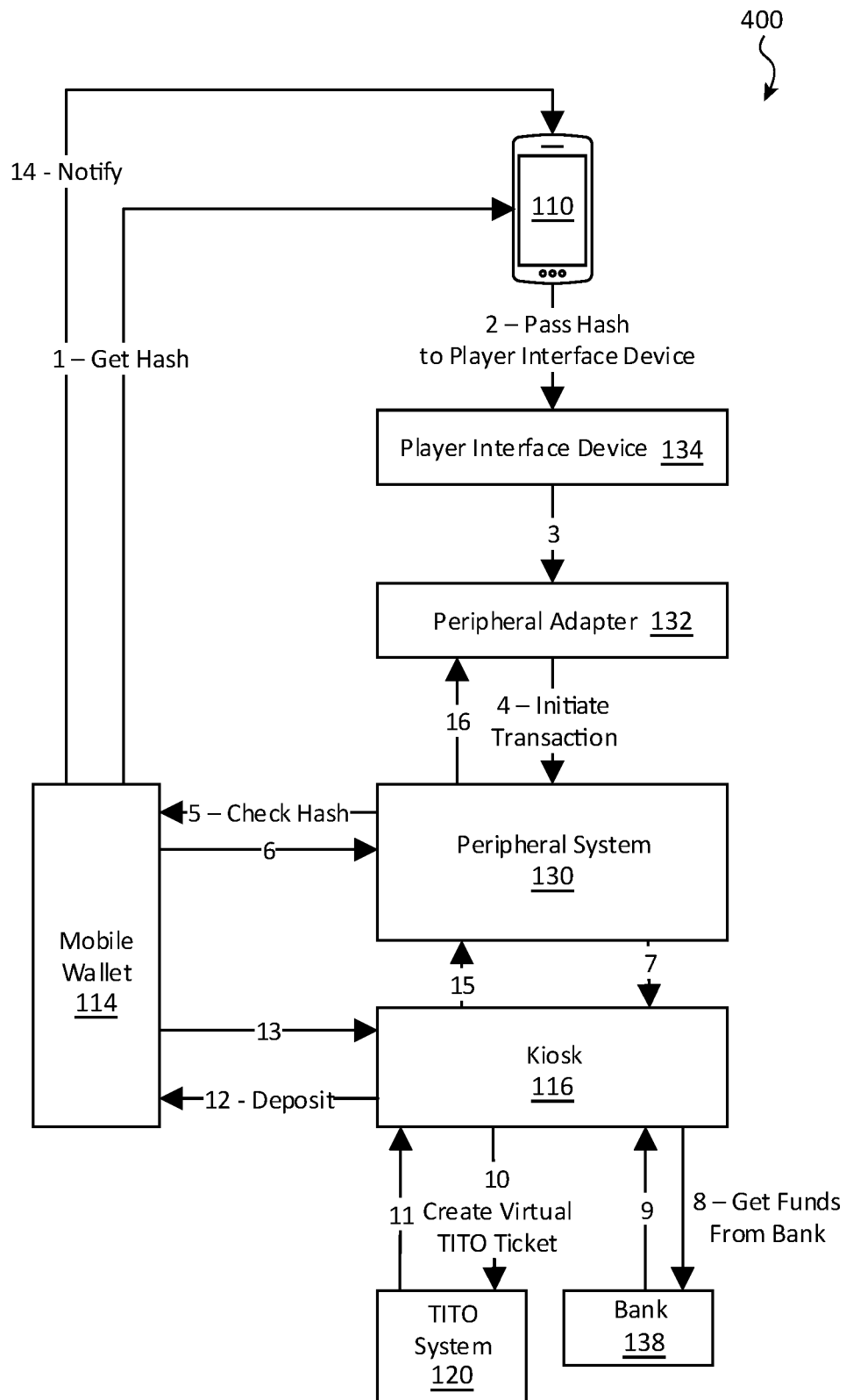

FIG. 4 shows a block diagram of a system 400 for adding funds to a mobile wallet 114. The system 400 is similar to that of the system 300, except that instead of the user's mobile device 110 obtaining a hash from the Player Interface Device 134 to begin a transaction, the Player Interface Device 134 obtains a hash from the user's mobile device 110.

The signal or work flow of the initiation stages of the system 400 is then in the opposite direction to that of the system 300, but is otherwise apparent to one skilled in the art.

Figure 5:
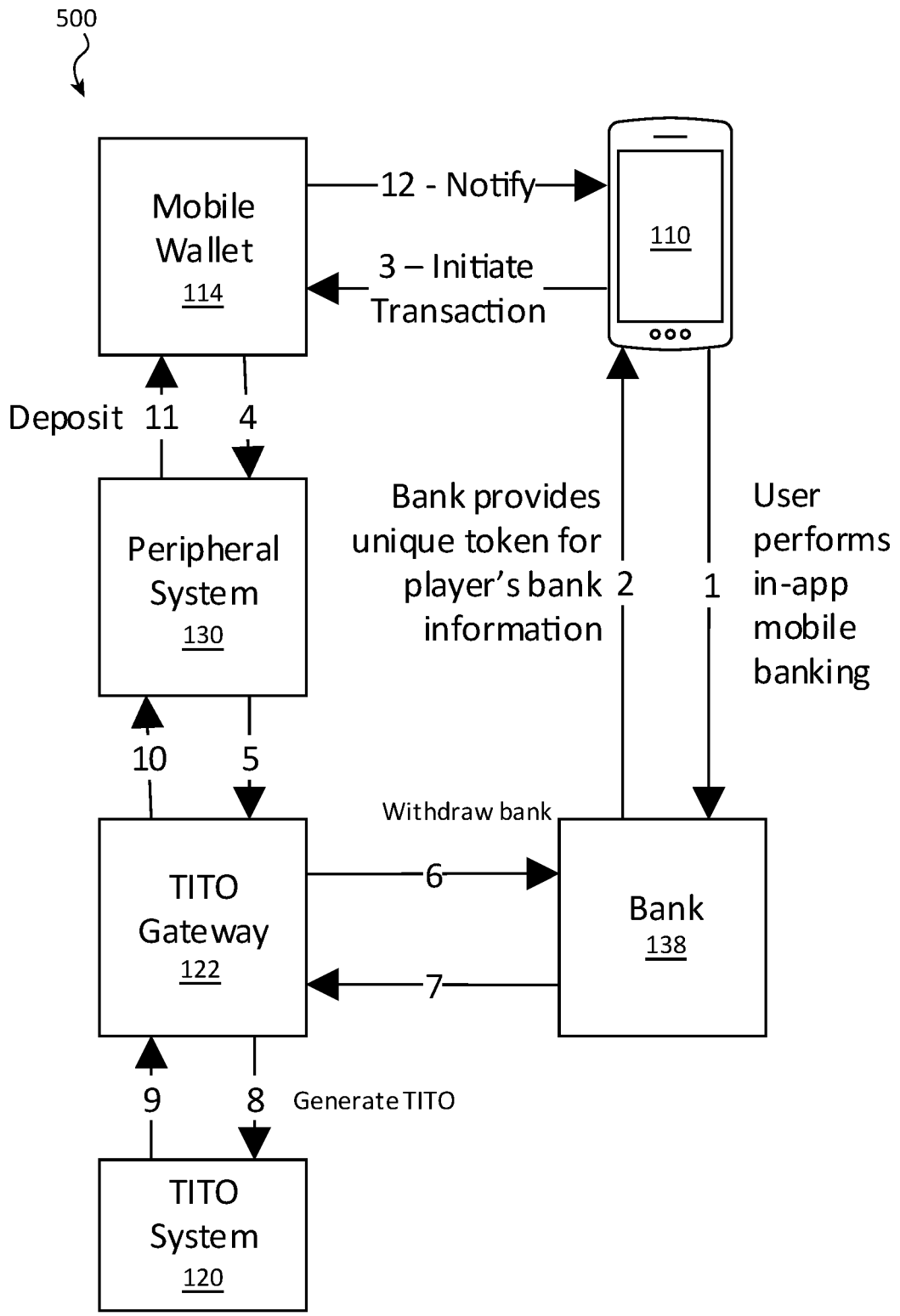
Figure 6:
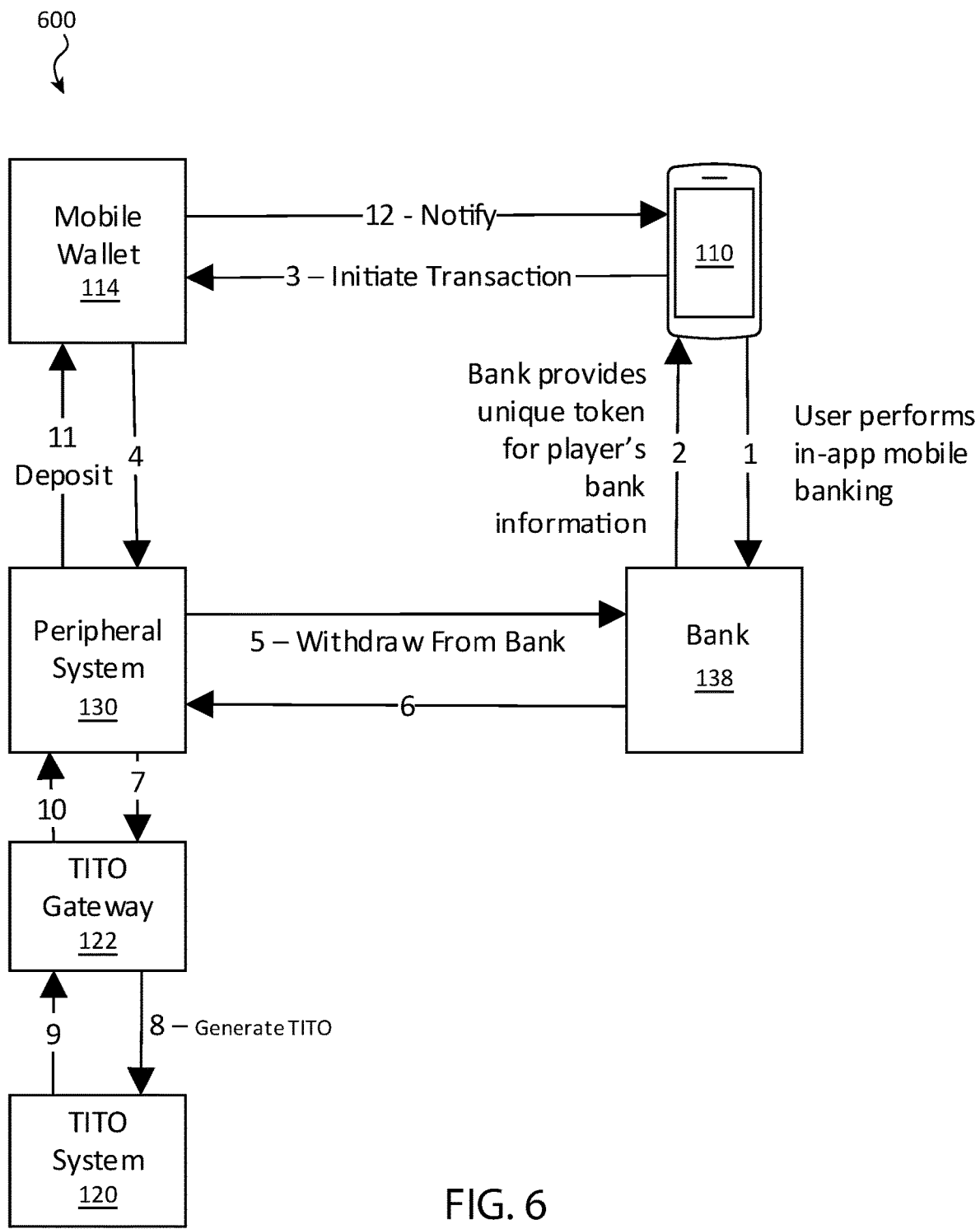
Figure 7:
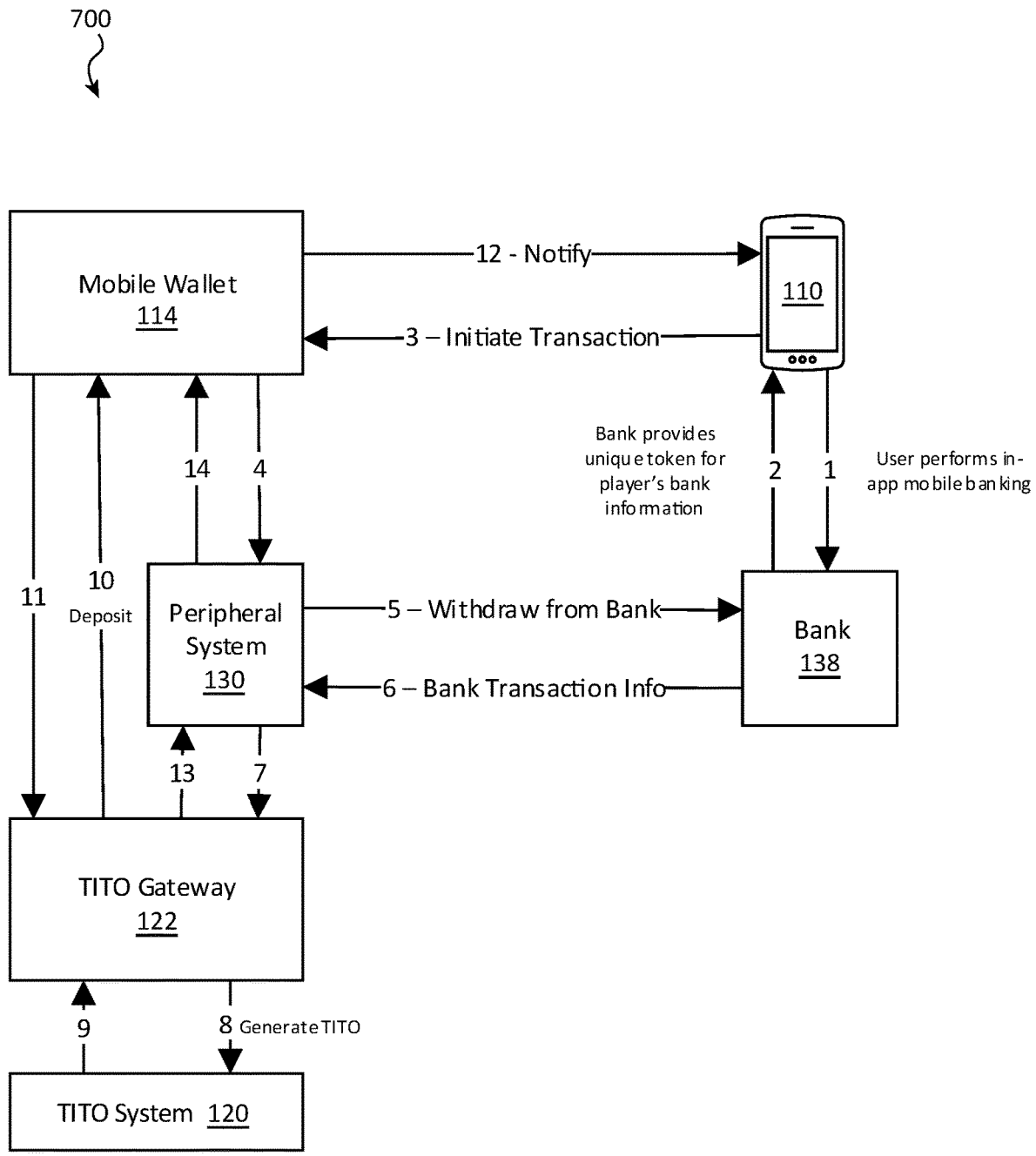

FIGS. 5-7 show block diagrams of components and signal flows of methods and systems 500-700 by which a mobile application or program on a user's mobile device 110 may initiate a transfer of funds from a financial account of the user directly to a mobile wallet 114, without connection to a kiosk or an electronic gaming machine of a casino.

FIG. 5 shows a block diagram of a system 500 for adding funds to a mobile wallet 114. In the system 500, the user's mobile device 110 initiates a transfer transaction with the Bank 138. The transaction may include a specific amount to be credited to the EGM. The Bank 138 provides a unique token related to information about the Bank 138 and the transaction. The unique token may then be passed to the mobile wallet 114, which in turn may use it in communications with the Peripheral System 130.

The Peripheral System 130 may provide needed information and/or verifications to allow the TITO Gateway 122 to obtain the funds from the Bank 138 and communicate with the TITO System 120 to generate a TITO ticket, which may be virtual. The TITO ticket may be relayed or transmitted using the TITO Gateway 122 through the Peripheral System 130 and deposited in the mobile wallet 114. Once on the mobile wallet 114, the TITO ticket may be used to add credit to the EGM.

FIG. 6 shows a block diagram of a system 600 for adding funds to a mobile wallet 114. The system 600 is similar to the system 500 of FIG. 5, except that the Peripheral System 130 is now operable to obtain the funds from the Bank 138. One skilled in the art will recognize the corresponding changes in the signal or work flow.

FIG. 7 shows a block diagram of a system 700 for adding funds to a mobile wallet 114. The system 700 is similar to the system 600 of FIG. 6, except that the Peripheral System 130 now passes the necessary information to the TITO Gateway 122, which updates the mobile wallet 114.

Figure 8:
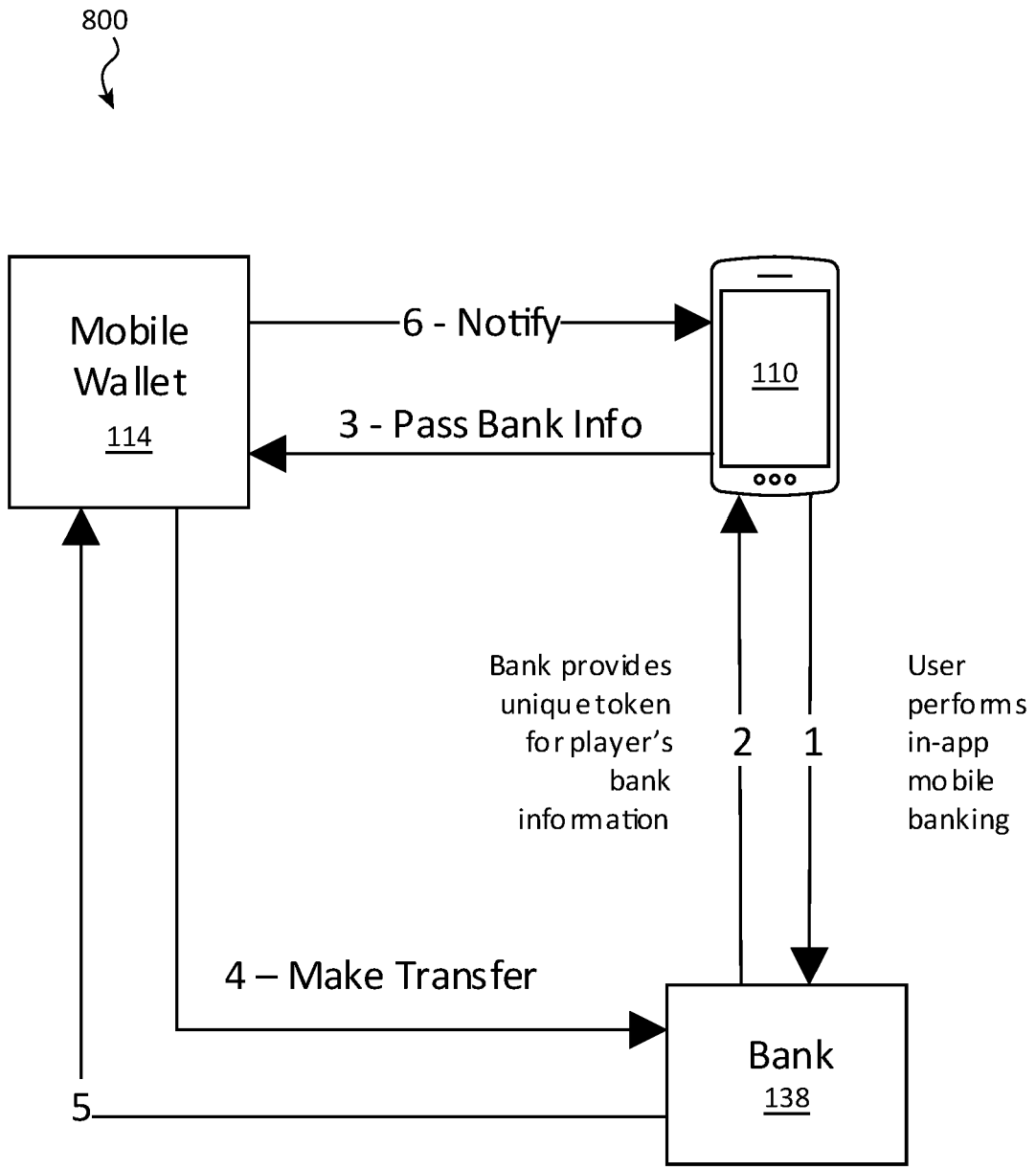

FIG. 8 shows a block diagram of components and signal flows of a system 800 by which a user may transfer funds directly to a mobile wallet 114. The system 800 may not need to operate with any of the components operated by a casino. The funds recorded as available on the mobile wallet 114 may then be used, such as by the systems and methods described in Sections II and III.

Figure 9:
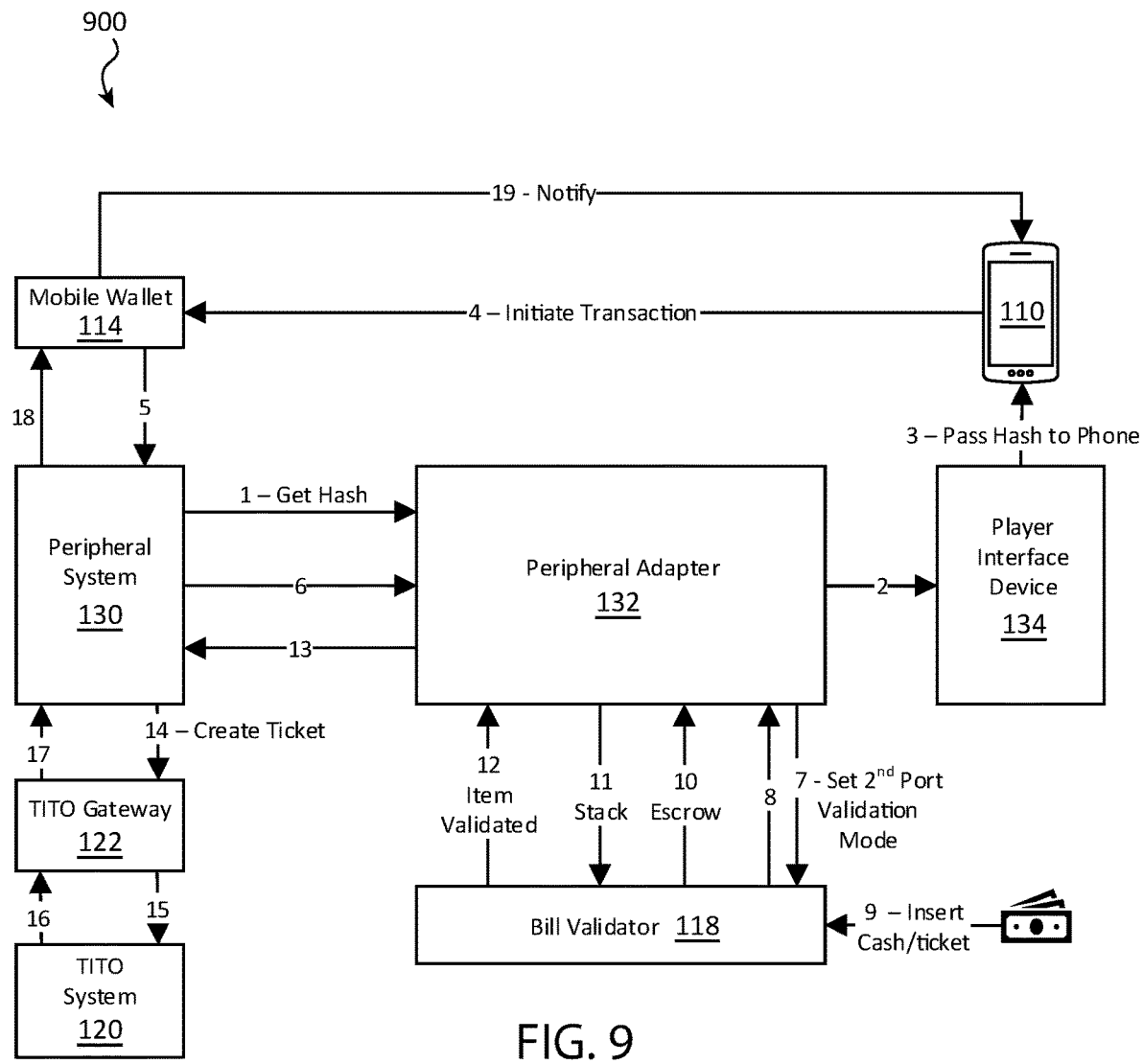
Figure 10:
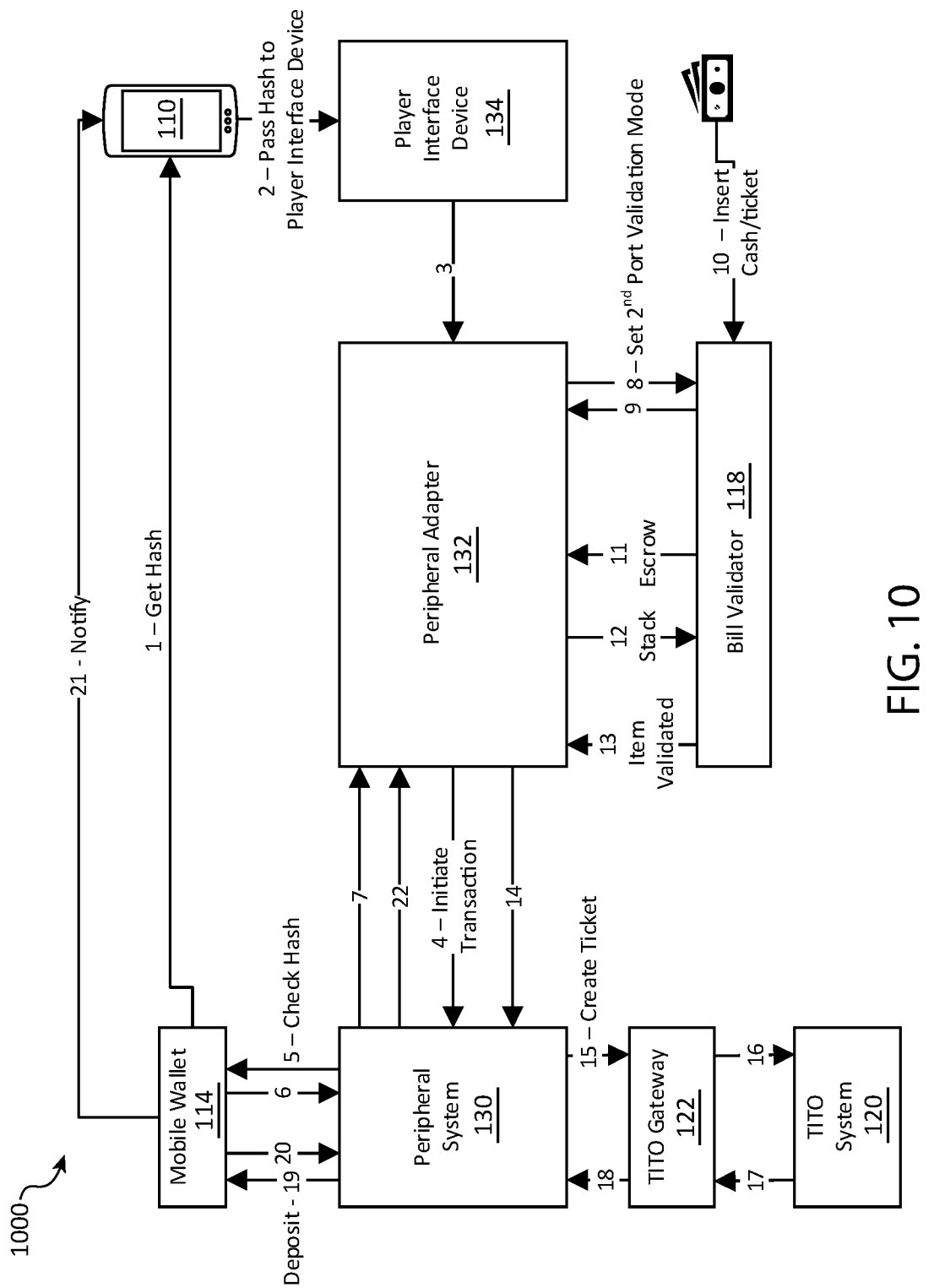

FIGS. 9-10 show block diagrams of components and signal flows of systems 900 and 1000 by which a user may add funds to a mobile wallet 114 through a bill validator 118 or with a TITO or gaming ticket. In this use case, a currency bill (or coin) or TITO ticket is entered through a primary port on the bill validator 118, and the bill or ticket is validated using a secondary port. The bill validator 118 does not apply the value of the inserted bill or TITO ticket to the EGM, but instead the value is credited as funds on the mobile wallet 114.

FIG. 9 shows a block diagram of components and signal flows of such a system 900. The mobile device 110 obtains a hash from the EGM 112 (through the Player Interface Device 134), and initiates the transaction using a mobile network by signaling the mobile wallet 114, which transmits the initiation command to the Peripheral System 130.

The Peripheral System 130 communicates, through the Peripheral Adapter 132, with the bill validator 118 to set its second port to bill validation mode and receive the bill or TITO ticket. The bill or TITO ticket is checked and validated. The Peripheral System 130 then communicates, through the TITO Gateway 122, to create the new TITO ticket having a value based on the amount of currency of the TITO ticket entered at the bill validator 118. The newly created TITO ticket is then applied to the mobile wallet 114. A notification signal can then be transmitted to the mobile device 110.

FIG. 10 shows a block diagram of components and signal flows of another such system 1000. The system 1000 is similar to the system 900, except that instead of the mobile device 110 obtaining a hash from the Player Interface Device 134, the Player Interface Device 134 obtains a hash from the mobile device 110. The signal and work flow of initiation stages is then in the opposite direction to that of the system 900 in FIG. 9.

Section II: EGM Credit in Using a TITO System

This section describes systems, methods, and devices by which a user may add gaming credit to an EGM. The systems, methods, and devices may use the various components described above, and may involve interactions between the user's mobile device and/or mobile wallet.

FIGS. 11-14 show block diagrams 1100-1400 of components and signal flows of methods and systems by which credit is applied to an EGM using a bump communication process between the user's mobile device and an EGM to initiate a transaction to print a physical TITO ticket from a virtual TITO ticket on the mobile device at the EGM. The physical TITO ticket may then be inserted into a bill validator to apply its credit to the EGM.

Figure 11:
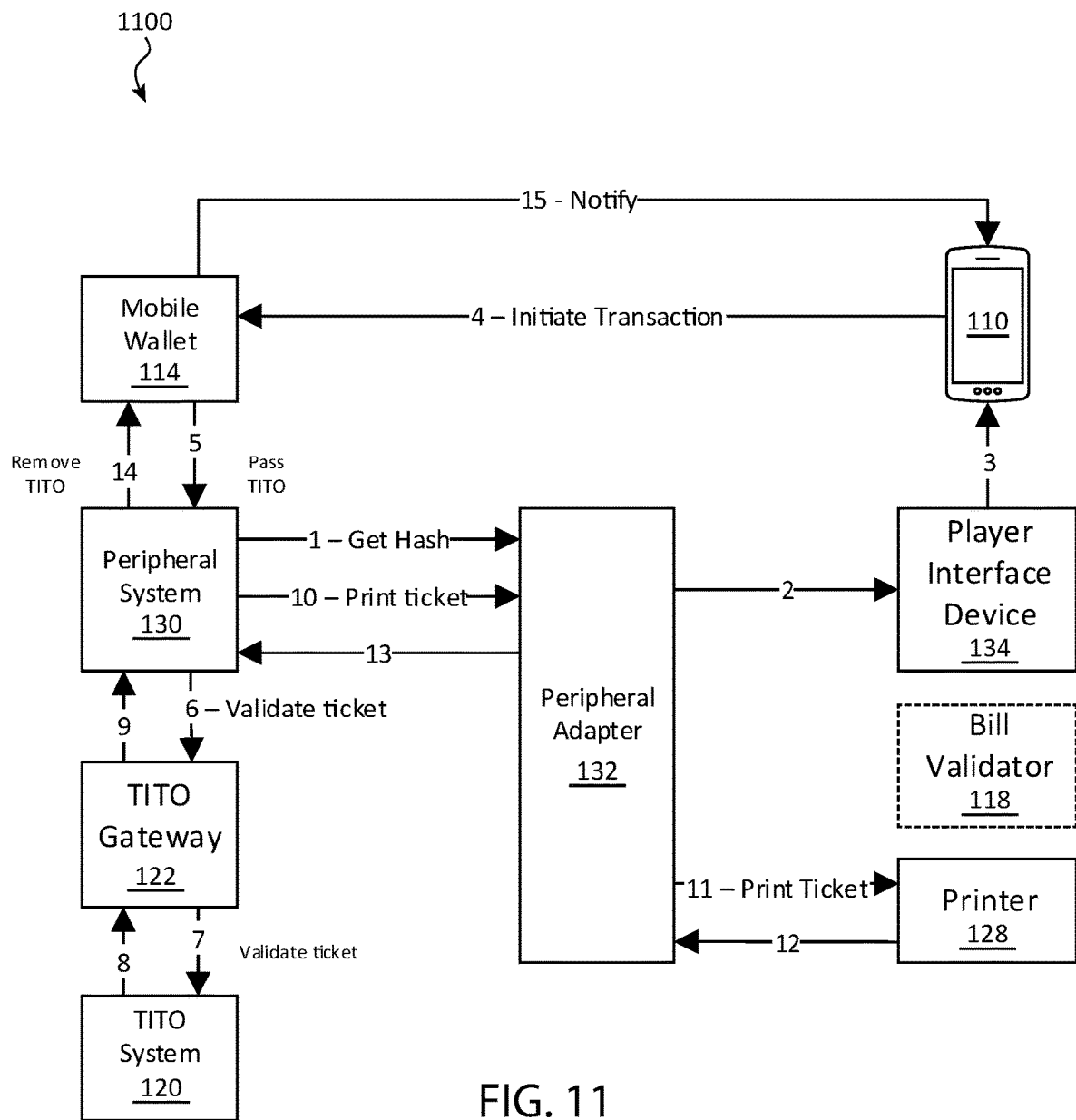
FIGS. 11-30 show block diagrams of various systems, methods, and devices related to adding gaming credit to an electronic gaming machine.

FIG. 11 shows a block diagram of components and signal flows of a system 1100 by which a user at an EGM may add credit to the EGM. The transaction is initiated by the user at the EGM retrieving a hash from the EGM in response to a bump communication with the mobile device 110. The hash may be generated or relayed from the Peripheral System 130 through the Peripheral Adapter 132 to the Player Interface Device 134 to be obtained by the user's mobile device 110. The hash is then communicated from the user's mobile device 110 to the user's mobile wallet 114. The hash in this embodiment may be communicated using a mobile or cellular network. The mobile wallet 114 may then pass the hash and/or related information, such as a validation number, to the Peripheral System 130.

The Peripheral System 130 may then pass the validation number to a TITO System 120 as part of a query to verify that the validation number is still active prior to the printing of a physical ticket. Validation may be performed by communications between the Peripheral System 130 and the TITO System 120, with the communications made through the TITO Gateway 122.

If the validation number is no longer active, the Peripheral System 130 may relay a corresponding message to the mobile wallet 114, which may notify the user's mobile device 110 of the invalidity. The user may then attempt to re-initiate the transaction. If the validation number is still active, the Peripheral System 130 may communicate, such as through the Peripheral Adapter 132, with the Printer 128 to print the TITO ticket.

The printed TITO ticket may then be inserted into a bill validator, such as may be a component within either the Peripheral Adapter 132 or associated with the EGM, to add the credit of the TITO ticket. The Peripheral System 130 may then communicate to the mobile wallet 114 to delete or remove the TITO ticket information from the mobile wallet 114.

Figure 12:
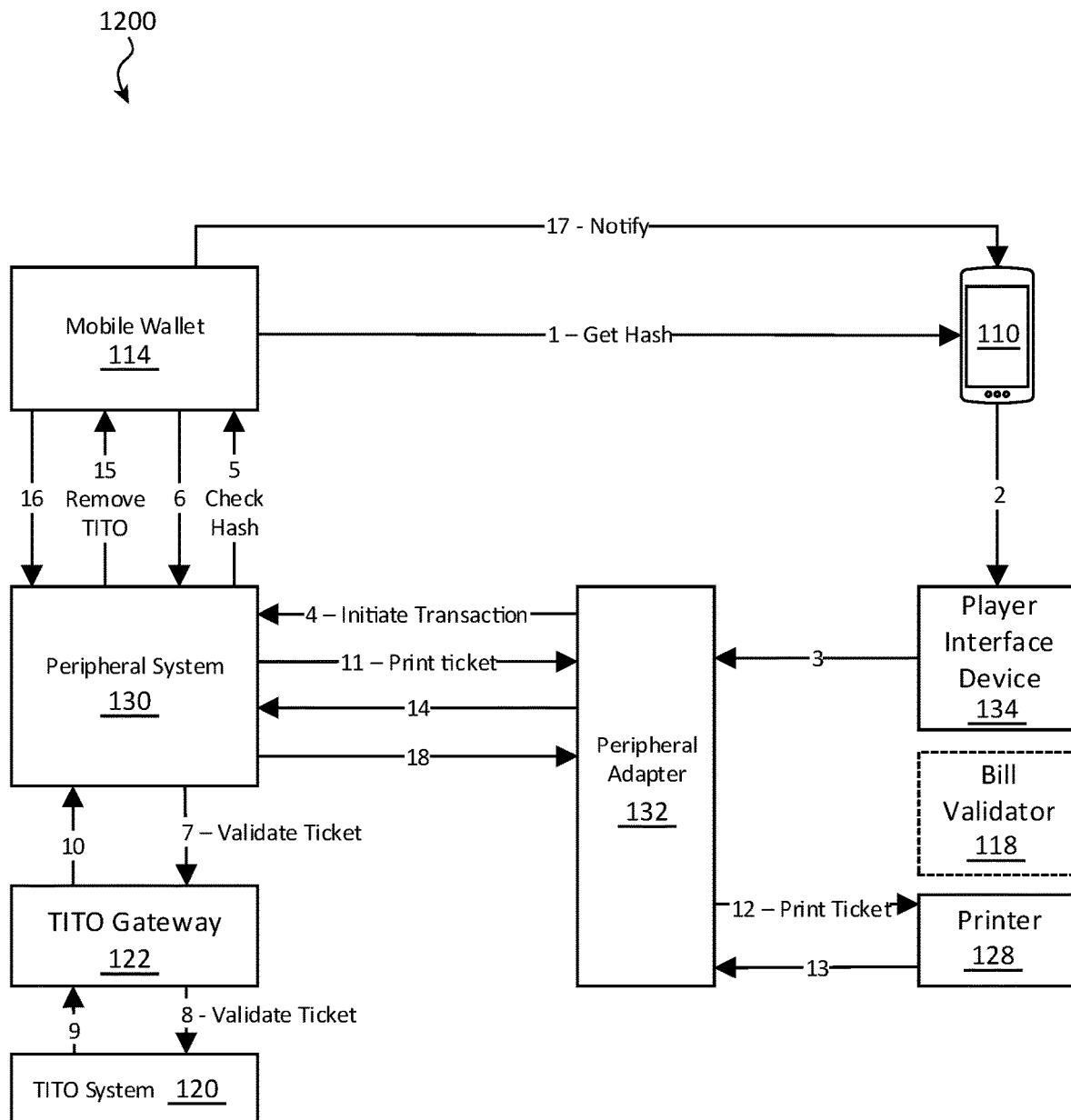
Figure 13:
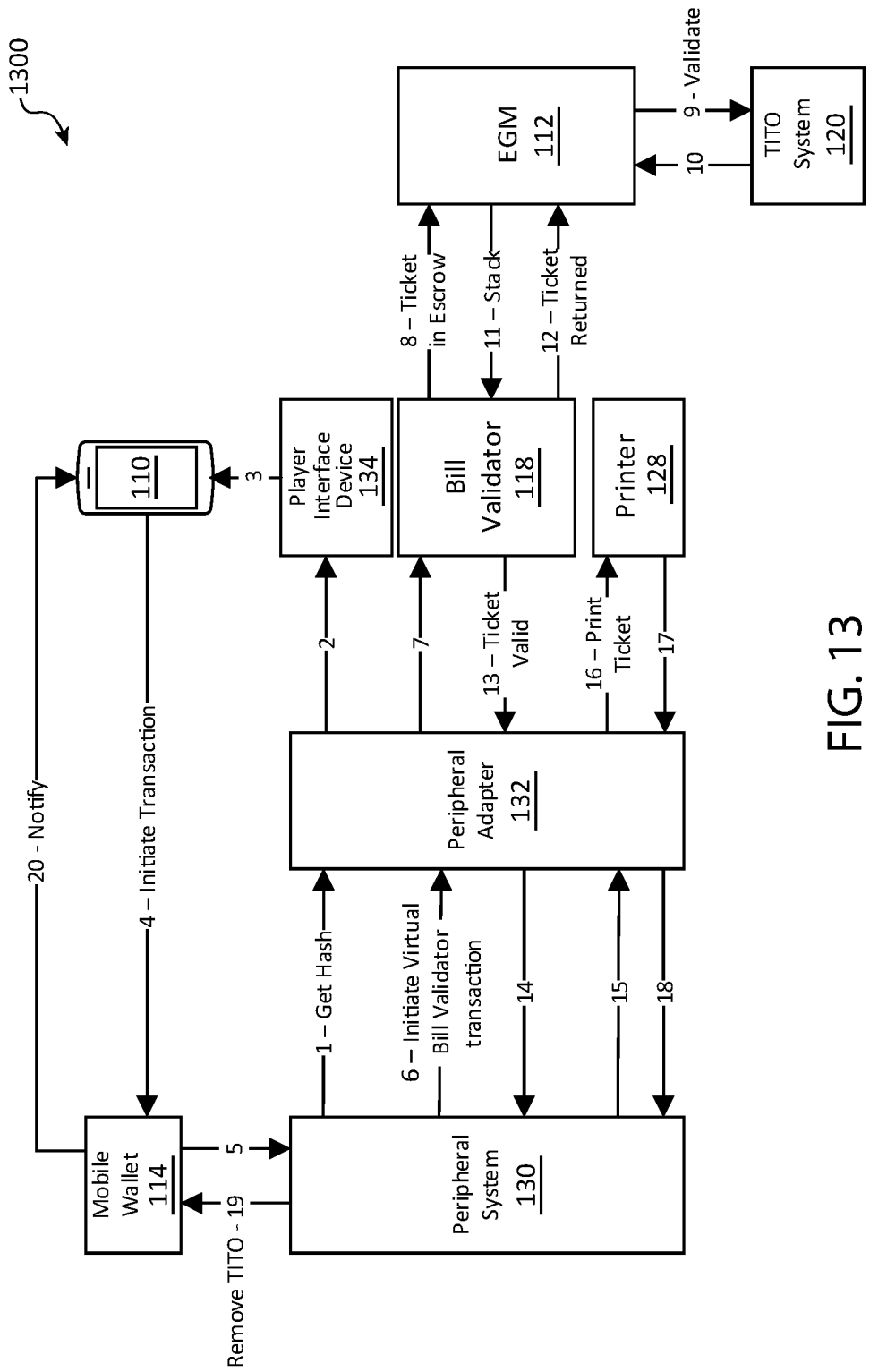
Figure 14:
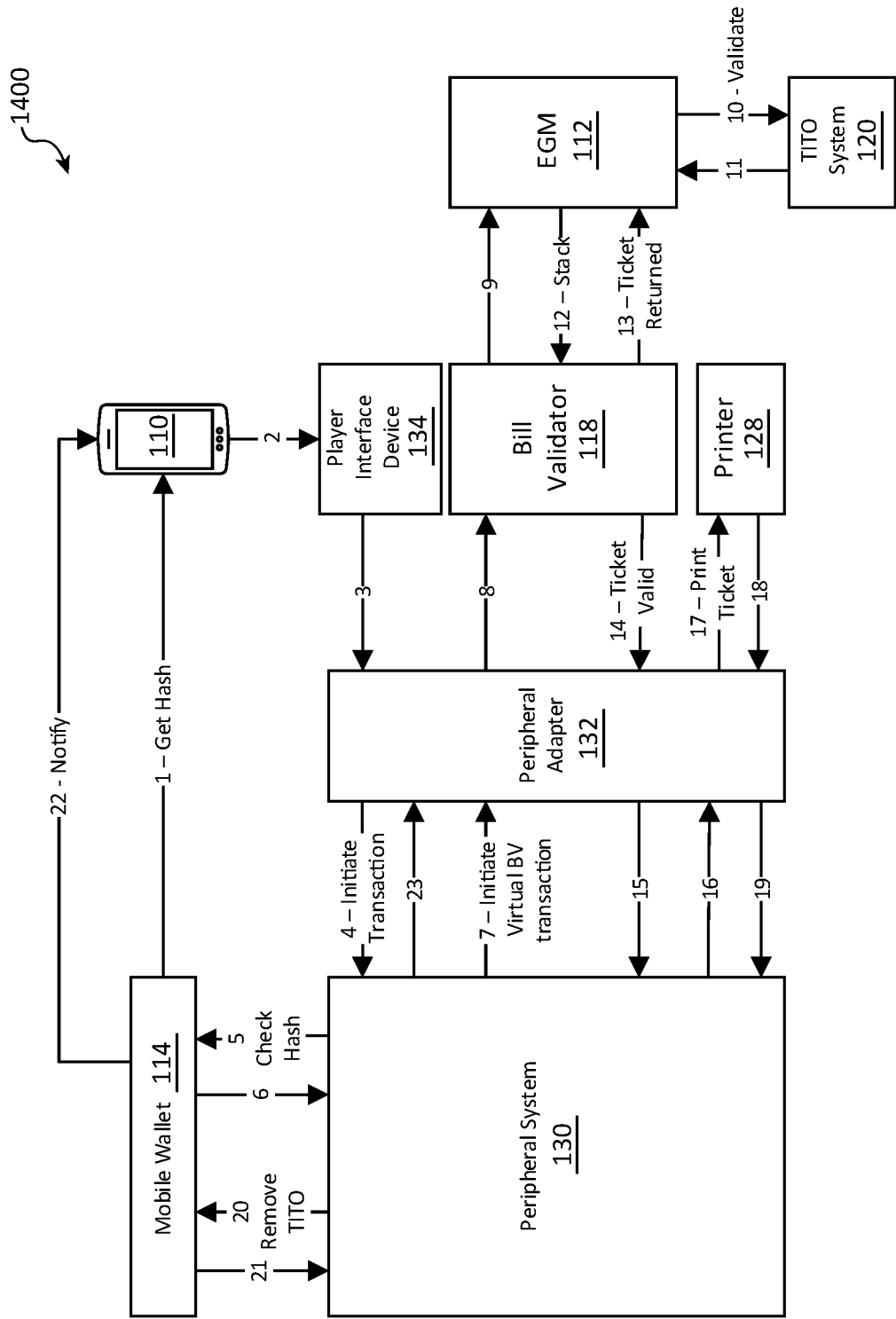

The systems 1200-1400 disclosed in FIGS. 12-14 are variations of the system 1000, and as one skilled in the art will recognize the needed modifications, their descriptions will describe the variations.

FIG. 12 shows a block diagram of components and signal flows of a system 1200 by which a user at an EGM may add credit to the EGM. The system 1200 is similar to the system 1100, except that instead of the mobile device 110 obtaining a hash from the Player Interface Device 134, the Player Interface Device 134 itself obtains a hash from the mobile device 110. The hash may have been obtained by the mobile device 110 from the mobile wallet 114 by a communication over the casino's network. The signal and work flow of the initiation stages is then in the opposite direction to that of the system 1100.

FIG. 13 shows a block diagram of components and signal flows of a system 1300 by which a user at an EGM 112 may add credit to the EGM 112. The system 1300 is similar to the system 1100 except that instead of passing the ticket validation number to the TITO Gateway 122 for validation, the validation number is passed to the EGM 112 through the bill validator 118.

This may have the form (such as a signal or ticket data) of a ticket-in-escrow. The EGM 112 may communicate back to the bill validator 118 to stack the ticket, which will indicate that the ticket is valid, and is to be printed by the Printer 128. Once printed, the ticket may be 'stacked' within the bill validator 118. The Peripheral Adapter 132 may then communicate to the Peripheral System 130 to communicate to the mobile wallet 114 to remove the TITO ticket.

Alternatively, for various reasons, the EGM 112 may communicate back to the bill validator 118 without indication to stack or print the ticket. This may occur even if the ticket is valid, but otherwise not redeemable. The EGM 112 then may communicate to the bill validator 118 that the ticket was returned or not accepted.

FIG. 14 shows a block diagram of components and signal flows of a system 1400 by which a user at an EGM 112 may add credit to the EGM 112. The system 1400 is similar to that of the system 1300, except that instead of the mobile device 110 obtaining a hash from the Player Interface Device 134 to initiate a transaction, the Player Interface Device 134 obtains the hash from the mobile device 110, and the signal and/or work flow of the initiation stages is then in the opposite direction to that of the system 1300.

Figure 15:
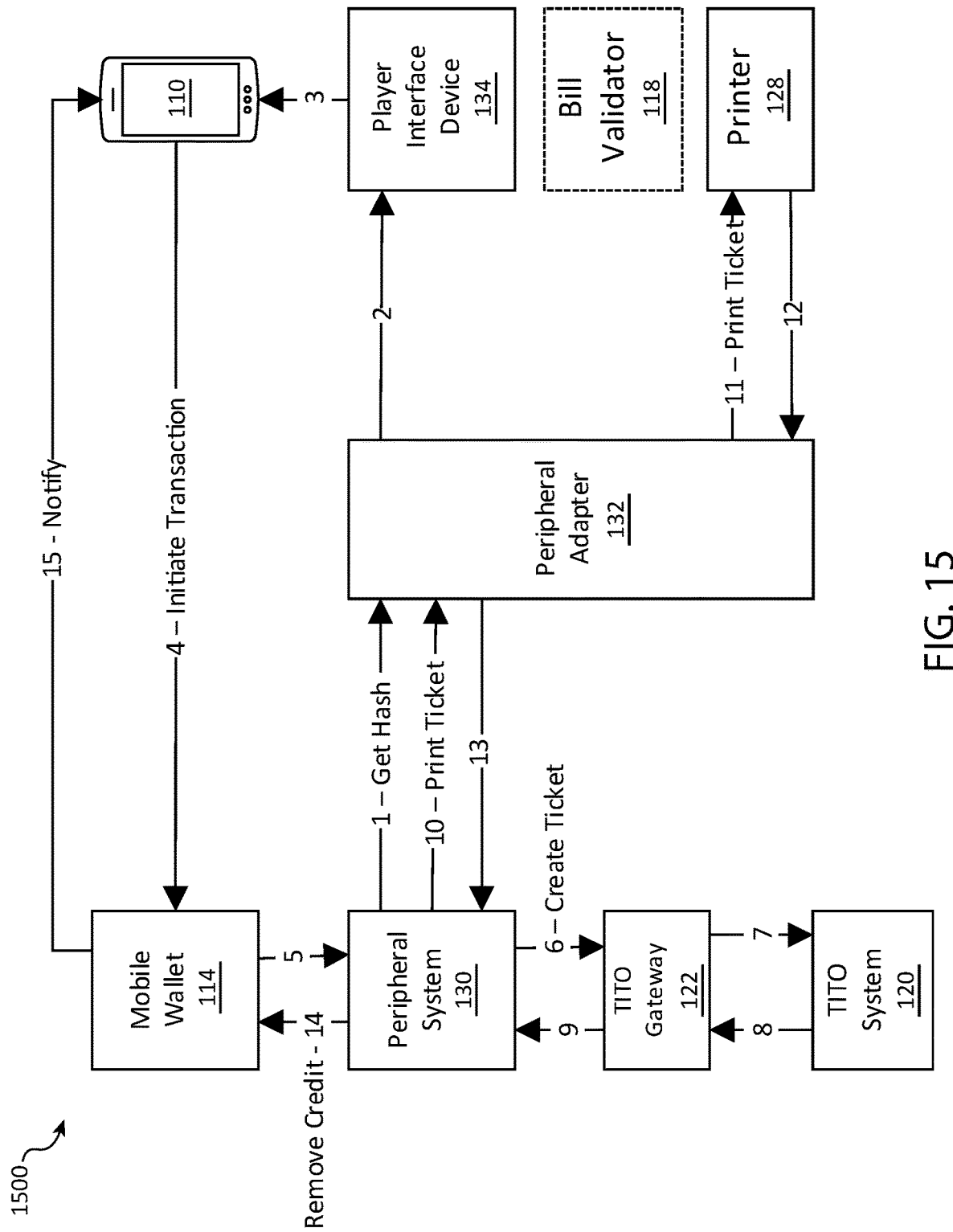
Figure 16:
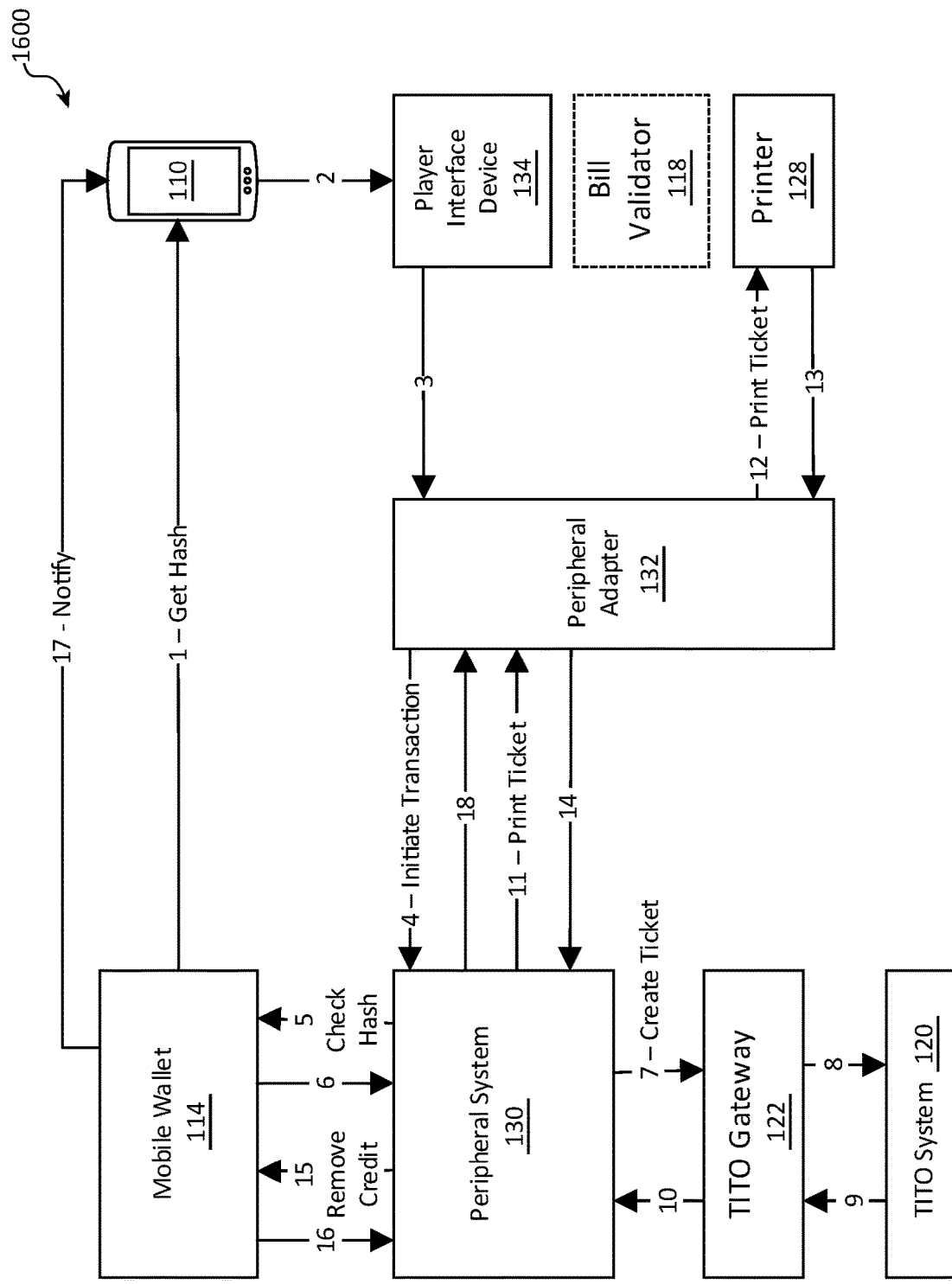

FIGS. 15-16 show block diagrams of components and signal flows of systems 1500 and 1600 of applying credit to an EGM from a value stored on a user's mobile wallet in the form of a currency amount, rather than stored in the form of a virtual gaming ticket, as in the system 1100. When a user wishes to apply a currency amount stored on the mobile wallet as a credit to an EGM, a TITO ticket of an appropriate amount is generated, and may then be printed. This may ensure proper accounting with the casino management system.

FIG. 15 shows a block diagram of components and signal flows of a system 1500 by which a user at an EGM may add credit to the EGM. The configuration of the system 1500 is similar to that of the system 1100 of FIG. 11, except, as mentioned, the mobile wallet 114 stores credit in the form of a currency amount. As explained in regard to the system 1100, in the system 1500 the mobile device 110 obtains the hash from the EGM, and initiates the transaction using a mobile network.

FIG. 16 shows a block diagram of components and signal flows of a system 1600 by which a user at an EGM may add credit to the EGM 112. The configuration of the system 1600 is similar to that of the system 1500, except that in the system 1600 the Player Interface Device 134 obtains the hash from the mobile device 110, and the work or signal flow of the initiation stages is then in the opposite direction to that of the system 1500.

Figure 17:
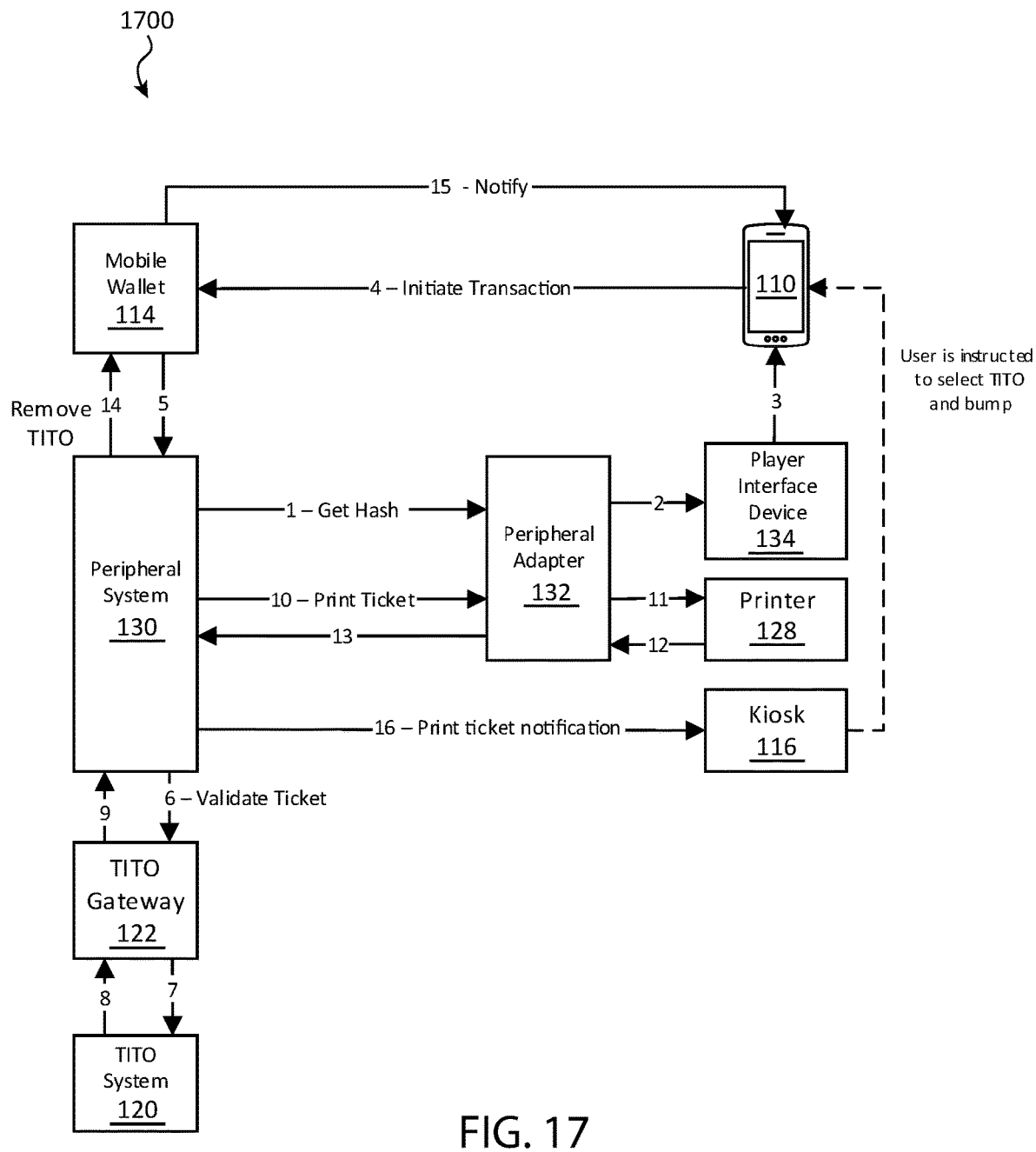
Figure 18:
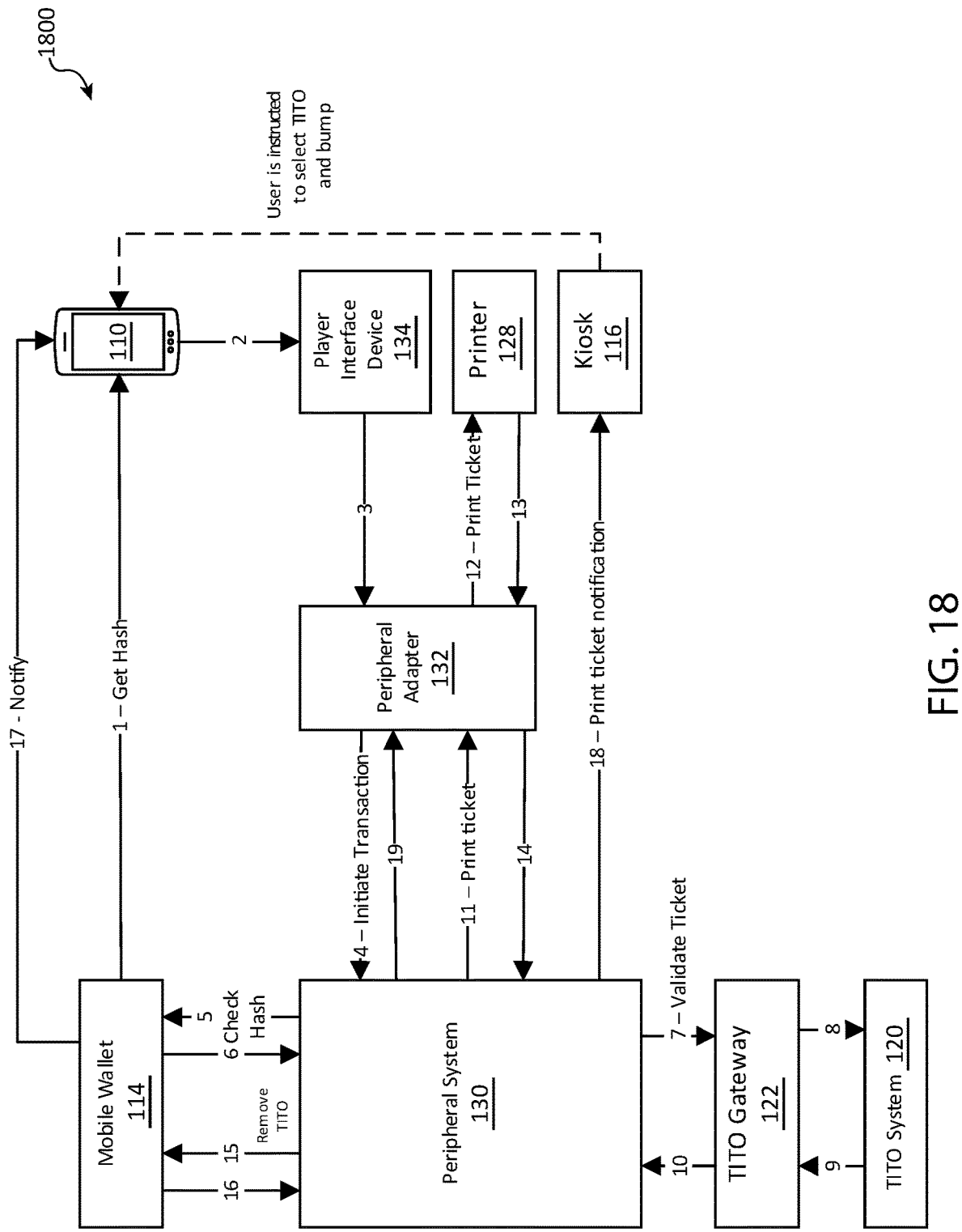

FIGS. 17-18 show block diagrams of components and signal flows of systems 1700 and 1800 similar to those of the systems 1100-1400 of FIGS. 11-14. In the systems 1700 and 1800, a credit is applied to an EGM using a bump communication process between the user's mobile device and an EGM to print a physical TITO ticket from a virtual TITO ticket stored on a mobile wallet 114 of the user. These cases include notifying the user through the kiosk that the user may bump to print the ticket, and receiving a notification that the ticket has been printed.

FIG. 17 shows a block diagram of components and signal flows of a system 1700 by which a user at an EGM may add credit to the EGM. The system 1700 is similar to the system 1100 of FIG. 11, except that after the Printer 128 has printed the ticket, the Peripheral System 130 includes a communication to the kiosk 116 that the ticket has been printed.

FIG. 18 shows a block diagram of components and signal flows of a system 1800 by which a user at an EGM may add credit to the EGM. The system 1800 is similar to the system 1700 of FIG. 17, except that the instead of the mobile device 110 obtaining the hash to initiate the transaction, the Player Interface Device 134 obtains the hash from the mobile device 110, and some signals or work flows of the initiation stages are then in the opposite direction to that of the system 1700, as shown. As with the system 1700, the system 1800 includes a communication to the kiosk 116 that the ticket has been printed.

FIGS. 19-22 show block diagrams of components and signal flows of the systems 1900-2200 in which a credit is applied to an EGM using a bump communication process between the user's mobile device and an EGM 112. The systems 1900-2200 are modifications of the system 1100. In the modifications of the systems 1900-2200, the user bumps the EGM to send a message to create a ticket, but instead of printing the ticket, a virtual ticket transaction is performed using the bill validator.

Figure 19:
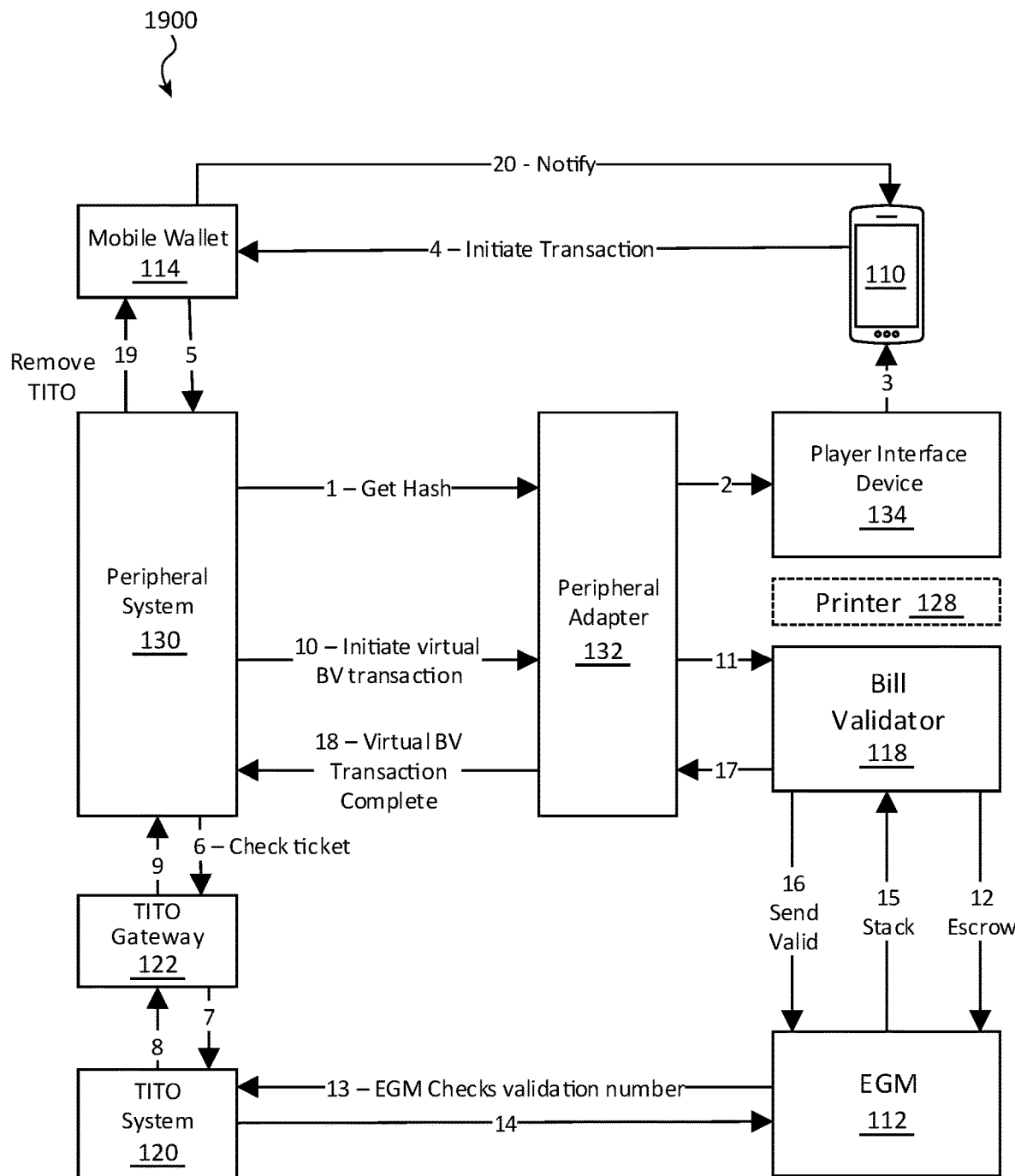

FIG. 19 shows a block diagram of components and signal flows of a system 1900 by which a user at an EGM 112 may add credit to the EGM 112. The system 1900 proceeds through stages similar to the first nine stages of the system 1100. At the indicated stage 10, the Peripheral System 130 initiates a virtual transaction by communications through the Peripheral Adapter 132 to the bill validator 118. The bill validator 118 may communicate with the EGM 112, such as by sending a ticket-in-escrow.

Similar to the system 1400, the EGM 112 may then check the validation number of the ticket, and relay the information to the bill validator 118. But instead of printing the ticket, in system 1900, the bill validator 118 may be configured to communicate to the EGM 112 to apply the credit, without physically printing the ticket.

A 'virtual BV transaction complete' message may then be transmitted from the Peripheral Adapter 132 to the Peripheral System 130, which may then transmit a message to the mobile wallet 114 to remove the ticket stored on the mobile wallet 114.

Figure 20:
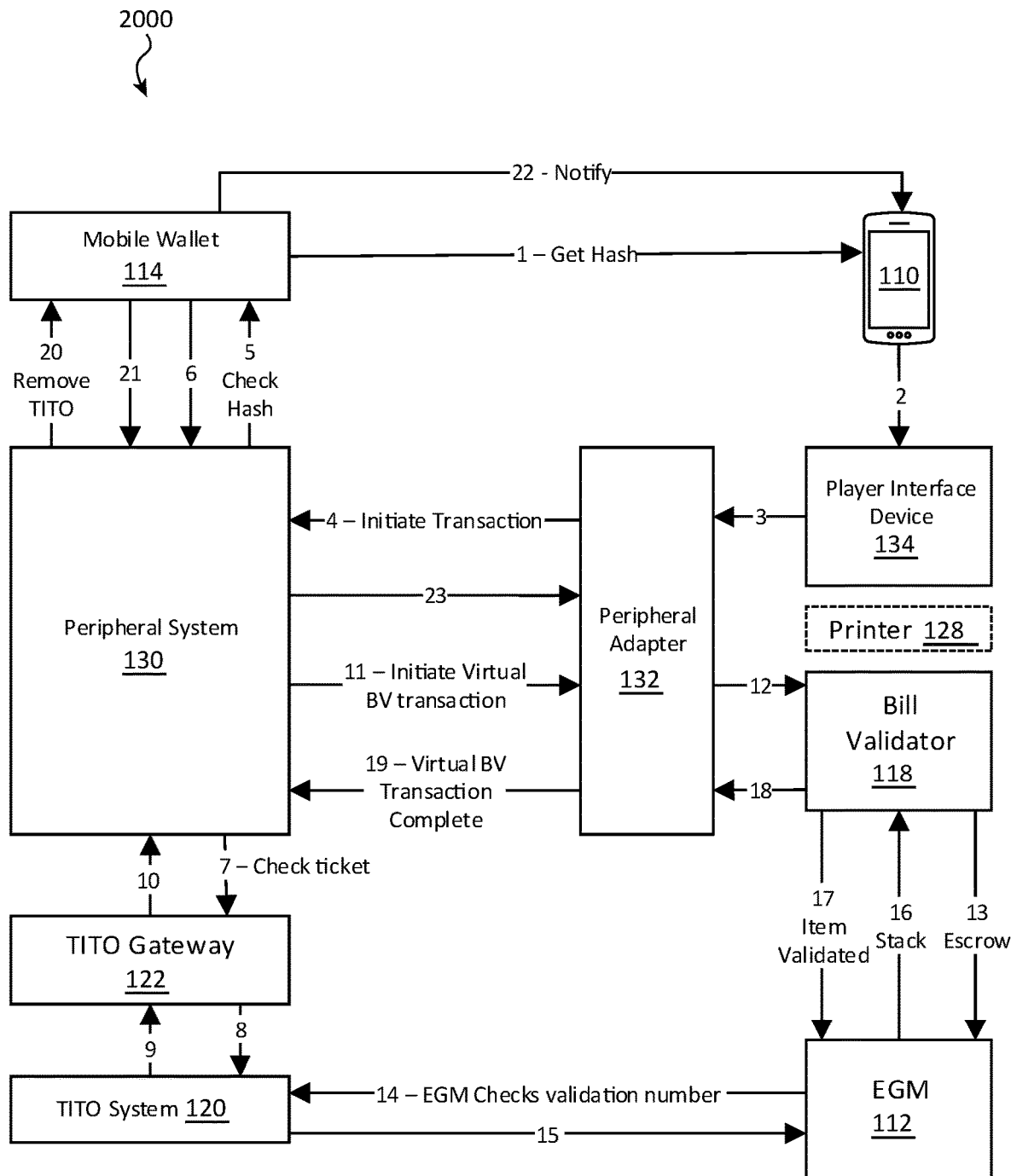

FIG. 20 shows a block diagram of components and signal flows of a system 2000 by which a user at an EGM 112 may add credit to the EGM 112. The system 2000 is similar to that of system 1900, except that the Player Interface Device 134 obtains the hash from the mobile device 110, and the work or signal flow of the initiation stages is then in the opposite direction to that of system 1900, as shown.

Figure 21:
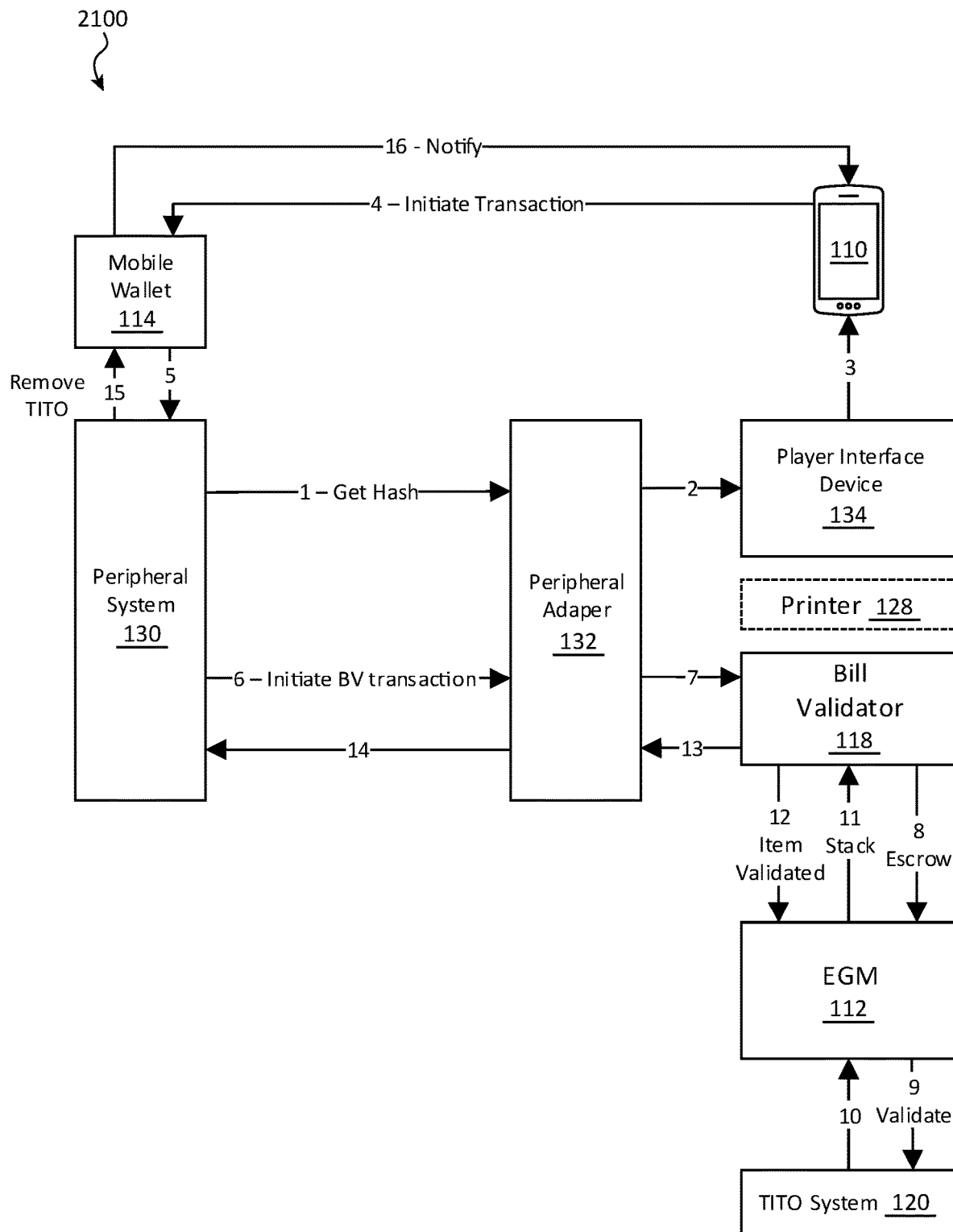

FIG. 21 shows a block diagram of components and signal flows of a system 2100 by which a user at an EGM 112 may add credit to the EGM 112. The system 2100 is similar to that of the system 1900, except the TITO Gateway 122 of the system 1900 is not used for determining validity of a ticket. Instead the ticket is transmitted to the EGM 112 for determination of the ticket's validity by communication between the EGM 112 and the TITO system 120.

Figure 22:
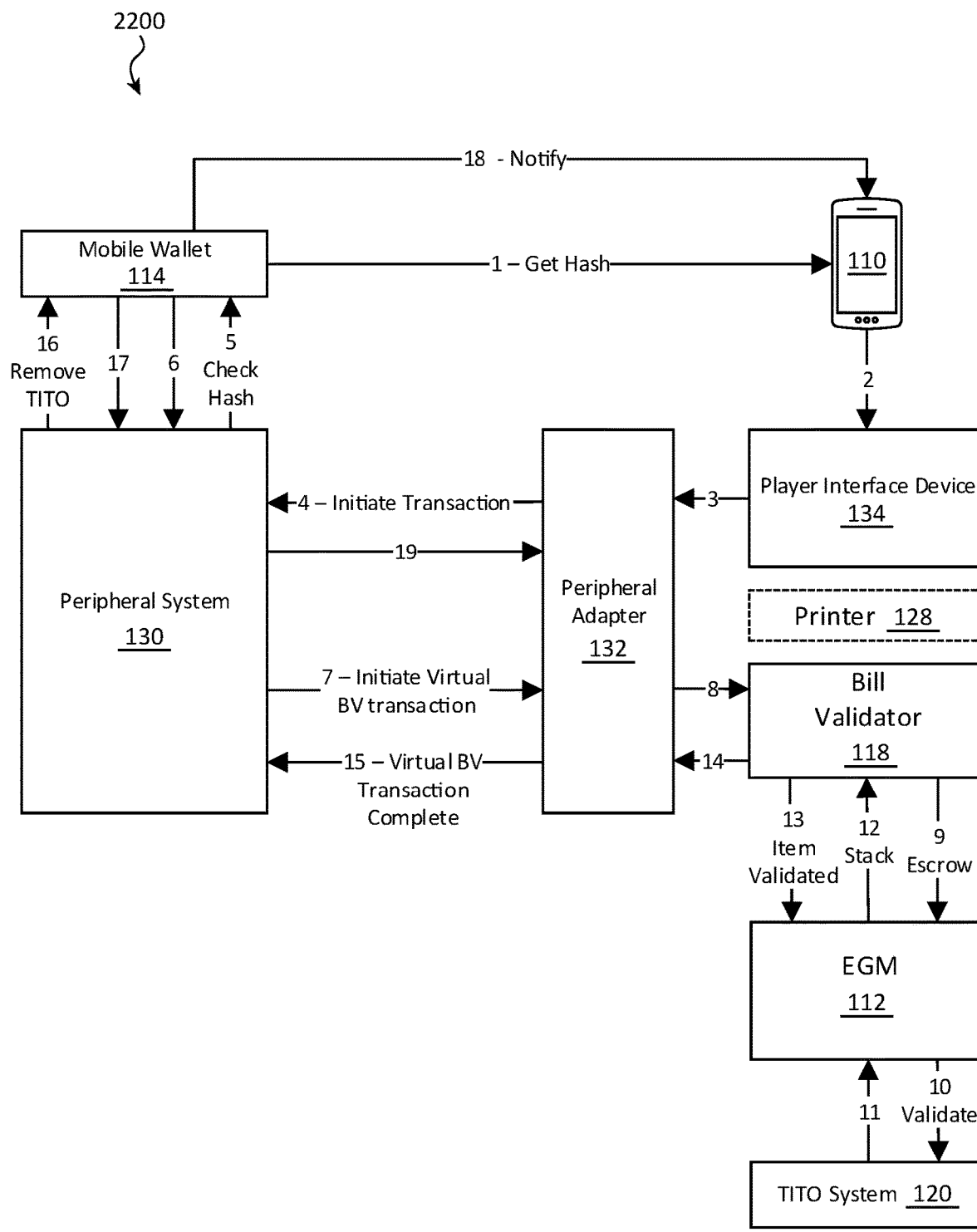

FIG. 22 shows a block diagram of components and signal flows of a system 2200 by which a user at an EGM 112 may add credit to the EGM 112. The system 2200 is similar to that of the system 2100, except that the Player Interface Device 134 obtains the hash from the mobile device 110 to initiate the transaction, and at the indicated stages the signal or work flow is reversed.

Figure 23:
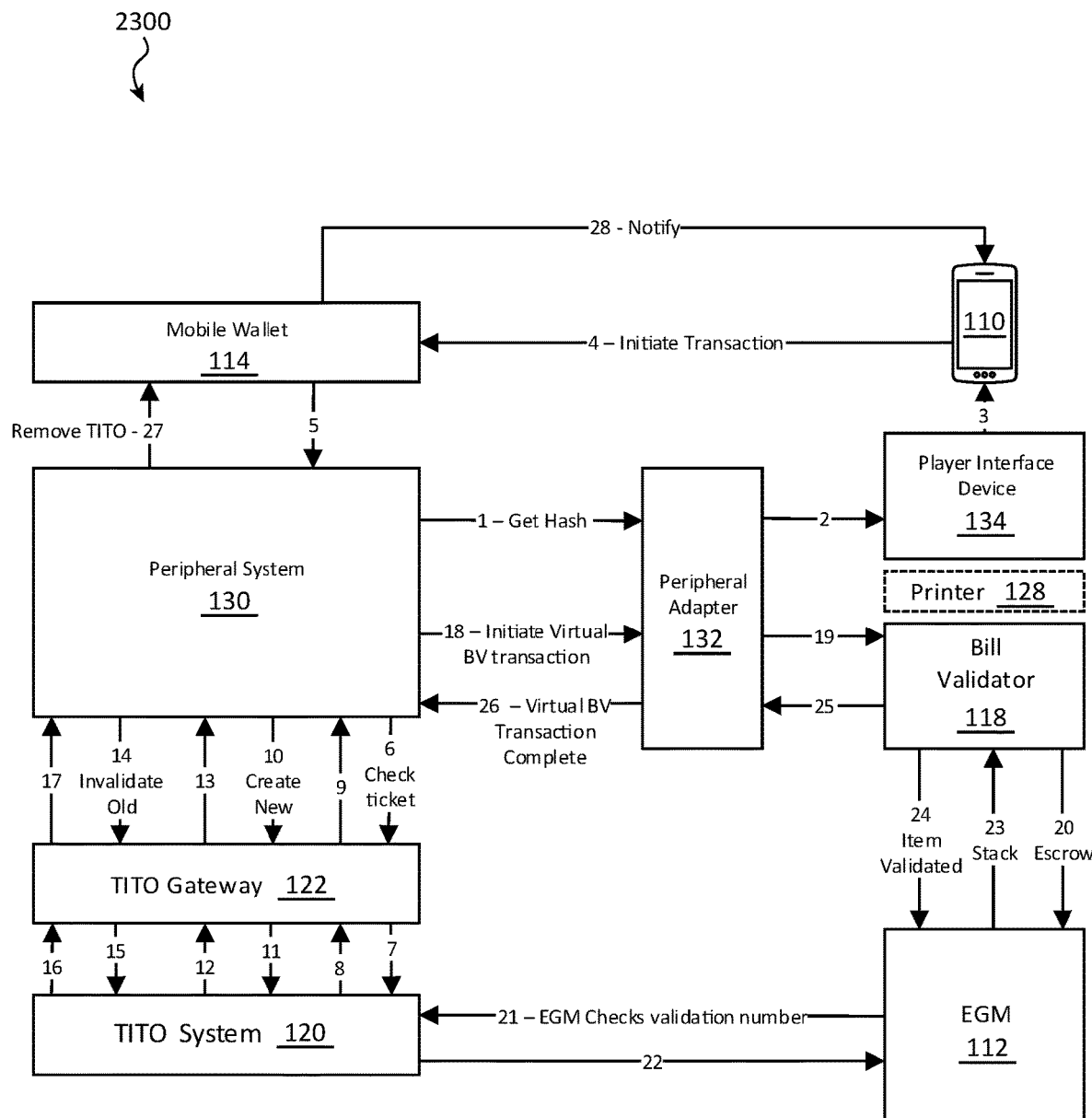
Figure 24:
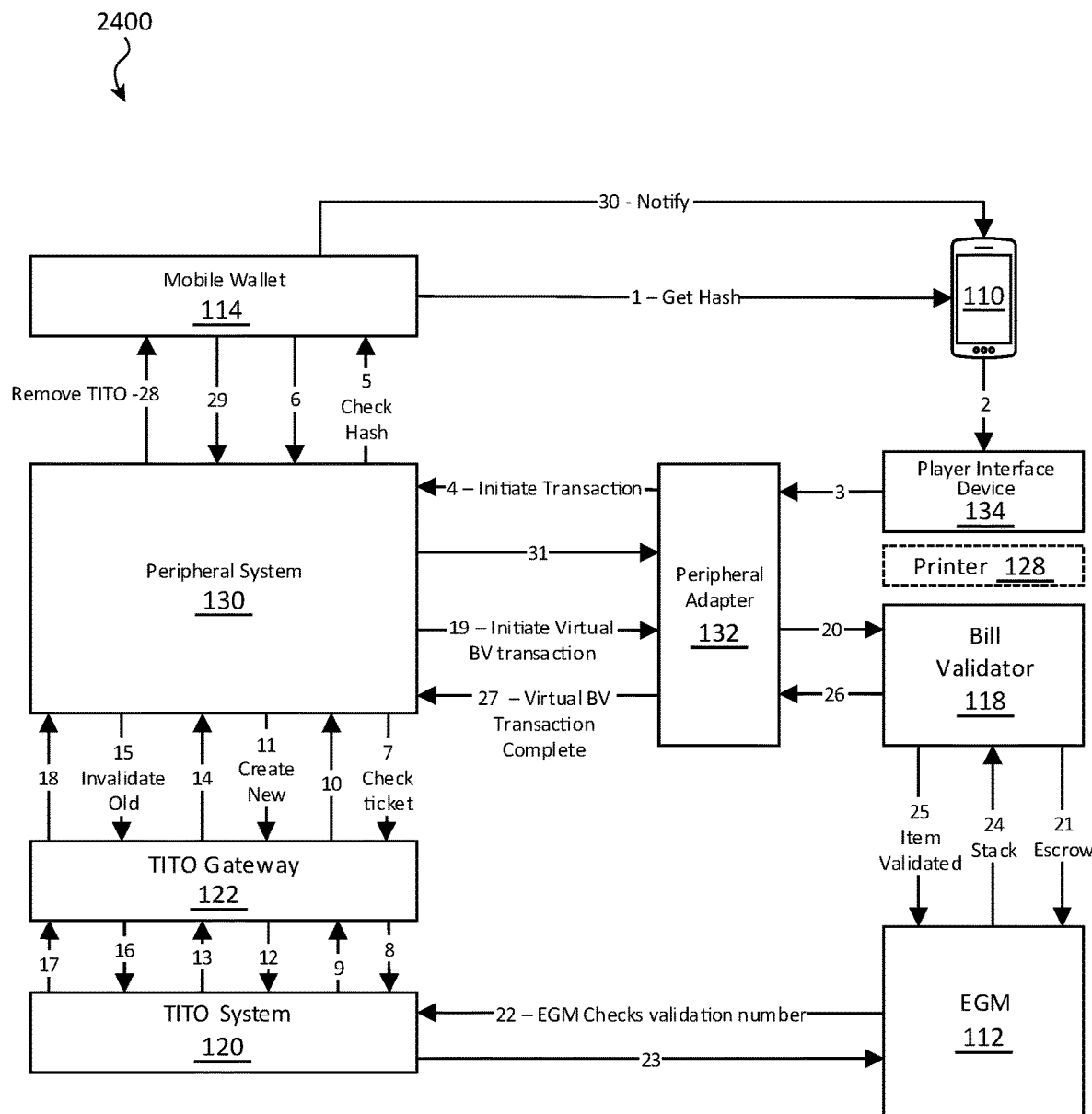

FIGS. 23-24 show block diagrams of components and signal flows of the systems 2300 and 2400 in which a credit is applied to an EGM using a bump communication process between the user's mobile device and an EGM. The user bumps the EGM to send a message to create a ticket, but instead of printing the ticket, or passing the original ticket validation number to the EGM, an alternate ticket validation number is created and passed to the EGM. The systems 2300 and 2400 are similar to the system 1900, except that further stages and/or operations are added for checking the validity of the ticket.

FIG. 23 shows a block diagram of components and signal flows of a system 2300 by which a user at an EGM 112 may add credit to the EGM 112. The system 2300 proceeds as in the system 1900 with the mobile device 110 obtaining a hash from the EGM 112, and initiating the transaction using a mobile or cellular network. In the system 2300, the validation number is passed to the TITO Gateway 122 to verify its validity. It is then replaced with a new validation number that is passed to the EGM 112. Other stages and/or operations may be as described in relation to system 1900.

FIG. 24 shows a block diagram of components and signal flows of a system 2400 by which a user at an EGM 112 may add credit to the EGM 112. The system 2400 is similar to that of the system 2300, except that the Player Interface Device 134 obtains the hash from the mobile device 110 to initiate the transaction, and at the indicated stages the signal or work flow is reversed.

Figure 25:
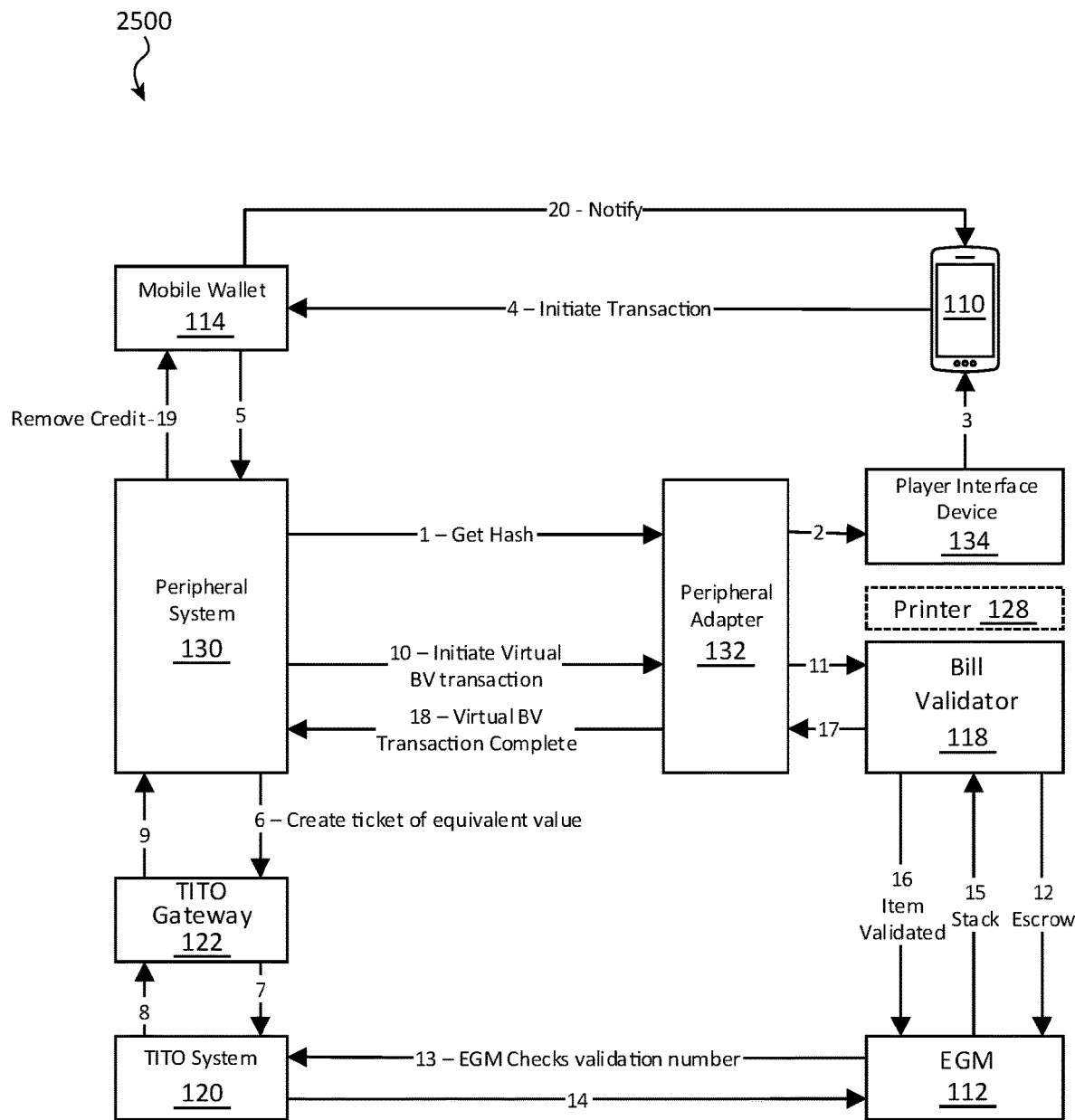
Figure 26:
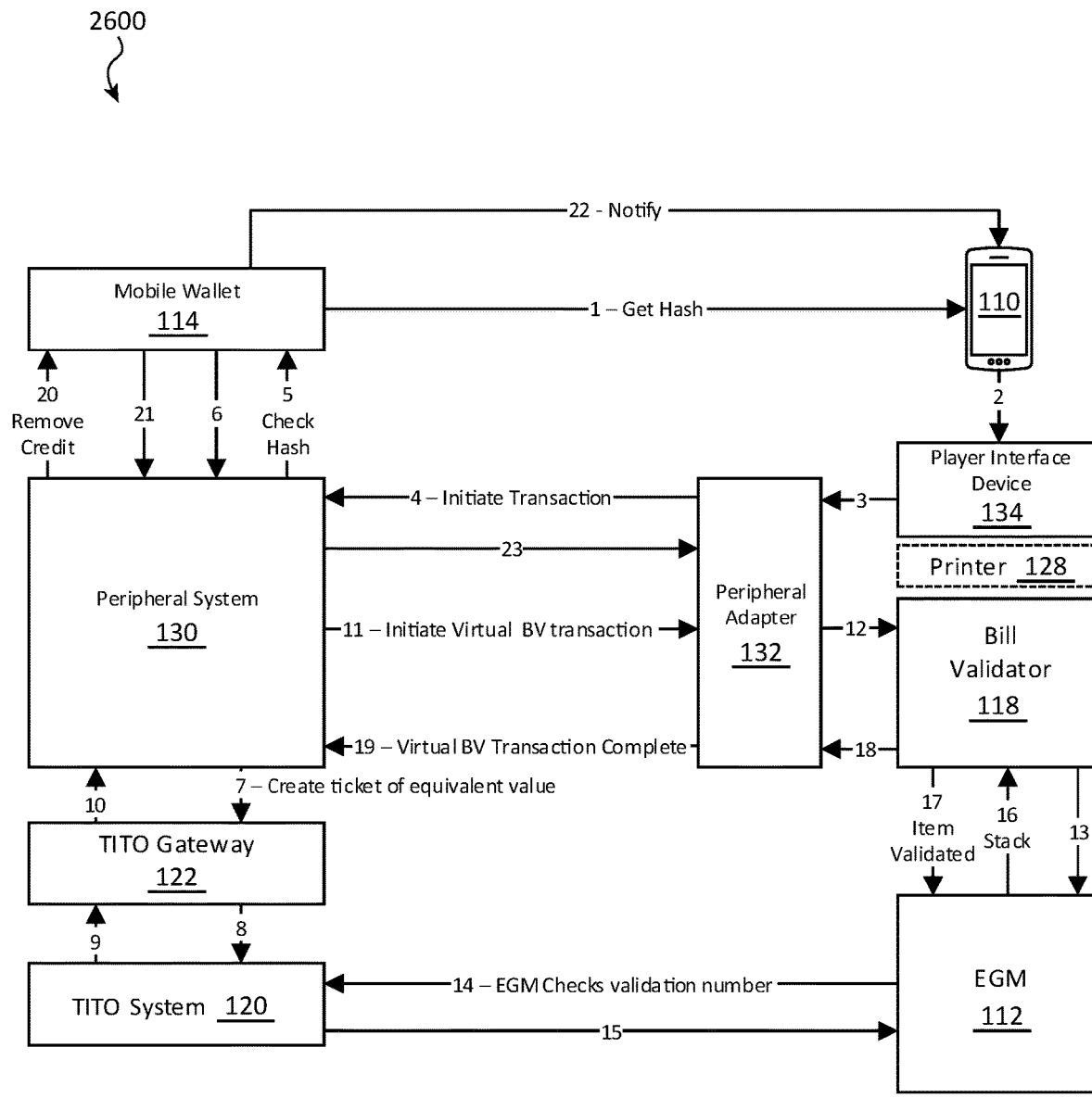

FIGS. 25-26 show block diagrams of components and signal flows of the systems 2500 and 2600 in which a credit is applied to an EGM using a bump communication process between the user's mobile device and an EGM. The mobile device has, or has access to, an amount of electronic credit, such as from or on a mobile wallet. The user bumps the EGM to send a message to create a ticket. A (virtual) ticket is then created with an equivalent value to the electronic credit, and a ticket validation number is passed to the EGM. The systems 2500 and 2600 are similar to the systems 2300 and 2600, in that a virtual BV transaction is used.

FIG. 25 shows a block diagram of components and signal flows of a system 2500 by which a user at an EGM 112 may add credit to the EGM 112. The system 2500 proceeds as in the system 1900 except that the mobile wallet 114 (at the fifth stage) communicates an amount of value to the Peripheral System 130. The Peripheral System 130 then generates a ticket of equivalent value, and communicates the respective information with the TITO System 120 through the TITO Gateway 122. Other stages and/or operations may be as described in relation to the system 1900.

FIG. 26 shows a block diagram of components and signal flows of a system 2600 by which a user at an EGM 112 may add credit to the EGM 112. The system 2600 is similar to the system 2500, except that the Player Interface Device 134 obtains the hash from the mobile device 110 to initiate the transaction, and at the indicated stages the signal or work flow is reversed.

Figure 27:
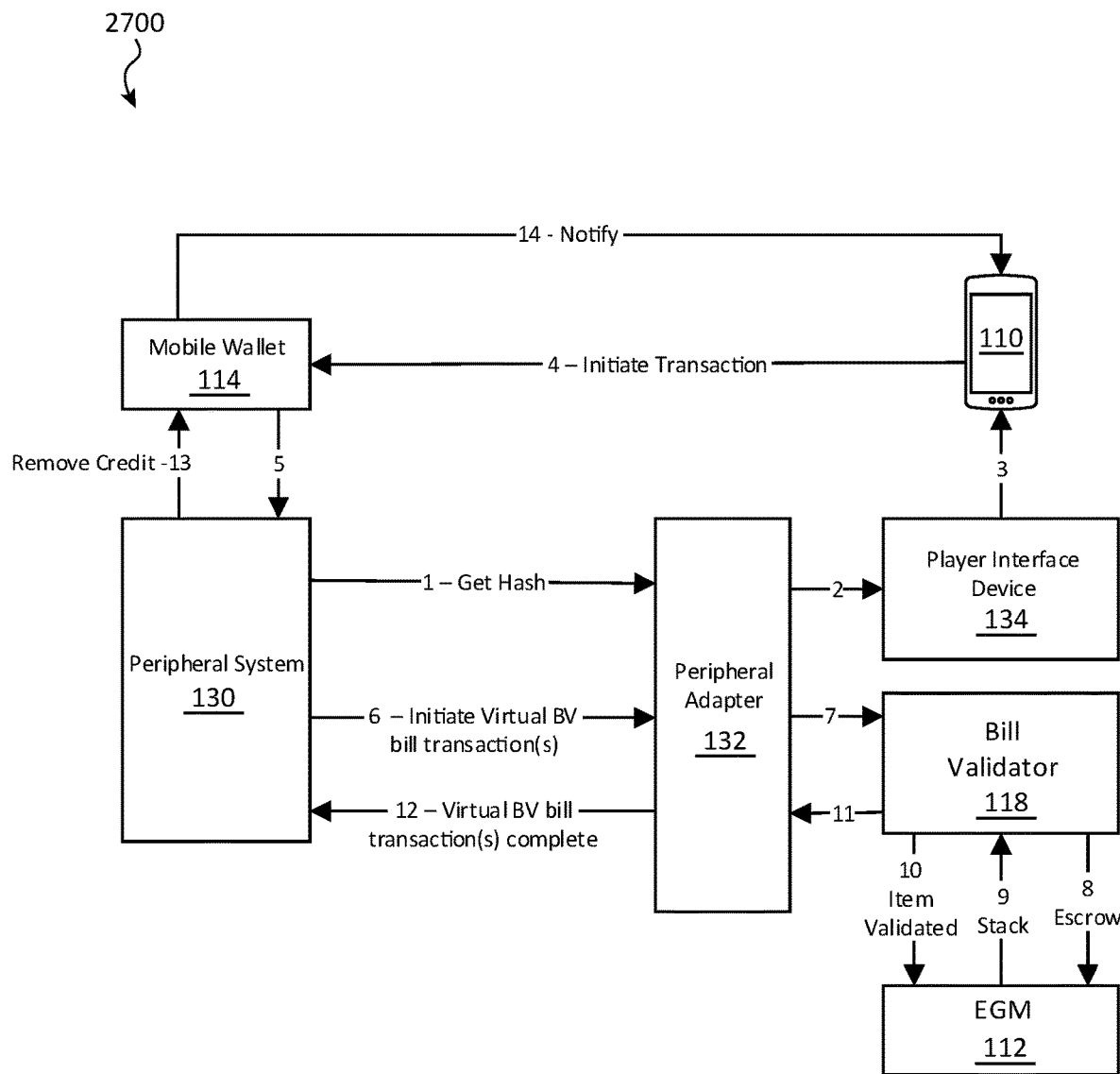
Figure 28:
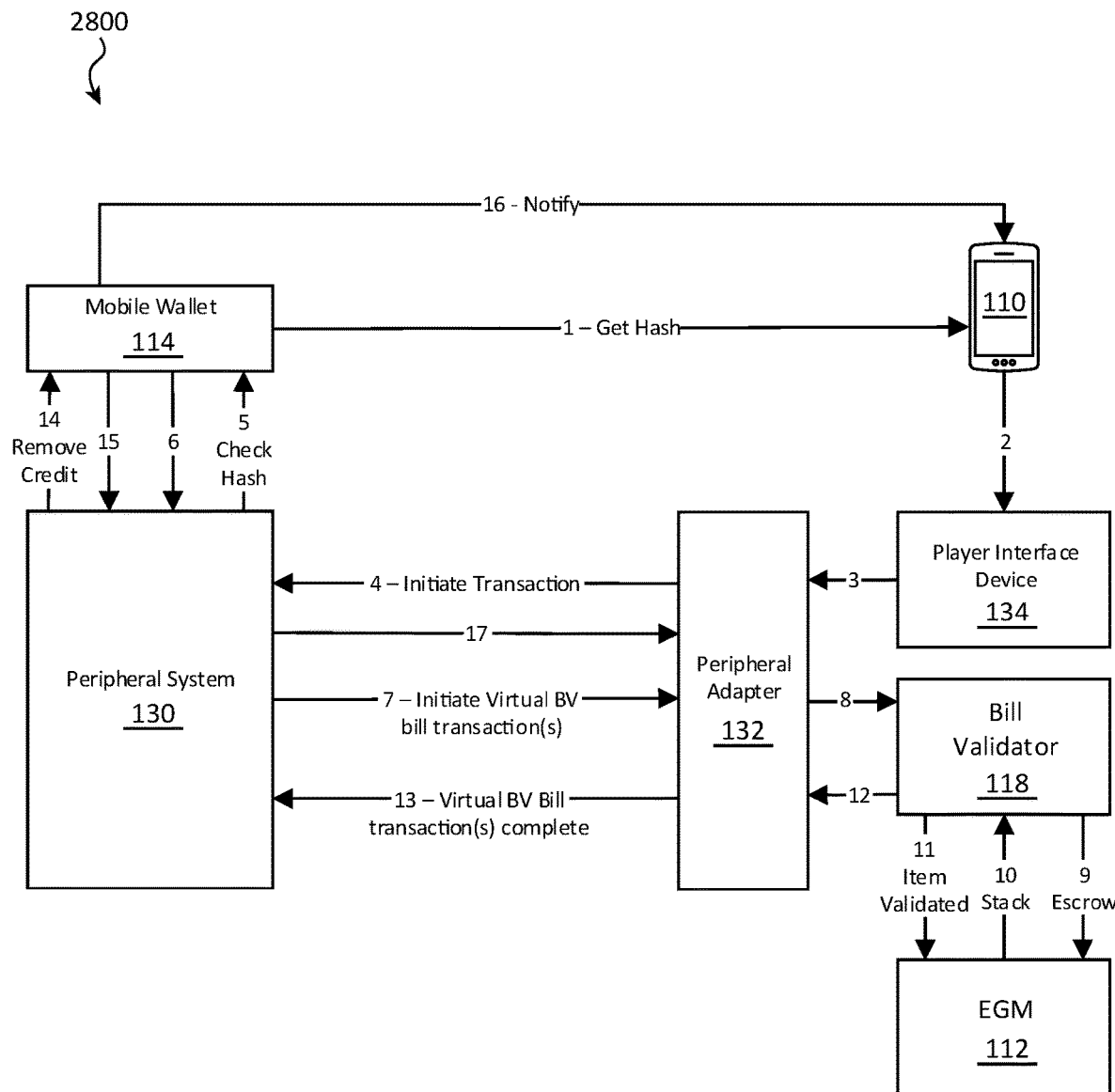

FIGS. 27-28 show block diagrams of components and signal flows of the systems 2700 and 2800, similar to those of the systems 2500 and 2600, except that instead of creating and redeeming a virtual ticket for providing credit to the EGM, information related to electronic credit, such from or on a mobile wallet, is received at a Peripheral System. The electronic credit is applied to the EGM through one or more virtual transactions with the bill validator. In systems 2700 and 2800, unlike the systems 2500 and 2600, a TITO Gateway is not used.

FIG. 27 shows a block diagram of components and signal flows of a system 2700 by which a user at an EGM 112 may add credit to the EGM 112. In the system 2700, a hash is obtained by a user's mobile device 110 from the Player Interface Device 134, and the transaction to add the credit to the EGM 112 is initiated using a mobile or cellular network.

The system 2700 proceeds as in the system 2500, except that the Peripheral System 130 does not use a TITO Gateway to a TITO System for creating a ticket to apply the electronic credit. Instead, the Peripheral System 130 uses a virtual bill transaction in conjunction with the bill validator 118. Once the credit is applied to the EGM 112, the original mobile wallet 114 is deleted or removed.

FIG. 28 shows a block diagram of components and signal flows of a system 2800 by which a user at an EGM 112 may add credit to the EGM 112. The system 2800 is similar to the system 2700, except that the Player Interface Device 134 obtains the hash from the mobile device 110, which had received the hash from the mobile wallet 114, to initiate the transaction. The hash is now checked by communications between the mobile wallet 114 and the Peripheral System 130.

Figure 29:
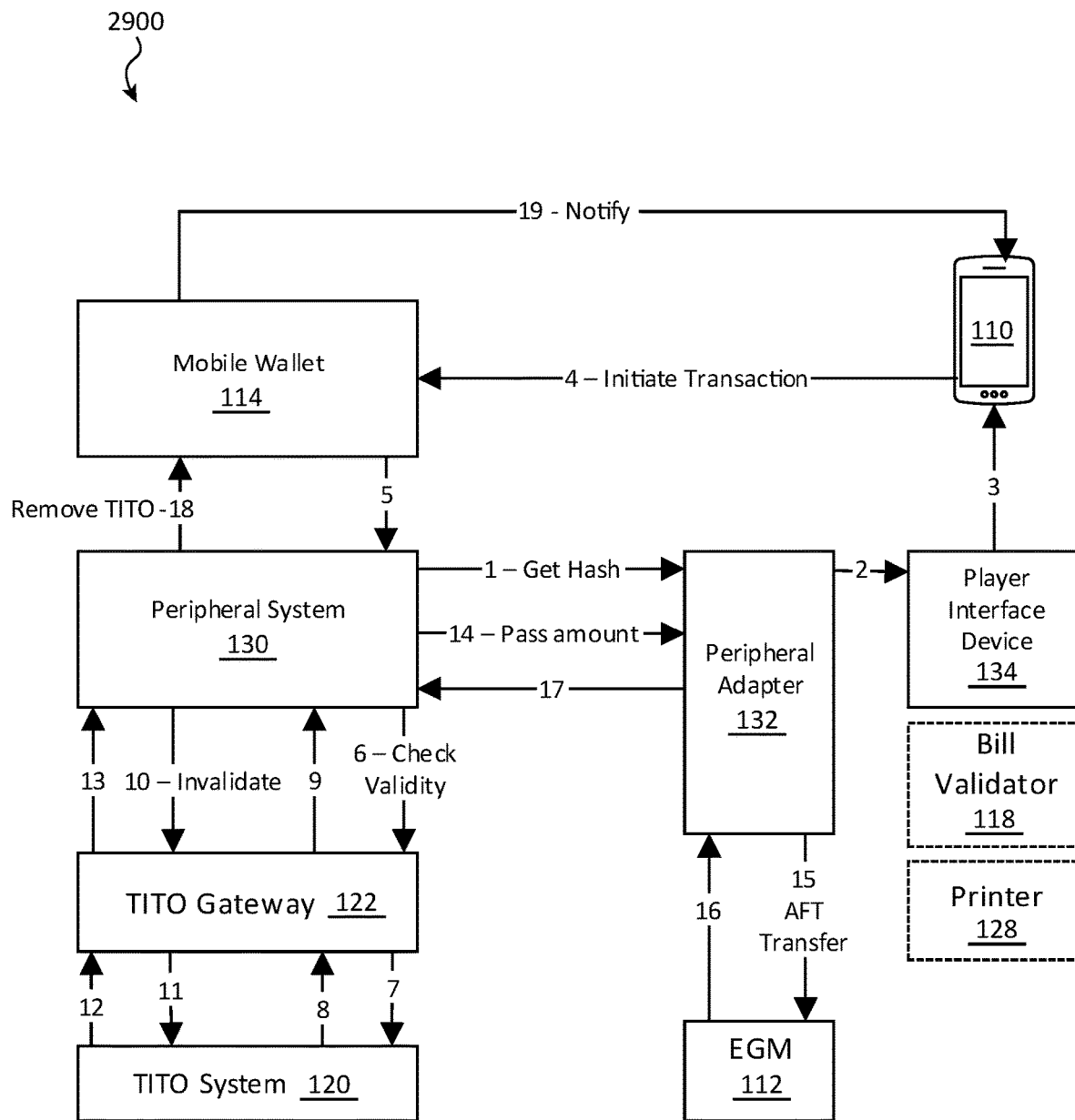
Figure 30:
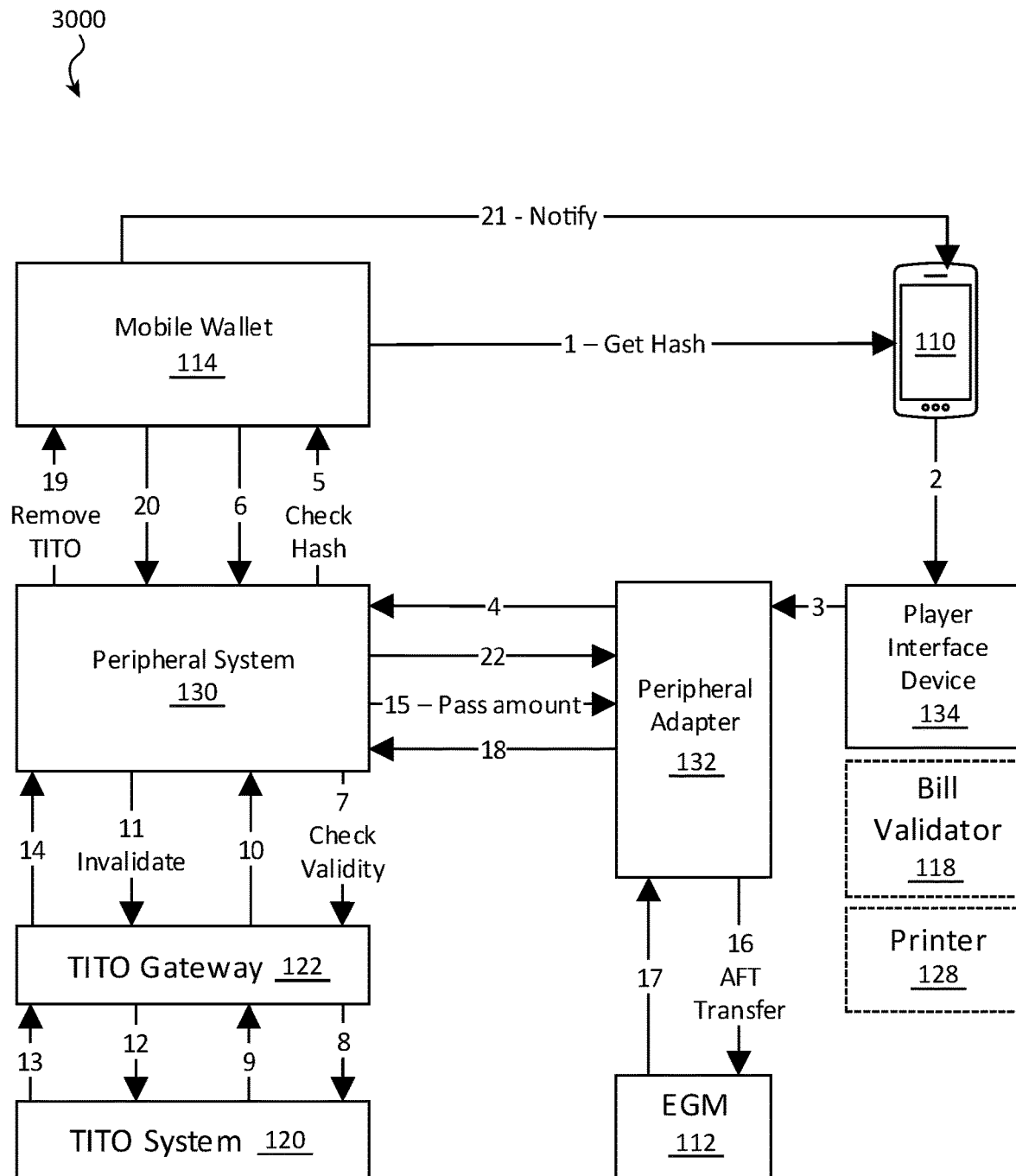

FIGS. 29-30 show block diagrams of components and signal flows of systems 2900 and 3000 in which a credit is applied to an EGM using an Automated Funds Transfer transaction for a value of a gaming ticket. The systems 2900 and 3000 are respectively similar to the systems 2500 and 2600 of FIGS. 25 and 26, except that the Automated Funds Transfer is used in place of the virtual bill validator transactions to redeem a virtual TITO ticket (such as may be stored or recorded on a user's mobile wallet.

FIG. 29 shows a block diagram of components and signal flows of a system 2900 by which a user at an EGM 112 may add credit to the EGM 112. In the system 2900, the user's mobile device 110 obtains the hash from the EGM 112, and initiates the transaction using a mobile or cellular network. The system 2900 proceeds as in system 2500, except now the Peripheral System 130 communicates an amount of electronic credit, such as the value of the virtual TITO ticket, to the Peripheral Adapter 132. The Peripheral Adapter 132 uses an Automated Funds Transfer to apply a credit to the EGM 112.

FIG. 30 shows a block diagram of components and signal flows of a system 3000 by which a user at an EGM 112 may add credit to the EGM 112. The system 3000 is similar to the system 2900, except that the Player Interface Device 134 obtains the hash from the mobile device 110 to initiate the transaction. The hash is now checked by communications between the mobile wallet 114 and the Peripheral System 130.

Section III: EGM Credit-In by Service Between an EGM and a TITO System

FIGS. 31-44 show block diagrams of components and signal flows of methods and systems by which a gaming credit can be applied to an electronic gaming machine (EGM) by services or communications between the EGM and a TITO system. These methods and systems may make use of the special service or component known as a TITO Translation Service that may act as an intermediary device between the EGM and the TITO system. This may allow a Peripheral System to create virtual ticket transactions in which a modified validation number, instead of being an actual validation number, is a special coded message that will be recognized by the TITO Translation Service. The TITO Translation Service may perform different types of transfer or application of credit based on the given code.

Figure 31:
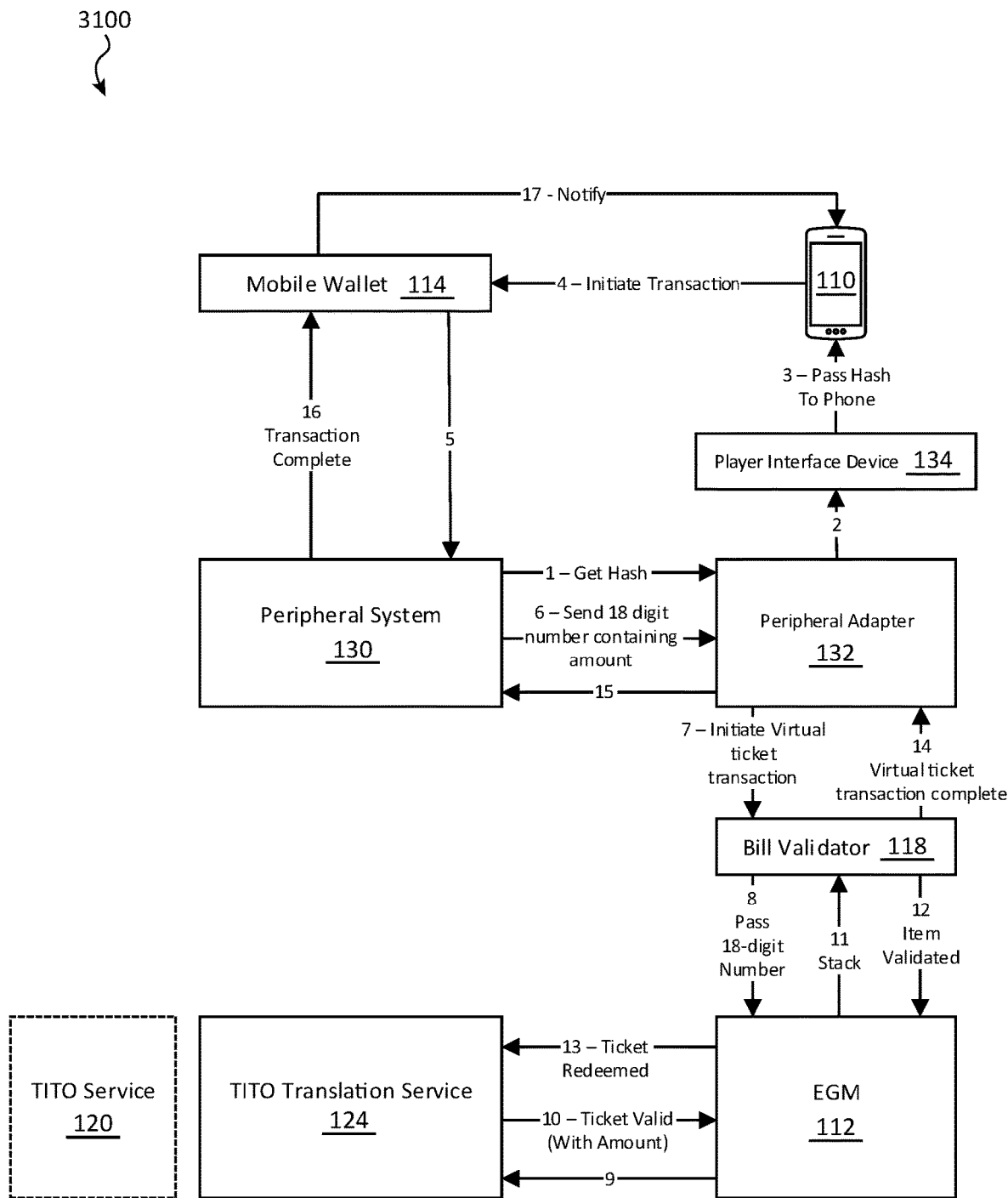
FIGS. 31-44 show block diagrams for various embodiments related to applying gaming credit to an electronic gaming machine through service between the electronic gaming machine and a Ticket-In-Ticket-Out service.
Figure 32:
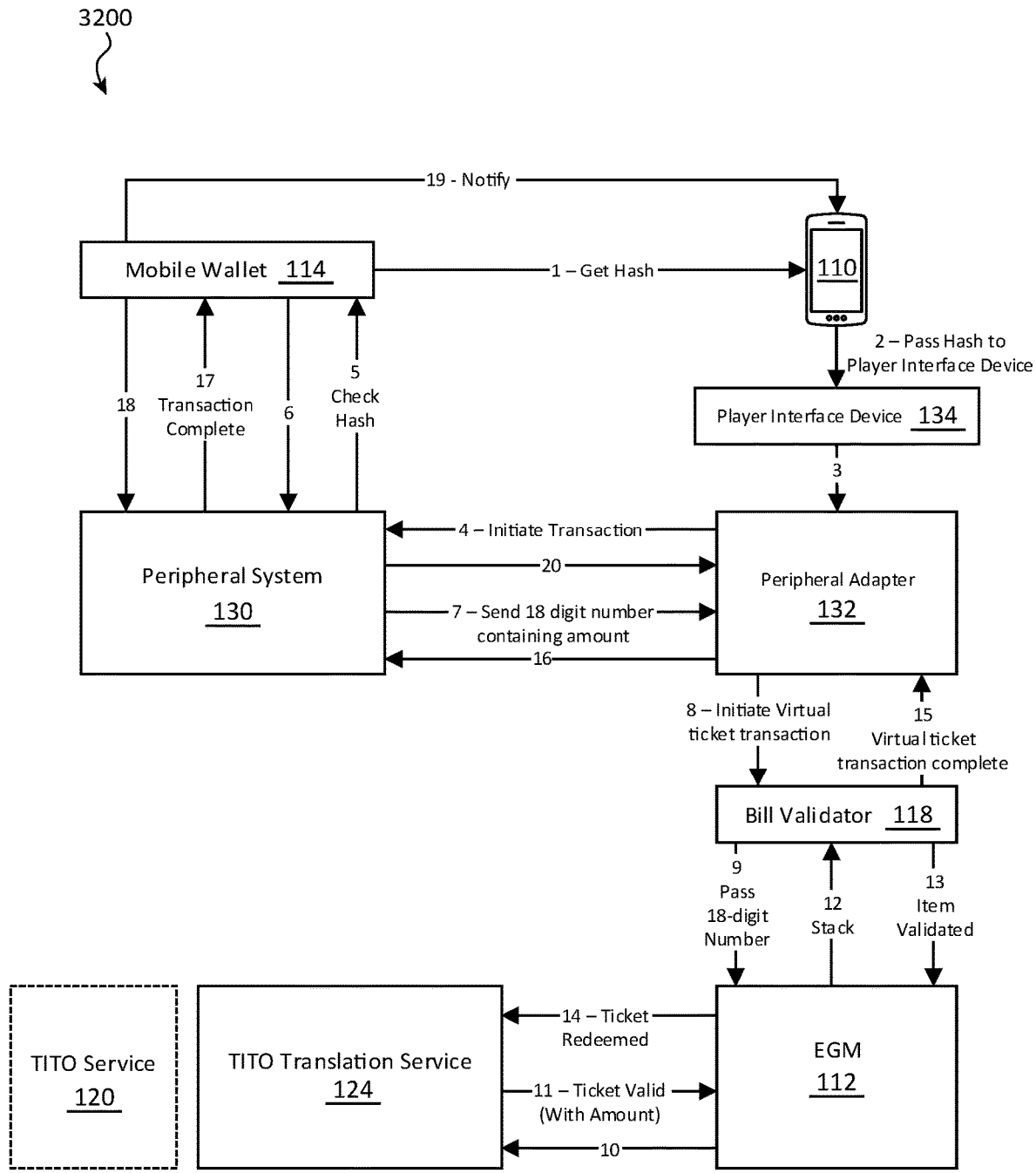

FIGS. 31-32 show block diagrams of components and signal flows of systems 3100 and 3200 in which the Peripheral System will indicate to the TITO Translation Service, possibly through intermediate components, an amount to credit to the EGM, and the TITO Translation Service will apply that amount as a credit on the EGM. The Peripheral System may communicate with the TITO Translation Service by use only of the modified validation number.

FIG. 31 shows a block diagram of components and signal flows of a system 3100 by which a user at an EGM 112 may add credit to the EGM 112. The system 3100 is similar to the system 1900 of FIG. 19, with modifications. The Peripheral System 130 does not interface through a TITO Gateway with the TITO System 120 to check or validate a ticket. Instead, another validation number based on the ticket, which may be coded, is ultimately used by a TITO Translation Service 124 to interface between the EGM 112 and TITO Service 120 to validate the ticket.

The system 3100 begins with a mobile device 110 obtaining a hash from the EGM 112. As explained previously, the hash may be obtained, as indicated by the first three stages, from a Peripheral System 130 through the Peripheral Adapter 132. The mobile device 110 may communicate information, including or based on the hash, to the mobile wallet 114 to communicate information or signals to the Peripheral System 130 to apply a credit based on an amount of a TITO ticket recorded on the mobile wallet 114.

The Peripheral System 130 may then communicate to the Peripheral Adapter 132 a validation number based on information in the TITO ticket. In some embodiments, the validation number may be an 18-digit number. The Peripheral Adapter 132 may then initiate a virtual ticket transaction to credit the EGM 112 using the bill validator 118.

The bill validator 118 passes the validation number to the EGM 112, which communicates with the TITO Translation Service 124 to determine that the ticket is valid, and the amount of credit to be applied to the EGM 112 for wagering. Once the credit is applied, the EGM 112 may communicate to the TITO Translation Service 124 that the ticket has been redeemed. The TITO Translation Service 124 may interface with the TITO System 120 so that the redemption is accounted for, such as in a casino management system.

Once the credit has been added to the EGM 112, messages that the virtual transaction is complete may be relayed or communicated to the mobile wallet 114 and to the mobile device 110.

FIG. 32 shows a block diagram of components and signal flows of a system 3200 by which a user at an EGM 112 may add credit to the EGM 112. The system 3200 is similar to the system 3100, except that the Player Interface Device 134 obtains the hash from the mobile device 110 to initiate the transaction, the hash having been received at the mobile device 110 from the mobile wallet 114. In the system 3200, the Peripheral System 130 may communicate with the mobile wallet 114 to check the hash. The system 3200 may be initiated over a casino's network.

Figure 33:
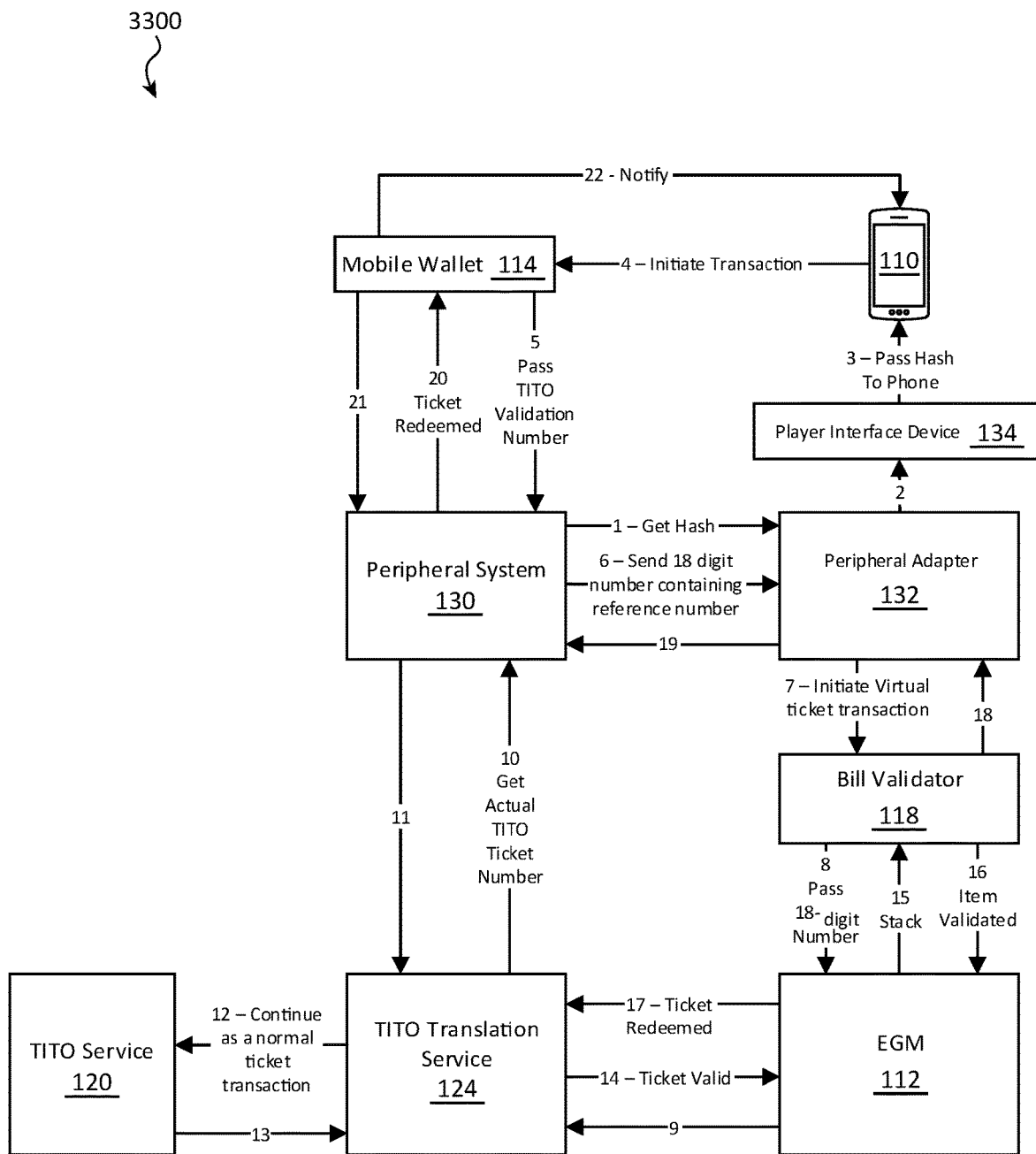
Figure 34:
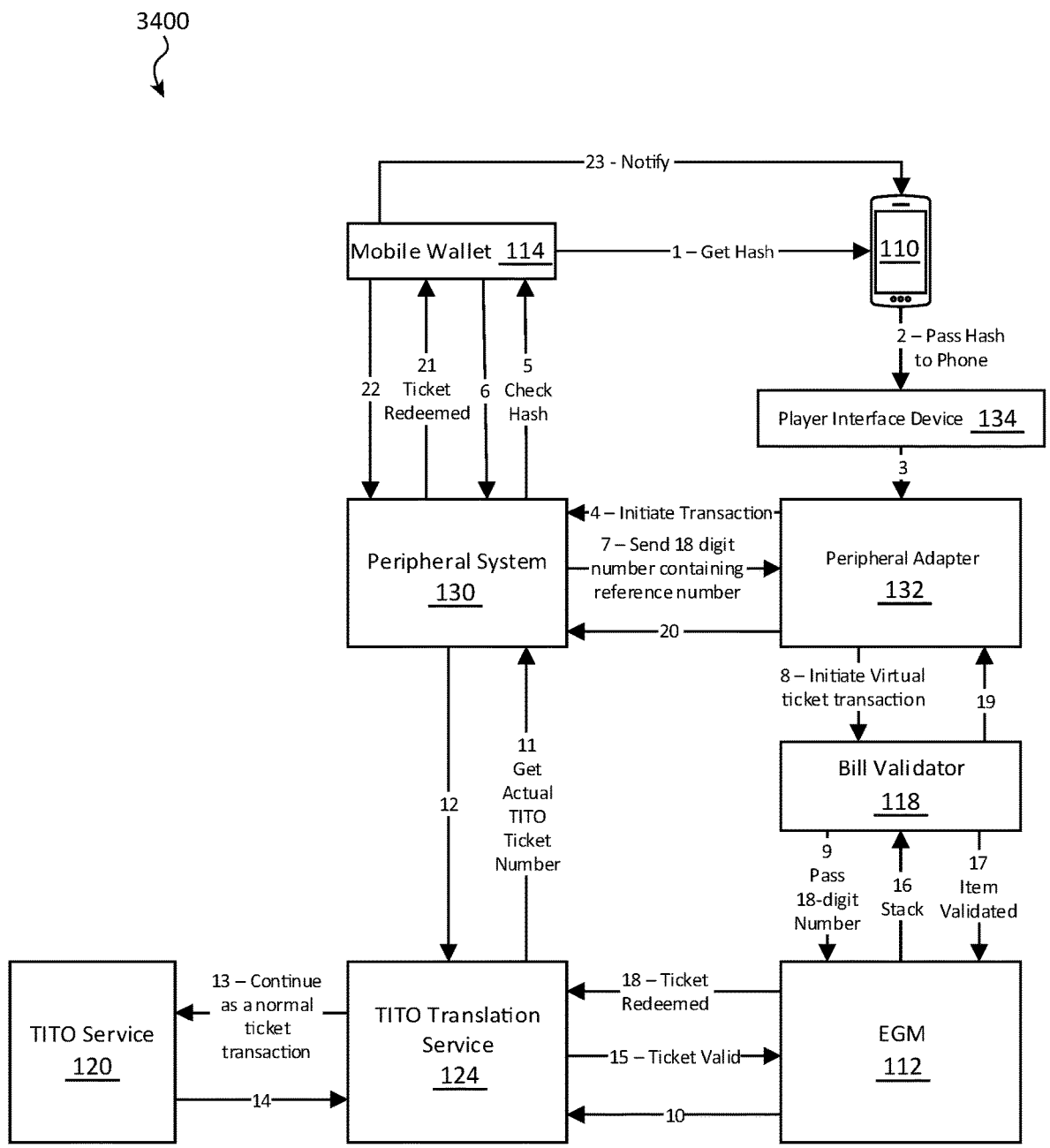

FIGS. 33-34 show block diagrams of components and signal flows of systems 3300 and 3400 in which a virtual TITO ticket is redeemed from a user's mobile wallet, and instead of being sent by the Peripheral System to the bill validator, a validation number (also, a "reference number") is obtained. The TITO Translation Service may then interact with the Peripheral System to carry out the transaction. The Peripheral System may thus work with a virtual TITO system indirectly through a TITO Translation Service by providing special codes and reference numbers.

FIG. 33 shows a block diagram of components and signal flows of a system 3300 by which a user at an EGM 112 may add credit to the EGM 112. The system 3300 is similar to the system 3100 in that the Peripheral System 130 also passes a validation number to the Peripheral Adapter 132 to use indirectly with the TITO Translation Service 124. The TITO Translation Service 124 in the system 3400 communicates, at indicated stages 10 and 11, with the Peripheral System 130 to get an actual TITO ticket number. The TITO Translation Service 124 then interfaces with the TITO Service 120 to communicate to the EGM 112 that the ticket is valid, and apply the ticket's credit to the EGM 112. Once so credited, messages that the ticket has been redeemed are sent from the Peripheral System 130 to the mobile wallet 114 and the mobile device 110.

FIG. 34 shows a block diagram of components and signal flows of a system 3400 by which a user at an EGM 112 may add credit to the EGM 112. The system 3400 is similar to the system 3300, except that the Player Interface Device 134 obtains the hash from the mobile device 110, the hash having been received from the mobile wallet 114, and the Peripheral System 130 may also check the hash.

Figure 35:
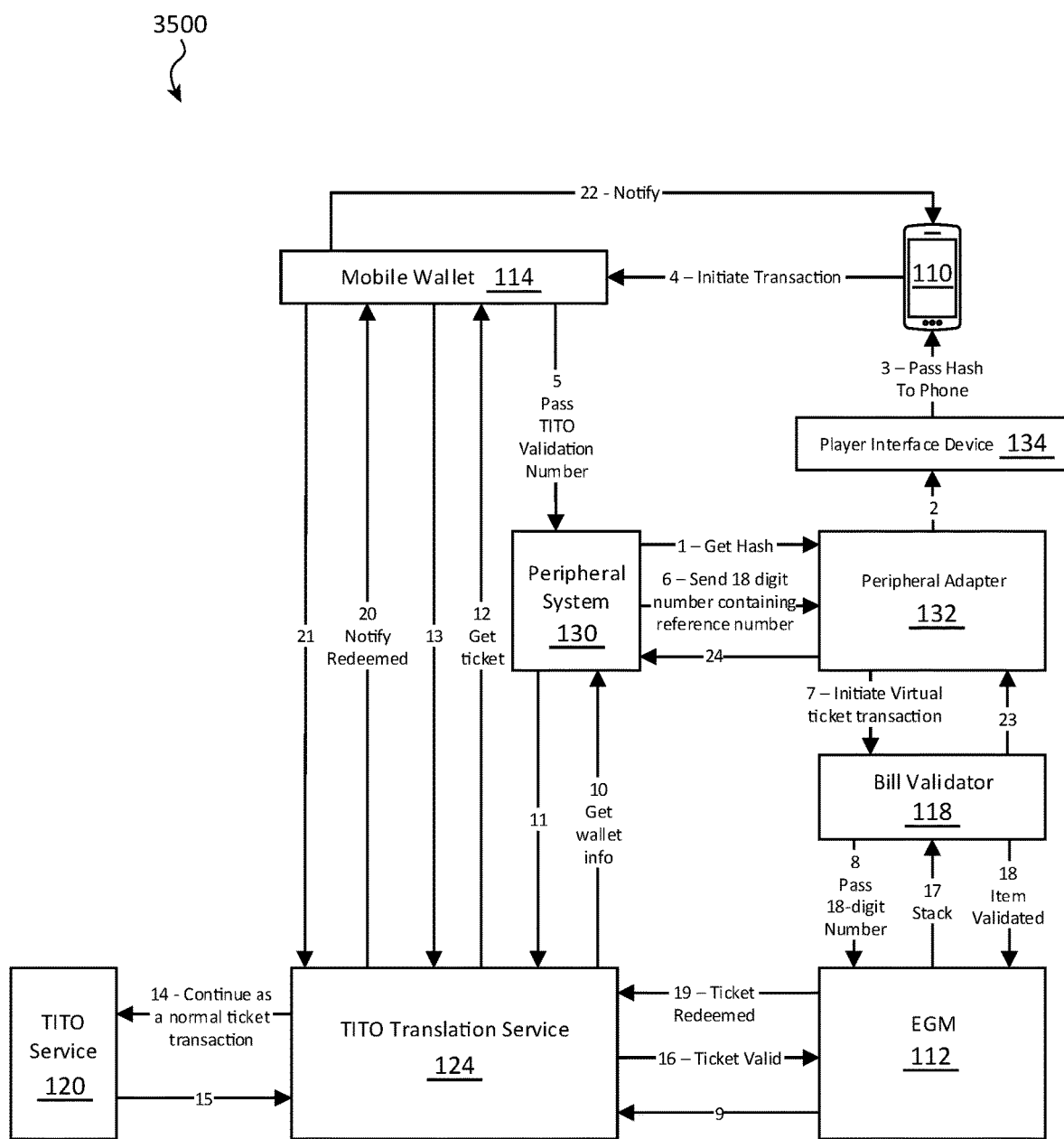
Figure 36:
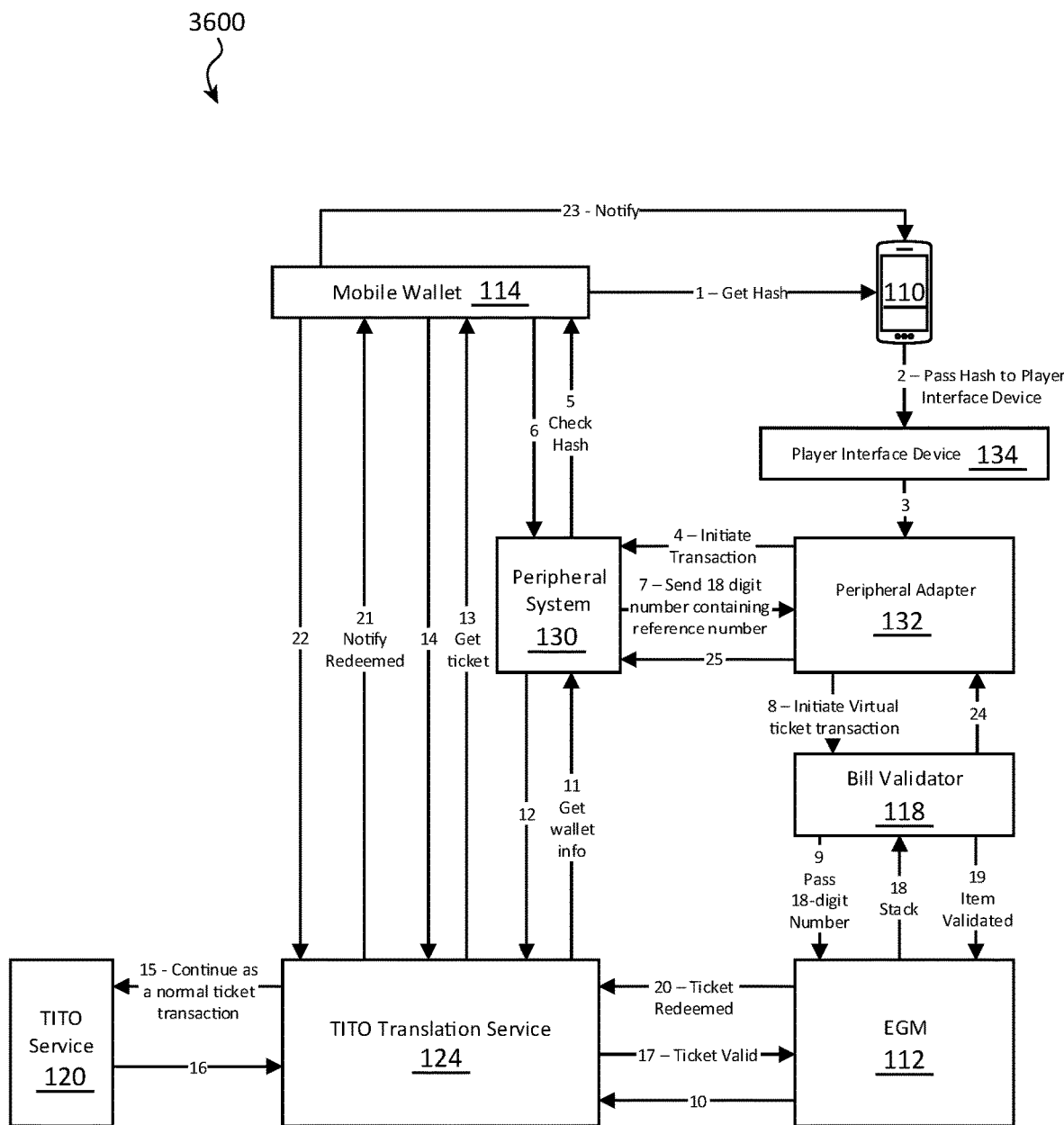

FIGS. 35-36 show block diagrams of components and signal flows of systems 3500 and 3600, similar to the systems shown in FIGS. 33-34, in which a virtual TITO ticket is redeemed from a user's mobile wallet, and instead of being sent to the bill validator, a validation number is obtained. However, the TITO Translation Service obtains the virtual TITO ticket by direct communication or signaling with the mobile wallet, instead of through a Peripheral System.

FIG. 35 shows a block diagram of components and signal flows of a system 3500 by which a user at an EGM 112 may add credit to the EGM 112. The system 3500 is a modification of the system 3300. The system 3500 proceeds as in the system 3300, with the mobile device 110 obtaining a hash from the EGM, as explained previously, and the mobile wallet 114 passing a TITO validation number to the Peripheral System 130. The Peripheral System 130 generates a reference number from a TITO validation number and passes the reference number to the Peripheral Adapter 132 to initiate a virtual ticket transaction to add credit to the EGM 112. The indicated message flow transmits the reference number to the TITO Translation Service 124.

The TITO Translation Service 124 then interfaces with the Peripheral System 130 to obtain information for communicating with the user's mobile wallet 114. The TITO Translation Service 124 obtains, from the mobile wallet 114, the information about the TITO ticket needed to interface with the TITO Service 120 to proceed as a normal ticket transaction to add credit to the EGM 112.

The EGM 112, upon receiving a message that the ticket was valid, may apply the ticket's value as a credit, and communicate to the TITO Translation Service 124 that the ticket was redeemed. The TITO Translation Service 124 may then notify the mobile wallet 114 directly that the ticket was redeemed. The mobile wallet 114 may then send a notification of the redemption to the user's mobile device 110.

FIG. 36 shows a block diagram of components and signal flows of a system 3600 by which a user at an EGM 112 may add credit to the EGM 112. The system 3600 is similar to the system 3500, except that the Player Interface Device 134 obtains the hash from the mobile device 110, which had received the hash from the mobile wallet 114, and the Peripheral System 130 may also check the hash.

Figure 37:
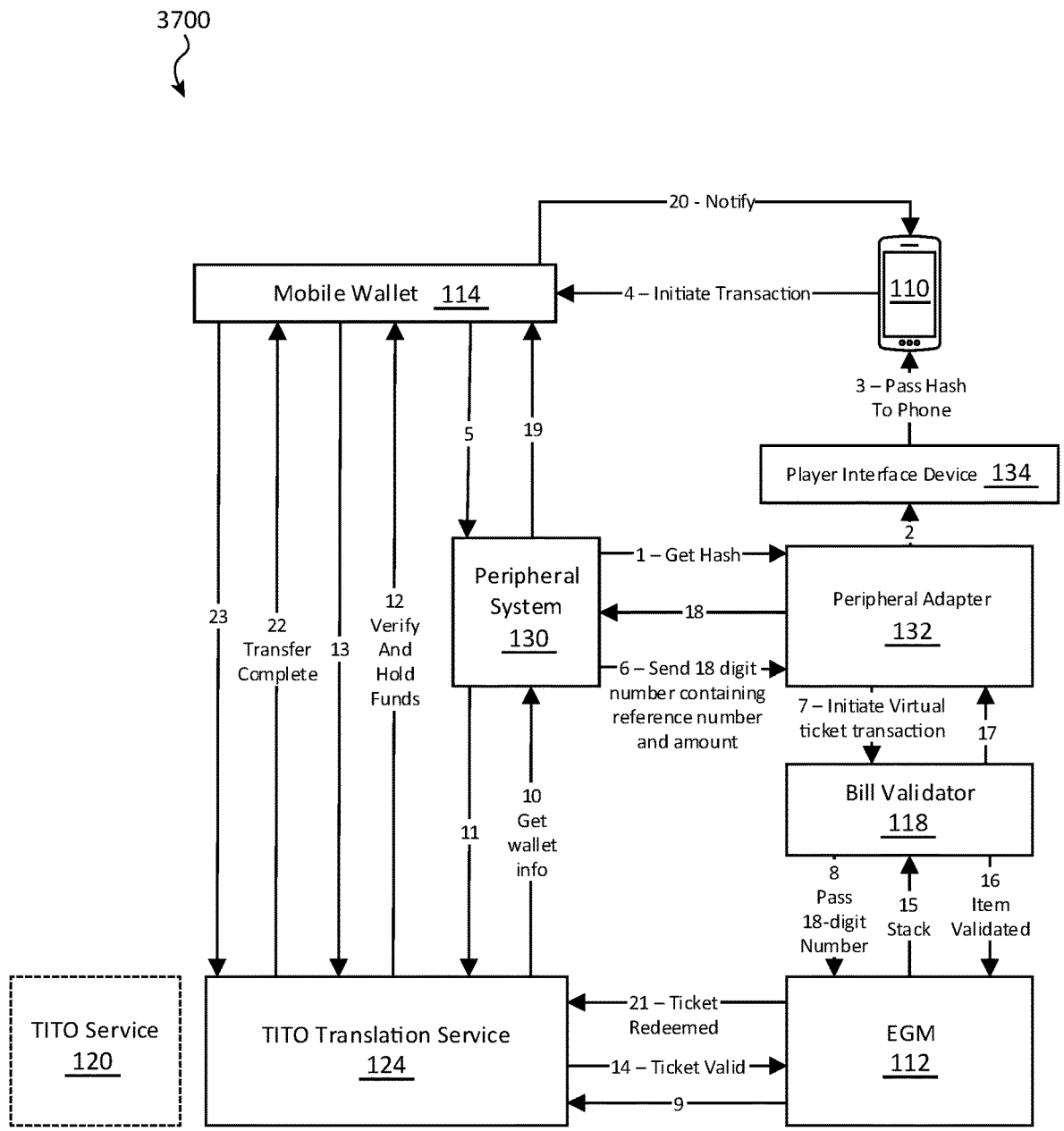
Figure 38:
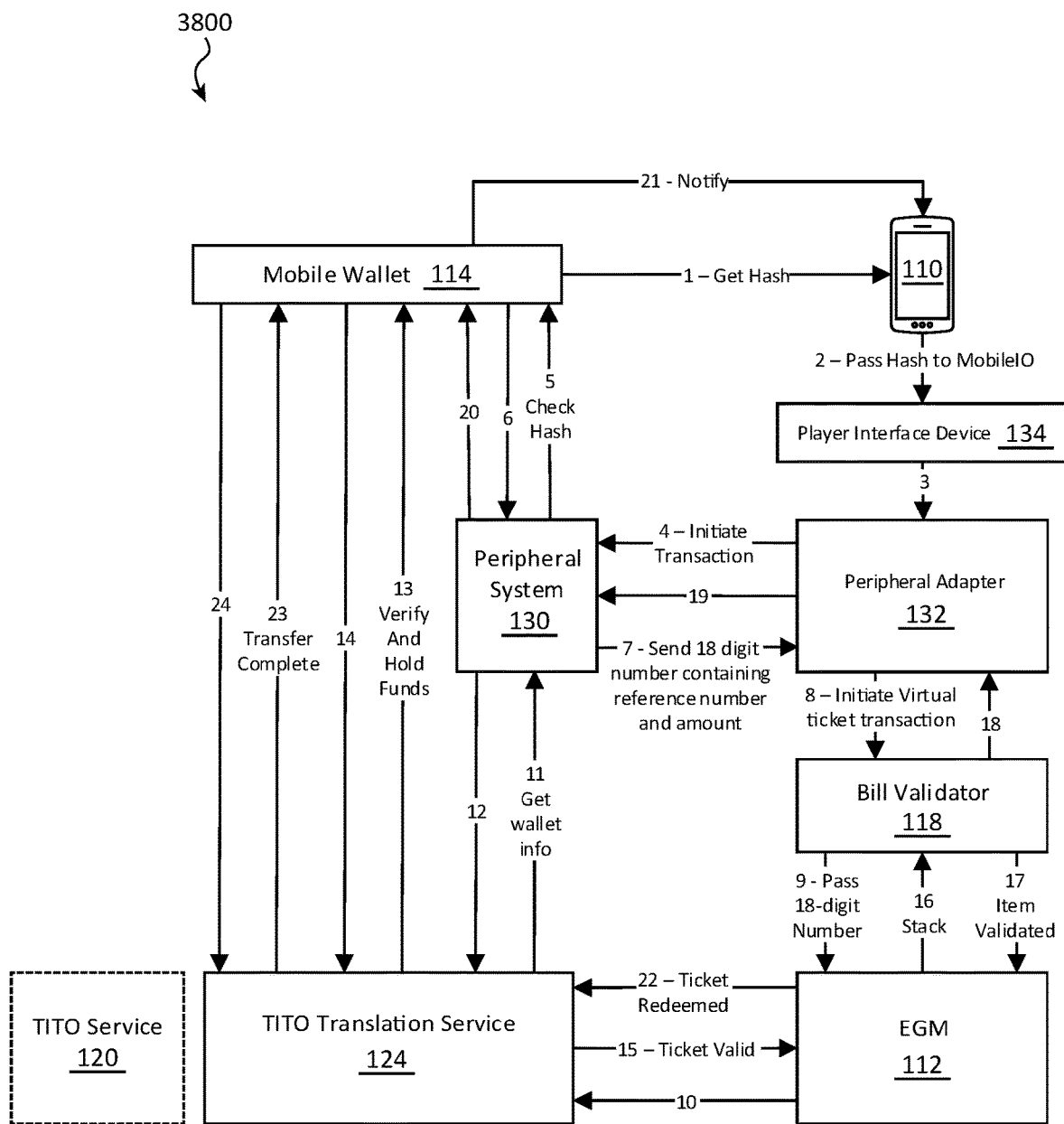

FIGS. 37-38 show block diagrams of components and signal flows of systems 3700 and 3800 by which credit is applied to an EGM using a Peripheral System and a TITO Translation Service. The Peripheral System transmits a reference number, through a Peripheral Adapter and the EGM, to the TITO Translation Service to indicate how much credit is to be transferred from the mobile wallet to the EGM.

FIG. 37 shows a block diagram of components and signal flows of a system 3700 by which a user at an EGM 112 may add credit to the EGM 112. The system 3700 is similar to the system 3500, except that the TITO Translation Service 124 uses the received reference number to interface directly with the mobile wallet 114 to verify and hold the funds from the mobile wallet 114. Unlike in the system 3500, in the system 3700 the TITO Translation Service 124 does not need to conduct a normal ticket transaction with the TITO Service.

FIG. 38 shows a block diagram of components and signal flows of a system 3800 by which a user at an EGM 112 may add credit to the EGM 112. The system 3800 is similar to the system 3700 except that the Player Interface Device 134 obtains the hash from the mobile device 110, which had received the hash from the mobile wallet 114, and the Peripheral System 130 may also check the hash.

Figure 39:
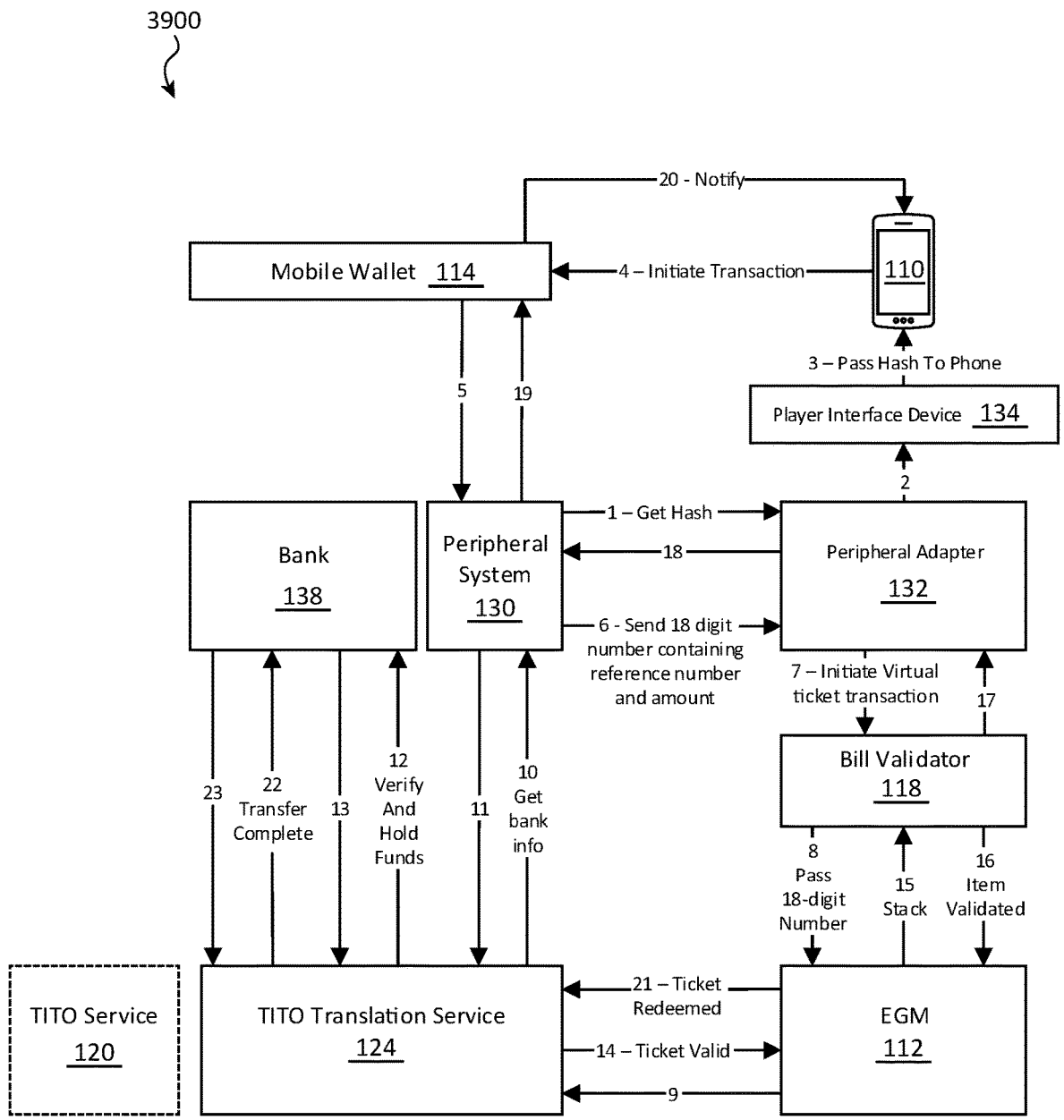
Figure 40:
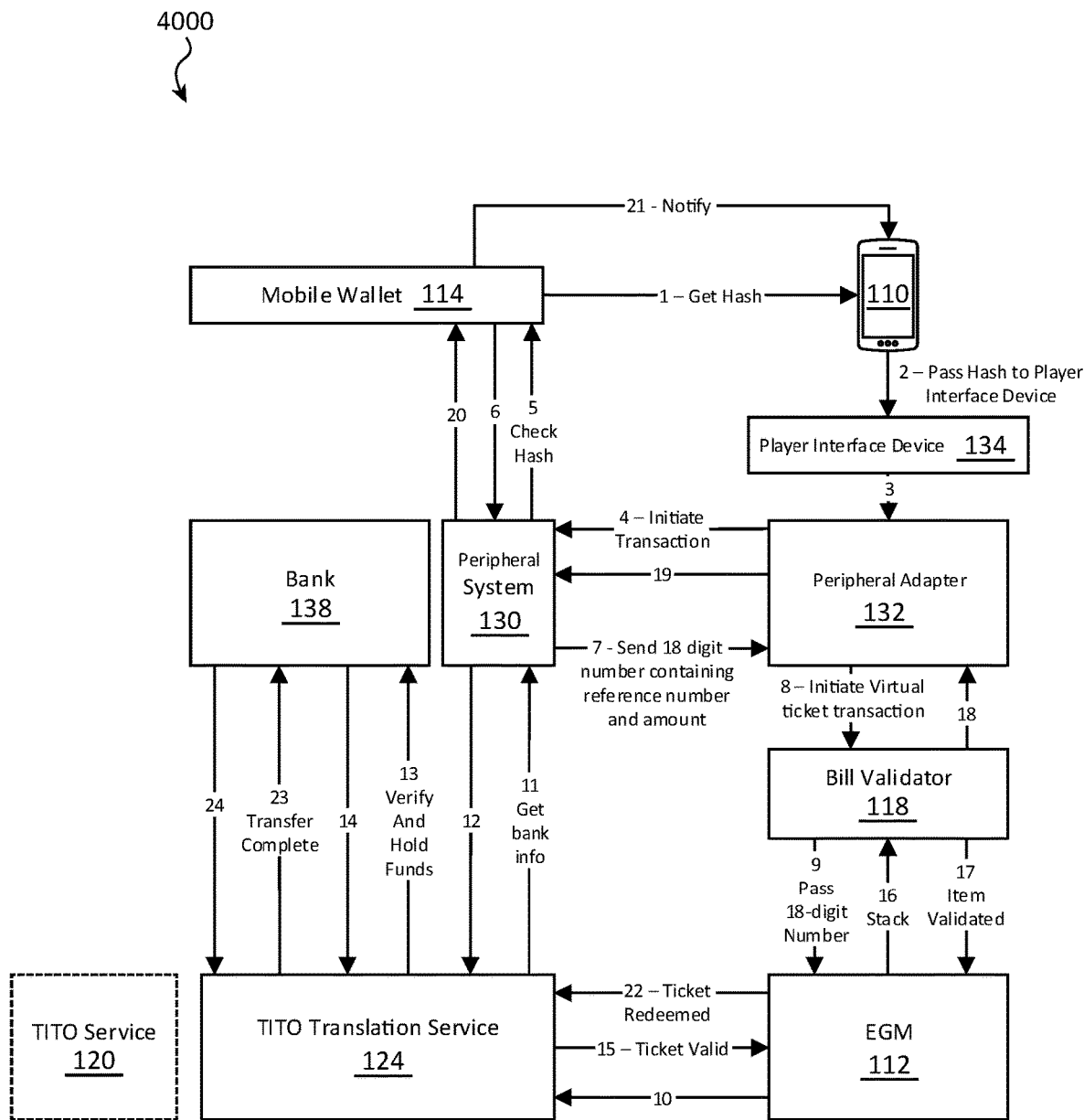

FIGS. 39-40 show block diagrams of components and signal flows of systems 3900 and 4000 by which credit is applied to an EGM using a Peripheral System and a TITO Translation Service. These systems are similar to the systems 3700 and 3800, except that the funds for the credit are obtained from a bank (or other financial institution of the user), instead of a mobile wallet of the user. The Peripheral System transmits a reference number, through a Peripheral Adapter and the EGM, to the TITO Translation Service. The TITO Translation Service interfaces with the bank to obtain the funds.

FIG. 39 shows a block diagram of components and signal flows of a system 3900 by which a user at an EGM 112 may add credit to the EGM 112. The system 3900 is similar to the system 3800, except that the TITO Translation Service 124 obtains information regarding the Bank 138 from the Peripheral System 130 needed for interfacing with the Bank 138. Such information may include a routing number of the Bank 138, the amount of funds to be withdrawn, and the like.

FIG. 40 shows a block diagram of components and signal flows of a system 4000 by which a user at an EGM 112 may add credit to the EGM 112. The system 4000 is similar to the system 3900, except that the Player Interface Device 134 obtains the hash from the mobile device 110, which had received the hash from the mobile wallet 114, and the Peripheral System 130 may also check the hash.

Figure 41:
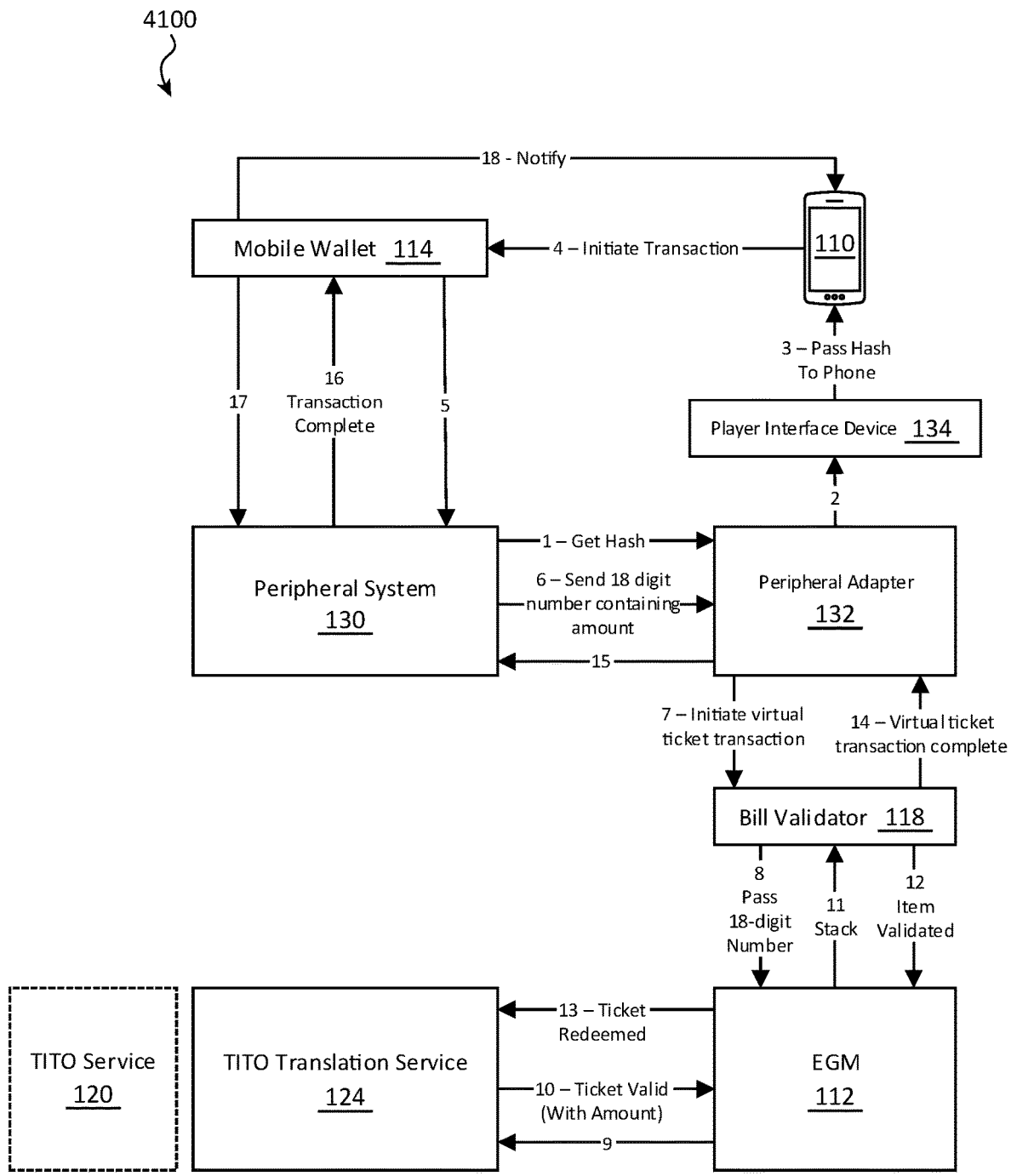
Figure 42:
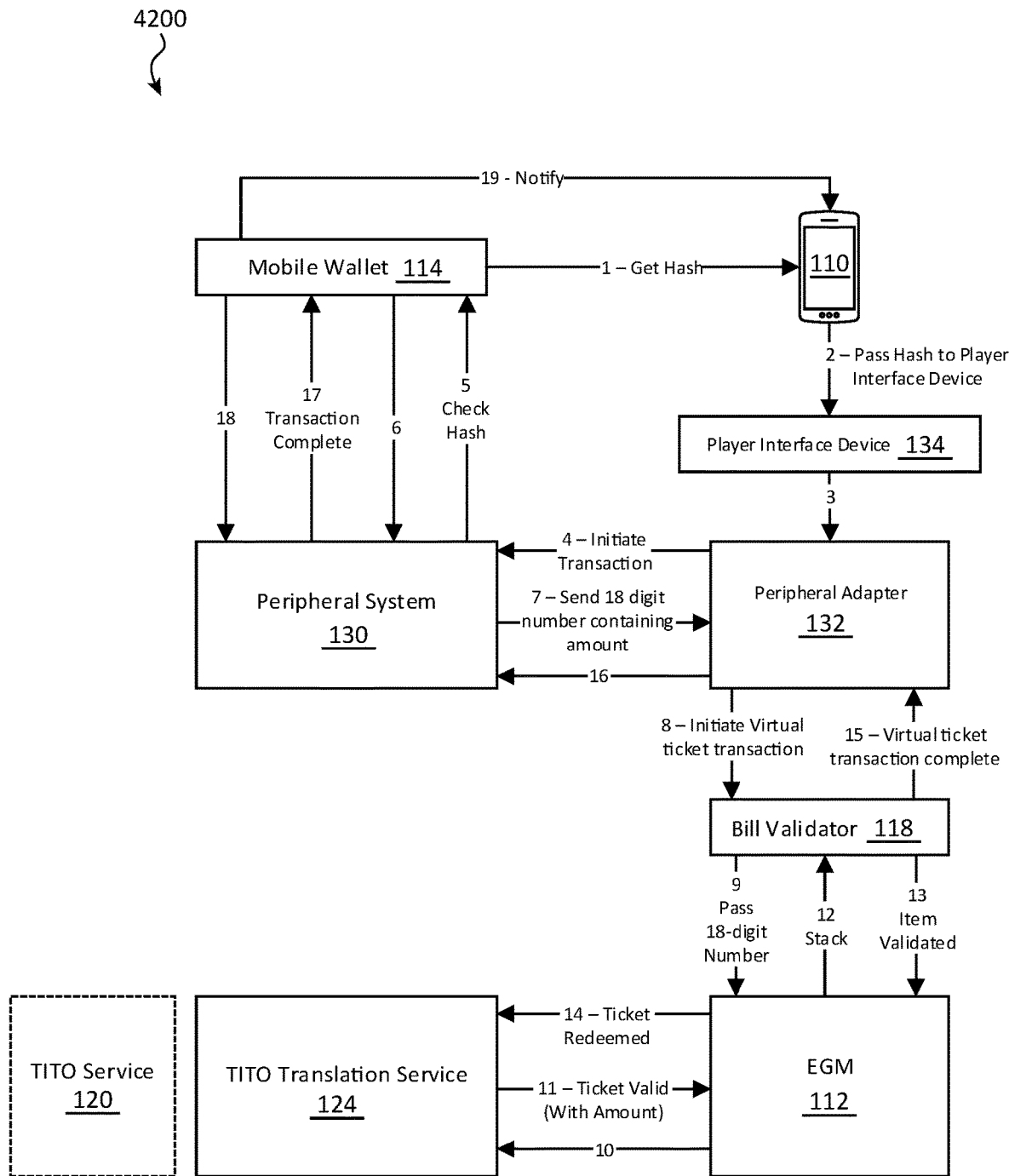

FIGS. 41-42 show block diagrams of components and signal flows of systems 4100 and 4200, by which credit is applied to an EGM using a Peripheral System and a TITO Translation Service. These systems are similar to the systems 3700 and 3800, except that the funds for the credit are returned from the TITO Translation Service to the EGM.

FIG. 41 shows a block diagram of components and signal flows of a system 4100 by which a user at an EGM 112 may add credit to the EGM 112. The system 4100 is similar to the system 3700, except at stage 6 the Peripheral System 130 transmits a number containing the amount to be credited to the Peripheral Adapter 132. The Peripheral Adapter 132 initiates a virtual ticket transaction as before, and the EGM 112 interfaces with the TITO Translation Service 124 to determine that the information regarding the ticket and the amount are valid.

FIG. 42 shows a block diagram of components and signal flows of a system 4200 by which a user at an EGM 112 may add credit to the EGM 112. The system 4200 is similar to the system 4100 except that the Player Interface Device 134 obtains the hash from the mobile device 110, which had received the hash from the mobile wallet 114, and the Peripheral System 130 may also check the hash.

Figure 43:
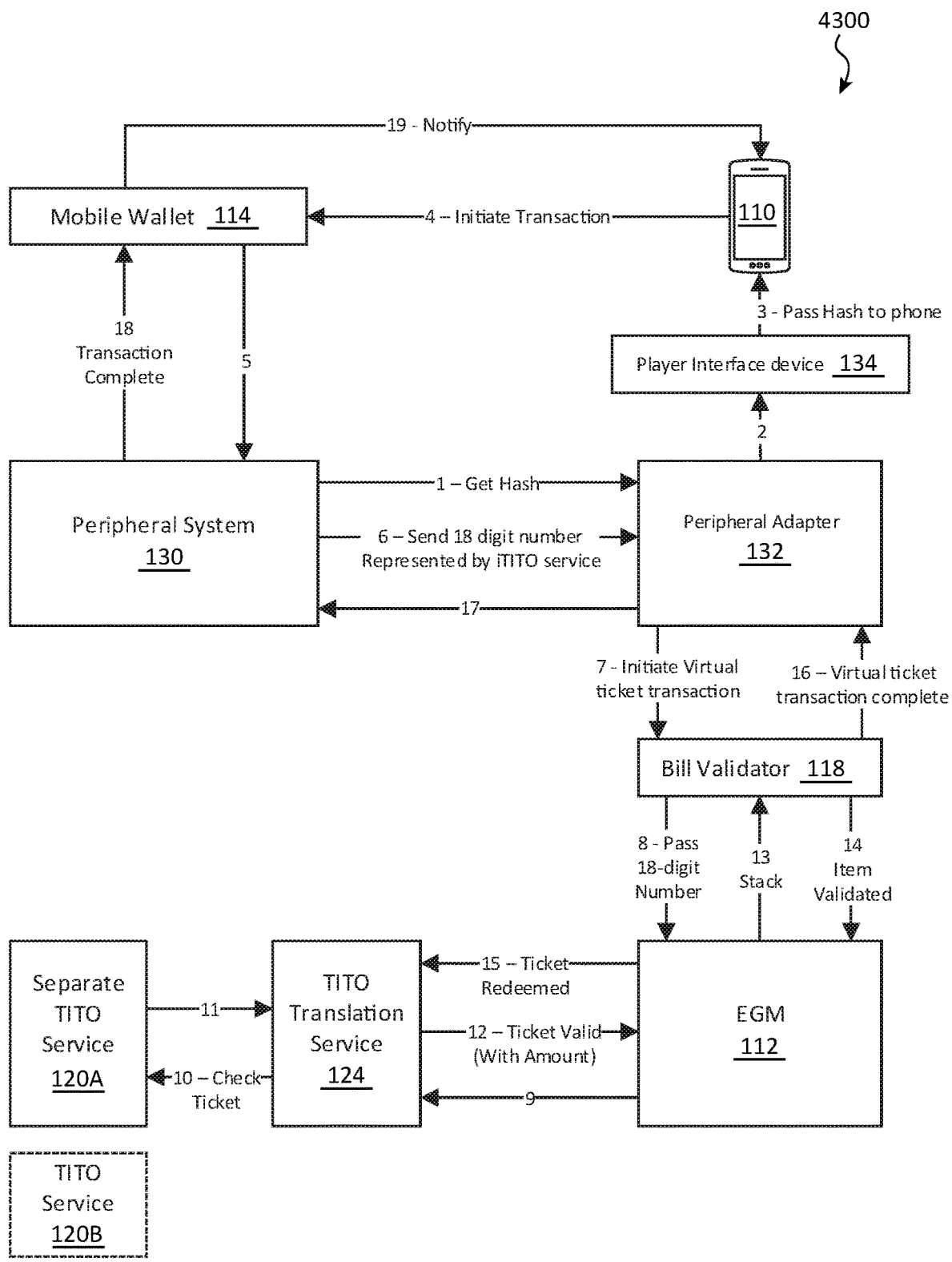
Figure 44:
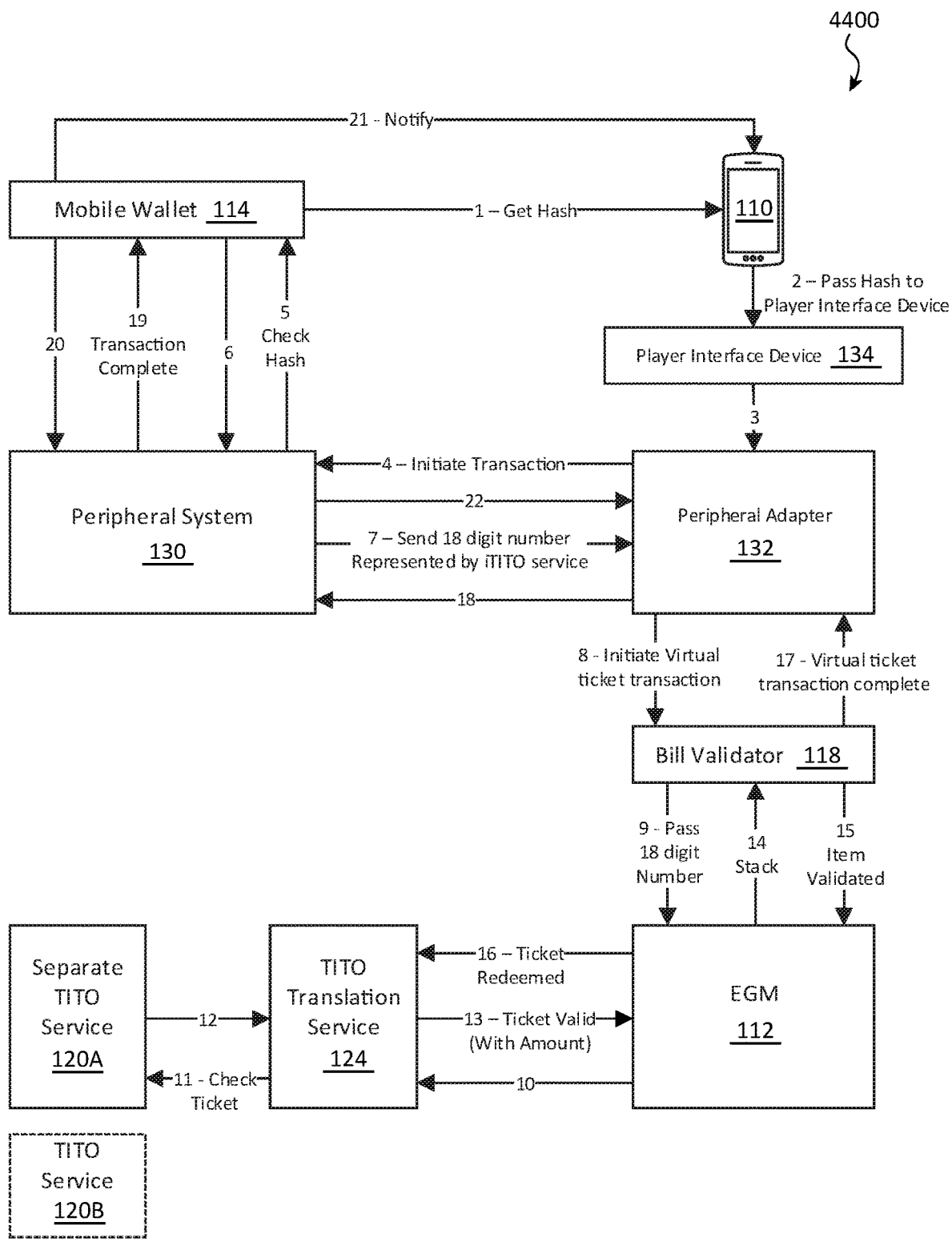

FIGS. 43-44 show block diagrams of components and signal flows of systems 4300 and 4400 in which a mobile wallet contains TITO tickets from separate TITO services. This may happen in the case that multiple casinos use respective TITO services or issue distinct TITO tickets. Each casino's TITO tickets may have validation numbers with a respective format that can be recognized by a TITO Translation Service, which can implement interactions with, or direct interactions to, the respective casino's TITO service. Each casino's Peripheral System may generate the reference number passed to the respective Peripheral Adapter with a format or coding by which a TITO Translation Service may identify the casino.

FIG. 43 shows a block diagram of components and signal flows of a system 4300 by which a user at an EGM 112 may add credit to the EGM 112. The system 4300 is similar to the system 3100 of FIG. 31. The mobile device 110 receives a hash from the EGM 112 and initiates the transaction to add credit to the EGM 112 using a mobile or cellular network to transmit a communication to the mobile wallet 114. The mobile wallet 114 in turn transmits information related to the ticket to the Peripheral System 130.

The Peripheral System 130 generates a reference number related to or based on the ticket information, and transmits that reference number to the Peripheral Adapter 132. The Peripheral Adapter 132 in turn initiates a virtual ticket transaction through communications with the bill validator 118 and the EGM 112. The EGM 112 communicates information regarding the reference number with the TITO Translation Service 124.

The TITO Translation Service 124 may use information included in the reference number to select which of the TITO Services 120A and 120B is associated with the original TITO ticket in the mobile wallet 114. In FIG. 43, the associated TITO Service is shown as TITO Service 120A. TITO Service 120A can then provide ticket validity information to the TITO Translation Service 124 with which to interact or communicate with the EGM 112. The operations or communications may then be as described for the system 3100.

FIG. 44 shows a block diagram of components and signal flows of a system 4400 by which a user at an EGM 112 may add credit to the EGM 112. The system 4400 is similar to the system 4300 except that the Player Interface Device 134 obtains the hash from the mobile device 110, which had received the hash from the mobile wallet 114, and the Peripheral System 130 may also check the hash.

Section IV: EGM Credit Out

This section describes systems, methods, and devices by which a user may redeem, convert, transfer, or obtain a refund for available gaming credit on an EGM or a printed TITO ticket into a user's mobile wallet. The term "cash out" may be used to refer to such a redemption, refund, or transfer. A user may still have credit available on an EGM but may wish to end wagering. These embodiments describe how some or all of the credit can be cashed out into a mobile wallet of the user, or refunded in another form.

Figure 45:
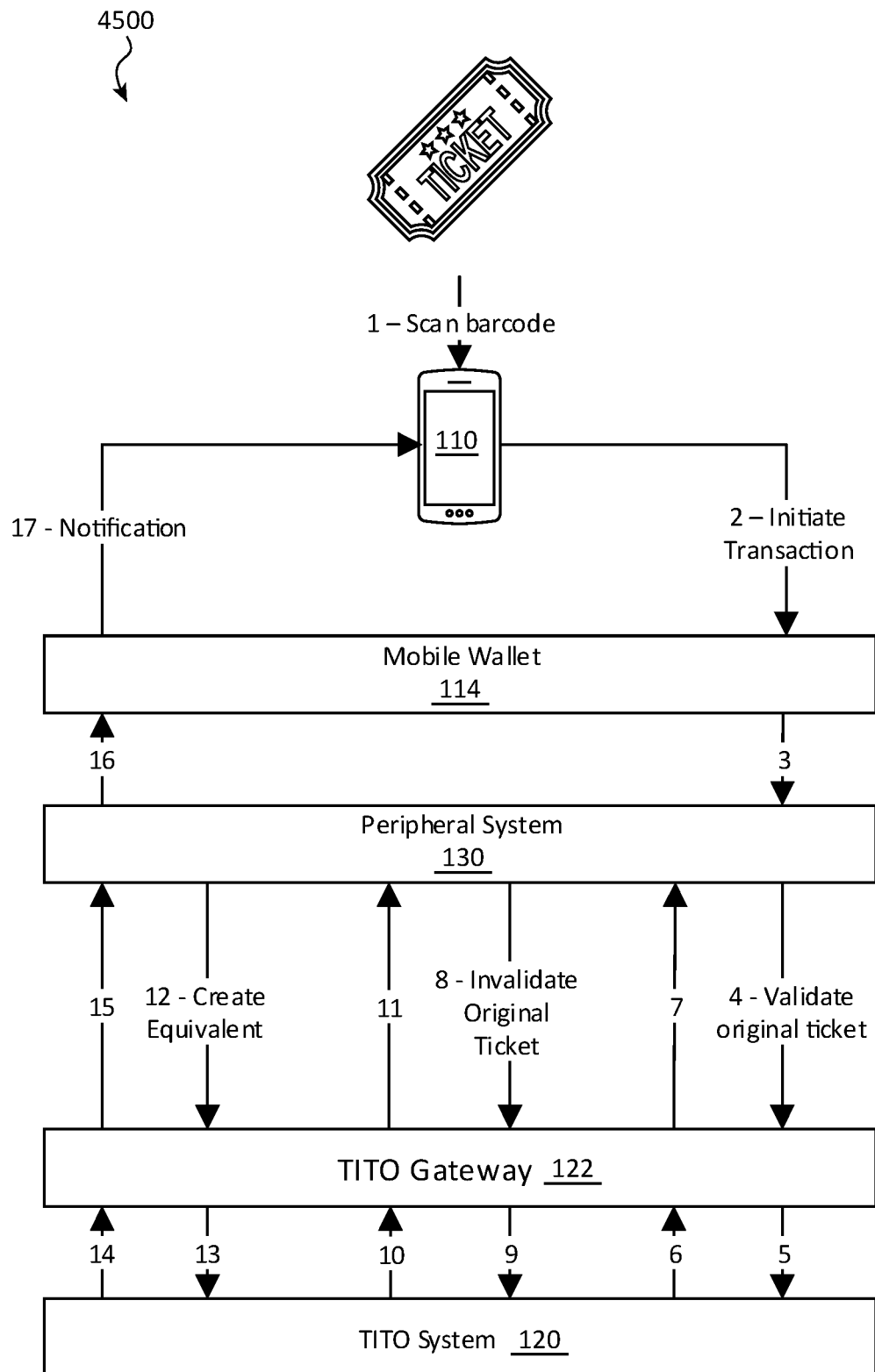
FIGS. 45-67 show block diagrams for various embodiments related to obtaining refunds, redemptions, or transfers of gaming credit from an electronic gaming machine.
Figure 46:
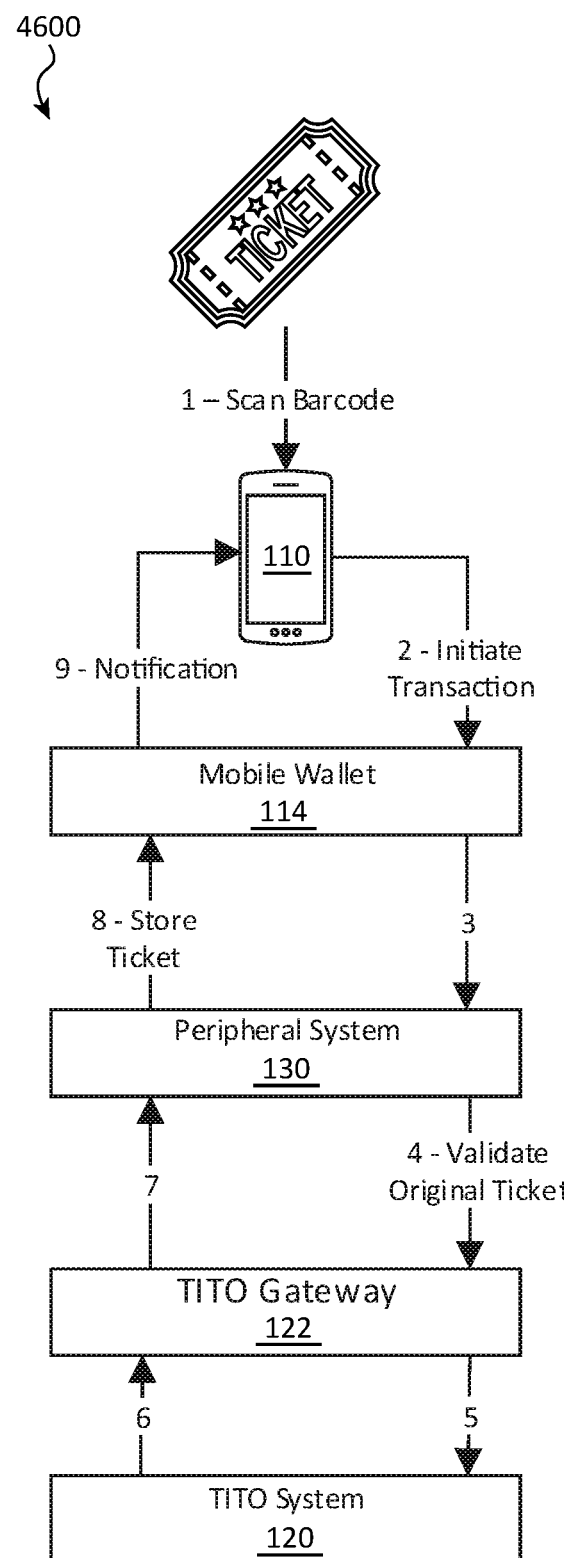

FIGS. 45-46 show block diagrams of components and signal flows of systems 4500 and 4600 by which a user may transfer credit from a physical TITO ticket to the user's mobile wallet. If the physical TITO ticket has been received from a kiosk, a bill validator, or from a printer associated with an EGM, a mobile device may be able to scan the physical ticket and deposit the funds onto the user's mobile wallet.

FIG. 45 shows a block diagram of components and signal flows of a method or system 4500 by which a user may obtain or redeem credit available on a physical ticket to a mobile wallet 114. The operations of the system 4500 begin with the scanning by the mobile device 110 of a physical ticket, and the initiation of the transaction to obtain refunded credit. The scanning may be performed using a special purpose or other app on the mobile device 110 directed to transactions involving a mobile wallet 114. The scanning may be performed by a camera on the mobile device 110, or by separate scanner, such as at a kiosk, EGM, bill validator, cage, or other component described above, and then transmitted to the mobile device 110.

The mobile device 110 may then initiate the credit out transaction by communicating information from the scanned ticket (such as the scanned image itself, the code on the ticket, information obtained from the code, or the like) to the mobile wallet 114. The mobile wallet 114 may then communicate the information to the Peripheral System 130. The Peripheral System 130 may communicate with the TITO System 120, such as through the TITO Gateway 122, to determine that the original ticket was valid. As part of the credit out transaction, and/or to account for outstanding or available tickets, the TITO System 120 can then cause records of the ticket, such as electronic records thereof within a casino management system, to indicate that the original physical ticket is no longer valid.

The Peripheral System 130 may then create an equivalent new ticket, such as a virtual ticket. The Peripheral System 130 uses the equivalent new ticket in communications with the TITO System 120, such as through the TITO Gateway 122, to have either the funds from the original ticket added as monetary funds to the user's mobile wallet 114, or to the new ticket.

FIG. 46 shows a block diagram of components and signal flows of a system 4600 by which a user may obtain or redeem credit available on the EGM 112 to a mobile wallet 114. The system 4600 is similar to the system 4500, except that a new equivalent ticket is not created. Instead, the original ticket, or a virtual equivalent, is directly recorded or stored in the user's mobile wallet 114. This system requires that the initial printed form of the ticket be destroyed. This system may be performed at a cage, kiosk, bill validator, or EGM (not shown) of the casino for which the destruction of the physical ticket can be performed.

Figure 47:
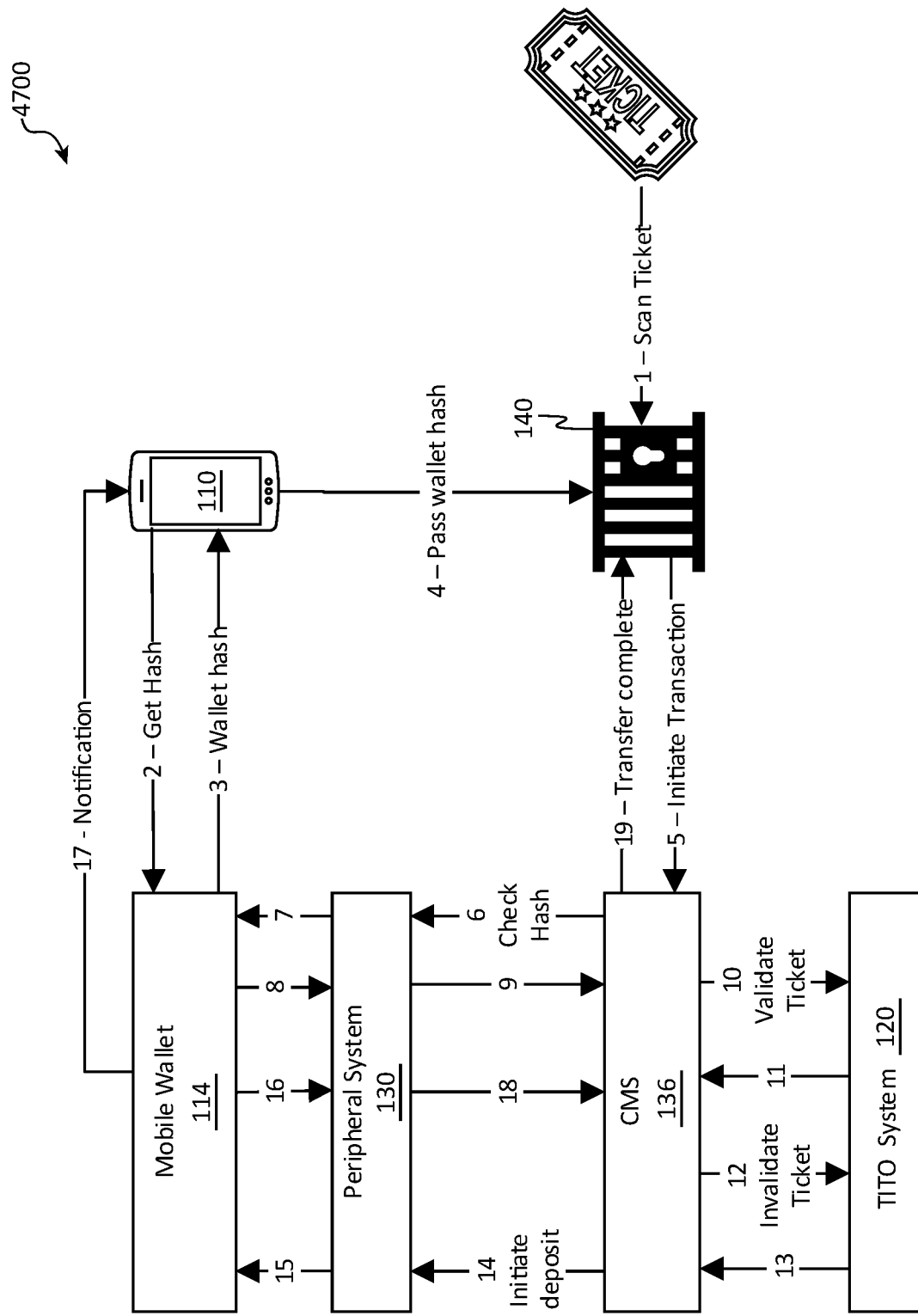
Figure 48:
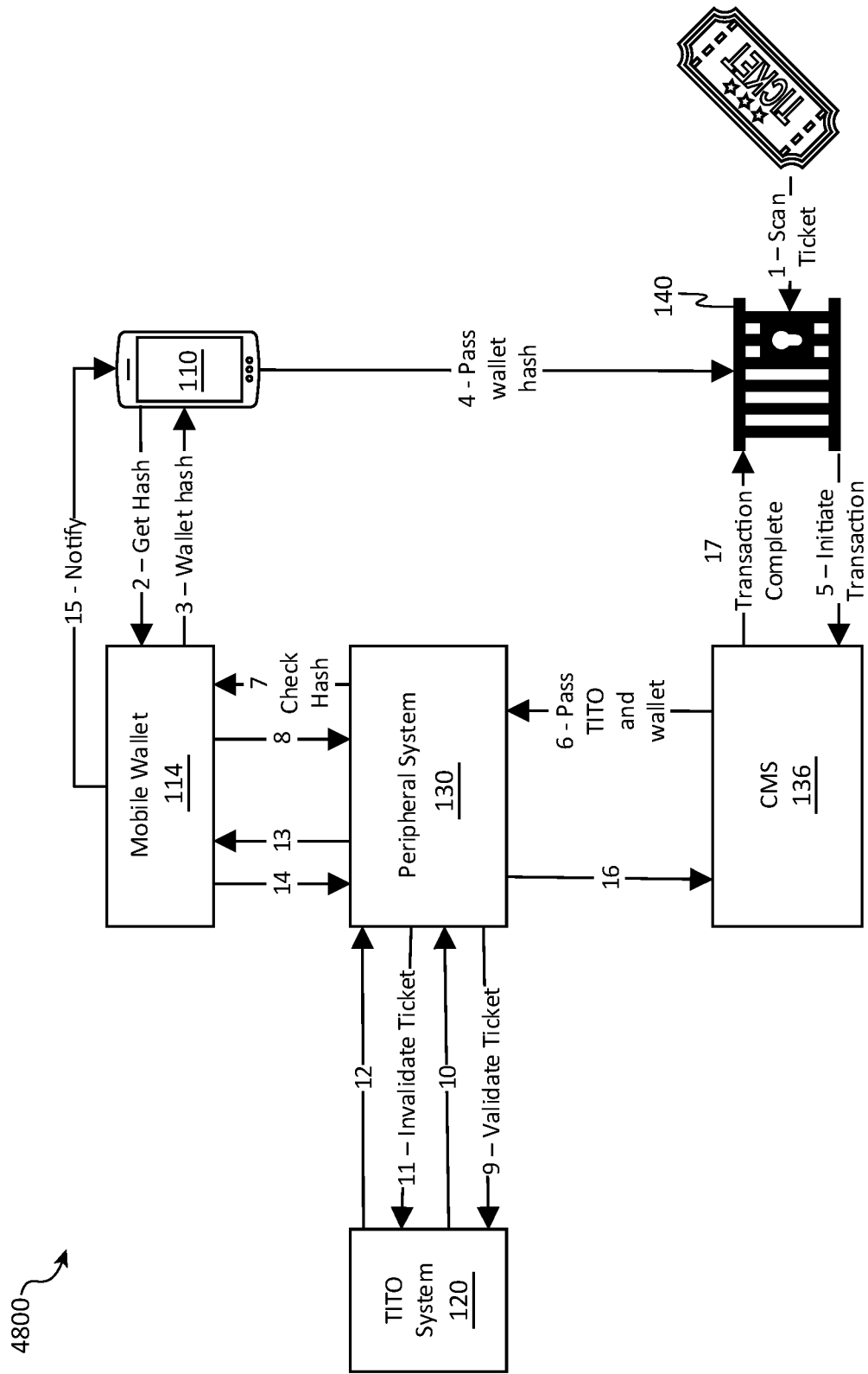

FIGS. 47-48 show block diagrams of components and signal flows of systems 4700 and 4800 in which a physical ticket is redeemed at a cage of the casino. The ticket is scanned at a cage (such as by an attendant). A user's mobile device may obtain a hash from the user's mobile wallet to pass to equipment in the cage configured to communicate with a casino management system. The casino management system may communicate with a TITO System and a Peripheral System to perform the transfer of the funds, or of a replacement ticket, to the user's mobile wallet.

FIG. 47 shows a block diagram of components and signal flows of a system 4700 by which a user may obtain or redeem credit available on a physical ticket to the user's mobile wallet 114. In the method of the system 4700, a user presents a physical ticket at the casino cage 140, and the ticket is then scanned at the cage, such as by an attendant. The user's mobile device 110 may then communicate a hash obtained from the user's mobile wallet 114 to equipment at the cage 140. The communication may use a bump communication, various NFC technologies, reading of codes (e.g., QR or bar codes) from a display on the user's mobile device 110, or other communication methods.

Using the hash and/or other information from the scan of the ticket, the cage 140 communicates with the casino management system (CMS) 136. The CMS 136 may then communicate with the user's mobile wallet 114 through the Peripheral System 130 to check the hash and obtain validation of the ticket. The validation is communicated with the TITO System 120, which can then invalidate the original physical ticket, such as within its records or databases. The CMS 136 can then, using the Peripheral System 130, cause the value or funds of the original physical ticket to be deposited or recorded on the user's mobile wallet 114. The funds may be in the form of a monetary value recorded on the mobile wallet 114, as a new ticket, or in another form.

FIG. 48 shows a block diagram of components and signal flows of a system 4800 by which a user may obtain or redeem credit available on a physical ticket to the user's mobile wallet 114. The system 4800 is similar to the system 4700, except that the CMS 136 interfaces only with the Peripheral System 130, rather than with both the Peripheral System 130 and the TITO System 120.

In the system 4800, the Peripheral System 130 directly communicates with the mobile wallet 114 and the TITO System 120 to check the hash and communicate the validity of the hash to the TITO System 120, which can then invalidate the original physical ticket. The Peripheral System 130 can then cause the value or funds of the original physical ticket to be deposited or recorded on the user's mobile wallet 114. The funds may be in the form of a monetary value recorded on the mobile wallet 114, as a new virtual ticket, or in another form.

Figure 49:
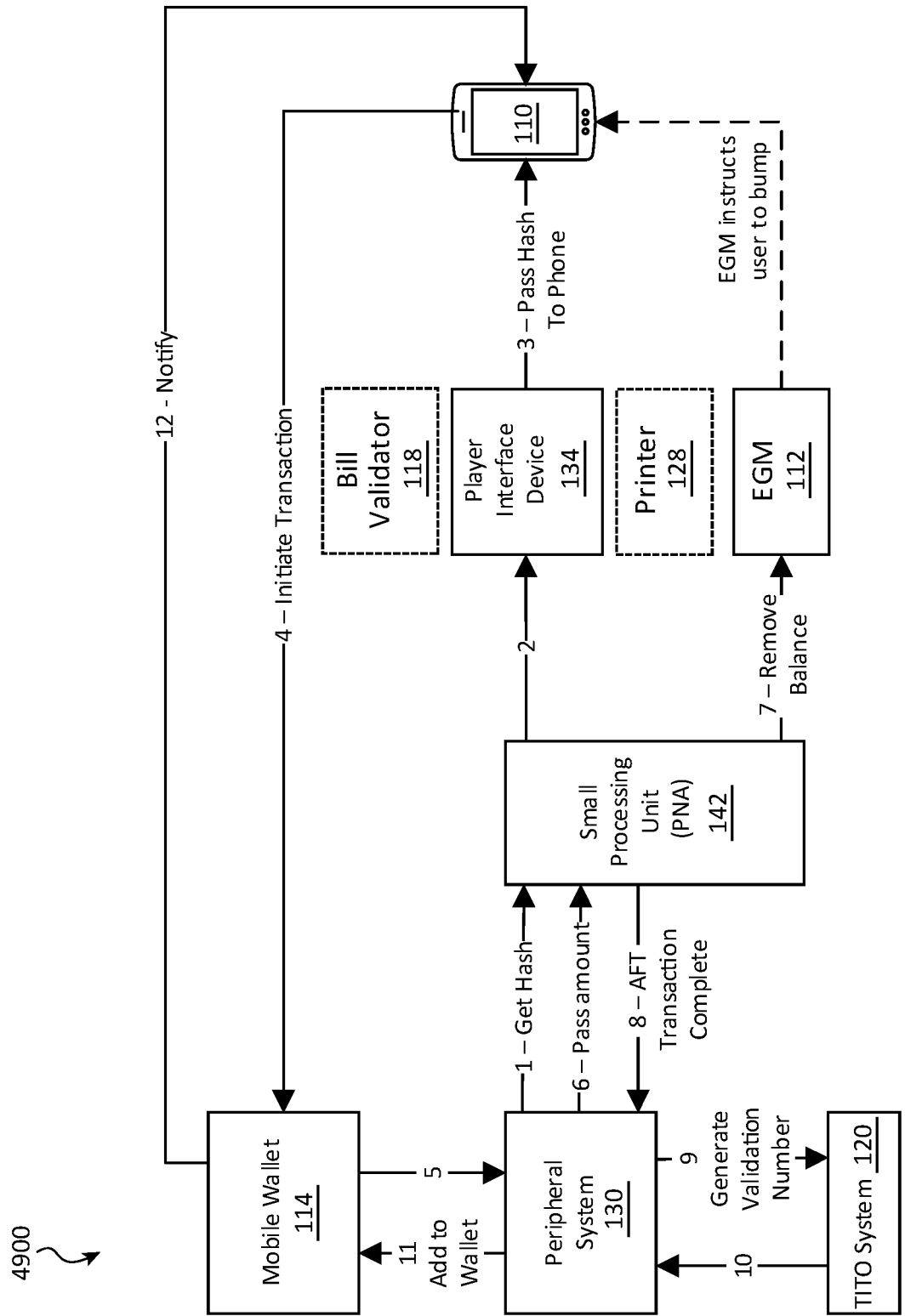
Figure 50:
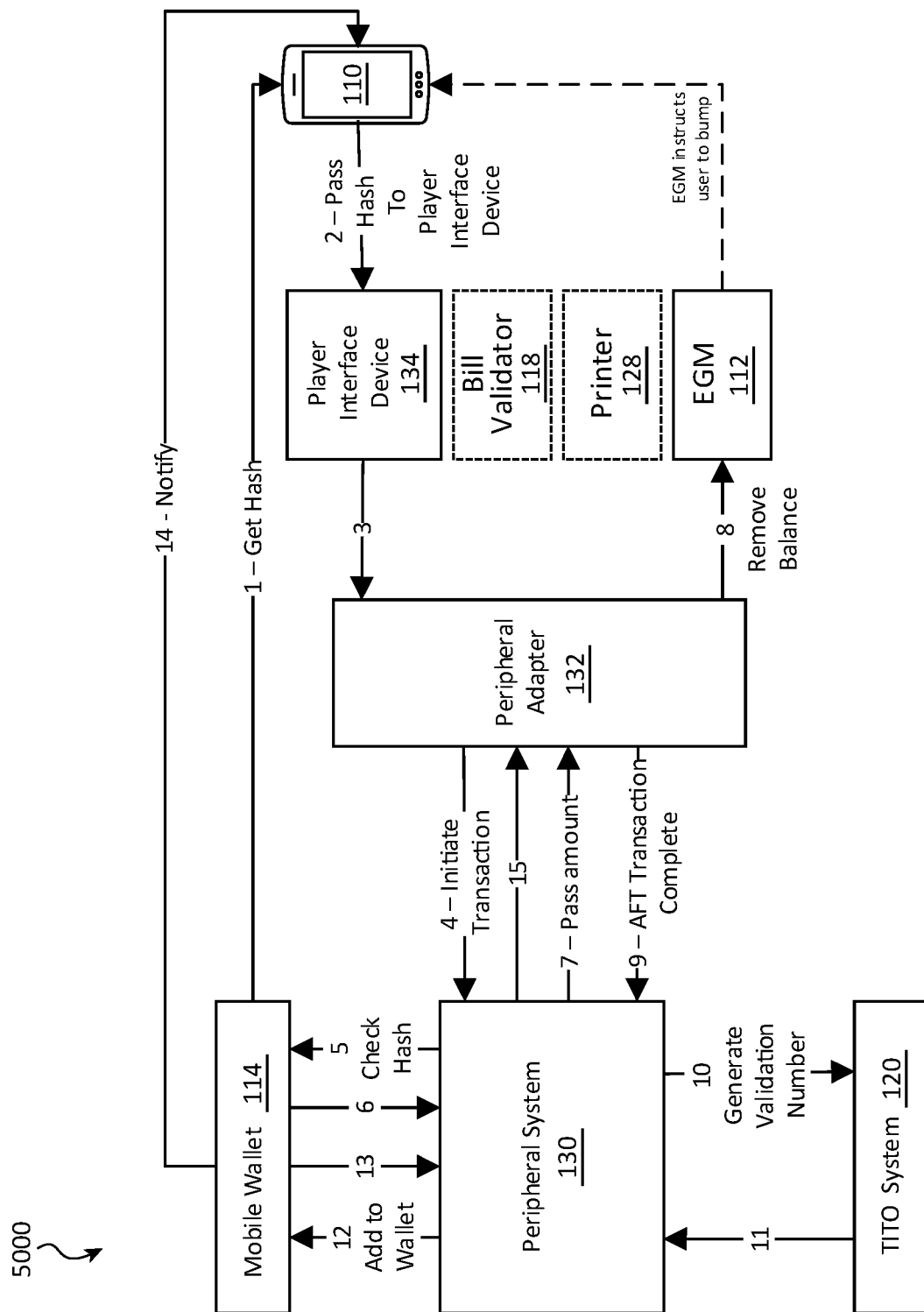

FIGS. 49-50 show block diagrams of components and signal flows of systems 4900 and 5000 by which a user may transfer credit available on an EGM to the user's mobile wallet. The systems 4900 and 5000 make use of Automated Funds Transfer (AFT) methods.

FIG. 49 shows a block diagram of components and signal flows of a system 4900 by which a user may obtain or redeem credit available on the EGM 112 to the mobile wallet 114. The operations of the system 4900 begin with the mobile device 110 retrieving a hash from the EGM 112. As shown in FIG. 49, the EGM 112 may communicate or interface with the user through Player Interface Device 134. The EGM 112 then communicates the hash over a mobile or cellular network to the mobile wallet 114 to initiate the transfer transaction. The mobile wallet 114 communicates with the Peripheral System 130 to perform the transfer, and the Peripheral System 130 communicates with a Small Processing Unit 142 to implement the AFT. The Small Processing Unit 142 may include or be implemented as a peripheral network adaptor (PNA).

The Small Processing Unit 142 communicates with the EGM 112 so that the credit on the EGM 112 is removed, and with the Peripheral System 130 to indicate the AFT is completed. Once the Peripheral System 130 has that indication, it sends a corresponding validation to the TITO System 120, and transfers the funds to the mobile wallet 114.

FIG. 50 shows a block diagram of components and signal flows of a system 5000 by which a user may obtain or redeem credit available on the EGM 112 to a mobile wallet 114. The system 5000 is a modification of the system 4900, except that (i) a Peripheral Adapter 132 is used in place of the Small Processing Unit 142, and (ii) the mobile device 110 obtains the hash from the Player Interface Device 134.

Figure 51:
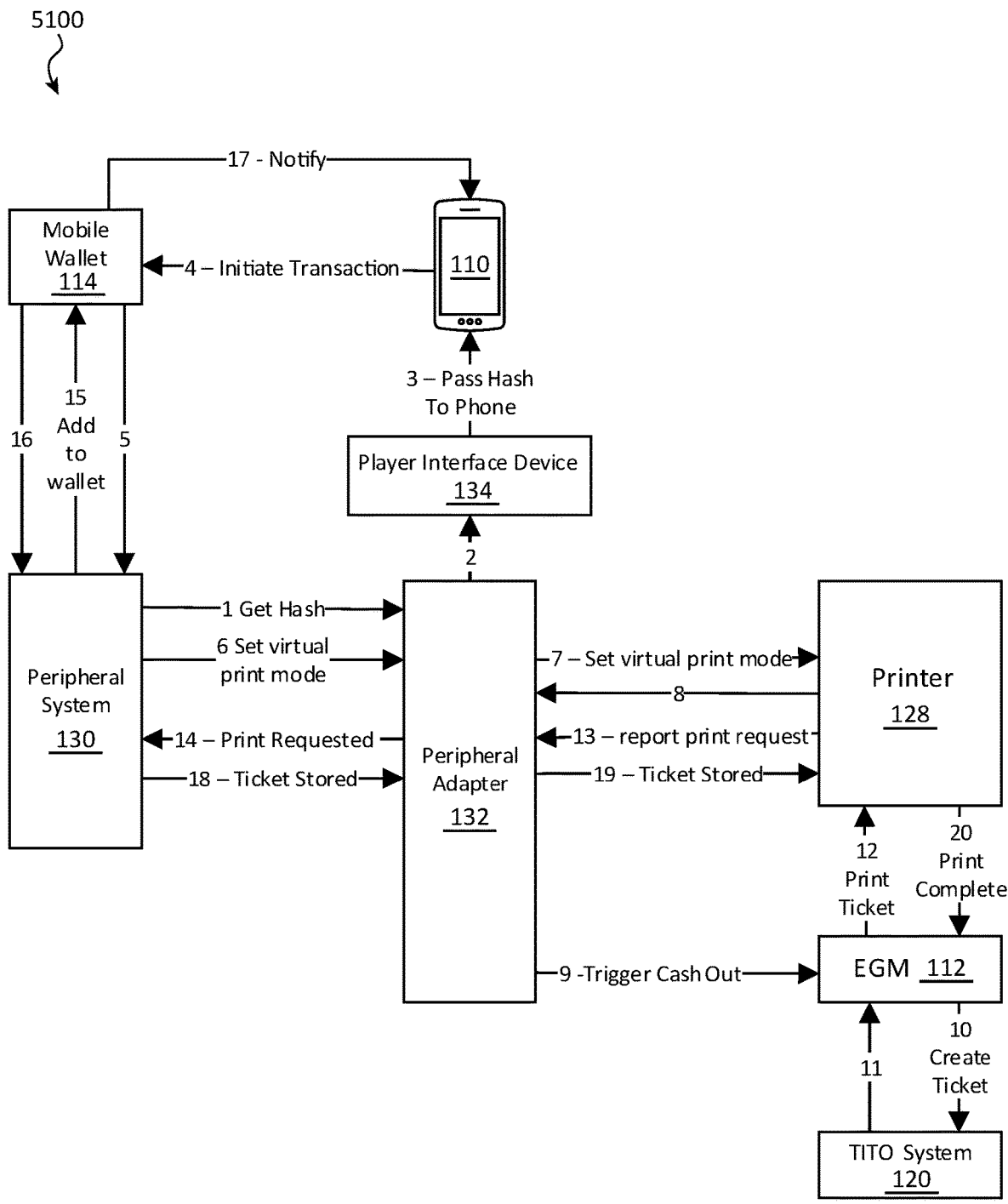
Figure 52:
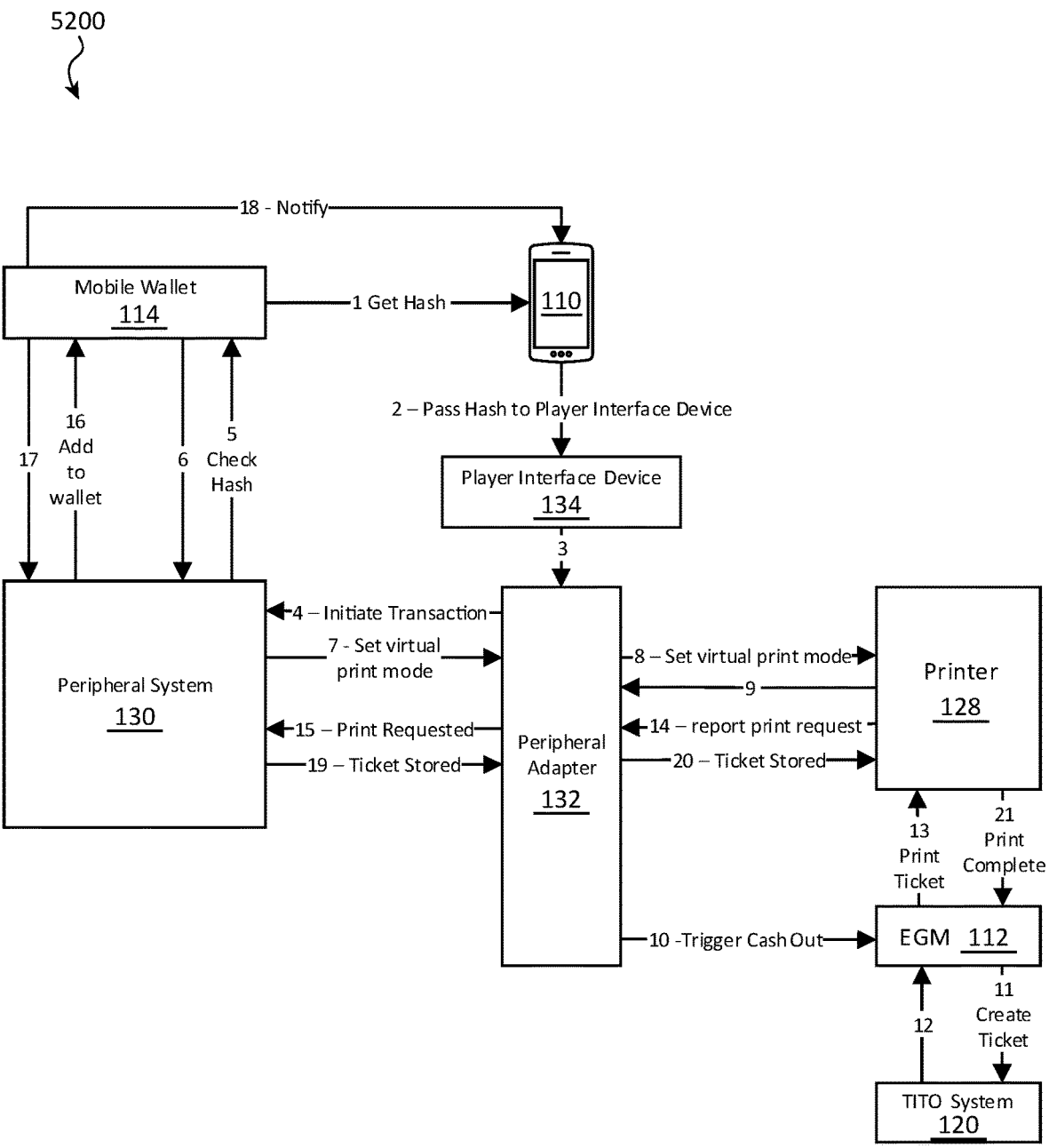

FIGS. 51-52 show block diagrams of components and signal flows of methods and systems 5100 and 5200 by which a user may transfer funds available on an EGM to the user's mobile wallet. The systems 5100 and 5200 make use of a bill validator and a virtual printer transaction. In these systems, a user selects an option in a mobile app, such as on a mobile device, to transfer the credit on the EGM to a mobile wallet. The EGM will communicate to a printer to print a TITO ticket (as in a usual process by which a user can cash out) and, instead, the printer routes a validation number to the Peripheral System. The Peripheral System may then add the value or funds to the mobile wallet.

FIG. 51 shows a block diagram of components and signal flows of a system 5100 by which a user may obtain or redeem credit available on the EGM 112 to a mobile wallet 114. The system 5100 implements the process described above by the mobile device 110 obtaining a hash from the EGM 112, such as over a mobile or cellular network. In the system 5100, the Peripheral System 130, through the Peripheral Adapter 132, sets the printer 128 to a virtual print mode. The work and signal flow are then as shown to transfer the funds to the mobile wallet 114.

FIG. 52 shows a block diagram of components and signal flows of a system 5200 by which a user may obtain or redeem credit available on the EGM 112 to a mobile wallet 114. The system 5200 is based on the system 5100 except that, instead of the mobile device 110 obtaining the hash from the Player Interface Device 134 to initiate the transfer transaction, the Player Interface Device 134 obtains the hash from the mobile device 110. The initial work or signal flow stages related to communicating the hash are reversed, but otherwise the system 5200 is as in system 5100.

In stage 8 of system 5100 and stage 9 of system 5200, the Peripheral Adapter 132 triggers a cash out event at the EGM 112. This can be done in various ways. A first way is that the Peripheral Adapter 132 can tap into the electrical signal of the physical cash out button (such as may be located on the EGM 112 or an associated Player Interface Device 134) and simulate a button press. In a second way, the Peripheral Adapter 132 can send some kind of software signal, such as through a serial communication, a web application program interface, or the like.

Figure 53:
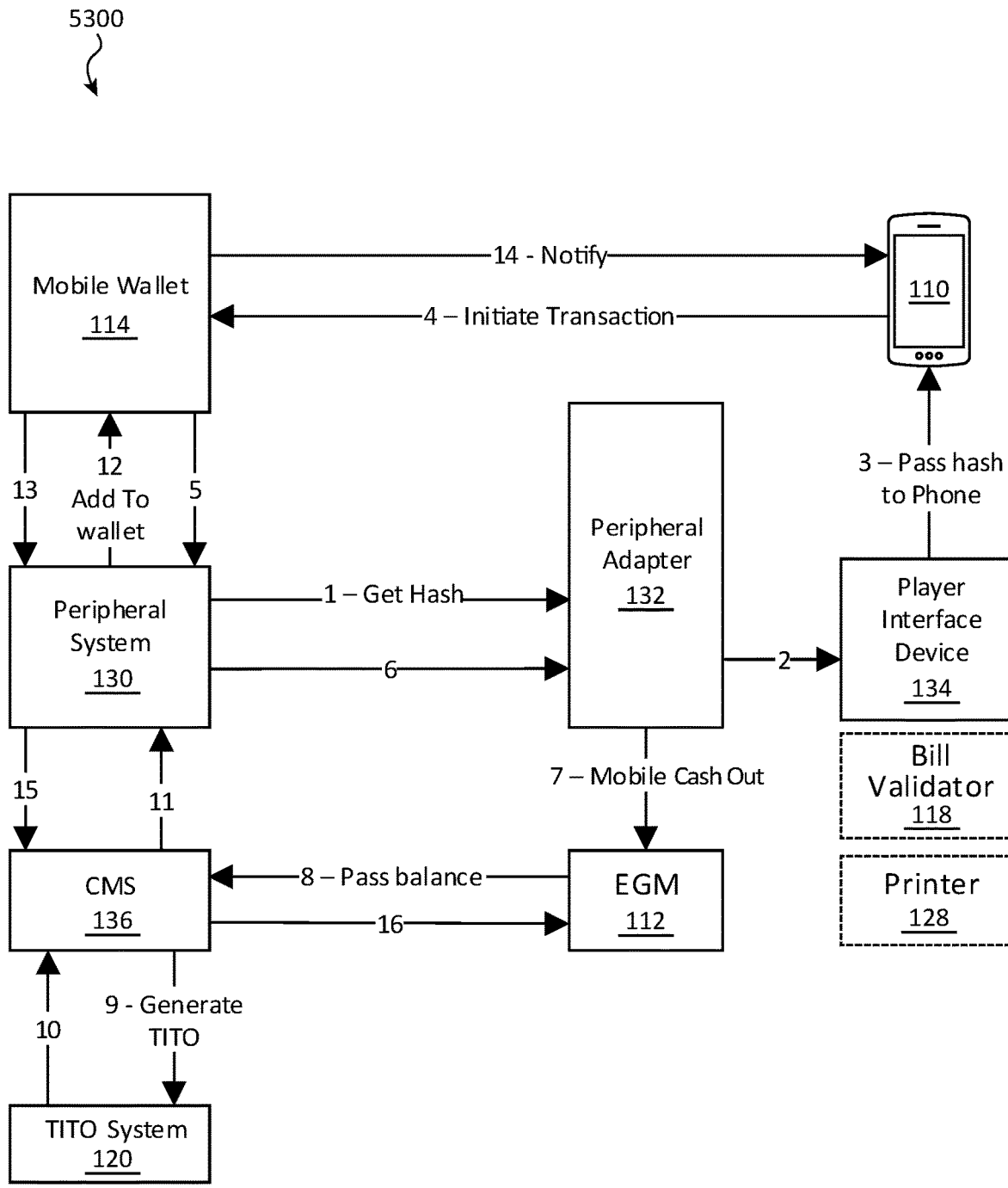
Figure 54:
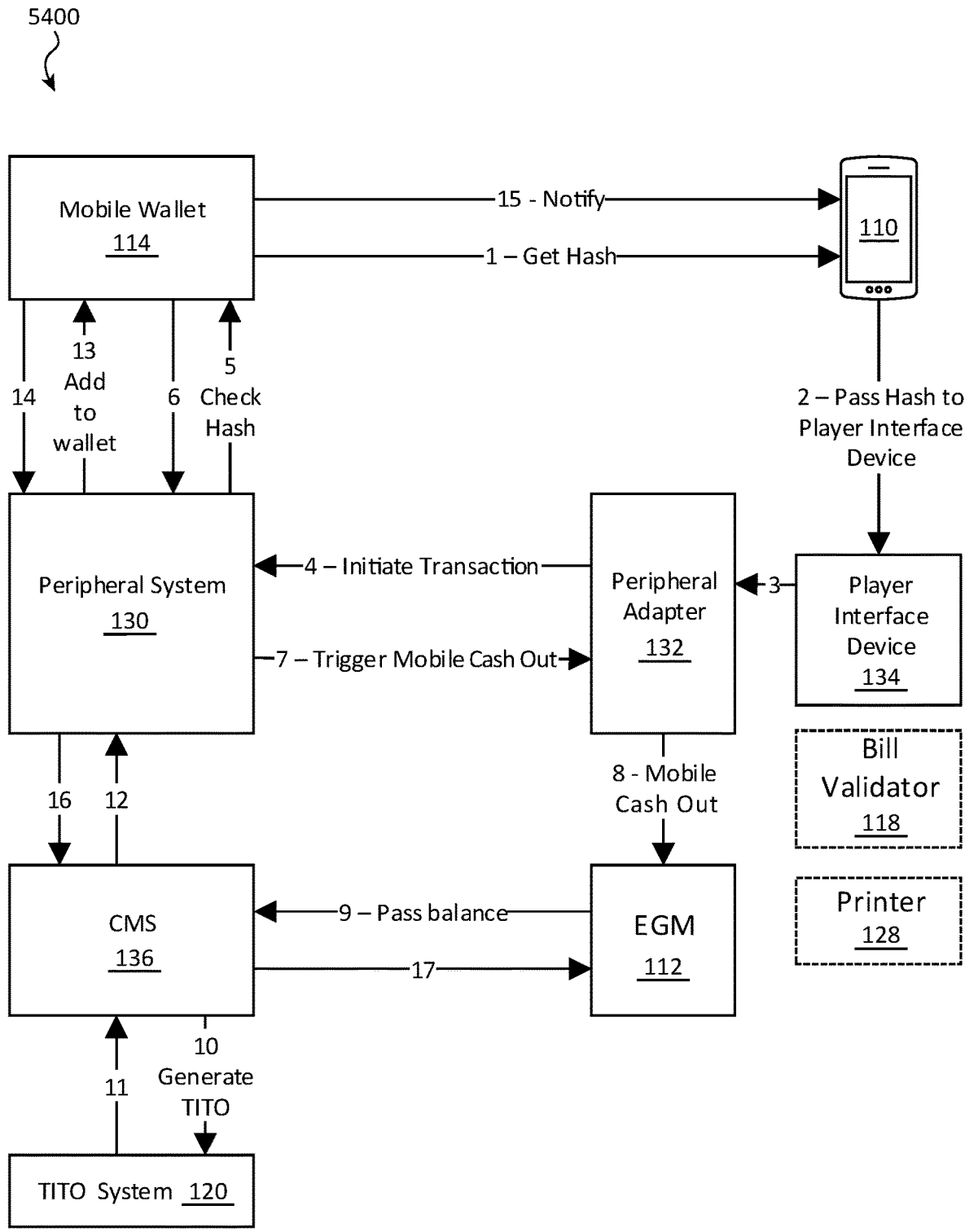

FIGS. 53-54 show block diagrams of components and signal flows of methods and systems 5300 and 5400 by which a user may transfer credit available on an EGM to the user's mobile wallet. The systems 5300 and 5400 are based on the systems 5100 and 5200 described above, except that an EGM may have been programmed to support ticketless cash out. In the work and signal flows of the systems 5300 and 5400, the Peripheral Adapter can trigger a cash out on the EGM, and the EGM performs the cash out through communications with a casino management system.

FIG. 53 shows a block diagram of components and signal flows of a system 5300 by which a user may obtain or redeem credit available on the EGM 112 to a mobile wallet 114. The operations of the system 5300 are initiated by the mobile device 110 obtaining a hash from the EGM 112, such as over a mobile network. The Peripheral System 130 communicates, by use of the Peripheral Adapter 132, to the EGM 112 to perform a cash out operation. The communication from the Peripheral System 130 to the EGM 112 may include information related to an amount of credit to be cashed out.

The EGM 112 then notifies the CMS 136 to communicate with the TITO System 120 and the mobile wallet 114 to transfer, and account for, the funds.

FIG. 54 shows a block diagram of components and signal flows of a system 5400 by which a user may obtain or redeem credit available on the EGM 112 to a mobile wallet 114. The system 5400 is based on the system 5300 except that the Player Interface Device 134 instead obtains the hash from the mobile device 110. The initial work or signal flow stages related to communicating the hash are reversed, but otherwise the system 5400 is as described in the system 5300.

In stage 7 of system 5300 and stage 8 of system 5400, the Peripheral Adapter 132 triggers a cash out event at the EGM 112. This may be done by various methods. A first way is that the Peripheral Adapter 132 can tap into the electrical signal of the physical cash out button (such as may be located on the EGM 112 or an associated Player Interface Device 134) and simulate a button press. In a second way, the Peripheral Adapter 132 can send some kind of software signal, such as through a serial communication, a web application program interface, or the like.

FIGS. 55-60 show block diagrams of components and signal flows of methods and systems 5500-6000 by which a user can obtain refunds or transfers ("cash outs") of credit on an EGM. Differences from the systems 5300 and 5400 described include: (i) the cash out is triggered on the EGM by a casino management system (CMS) instead of a Peripheral Adapter, and (ii) the EGM creates the TITO ticket(s) by communications with a TITO System.

Figure 55:
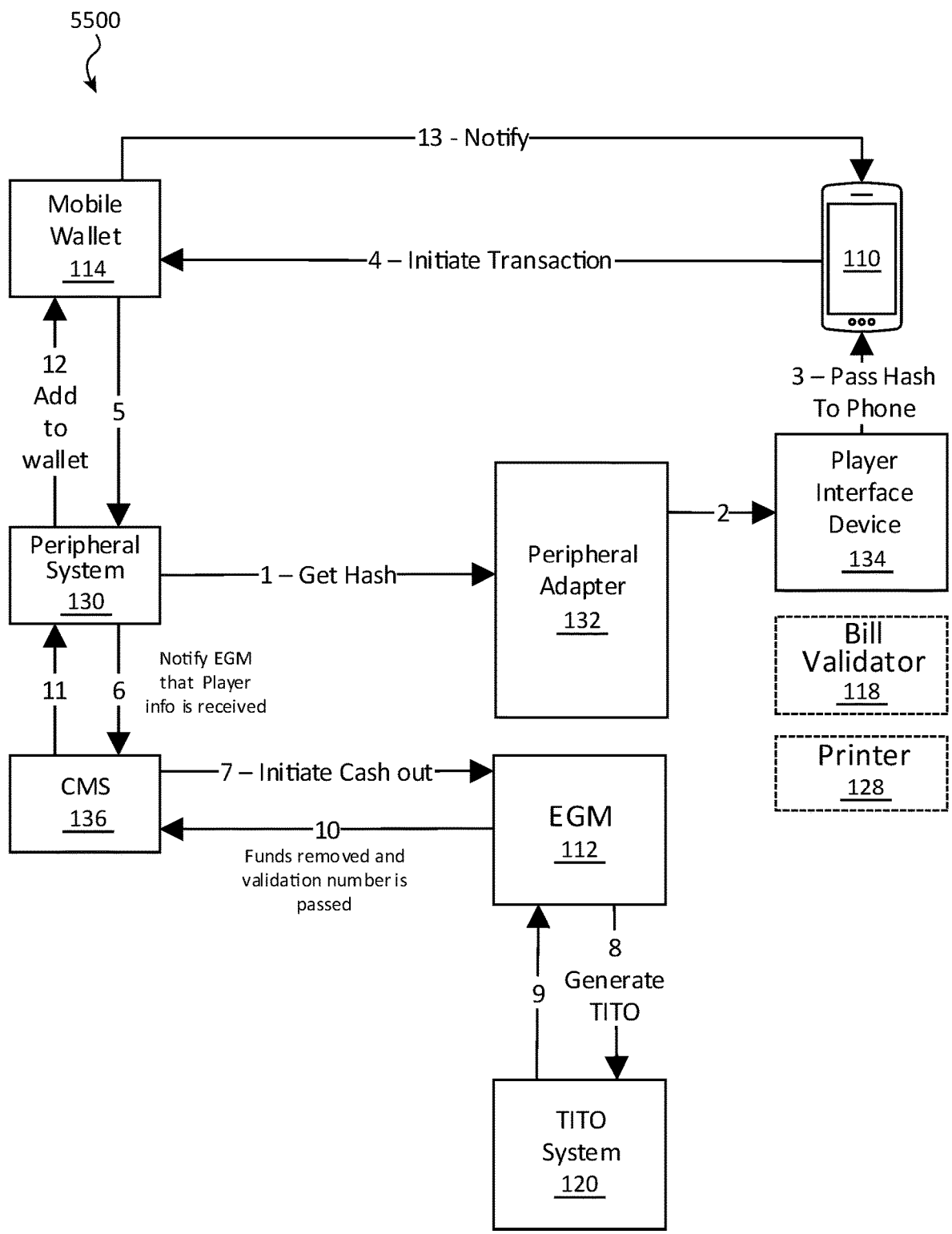

FIG. 55 shows a block diagram of components and signal flows of a system 5500 by which a user may obtain or redeem credit available on the EGM 112 to a mobile wallet 114. The process of the system 5500 is initiated by a mobile device 110 obtaining a hash from the EGM 112, such as over a mobile or cellular network. The hash and other information needed for the process may be communicated to the Peripheral System 130 by the mobile wallet 114. The information may include the balance or other amount of the credit on the EGM 112 to be redeemed.

The Peripheral System 130 may then communicate the information for the cash out to the EGM 112. The EGM 112 may then communicate with the casino's TITO System 120 to generate a virtual TITO ticket. The EGM 112 may then communicate to the CMS 136 that the amount or balance has been removed from credit, and pass a validation number to the CMS 136 related to the generated TITO ticket.

The CMS 136, in conjunction with the Peripheral System 130, may transmit the amount or balance for deposit into the mobile wallet 114. Return or response communications may then be sent from the mobile wallet 114 back through the Peripheral System 130 to the CMS 136 to record the deposit.

Figure 56:
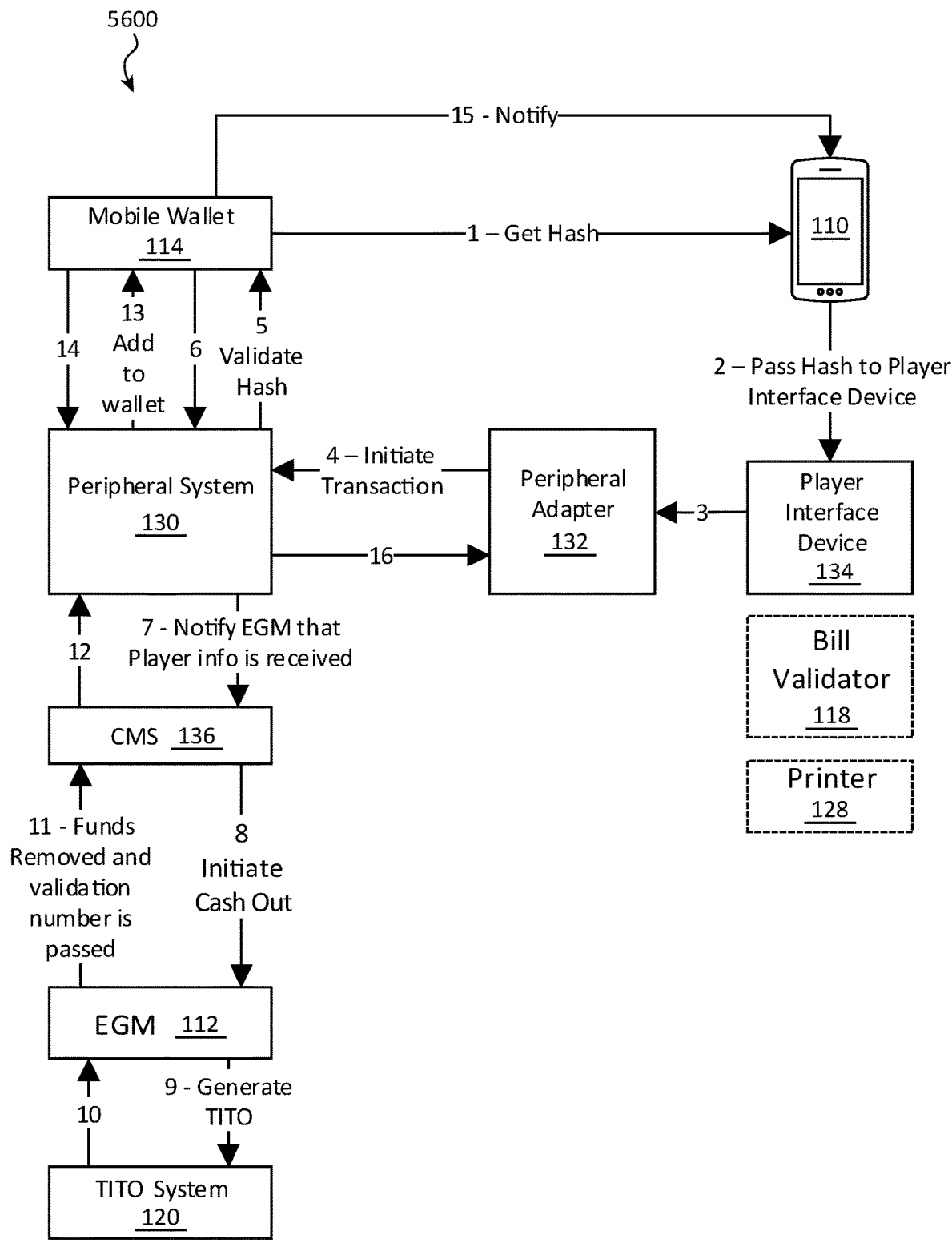

FIG. 56 shows a block diagram of components and signal flows of a system 5600 by which a user may obtain or redeem credit available on the EGM 112 to a mobile wallet 114. The system 5600 is similar to the system 5500, except that the Player Interface Device 134 obtains the hash from the mobile device 110, and the initiation signal or work flow is reversed.

Figure 57:
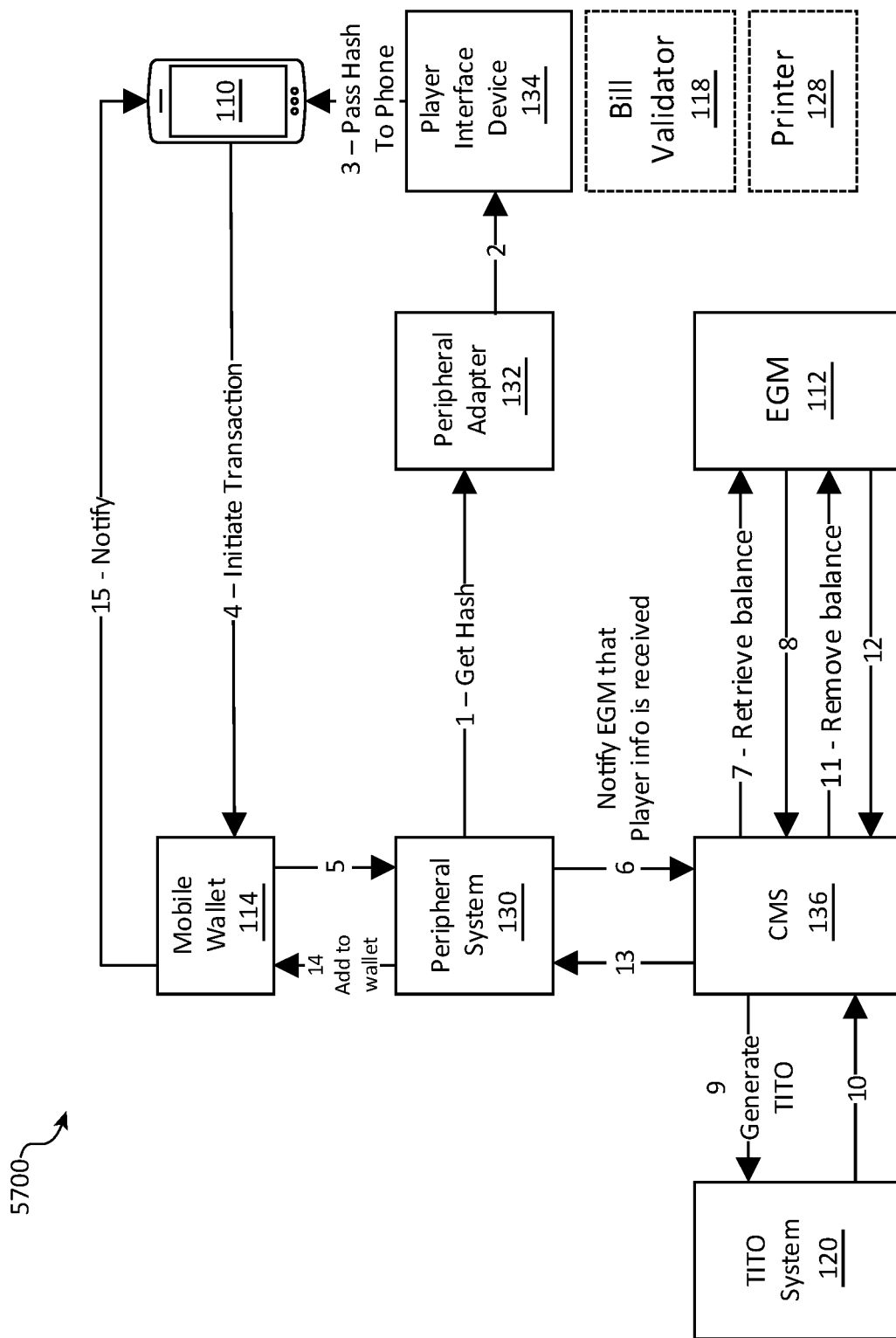

FIG. 57 shows a block diagram of components and signal flows of a system 5700 by which a user may obtain or redeem credit available on the EGM 112 to a mobile wallet 114. The system 5700 is similar to the system 5500, except that the CMS 136, rather than the EGM 112, interfaces with the TITO System 120. The initiation stages of the system 5700 proceed as in the system 5500 up to stage 5, in which the Peripheral System 130 receives the hash and other information from the mobile wallet 114. Then the Peripheral System 130 sends a communication to the CMS 136 that information related to the user, or his/her credit on the EGM 112, has been received. The CMS 136 may then retrieve the balance, or another amount, of the user's credit. The CMS 136 then may, in conjunction with the TITO System 120, generate a TITO ticket having value equal to the retrieved balance or amount. The CMS 136 may remove or cancel the balance or amount on the EGM 112. The CMS 136 then may transmit, using the Peripheral System 130, the balance or amount for deposit into the mobile wallet 114.

Figure 58:
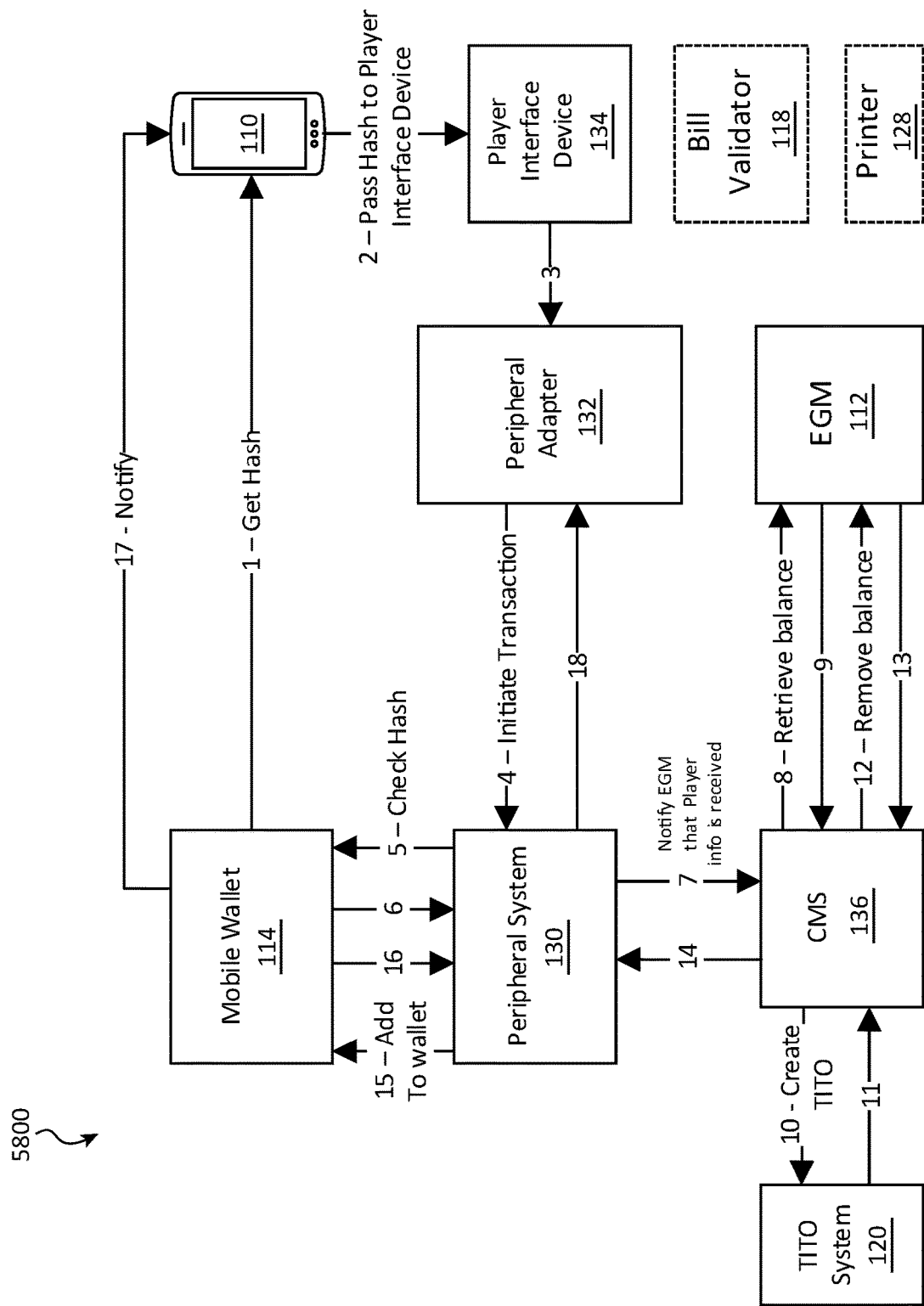

FIG. 58 shows a block diagram of components and signal flows of a system 5800 by which a user may obtain or redeem credit available on the EGM 112 to a mobile wallet 114. The system 5800 is similar to the system 5700, except that the Player Interface Device 134 obtains the hash from the mobile device 110, and the initiation signals or work flows are reversed.

Figure 59:
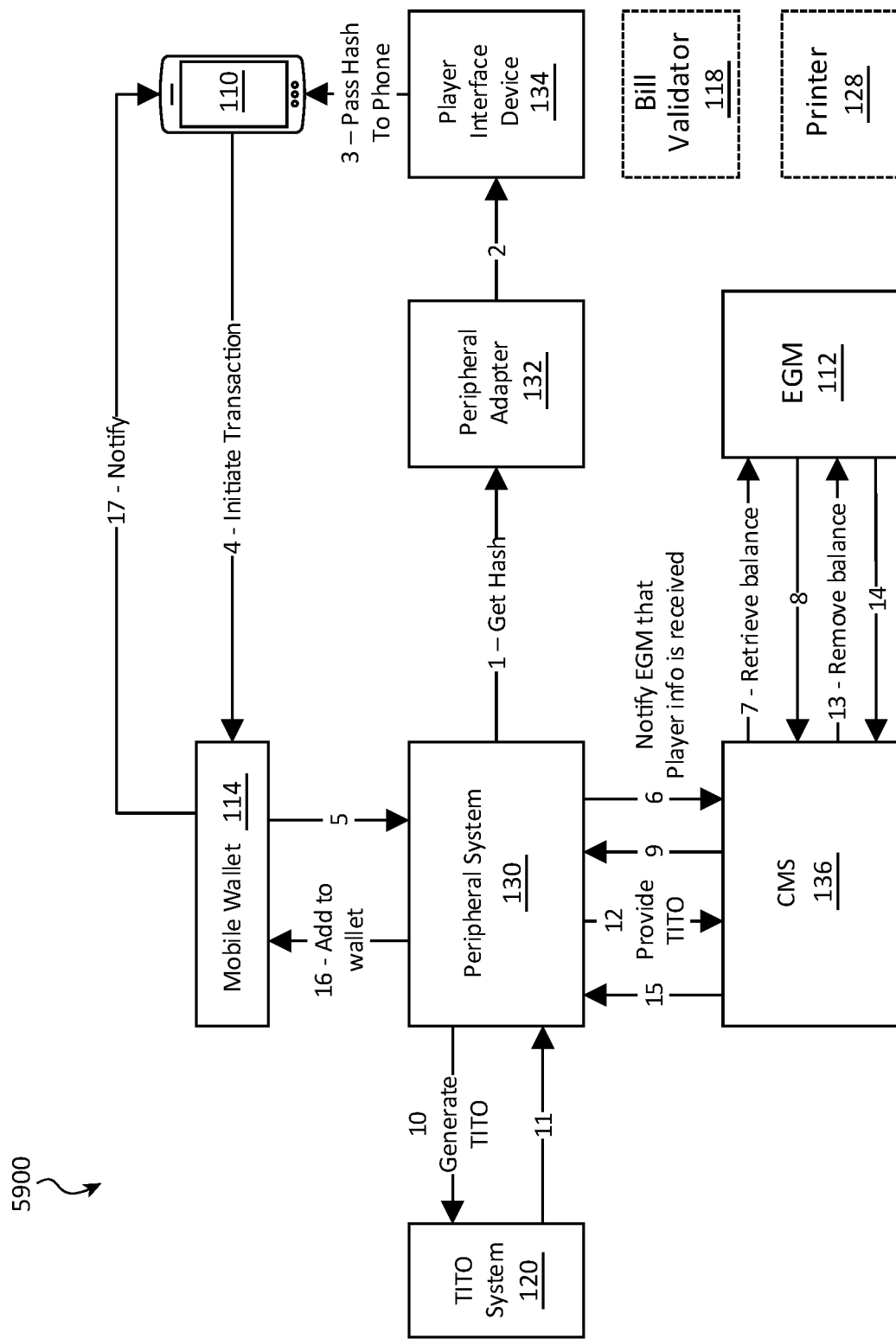

FIG. 59 shows a block diagram of components and signal flows of a system 5900 by which a user may obtain or redeem credit available on the EGM 112 to a mobile wallet 114. The system 5900 is a modification of the system 5700. The process of system 5900 is as for the system 5700 through stage 8, at which point the CMS 136 has retrieved the balance or amount from the EGM 112. The CMS 136 communicates to the Peripheral System 130 to generate a TITO ticket in conjunction with the TITO System 120.

The TITO ticket (or its information) is communicated by the Peripheral System 130 to the CMS 136, and the operations proceed as in the system 5700 to deposit the balance or amount to the mobile wallet 114.

Figure 60:
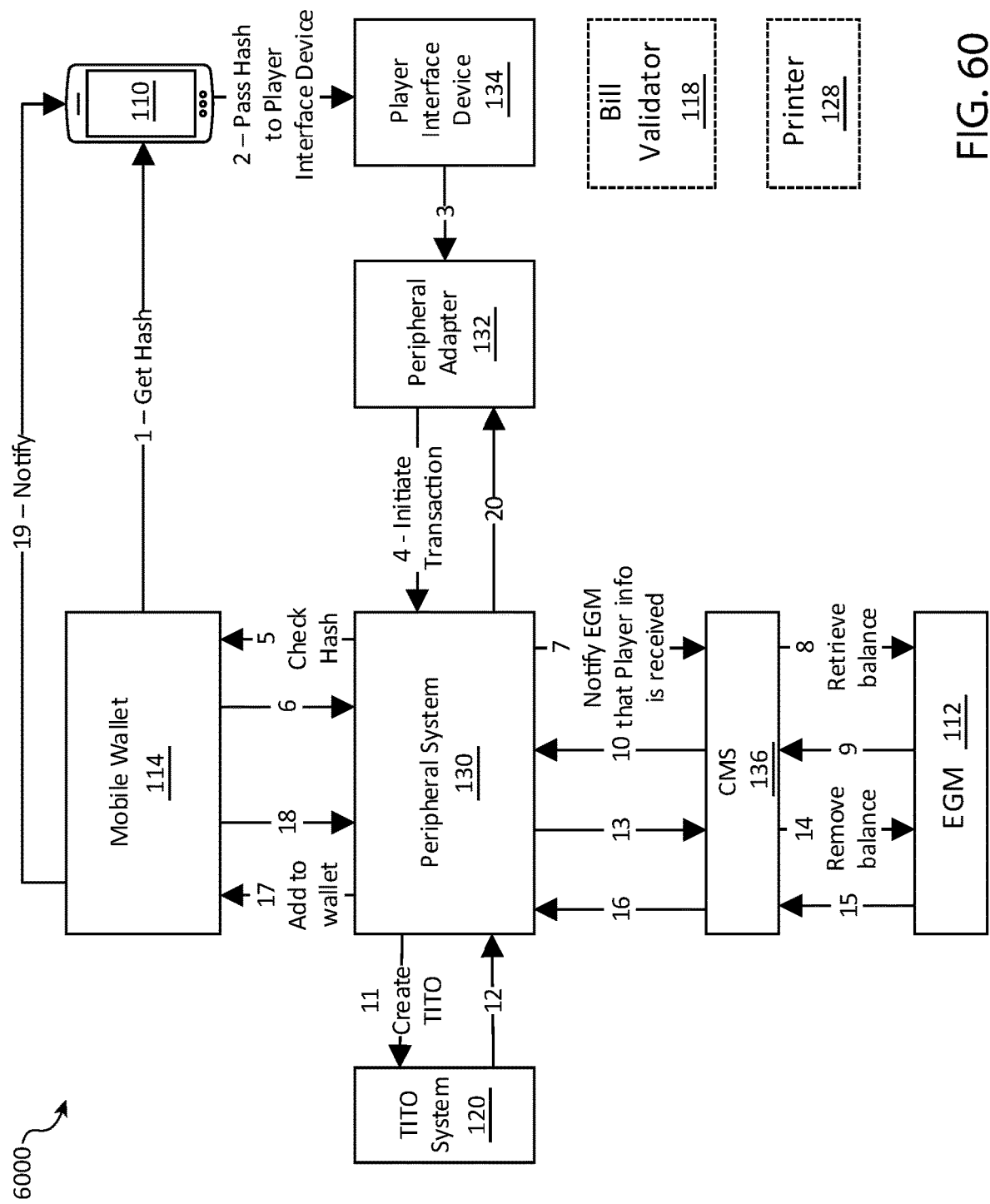

FIG. 60 shows a block diagram of components and signal flows of a system 6000 by which a user may obtain or redeem credit available on the EGM 112 to a mobile wallet 114. The system 6000 is similar to the system 5900, except that the Player Interface Device 134 obtains the hash from the mobile device 110, and the initiation signals or work flows are reversed.

Figure 61:
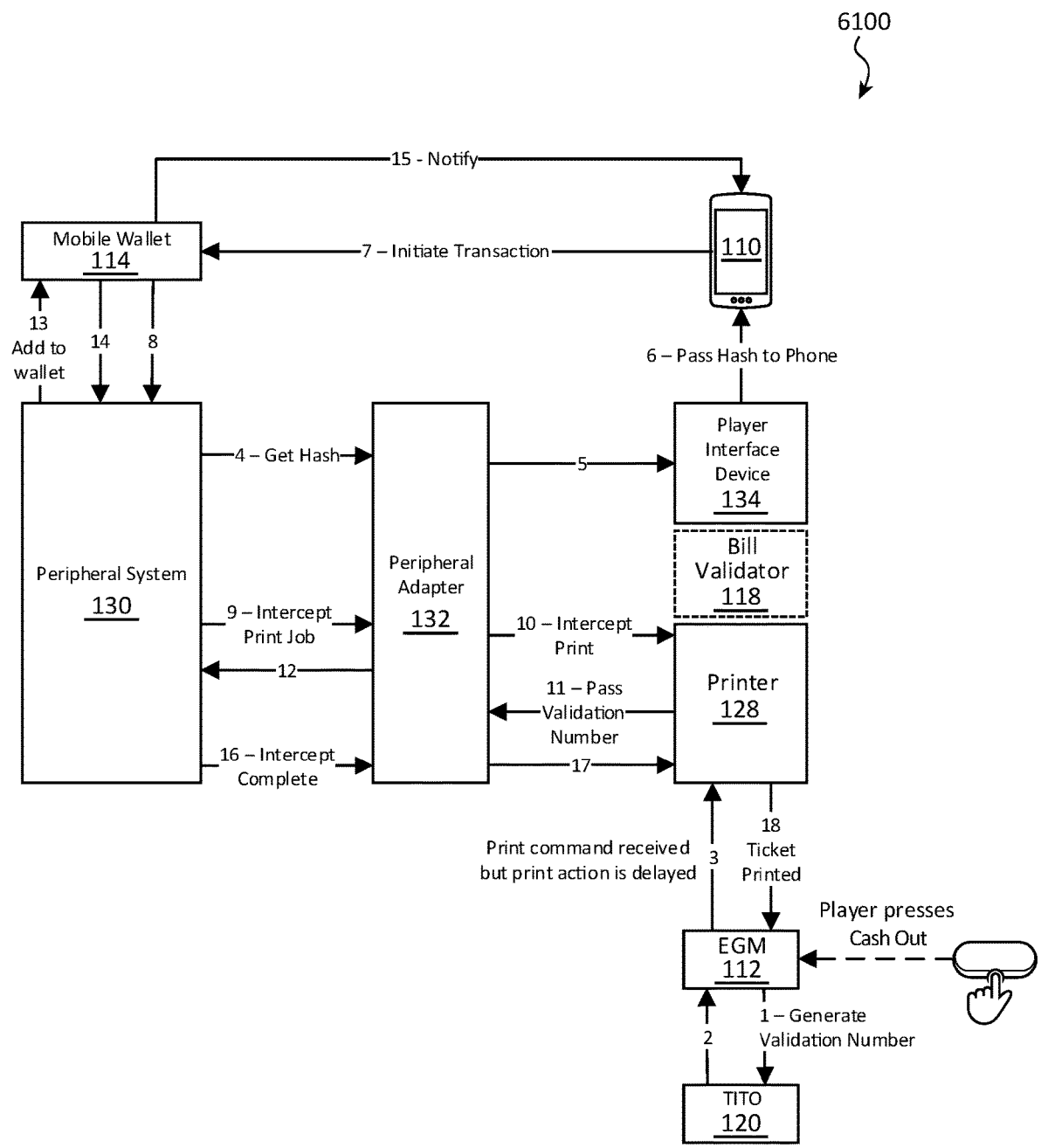
Figure 62:
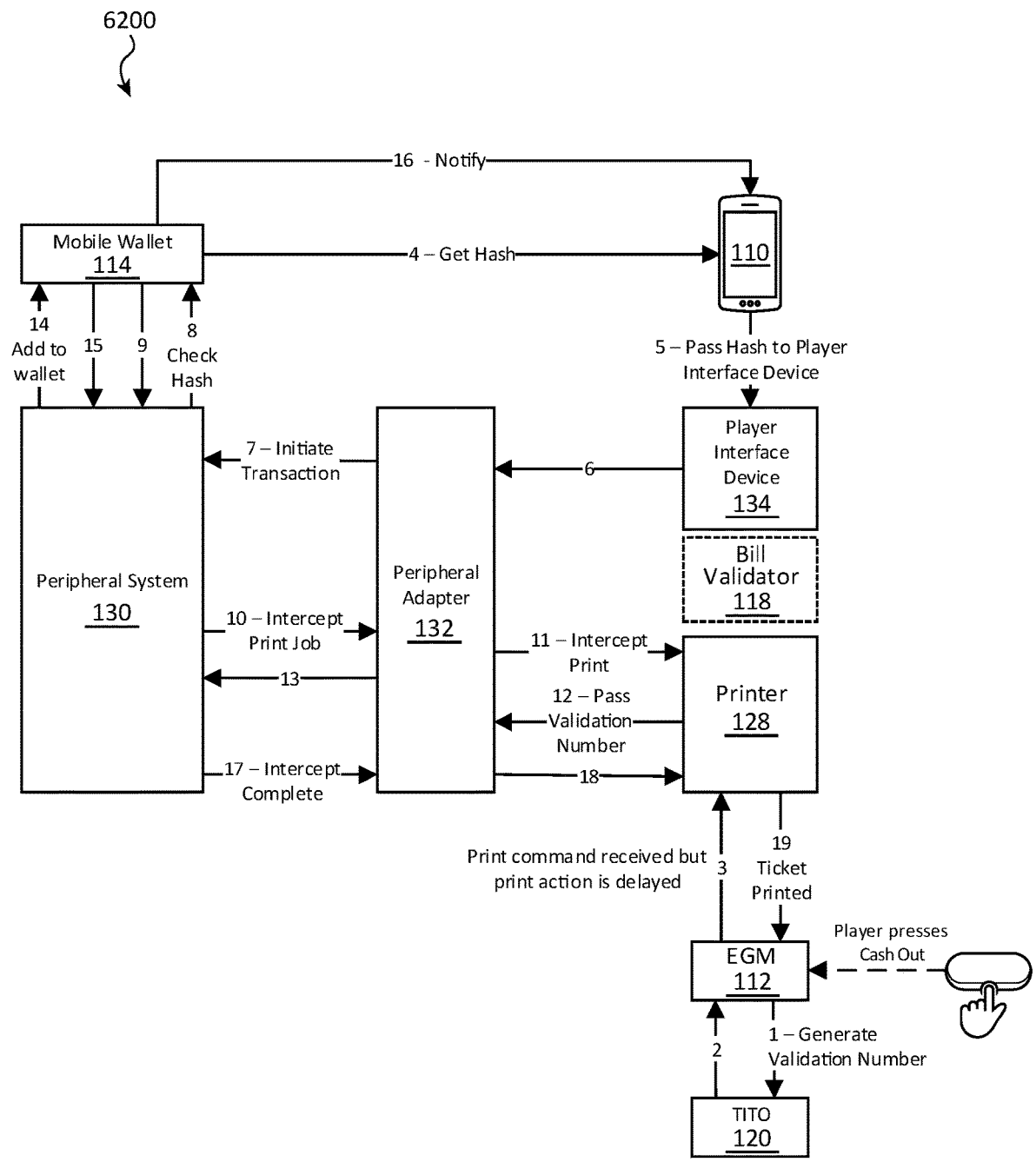

FIGS. 61-62 show block diagrams of components and signal flows of methods and systems 6100 and 6200 by which a user can obtain refunds or transfers of credit on an EGM. The systems 6100 and 6200 can be used in conjunction with, or retrofitted to, an EGM having a "Cash Out" button available for a user to initiate a cash out transaction for the credit on the EGM. In some EGMs, a user pushing a "Cash Out" button would initiate a printing of a physical TITO ticket, such as by a bill validator or a printer. In such EGMs, there may be a time lag between the user pressing the "Cash Out" button and initiation of the printing. The systems 6100 and 6200 may allow a user to alter the process to change how the credit is to be redeemed or refunded. Altering the process may be performed, for example, by using a bump communication from a mobile device to the EGM, and may allow the user to redirect the credit to be deposited into a mobile wallet of the user. The systems 6100 and 6200 may also be used in conjunction with an EGM that has a specific button to allow a user to cash out to a mobile wallet.

FIG. 61 shows a block diagram of components and signal flows of a system 6100 by which a user may obtain or redeem credit available on the EGM 112 to a mobile wallet 114. The method or process of the system 6100 is initiated by a press of the "Cash Out" button on the EGM 112 by a user to redeem or get a refund of credit still available on the EGM 112. The EGM 112 communicates with the TITO System 120 to generate a validation number for a TITO ticket. The validation number is passed from the EGM 112 to the Printer 128.

Before the Printer 128 prints a physical ticket, the system 6100 may allow an option for a user to initiate a cash out process different from printing a physical ticket. This may be by the user applying a bump or other communication from the mobile device 110 to the EGM 112 or the Player Interface Device 134 linked with the EGM 112. Once the different cash out process is initiated, the mobile device 110 can obtain a hash, such as by use of a mobile or cellular network. The hash, and possibly other information, is passed to the user's mobile wallet 114 and then to the Peripheral System 130 to initiate the different cash out process. In the system 6100, the funds from the cash out of the credit are applied to the mobile wallet 114, but one skilled in the art will recognize that the funds from the credit on the EGM 112 can be applied or transmitted to other accounts or forms for the user.

The Peripheral System 130 then communicates through the Peripheral Adapter 132 to the Printer 128 to intercept the printing of the physical ticket. The Printer 128 then suspends or ends any print job for the physical ticket, such as in its print queue, and communicates the validation number back to the Peripheral System 130.

The Peripheral System 130 then communicates the validation number to the mobile wallet 114 to have funds deposited, and receives a confirmation. The Peripheral System 130 may, if still needed, communicate further to the Printer 128 to complete the intercept of the ticket printing. The Printer 128 may then communicate to the EGM 112 a confirmation message or signal that the refund process is completed. The EGM 112 may then complete the deletion of the redeemed credit.

FIG. 62 shows a block diagram of components and signal flows of a system 6200 by which a user may obtain or redeem credit available on the EGM 112 to a mobile wallet 114. The system 6200 is similar to the system 6100, except after the Printer 128 has received the validation number from the EGM 112, the Player Interface Device 134 receives a hash from the mobile device 110 of the user. The hash (and other information as needed) is passed to the Peripheral System 130 through the Peripheral Adapter 132 to initiate the cash out transaction. Thereafter the stages are as described for the system 6100.

Figure 63:
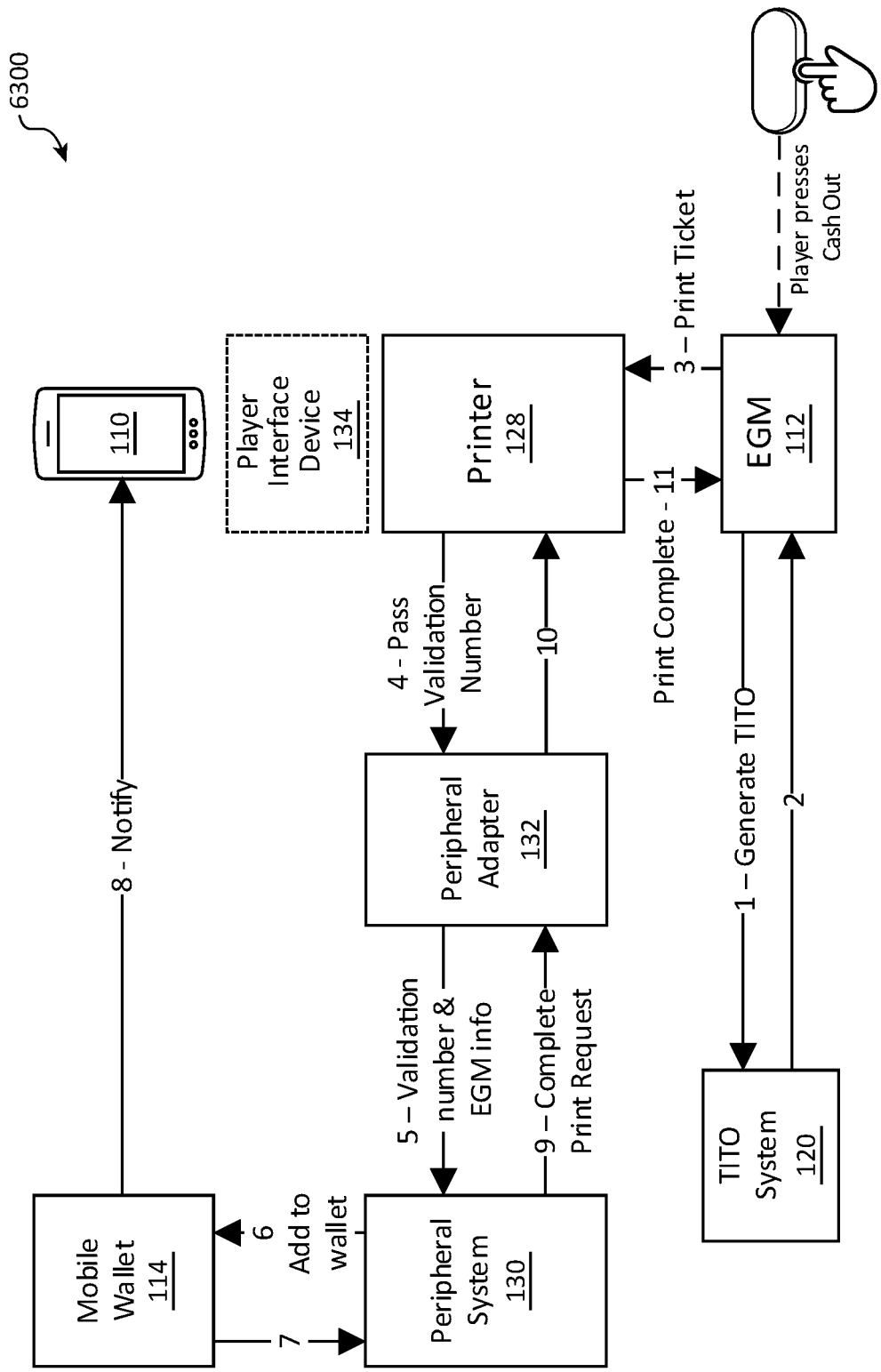
Figure 64:
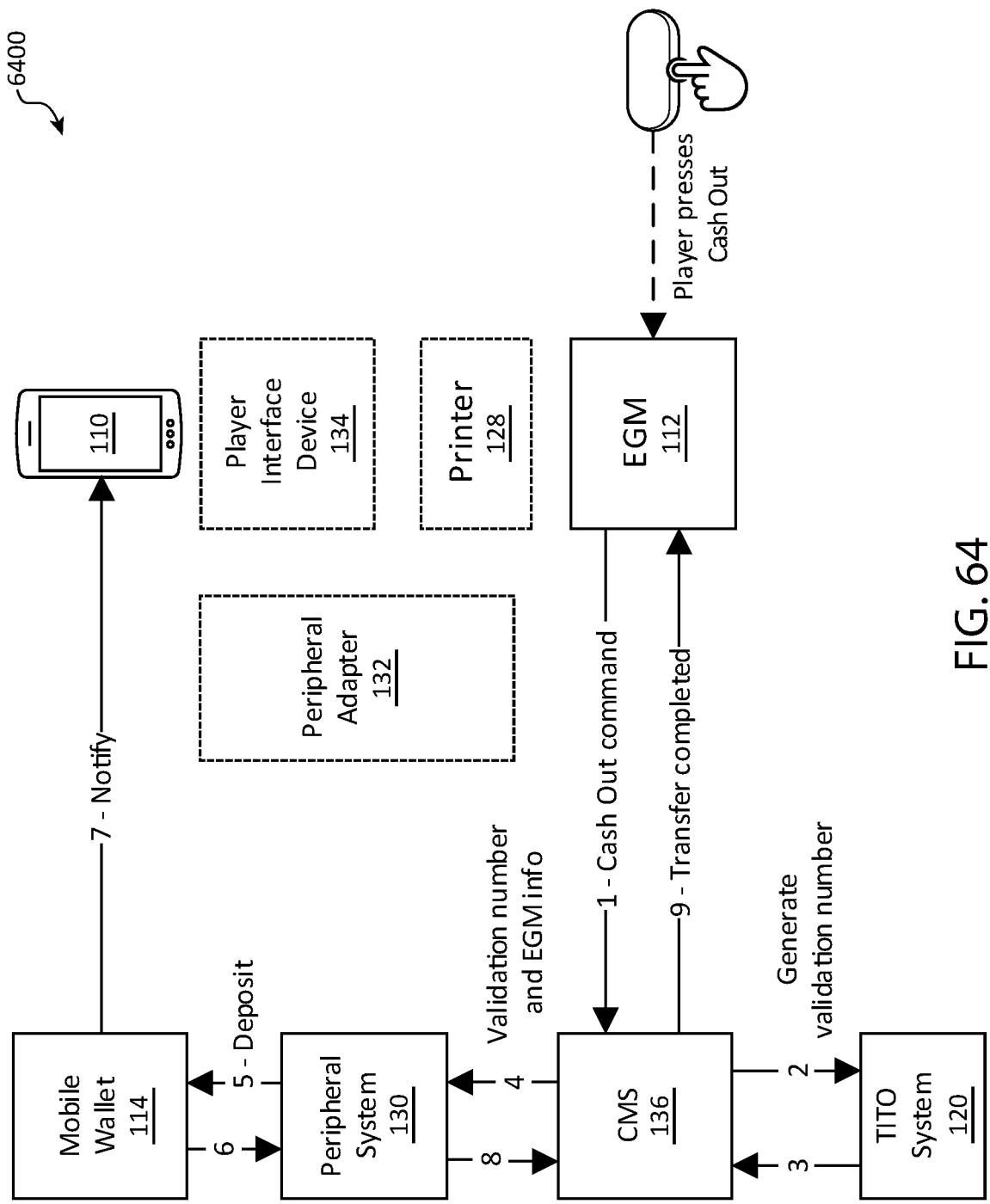
Figure 65:
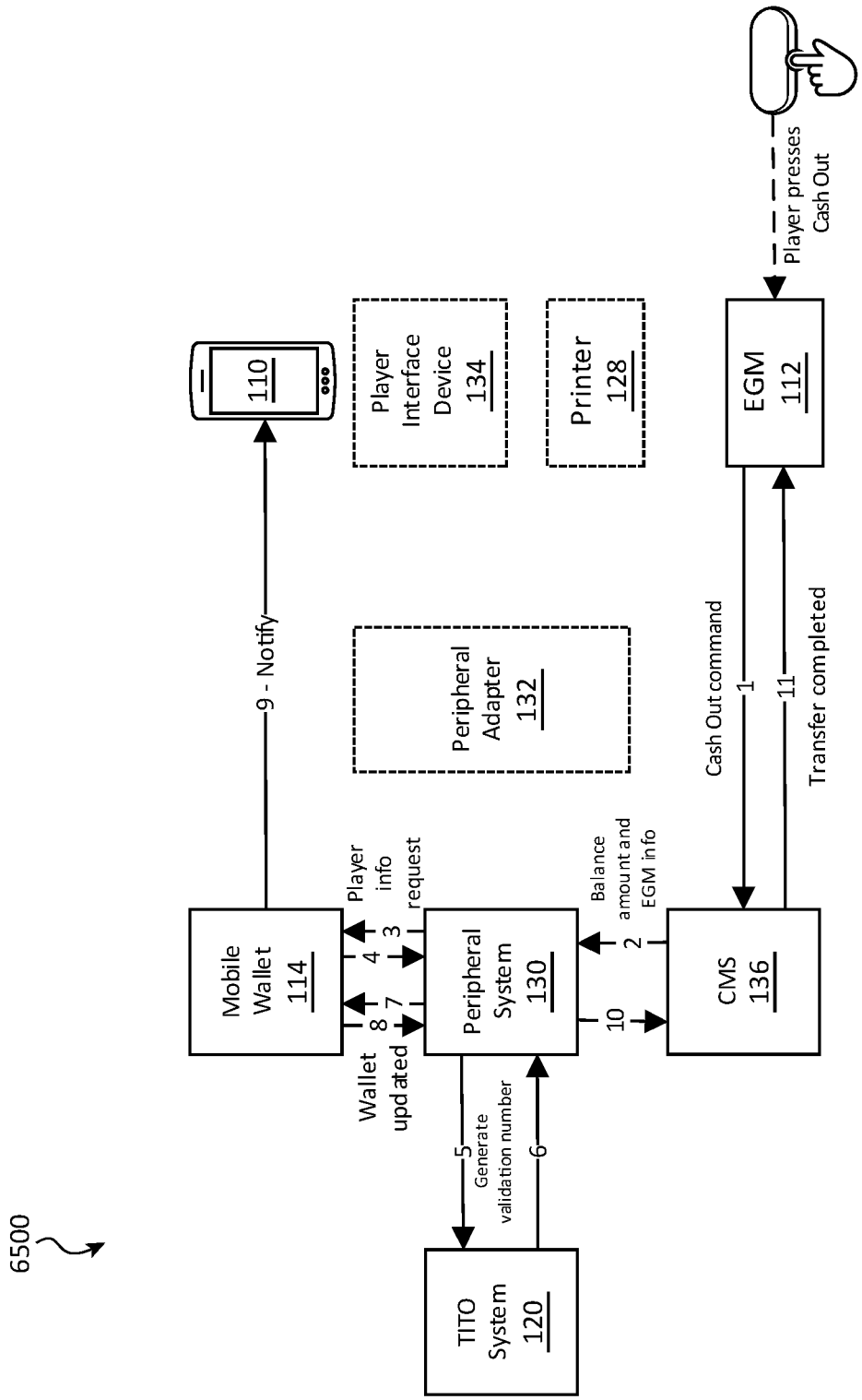

FIGS. 63-65 show block diagrams of components and signal flows of methods and systems 6300-6500 by which a user can obtain refunds or transfers of credit available on an EGM. The systems 6300-6500 can be used in conjunction with, or retrofitted to, an EGM having a "Cash Out" button available for a user to initiate a cash out for the credit on the EGM. In some EGMs, a user pushing a "Cash Out" button would initiate a printing of a physical TITO ticket, such as by a bill validator or a printer. The systems 6300-6500 are modifications of the system 6100 that make use of other connections with a mobile wallet or between the EGM and the other components than a printer.

FIG. 63 shows a block diagram of components and signal flows of a system 6300 by which a user may obtain or redeem credit available on the EGM 112 to a mobile wallet 114. The system 6300 is similar to the system 6100, except that the credit on the EGM 112 was originally applied to the EGM 112 from the mobile wallet 114 of the user. Information pertaining to the mobile wallet 114 may thus be available to components, such as the EGM 112, to allow for faster refunding, as a hash may not need to be generated.

The method of the system 6300 is as in system 6100, in that a user presses a "Cash Out" button, or performs an equivalent task, on the EGM 112 to initiate a cash out transaction. The EGM 112 communicates with the TITO System 120 to generate a TITO ticket and have it entered into the TITO System 120. By passing the TITO ticket, or at least its validation number, the EGM 112 can communicate to the Printer 128 to begin a process to print a physical ticket. The system 6300 may allow a user to intercept the process, as described above.

Upon the print process being intercepted, the Printer 128 may communicate the validation number to the Peripheral Adapter 132. In turn, the Peripheral Adapter 132 may pass to the Peripheral System 130 the validation number and information regarding the EGM 112 from which the credit is being redeemed.

The Peripheral System 130 may then be able to deposit the funds directly to the mobile wallet 114. The Peripheral System 130 may then also communicate to the EGM 112, through the Peripheral Adapter 132, that the printing process is completed. The EGM 112 may then be able to remove the credit.

FIG. 64 shows a block diagram of components and signal flows of a method and system 6400 by which a user may obtain or redeem credit available on the EGM 112 to a mobile wallet 114. The system 6400 is similar to the system 6300 in that the credit on the EGM 112 was initially applied from the mobile wallet 114 by the user who now wishes to cash out any remaining credit. However, the system 6400 differs from the system 6300 in that the EGM 112 performs the cash out operations by communications with a CMS 136. The EGM 112 may still be linked with the Printer 128, but the Printer 128 is not used in the cash out transaction. The system 6400 may still include the Player Interface Device 134 and the Peripheral Adapter 132, though the cash out transaction may not need to make use of them.

The processes of the cash out transaction in the system 6400 begin when the user presses a "Cash Out" button, or performs an equivalent task, on the EGM 112 to initiate a cash out transaction. The EGM 112 communicates to the CMS 136 that a cash out command was entered, and the CMS 136 communicates with the TITO System 120 to generate a virtual TITO ticket and/or validation number.

Identifying or other information pertaining to the mobile wallet 114 may be on the CMS 136 since the mobile wallet 114 was used to apply a credit to the EGM 112 at the start of the user's wagering. The CMS 136 may communicate that identifying or other information, along with at least the validation number, to the Peripheral System 130. The Peripheral System 130 may then deposit the credit being redeemed from the EGM 112 as funds into the mobile wallet 114.

Confirmation or other communications may then proceed from the mobile wallet 114 to the Peripheral System 130, then to the CMS 136, and then to the EGM 112 to confirm that the credits to be cashed out have been deposited, and complete the cash out transaction.

FIG. 65 shows a block diagram of components and signal flows of a system 6500 by which a user may obtain or redeem credit available on the EGM 112 to a mobile wallet 114. The system 6500 is similar to the system 6400 in that the EGM 112 communicates with the CMS 136 to perform a cash out transaction. However, in the system 6500, it is the Peripheral System 130 that communicates with the TITO System 120.

The process shown for the system 6500 is initiated by a user pressing a cash out button on the EGM 112. The EGM 112 communicates the command to the CMS 136, which communicates the credit balance to be cashed out and identifying or other information regarding the EGM 112 to the Peripheral System 130.

The Peripheral System 130 then communicates with the mobile wallet 114 to obtain information regarding the user, such as identifying or other information regarding accounts of the mobile wallet 114. The Peripheral System 130 then interfaces with the TITO System 120 to generate a validation number. The validation number is then used as part of the process of depositing the credit balance from the EGM 112 into the mobile wallet 114. Once the deposit is complete, the Peripheral System 130 may transmit, through the CMS 136, to the EGM 112 that the credit has been transferred.

Figure 66:
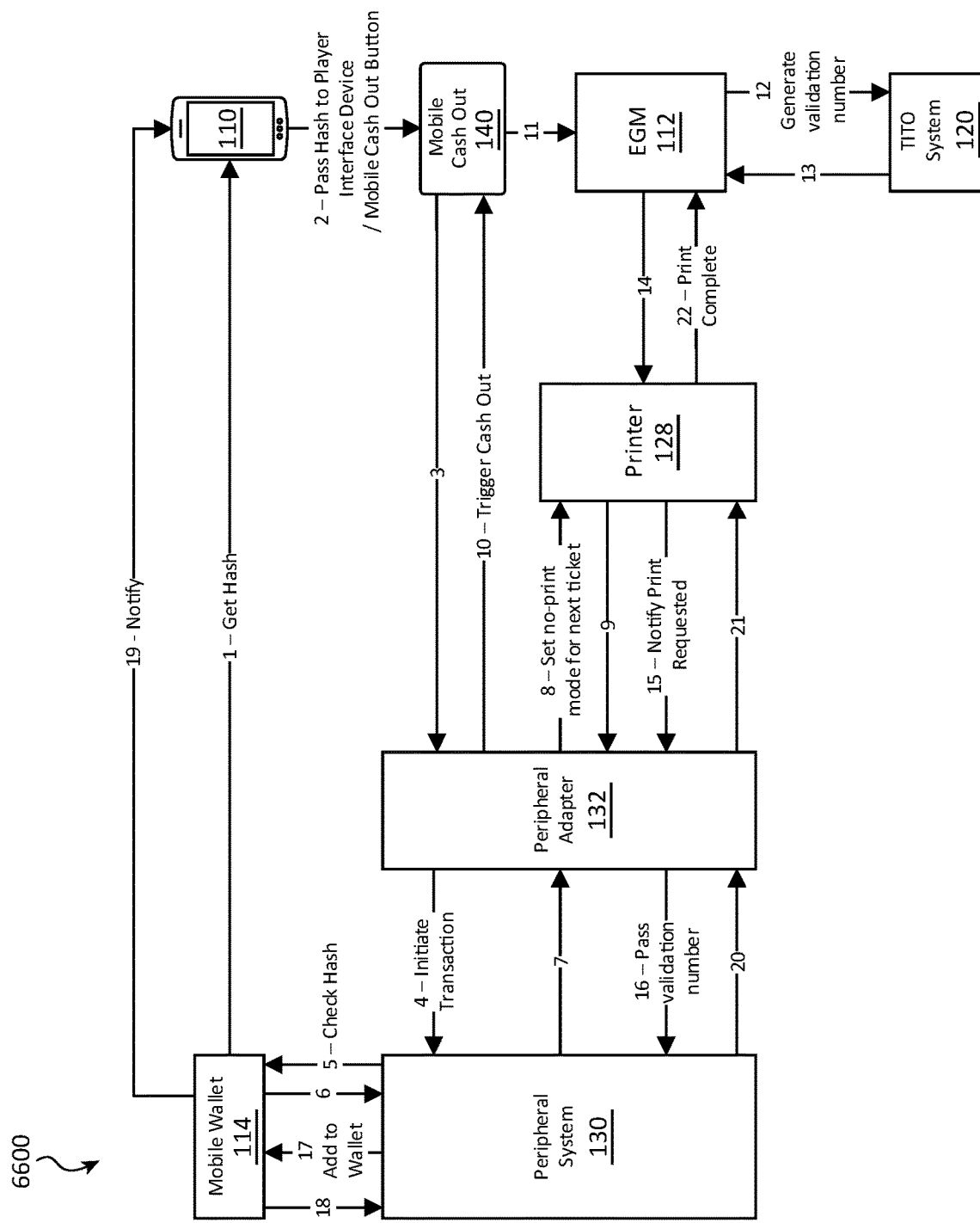
Figure 67:
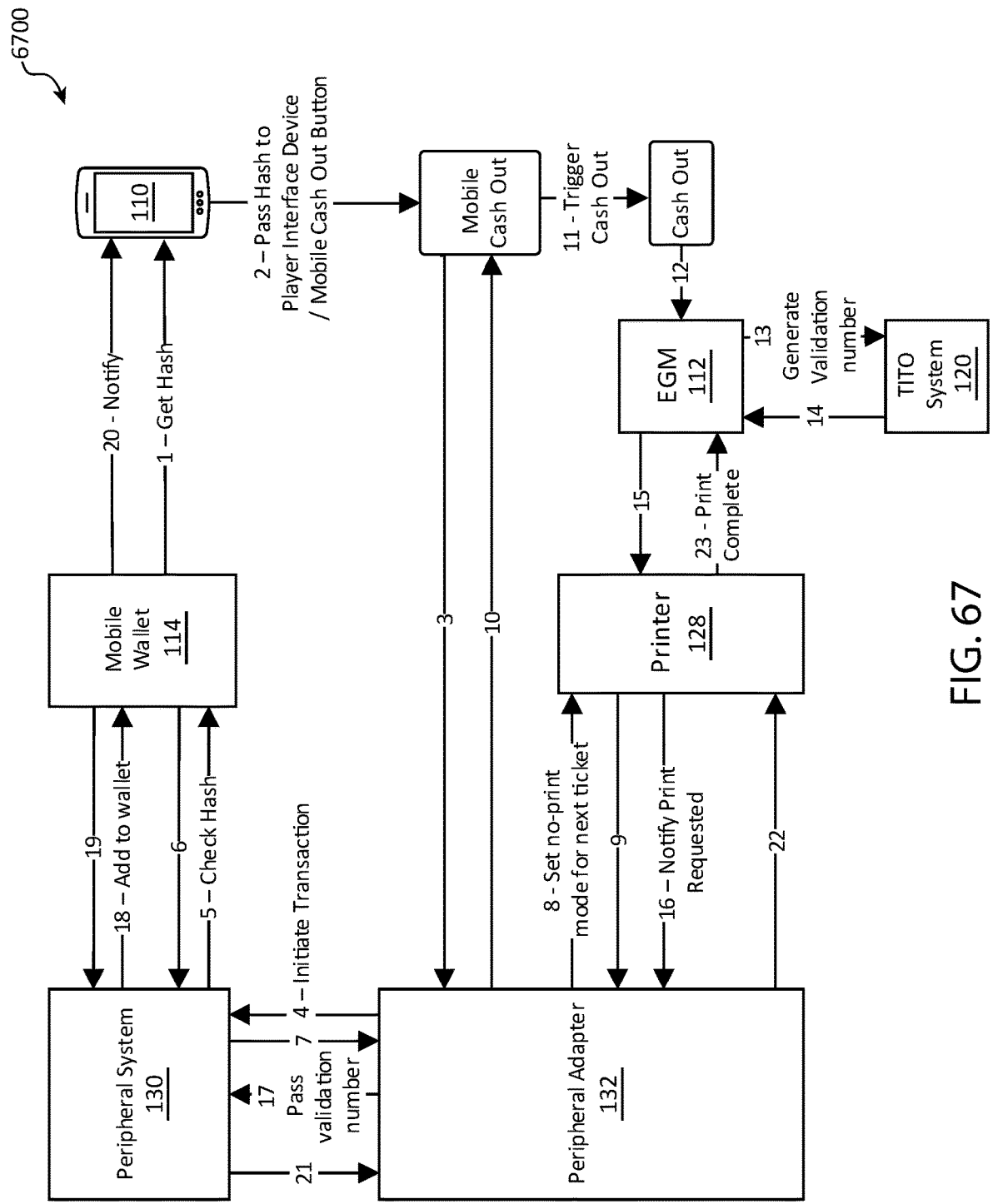

FIGS. 66-67 show block diagrams of components and signal flows of methods and systems 6600 and 6700 by which a user can obtain refunds or transfers of credit available on an EGM. The systems 6600-6700 can be used in conjunction with, or retrofitted to, an EGM having a both "Cash Out" button and a "Mobile Cash Out" button available. The user may initiate a cash out transaction for the credit on the EGM in at least two ways. For such EGMs, a user pushing a "Cash Out" button would initiate a printing of a physical TITO ticket, such as by a bill validator or a printer. There may be no need for a method to intercept the printing of the ticket, as there was in the systems 6100 and 6200. The systems 6600-6700 implement this in separate ways. In these systems, the term "button" will refer to a physical button, a screen icon, or other input mechanism that a user can use to initiate the corresponding process or transaction.

FIG. 66 shows a block diagram of components and signal flows of a system 6600 by which a user may obtain or redeem credit available on the EGM 112 to a mobile wallet 114. The system 6600 includes an EGM 112 on which there is a "Mobile Cash Out" button. The "Mobile Cash Out" button is able to send a signal to another device to prepare for, or to begin, a mobile cash out prior to sending an initiation signal to the EGM 112 to initiate a cash out transaction.

As shown in FIG. 66, if a user wishes to redeem credit to the mobile wallet 114, the mobile device 110 obtains a hash from the mobile wallet 114 and passes it to either a Player Interface Device 134 or the "Mobile Cash Out" button. Then the message is sent to the Peripheral System 130 through the Peripheral Adapter 132, which communicates to the Printer 128 to set a "no-print" option for the next ticket.

At stages 10 and 11, a cash out transaction at the EGM 112 is triggered, which may cause the EGM 112 to communicate with the TITO System 120 to generate a validation number. The EGM 112 sends a message to the Printer 128, which would ordinarily cause a physical ticket based on the validation number to be printed. Instead, communications are routed to the Peripheral System 130, which can deposit the funds to the mobile wallet 114. Communications can then be sent back to the Printer 128 and the EGM 112 that the cash out transaction is completed.

FIG. 67 shows a block diagram of components and signal flows of a system 6700 by which a user may obtain or redeem credit available on the EGM 112 to a mobile wallet 114. The system 6700 is similar to the system 6600, except that the "Mobile Cash Out" button is tied to, or implemented as part of, a normal cash out button, as described above in relation to the system 6100. In the system 6700, at stages 11 and 12 the "Mobile Cash Out" communicates the cash out transaction signal either to or through the normal cash out button. Otherwise the operations of the system 6700 are as in the system 6600.

Section V: Mobile Credit Transfer to External Funds

This section describes systems, methods, and devices by which a user may have funds available on a mobile wallet transferred or refunded to external funds. External funds may include cash refunds, payments to credit card or debit card accounts, bank accounts, or other accounts. As before, the funds available on the mobile wallet may be in the form of stored TITO tickets, separate cash accounts, or other forms.

In a first method, not shown in a figure, a user may use a bump (or another form of) communication, such as at a bill validator or other component configured to print physical TITO tickets. The physical TITO tickets may then be redeemed at a casino cage.

FIGS. 68-71 show block diagrams of components and signal flows of methods and systems 6800-7100 by which a user may have funds available on a mobile wallet transferred or refunded to an external debit account using a casino kiosk. The kiosk can have a display or other ways to interact with a user to assist the user through the processes.

Figure 68:
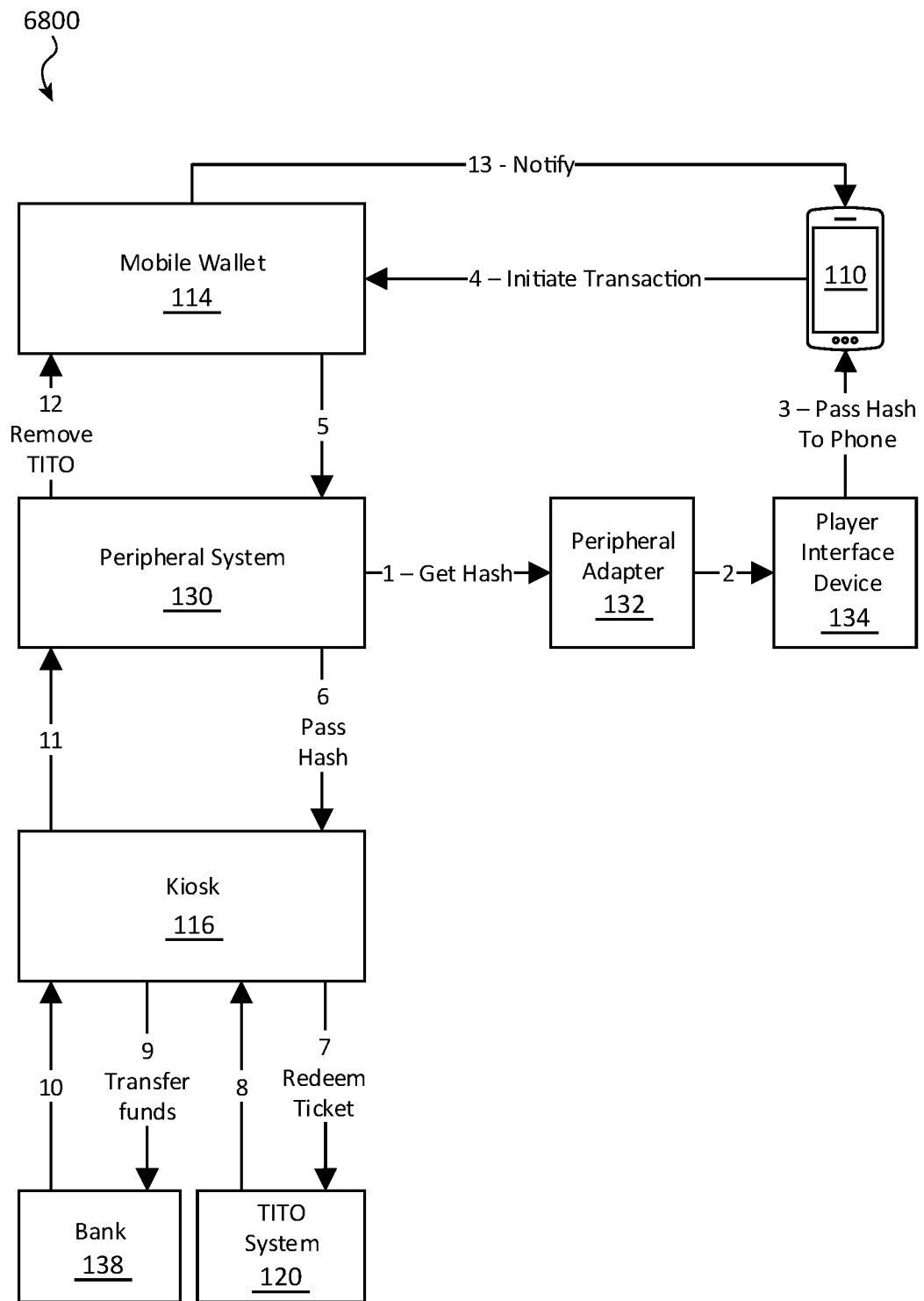
FIGS. 68-77 show block diagrams of systems, methods, and devices related to movement of funds between mobile credit and external funds.

FIG. 68 shows a block diagram of components and signal flows of a system 6800 by which a user may have funds available on the mobile wallet 114 transferred or refunded to external funds. The system 6800 is configured for the kiosk 116 to communicate with the Bank 138 and the TITO System 120 to perform the cash out transaction.

The cash out transaction in the system 6800 begins by the mobile device 110 obtaining a hash from the Player Interface Device 134 and passing the hash to the mobile wallet 114. The mobile wallet 114 passes the hash to the Peripheral System 130 that interfaces with the kiosk 116. The kiosk 116 first interfaces with the TITO System 120 to redeem one or more TITO tickets, or other funds, that were on the mobile wallet 114.

The kiosk 116, through its connection (e.g., internet, wireless, etc.) with the external Bank 138, communicates to the Bank 138 to deposit the funds that were redeemed. The kiosk 116 also then communicates with the mobile wallet 114 to deduct the redeemed funds from the mobile wallet 114 to complete the cash out transaction.

Figure 69:
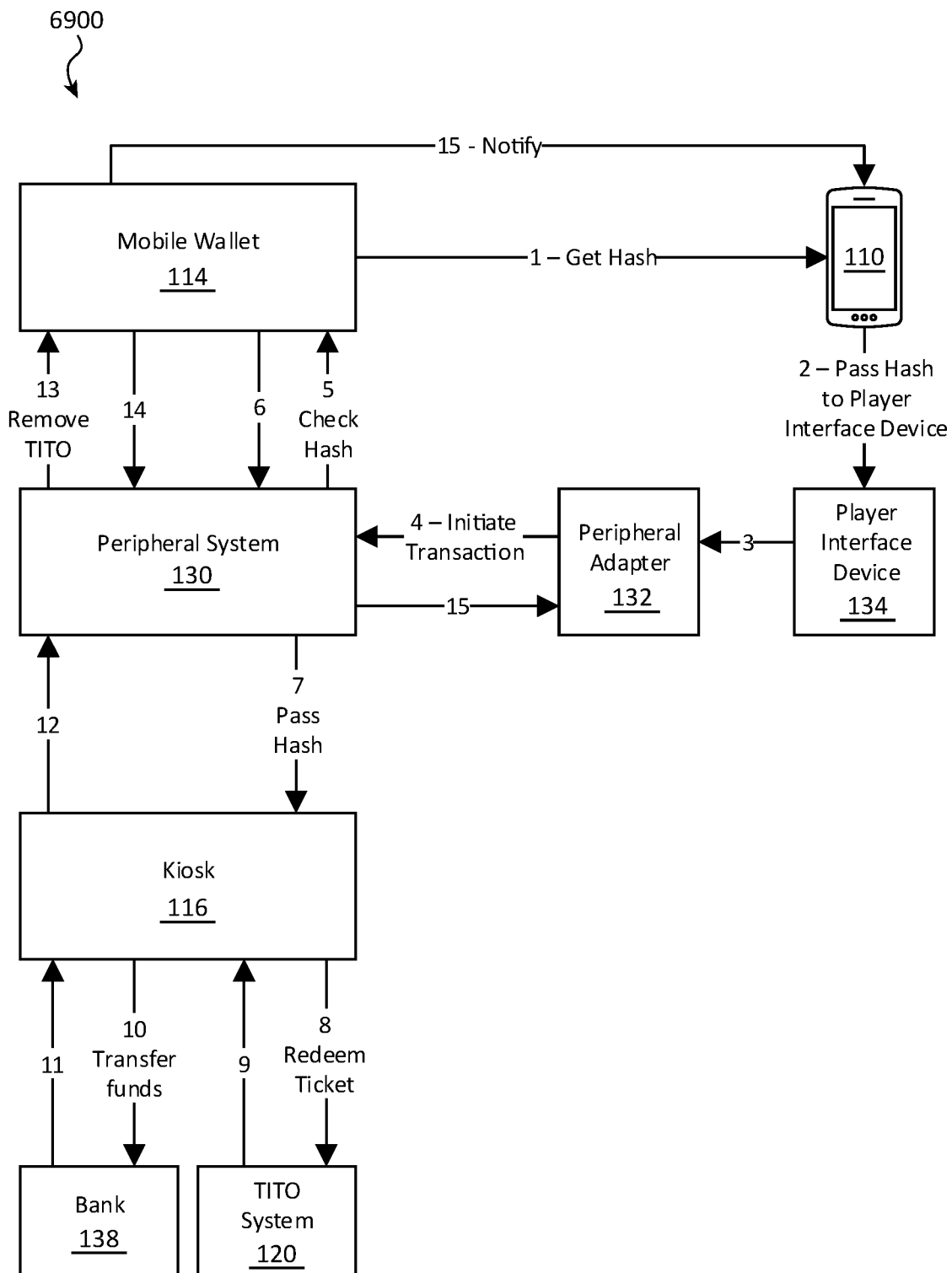

FIG. 69 shows a block diagram of components and signal flows of a system 6900 by which a user may have funds available on the mobile wallet 114 transferred or refunded to external funds. The signal and work flow in the system 6900 are similar to that of the system 6800, except that now the Player Interface Device 134 obtains the hash from the mobile device 110, which obtained it from the mobile wallet 114. The Player Interface Device 134 passes the hash to the Peripheral System 130, which may check the hash with the mobile wallet 114, and then the cash out transaction proceeds as in the system 6800.

Figure 70:
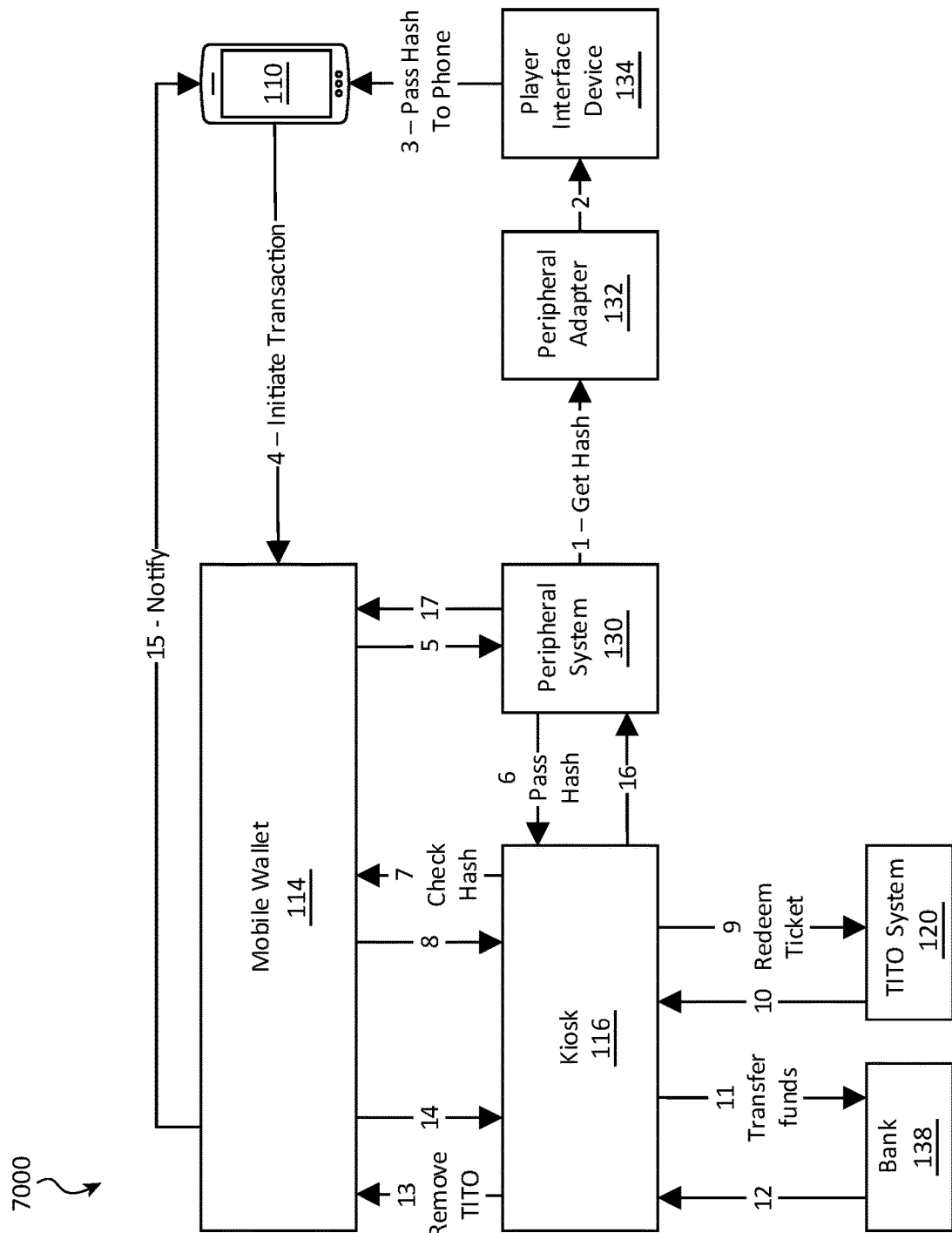

FIG. 70 shows a block diagram of components and signal flows of a system 7000 by which a user may have funds available on the mobile wallet 114 transferred or refunded to external funds. The system 7000 is similar to the system 6800, except that kiosk 116 is used to update the mobile wallet 114 rather than the Peripheral System 130. The initial operations within the system 7000 begin with the mobile device 110 obtaining a hash from the Player Interface Device 134 and passing the hash to the mobile wallet 114 to initiate the cash out transaction. The mobile wallet 114 passes the hash through the Peripheral System 130 to the kiosk 116, which may then check the hash with the mobile wallet 114.

The kiosk 116 then proceeds as in the system 6800, except that the kiosk 116 directly communicates with the mobile wallet 114 to remove, cancel, or deduct the TITO tickets or funds from the mobile wallet 114. Notification signals of completion of the cash out transaction are then sent from the kiosk 116 to the Peripheral System 130 and then to the mobile wallet 114, and also from the mobile wallet 114 to the mobile device 110.

Figure 71:
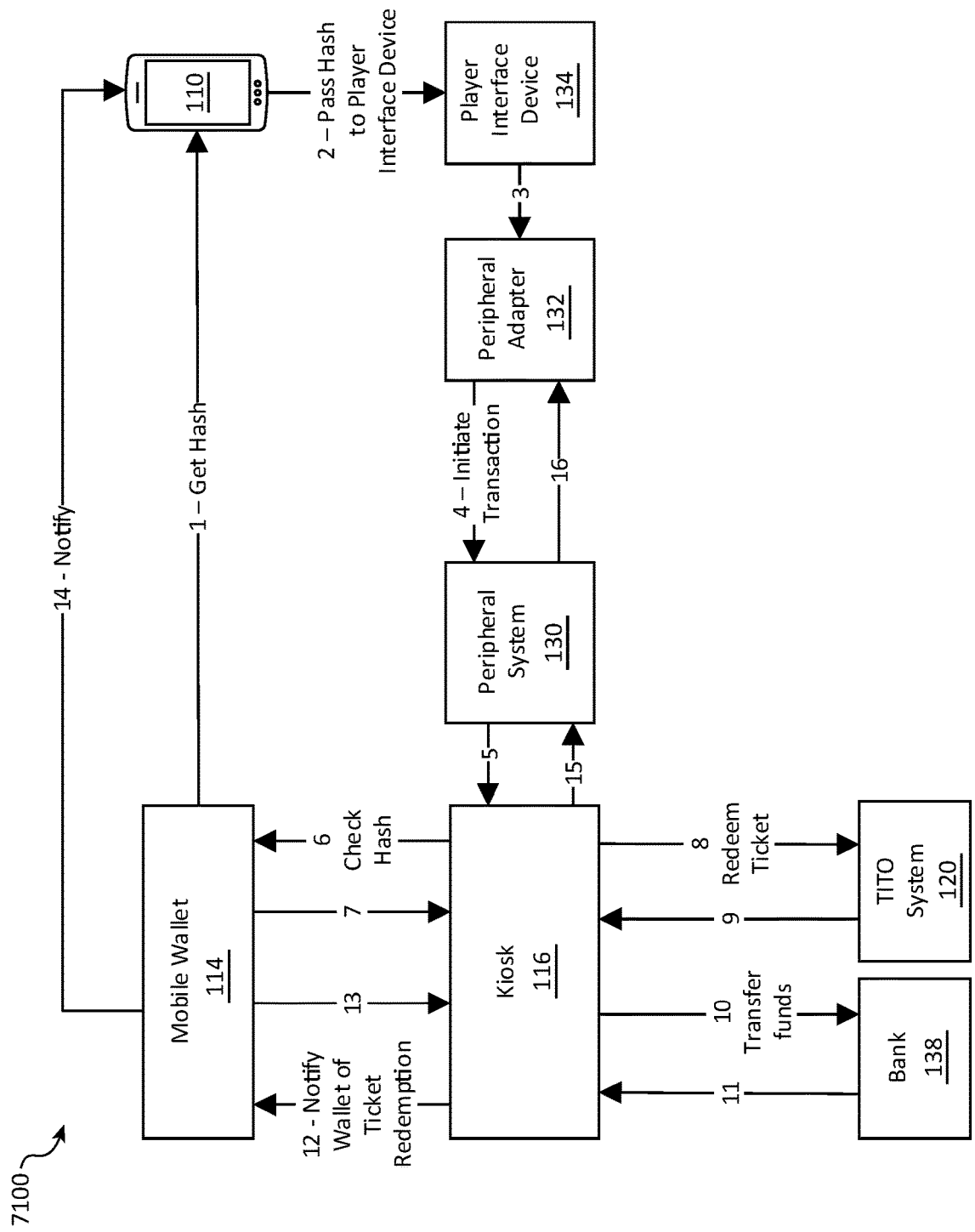

FIG. 71 shows a block diagram of components and signal flows of a system 7100 by which a user may have funds available on the mobile wallet 114 transferred or refunded to external funds. The system 7100 is similar to the system 7000, except that now the Player Interface Device 134 obtains the hash from the mobile device 110, which obtained it from the mobile wallet 114. The Player Interface Device 134 passes the hash (through the Peripheral Adapter 132 and the Peripheral System 130) to the kiosk 116, which may check the hash with the mobile wallet 114, and the cash out transaction then proceeds as in the system 7000.

Figure 72:
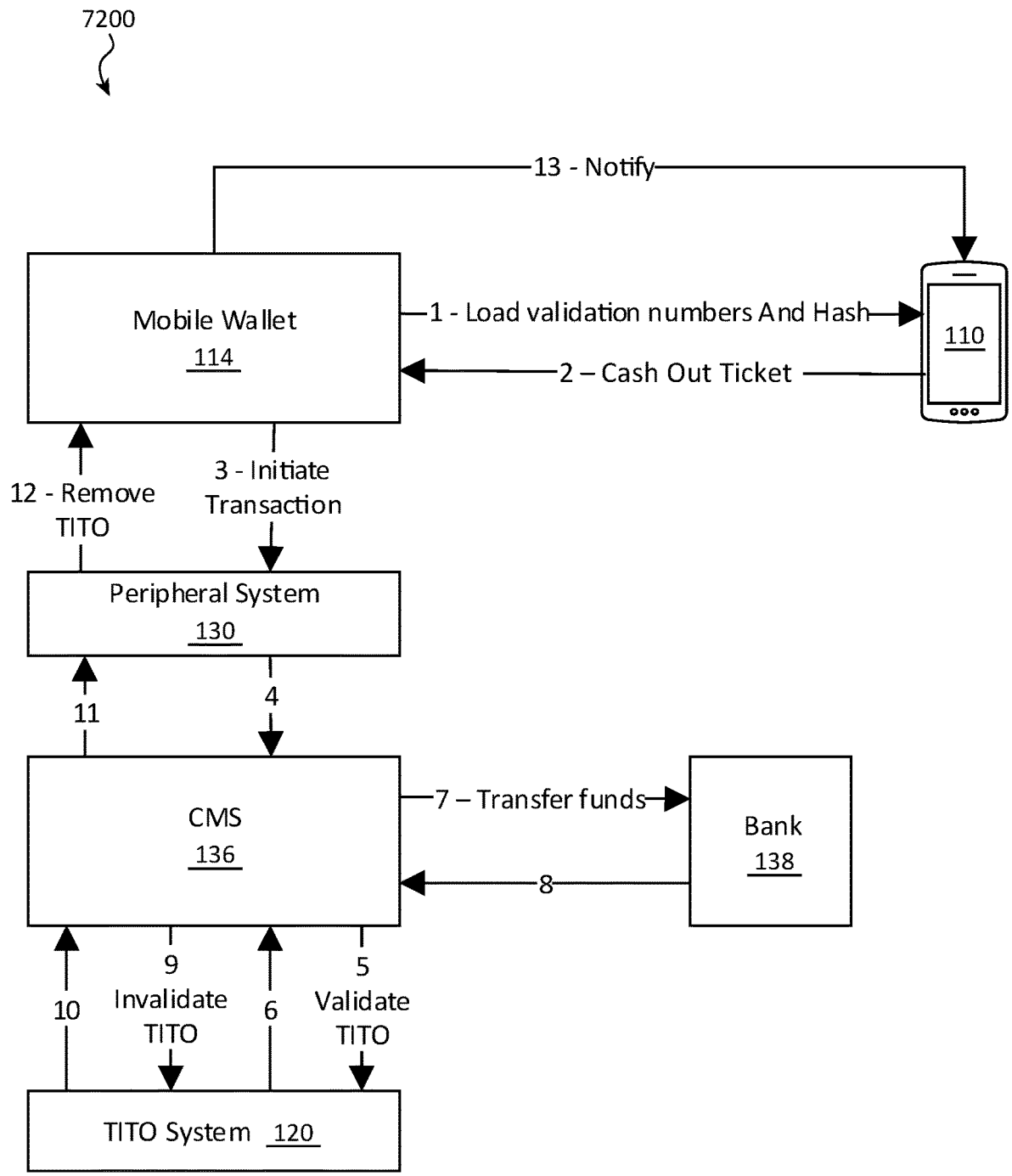
Figure 73:
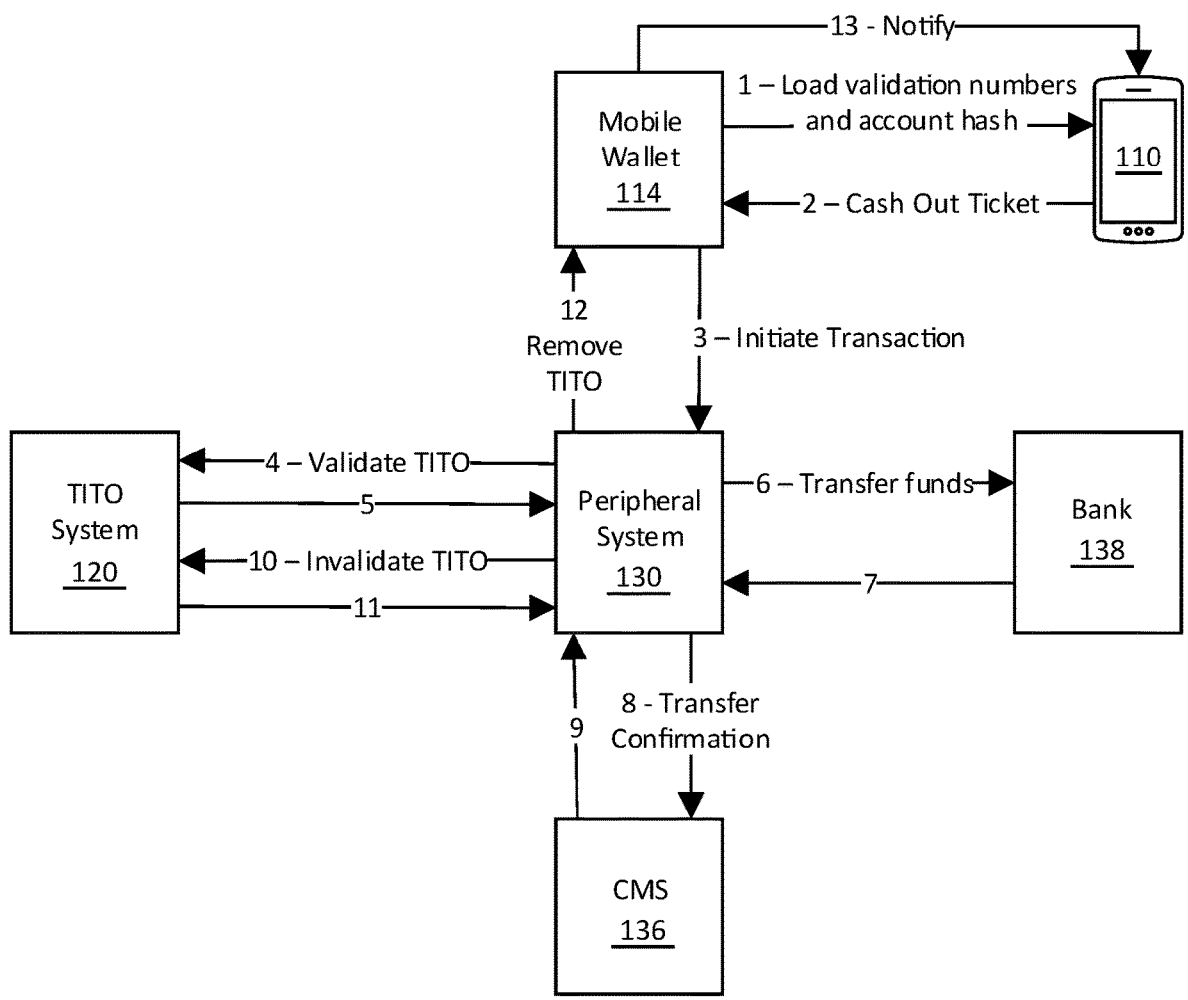

FIGS. 72-73 show block diagrams of components and signal flows of methods and systems 7200 and 7300 by which users may have funds or TITO tickets available on a mobile wallet directly transferred or refunded to their bank accounts.

FIG. 72 shows a block diagram of components and signal flows of the system 7200, in which the Peripheral System 130 interacts directly with the casino management system (CMS) 136 to manage the bank transfer and the TITO ticket invalidation. The operations of the system 7200 begin with a mobile wallet 114 providing a validation number (of a TITO ticket) and a hash to the mobile device 110, and receiving a (verification) reply message to cash out that ticket and initiate the bank transfer transaction. The CMS 136 receives the validation number and interfaces with the TITO System 120 to validate the TITO ticket. Upon validation, the CMS 136 transfers the equivalent funds to a bank account of the user in the Bank 138, and then invalidates the TITO ticket in the records of the TITO System 120. The CMS 136 then communicates with the mobile wallet 114 to remove or delete the TITO ticket from the mobile wallet 114.

FIG. 73 shows a block diagram of components and signal flows of a system 7300 by which a user may have funds available on the mobile wallet 114 transferred or refunded to an external bank account. The system 7300 is similar to the system 7200, except that the Peripheral System 130 interfaces directly the TITO System 120 for TITO validation and cancellation/invalidation, and with the Bank 138 to transfer funds, rather than with the CMS 136.

The initiation operations in the system 7300 are as in the system 7200. But the Peripheral System 130 then directly interfaces with the TITO System 120 to validate the TITO ticket, and then directly interfaces with the Bank 138 to transfer the funds. The Peripheral System 130 then communicates with the CMS 136 to confirm the transfer, and with TITO System 120 to have the TITO ticket invalidated or otherwise canceled. Then the Peripheral System 130 interfaces with the mobile wallet 114 to remove or cancel the TITO ticket.

Figure 74:
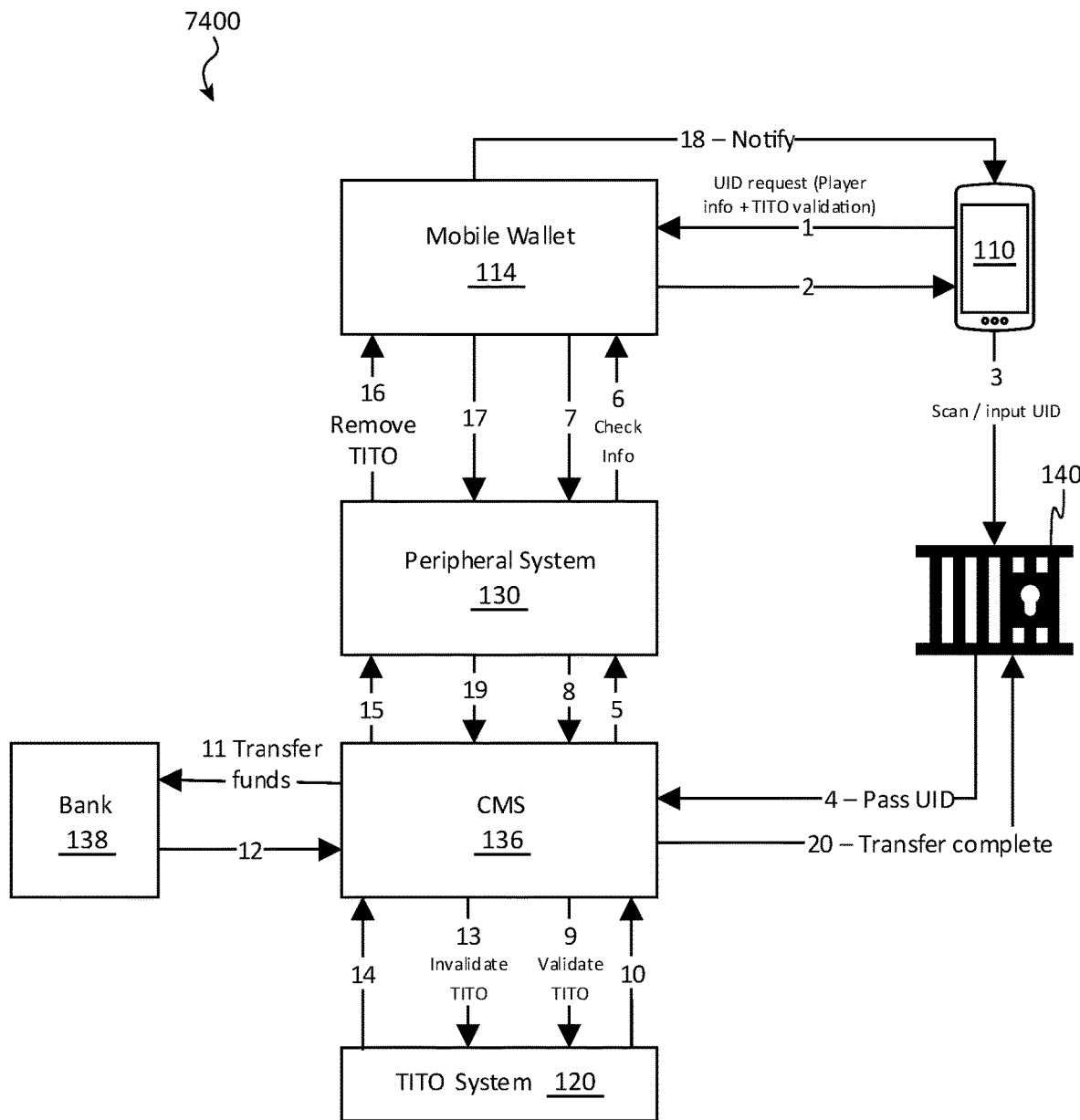
Figure 75:
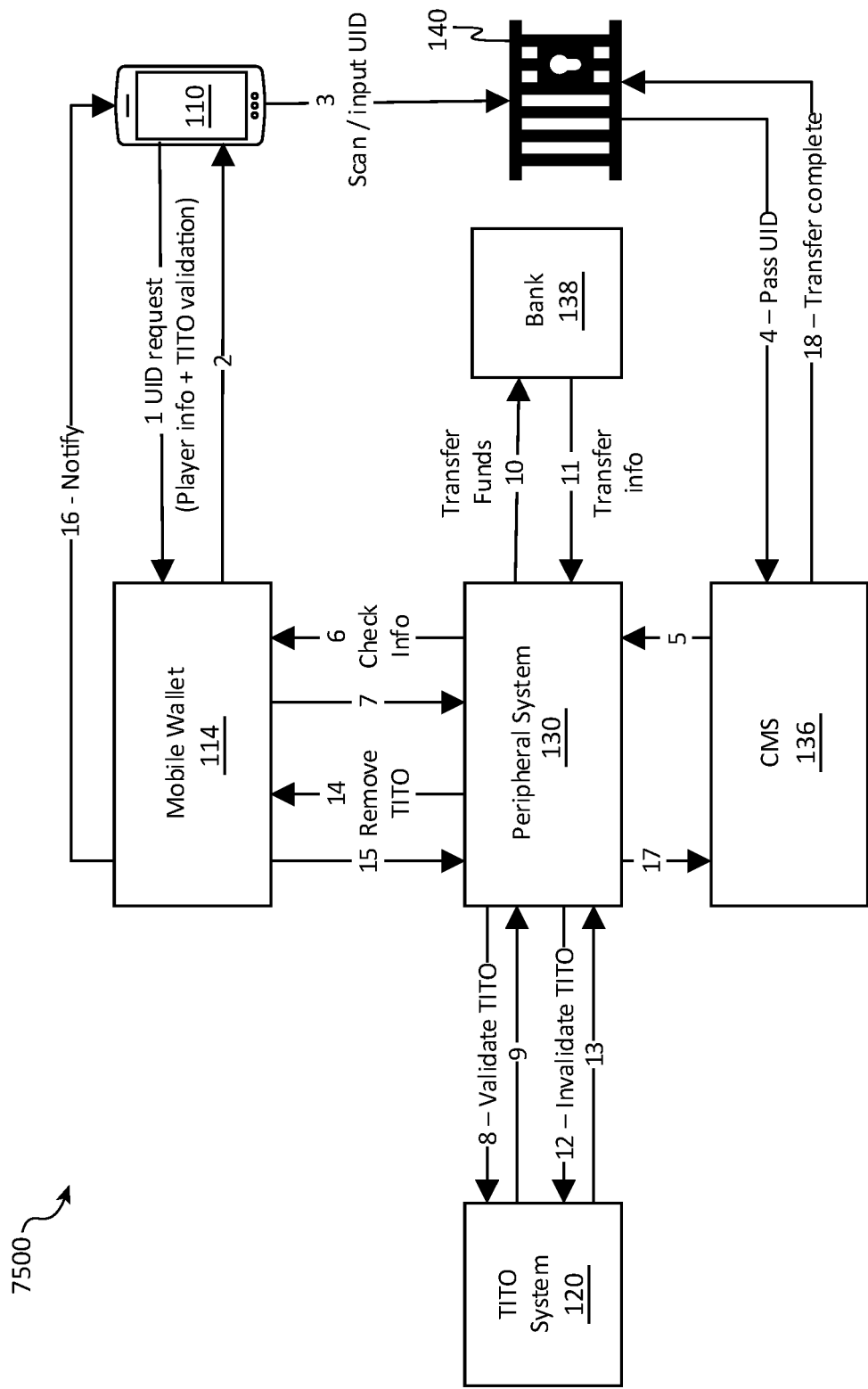

FIGS. 74-75 show block diagrams of components and signal flows of methods and systems 7400 and 7500 by which a user may have funds available on a mobile wallet transferred or refunded to a bank account using capabilities of a casino's cage. A user indicates, such as to an attendant at the cage, the wish to redeem one or more tickets to his or her bank account. An app on a mobile device of the user may be used to supply a bar code (or QR code, or another code) that can be scanned or entered at the casino cage and that can link the casino cage to the tickets.

FIG. 74 shows a block diagram of components and signal flows of a system 7400 by which a user may have funds available on the mobile wallet 114 transferred or refunded to external funds. The system 7400 works with a user's mobile device 110 and mobile wallet 114. The process begins when a user, at the casino cage 140, requests from the mobile wallet 114 a UID (user identification information and TITO validation), and then passes that UID to a system at the cage 140. The passing operation at the cage 140 may be by a scan of a bar code (or QR, or other code) on a display of the mobile device 110 by equipment at the cage 140.

The UID is passed by the cage 140 to the CMS 136, which can check the information in the UID with the mobile wallet 114 by communications through the Peripheral System 130. The CMS 136 can also validate the TITO with the TITO System 120. Upon receiving confirmation that the TITO is valid, the TITO System 120 can then transfer the funds of the TITO to the Bank 138.

Upon receiving confirmation of the transfer from the Bank 138, the CMS 136 then invalidates the TITO in the TITO System 120 and removes or otherwise cancels the TITO in the mobile wallet 114.

FIG. 75 shows a block diagram of components and signal flows of a system 7500 by which a user may have funds available on the mobile wallet 114 transferred or refunded to a bank account in the Bank 138. The system 7500 is similar to the system 7400, except that the Peripheral System 130 interfaces directly with the TITO System 120 and the Bank 138.

The initial operations through stage 7 are as described in the system 7400, with the UID being obtained and then passed to the Peripheral System 130 through the CMS 136. Thereafter, the Peripheral System 130 interfaces with the TITO System 120 and the Bank 138 to validate the ticket with the TITO System 120, transfer the funds of the ticket to the Bank 138, invalidate the ticket on the TITO System 120, and remove the ticket from the mobile wallet 114. Notifications can then be sent to the mobile device 110 and to the cage 140 of completion of the transfer.

Figure 76:
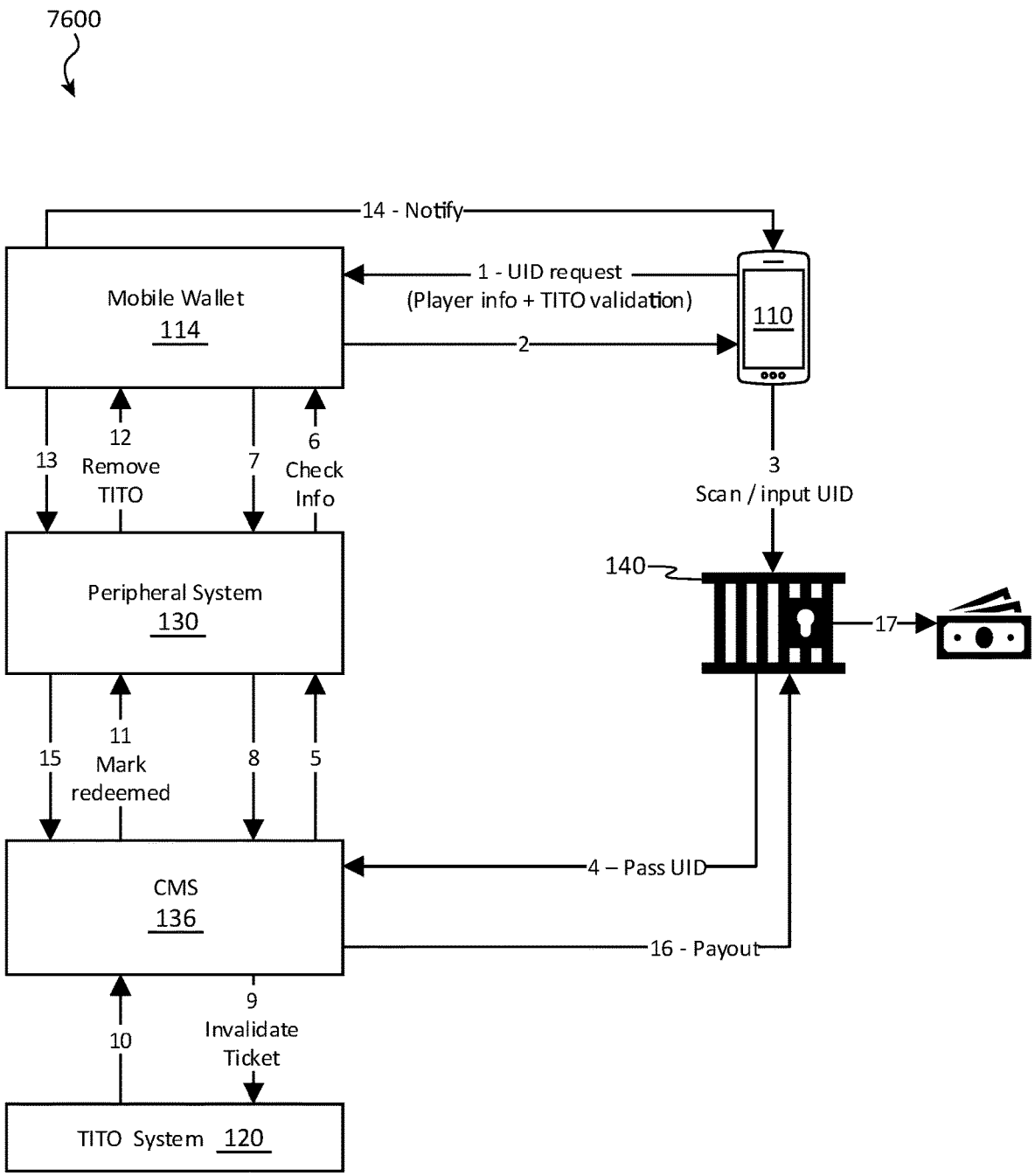
Figure 77:
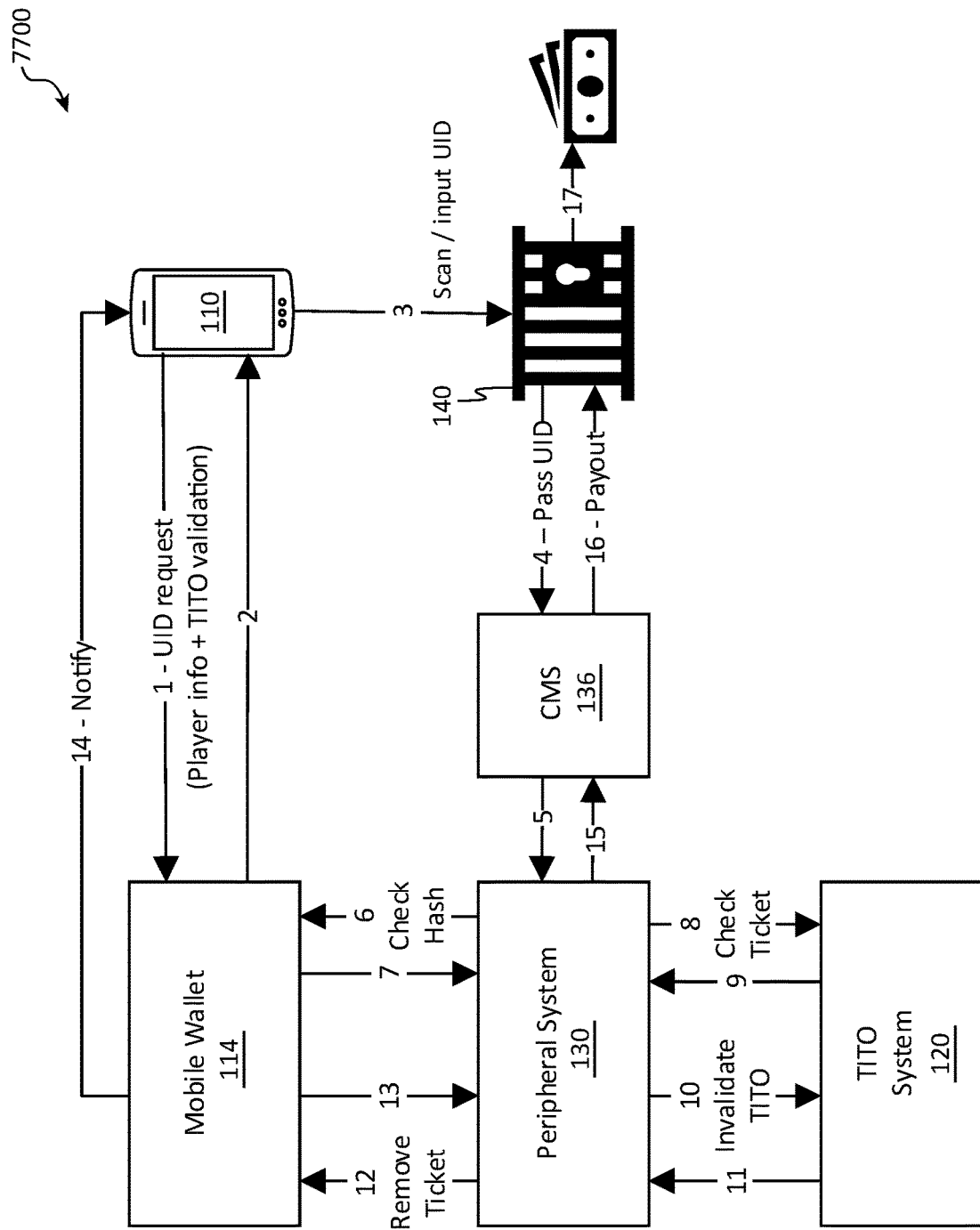

FIGS. 76-77 show block diagrams of components and signal flows of methods and systems 7600 and 7700 by which a user may have funds available on a mobile wallet refunded for cash using capabilities of a casino's cage. A user indicates, such as to an attendant at the cage, the wish to redeem one or more tickets for cash. An app on a mobile device of the user may be used to supply a bar code (or QR code, or another code) that can be scanned or entered at the casino cage, and that link the casino cage to the tickets.

FIG. 76 shows a block diagram of components and signal flows of a system 7600 by which a user may have funds available on the mobile wallet 114 refunded for cash. In the system 7600, the CMS 136 interfaces with the TITO System 120 to handle verification and invalidation of the tickets.

The system 7600 proceeds through the same four initial operations as in the system 7400 to provide the cage 140 with the UID, which is passed to the CMS 136. The CMS 136 may then interface with the Peripheral System 130 and the TITO System 120 to check the information in the UID with the mobile wallet 114, invalidate the ticket on the TITO System 120, remove or invalidate the ticket from the mobile wallet 114, and send a message to the cage 140 to disburse the cash value of the ticket.

FIG. 77 shows a block diagram of components and signal flows of a system 7700 by which a user may have funds available on the mobile wallet 114 refunded for cash. In the system 7700, the Peripheral System 130 interfaces directly with the mobile wallet 114 and the TITO System 120 to handle verification and invalidation of the tickets.

The system 7700 proceeds through the same four initial operations as in the system 7400 to provide the cage 140 with the UID, which is passed to the CMS 136. Then the CMS 136 passes the UID to the Peripheral System 130. The Peripheral System 130 may then interface with the mobile wallet 114 and the TITO System 120 to check the information in the UID with the mobile wallet 114, invalidate the ticket on the TITO System 120, and remove or invalidate the ticket from the mobile wallet 114. Once these operations are completed, the Peripheral System 130 may transmit a signal to the CMS 136 of the operations' completion. The CMS 136 may then notify the cage 140 to disburse the funds.

Section VI: Additional EGM Credit Out

This section describes additional systems, methods, and devices by which a user may redeem, convert, transfer, or obtain a refund for available gaming credit on an EGM or a printed TITO ticket into a user's mobile wallet. As described above, the term "cash out" may be used to refer to such a redemption, refund, or transfer. A user may still have credit available on an EGM but may wish to end wagering. These additional embodiments describe how some or all of the credit can be cashed out into a mobile wallet of the user, or refunded in another form.

Figure 78:
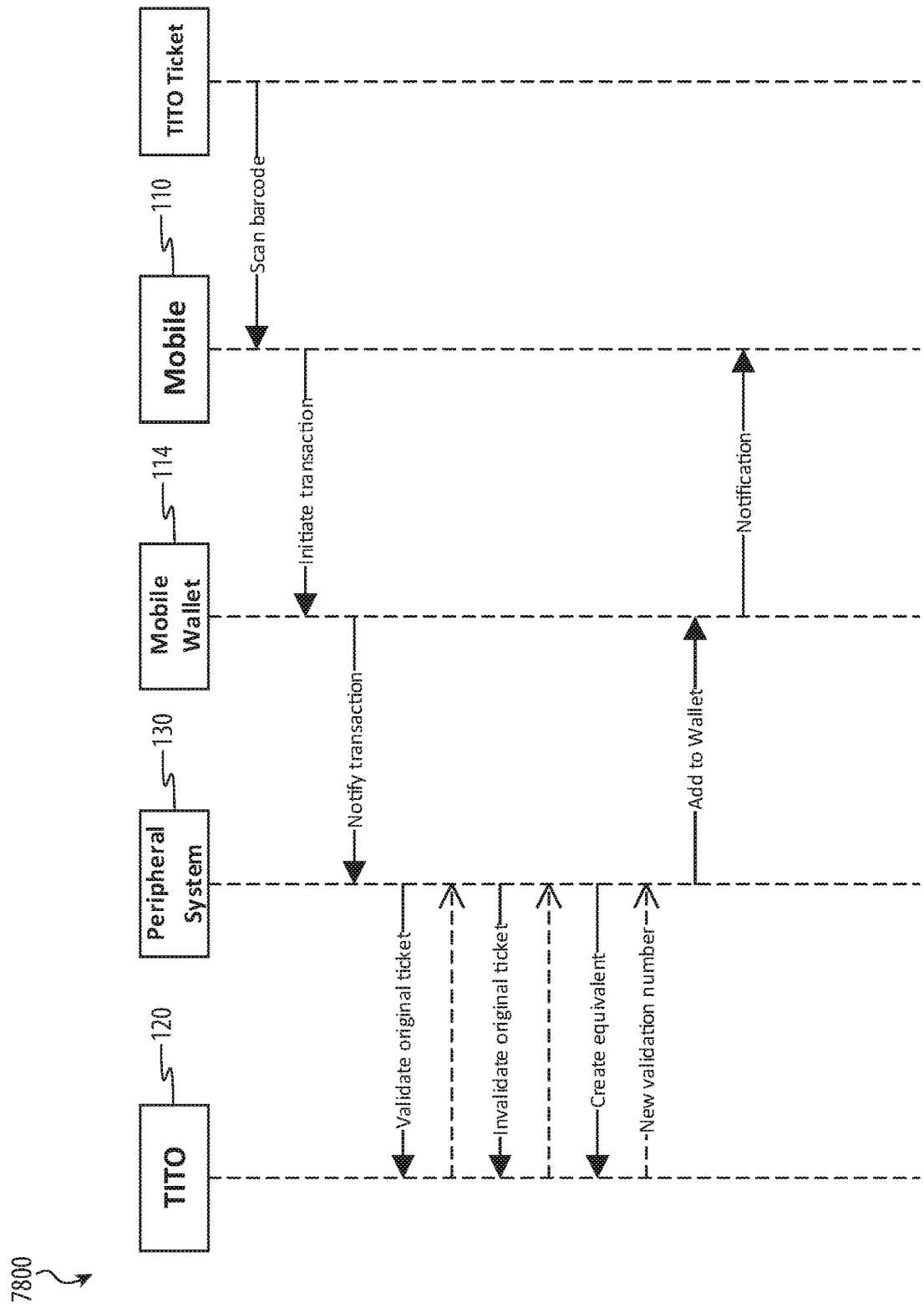
FIG. 78 illustrates a block diagram of components and signal flow for obtaining refunds, redemptions, or transfers of gaming credit from an electronic gaming machine, according to an embodiment.

FIG. 78 shows a block diagram of components and signal flows of a method or system 7800 by which a user may obtain or redeem credit available on a physical ticket to a mobile wallet 114. The operations of the system 7800 may begin with the scanning by the mobile device 110 of a physical ticket, and the initiation of the transaction to obtain refunded credit. The scanning may be performed using a special purpose or other app on the mobile device 110 directed to transactions involving a mobile wallet 114. The scanning may be performed by a camera on the mobile device 110, or by separate scanner, such as at a kiosk, EGM, bill validator, cage or other component described above, and then transmitted to the mobile device 110.

The mobile device 110 may then initiate the credit out transaction by communicating information from the scanned ticket (such as the scanned image itself, the code on the ticket, information obtained from the code, or the like) to the mobile wallet 114. The mobile wallet 114 may then communicate the information to the Peripheral System 130. The Peripheral System 130 may communicate with a TITO System 120 to determine that the original ticket was valid. As part of the credit out transaction, and/or to account for outstanding or available tickets, the TITO System 120 may then cause records of the ticket, such as electronic records thereof within a casino management system, to indicate that the original physical ticket is no longer valid.

The Peripheral System 130 may then communicate with the TITO System 120 to create an equivalent new ticket, such as a virtual ticket. The Peripheral System 130 may use the equivalent new ticket in communications with the TITO System 120 to have either the funds from the original ticket added as monetary funds to the user's mobile wallet 114, or the new ticket. The mobile wallet 114 may then notify the mobile device 110.

Figure 79:
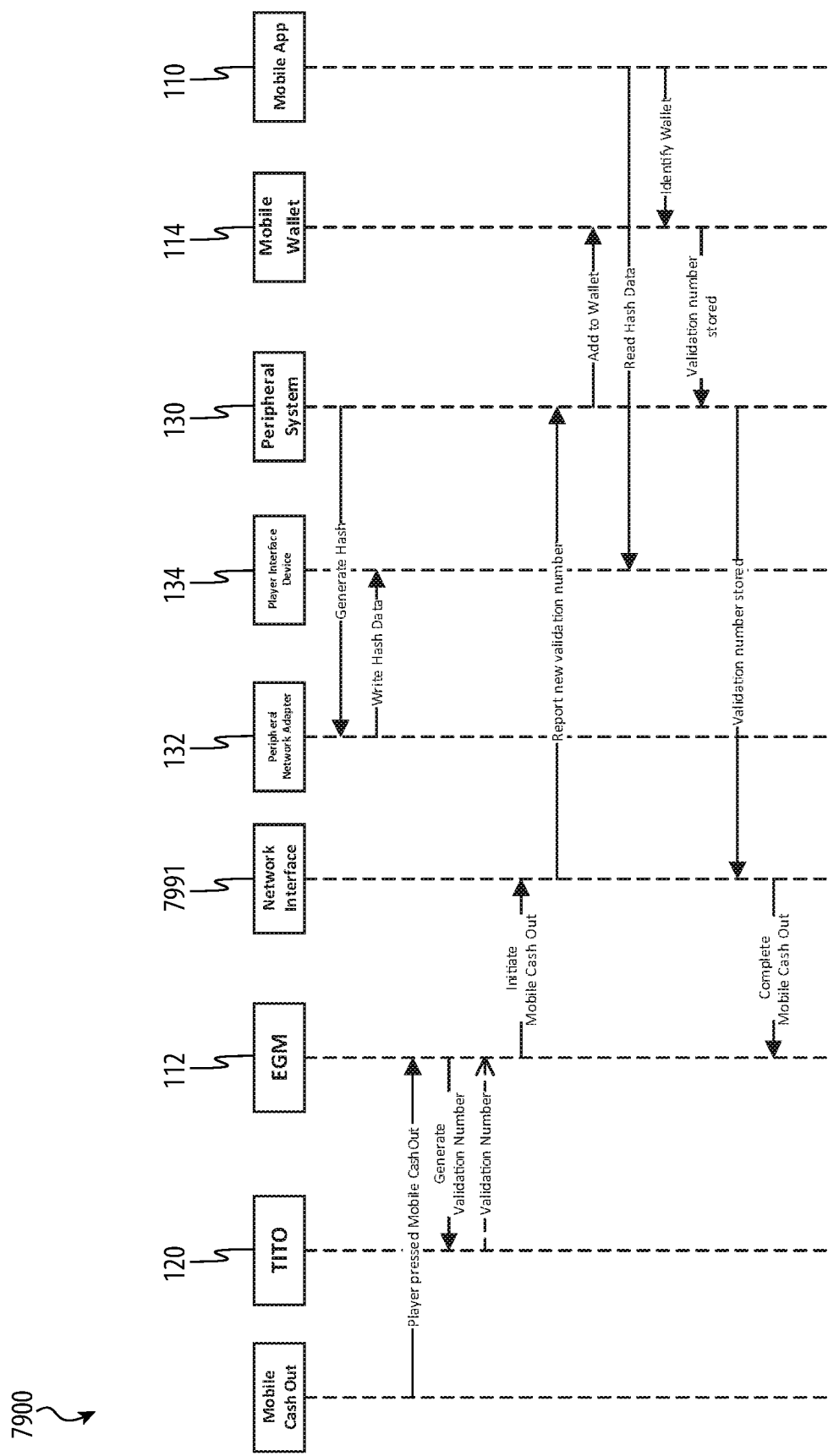
FIG. 79 illustrates a block diagram of components and signal flow for obtaining refunds, redemptions, or transfers of gaming credit from an electronic gaming machine, according to an embodiment.

FIG. 79 shows a block diagram of components and signal flows of a method or system 7900 by which a user may obtain or redeem credit available on a physical ticket to a mobile wallet 114. In this system 7900, an EGM 112 may have a network interface 7991. The network interface 7991 may be a component such as a slot machine interface board ("SMIB"), a game monitoring unit ("GMU"), or the like. The network interface 7991 may directly communicate with a Peripheral System 130 on behalf of the EGM 112 to notify of a mobile cash out transaction. Once completed, the EGM 112 may be notified by the Peripheral System 130 via the network interface 7991 if the validation number has been stored in the player's mobile wallet 114.

In detail, the Peripheral System 130 may generate hash data and provide the hash data to a Player Interface Device 134 via a Peripheral Network Adapter 132 (or Peripheral Adapter). The EGM 112 may determine that the player has pressed Mobile Cash Out. The EGM 112 may then communicate with the TITO System 120 to create a new ticket, such as a virtual ticket. The EGM 112 may then initiate the Mobile Cash Out by reporting the new ticket to the Peripheral System 130 via the network interface 7991. The Peripheral System 130 may instruct the mobile wallet 114 to add the new ticket. A mobile app executing on a mobile device 110 associated with the player may read the hash data from the Player Interface Device 134 and identify the player to the mobile wallet 114 so that the new ticket may be appropriately stored. The mobile wallet 114 may confirm to the Peripheral System 130 that the new ticket has been stored, which may pass the notification to the EGM 112 via the network interface 7991 to complete the Mobile Cash Out.

Figure 80:
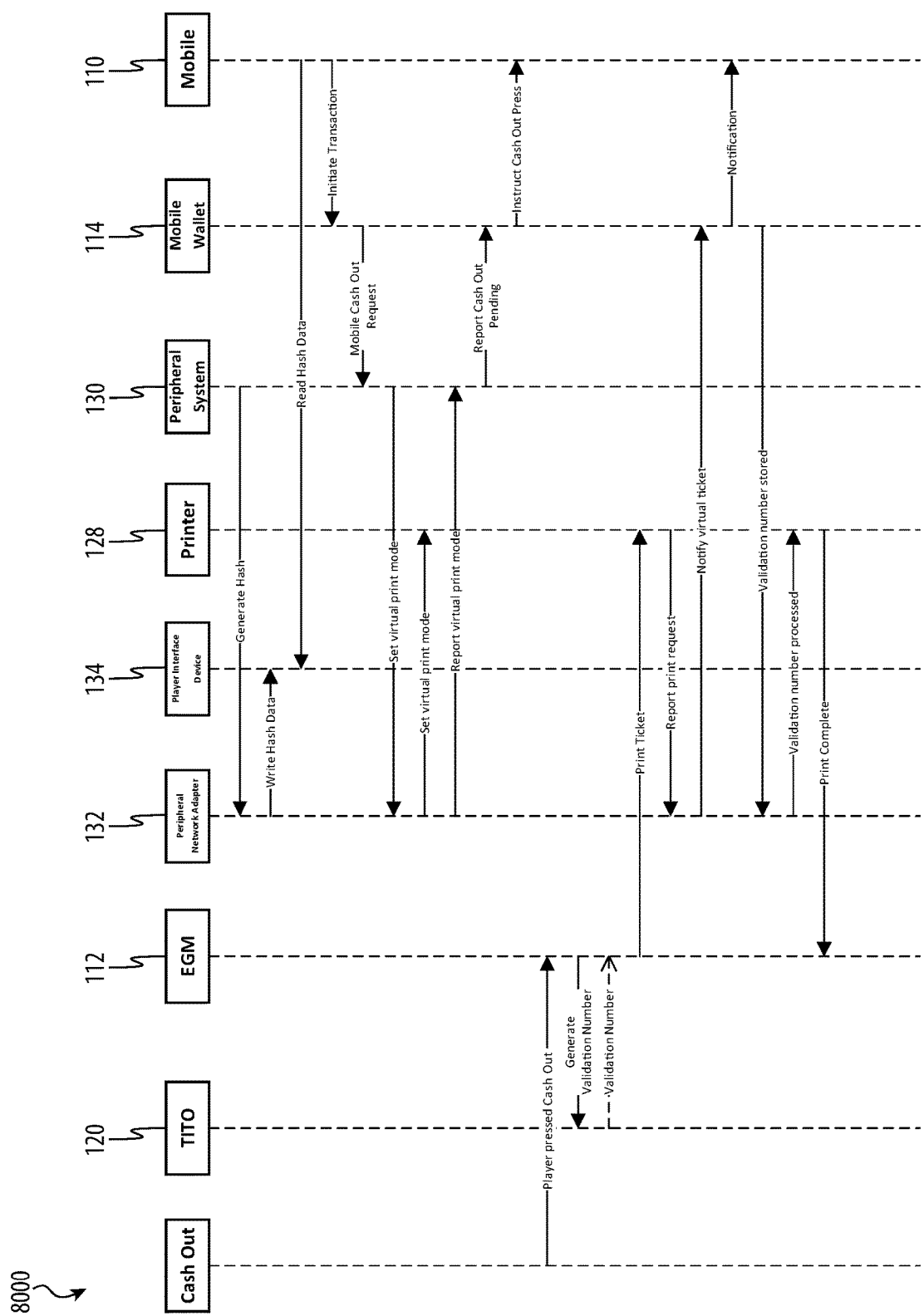
FIG. 80 illustrates a block diagram of components and signal flow for obtaining refunds, redemptions, or transfers of gaming credit from an electronic gaming machine, according to an embodiment.

FIG. 80 shows a block diagram of components and signal flows of a method or system 8000 by which a user may obtain or redeem credit available on a physical ticket to a mobile wallet 114. In this system 8000, a Peripheral Network Adapter 132 may set a virtual print mode (i.e., a mode configured to provide an electronic file version of a ticket and/or ticket data instead of and/or in addition to printing a physical ticket) of a Printer 128 associated with the EGM 112 upon receipt of a Mobile Cash Out Request from a Mobile Wallet 114 through the Peripheral System 130. Then, upon receipt by a Peripheral Network Adapter 132 of a ticket validation number from a pint request, the Peripheral Network Adapter 132 may then send the ticket validation number to the mobile wallet 114 for service, such as to store the ticket and/or validation number, convert the ticket to a monetary amount to store in the player's account, and so on.

In detail, the Peripheral System 130 may generate hash data and provide the hash data to a Player Interface Device 134 via a Peripheral Network Adapter 132 (or Peripheral Adapter). A mobile device 110 associated with a player may read the hash data from the Player Interface Device 134 and initiate a transaction for a Mobile Cash Out Request from the mobile wallet 114. The mobile wallet 114 may provide the Mobile Cash Out request to the Peripheral System 130. In response, the Peripheral System 130 may instruct the Printer 128 to set the virtual print mode through the Peripheral Network Adapter 132. The Peripheral Network Adapter 132 may report the virtual print mode to the Peripheral System 130, which may report Cash Out Pending to the mobile wallet 114, which may in turn provide an instruction via the mobile device 110 to press Cash Out.

The EGM 112 may then determine that the player has pressed Cash Out. The EGM 112 may then communicate with the TITO System 120 to create a new ticket, such as a virtual ticket. The EGM 112 may then instruct the Printer 128 to print the new ticket, which may include the validation number for the new ticket. The Printer 128 may report the print request to the Peripheral Network Adapter 132, which may notify the mobile wallet 114 of the virtual ticket. The mobile wallet 114 may notify the mobile device 110 and report that the validation number (or a monetary amount corresponding to the virtual ticket) has been stored in the player's account to the Peripheral Network Adapter 132. The Peripheral Network Adapter 132 may notify the Printer 128 that the validation number has been processed. The Printer 128 may then report to the EGM 112 that printing is complete.

Figure 81:
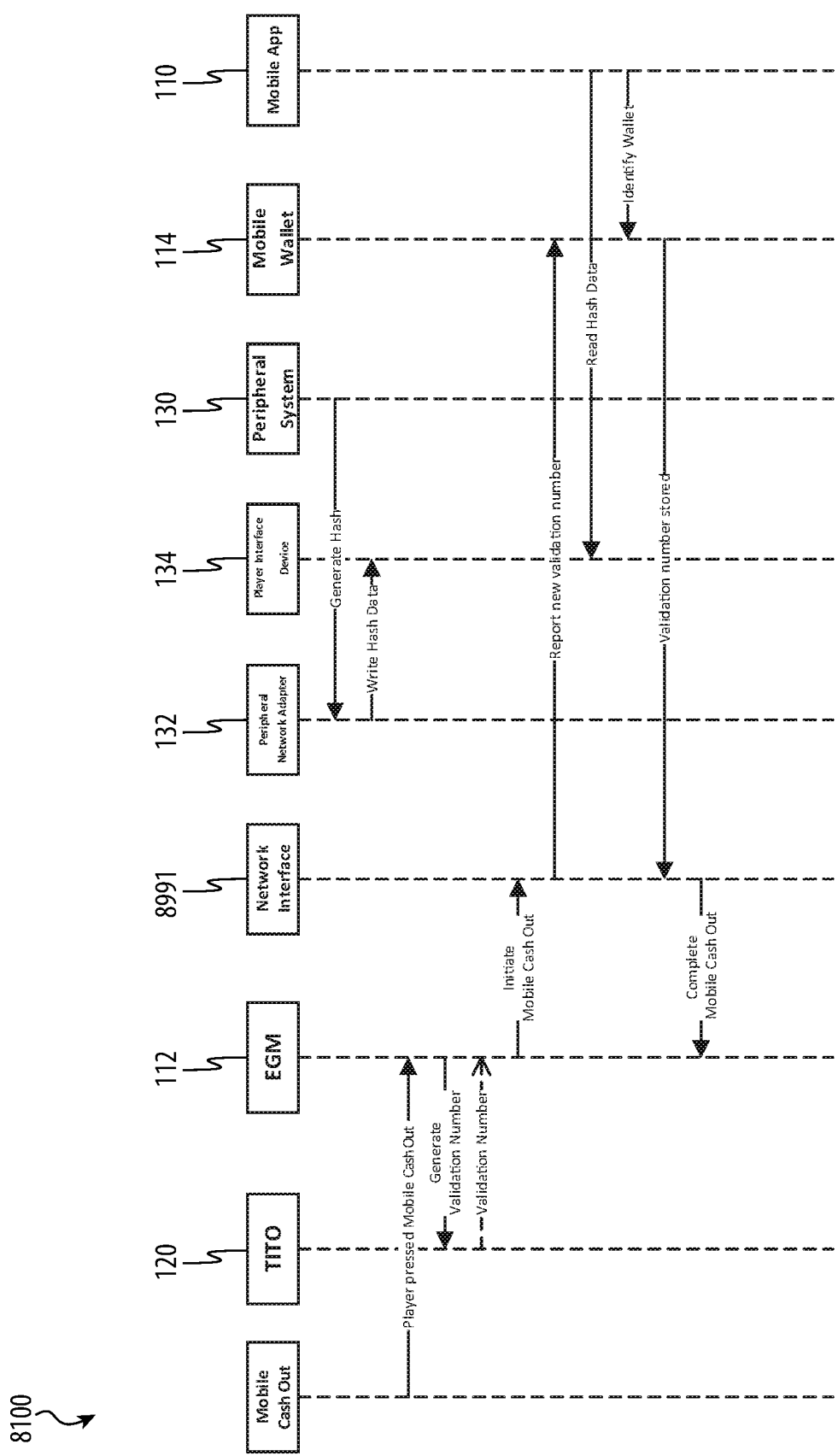
FIG. 81 illustrates a block diagram of components and signal flow for obtaining refunds, redemptions, or transfers of gaming credit from an electronic gaming machine, according to an embodiment.

FIG. 81 shows a block diagram of components and signal flows of a method or system 8100 by which a user may obtain or redeem credit available on a physical ticket to a mobile wallet 114. In this system 8100, an EGM 112 may have a network interface 8991. The network interface 8991 may be a component such as a slot machine interface board ("SMIB"), a game monitoring unit ("GMU"), or the like. This system 8100 may not involve use of a printer or a Peripheral Network Adapter 132 to store the validation number for a ticket to a mobile wallet 114 as the EGM 112 may determine to store the validation number for the ticket to the mobile wallet 114 before communicating with the mobile wallet 114.

In detail, the Peripheral System 130 may generate hash data and provide the hash data to a Player Interface Device 134 via a Peripheral Network Adapter 132 (or Peripheral Adapter). The EGM 112 may determine that the player has pressed Mobile Cash Out. The EGM 112 may then communicate with the TITO System 120 to create a new ticket, such as a virtual ticket. The EGM 112 may then initiate the Mobile Cash Out by reporting the validation number to the mobile wallet 114 via the network interface 8991. The mobile wallet 114 may add the new ticket. A mobile app executing on a mobile device 110 associated with the player may read the hash data from the Player Interface Device 134 and identify the player to the mobile wallet 114 so that the new ticket may be appropriately stored. The mobile wallet 114 may confirm to the EGM 112 via the network interface 8991 that the new ticket has been stored, which may complete the Mobile Cash Out.

Figure 82:
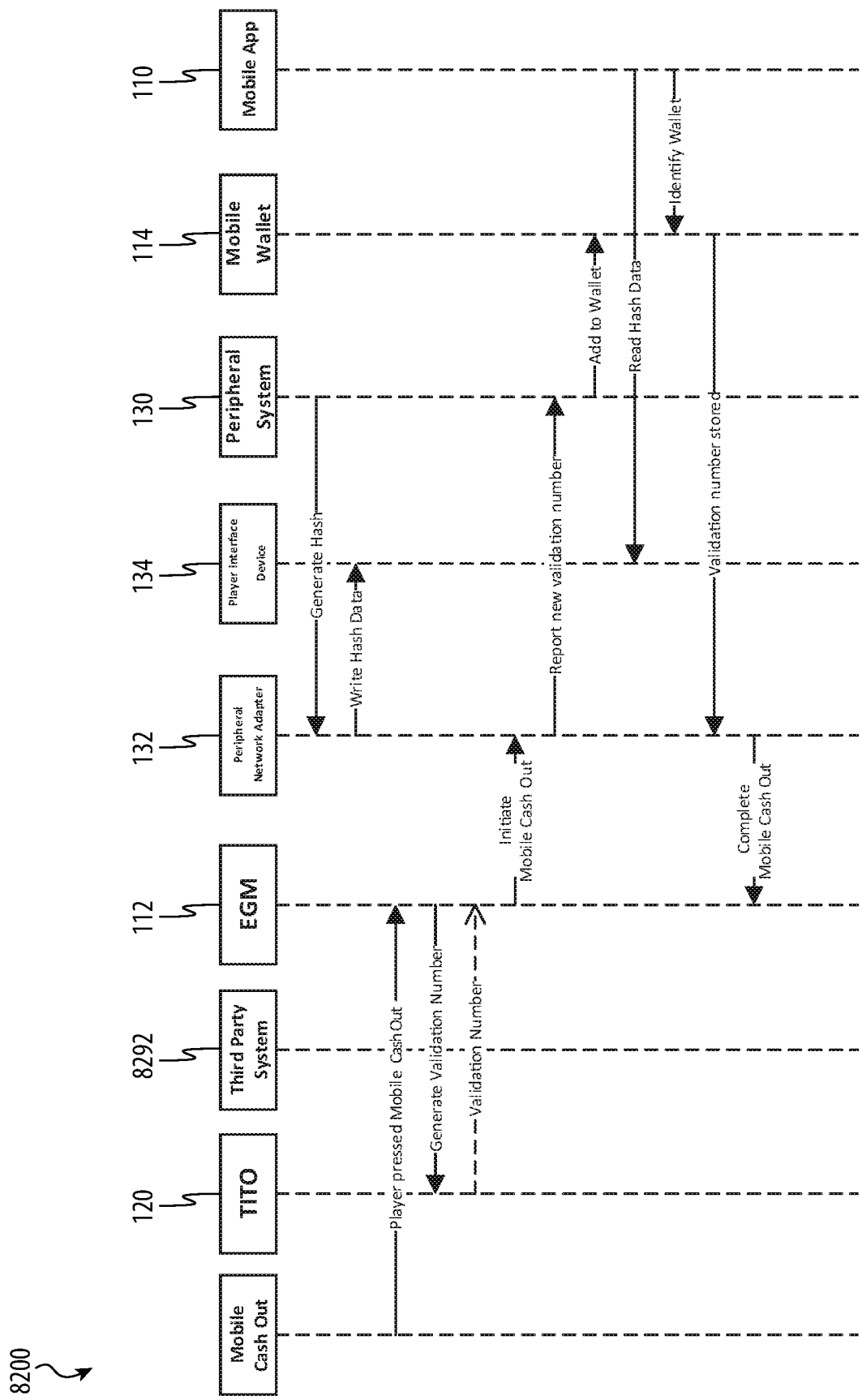
FIG. 82 illustrates a block diagram of components and signal flow for obtaining refunds, redemptions, or transfers of gaming credit from an electronic gaming machine, according to an embodiment.

FIG. 82 shows a block diagram of components and signal flows of a method or system 8200 by which a user may obtain or redeem credit available on a physical ticket to a mobile wallet 114. In this system 8200, an EGM 112 may be directly connected to a Peripheral Network Adapter 132 instead of a printer for performing a Cash Out. The Peripheral Network Adapter 132 may transmit the validation number for a ticket to a Peripheral System 130. The system 8200 may also include communications with a third party system 8292, which may be involved with processing the validation number in some embodiments.

In detail, the Peripheral System 130 may generate hash data and provide the hash data to a Player Interface Device 134 via a Peripheral Network Adapter 132 (or Peripheral Adapter). The EGM 112 may determine that the player has pressed Mobile Cash Out. The EGM 112 may then communicate with the TITO System 120 to create a new ticket, such as a virtual ticket. The EGM 112 may then initiate the Mobile Cash Out by reporting the validation number to the Peripheral Network Adapter 132. The Peripheral Network Adapter 132 may report the new validation number to the Peripheral System 130, which may instruct the mobile wallet 114 to add the new ticket. A mobile app executing on a mobile device 110 associated with the player may read the hash data from the Player Interface Device 134 and identify the player to the mobile wallet 114 so that the new ticket may be appropriately stored. The mobile wallet 114 may confirm to the Peripheral Network Adapter 132 that the new ticket has been stored, which may instruct the EGM 112 that the Mobile Cash Out is complete.

Figure 83:
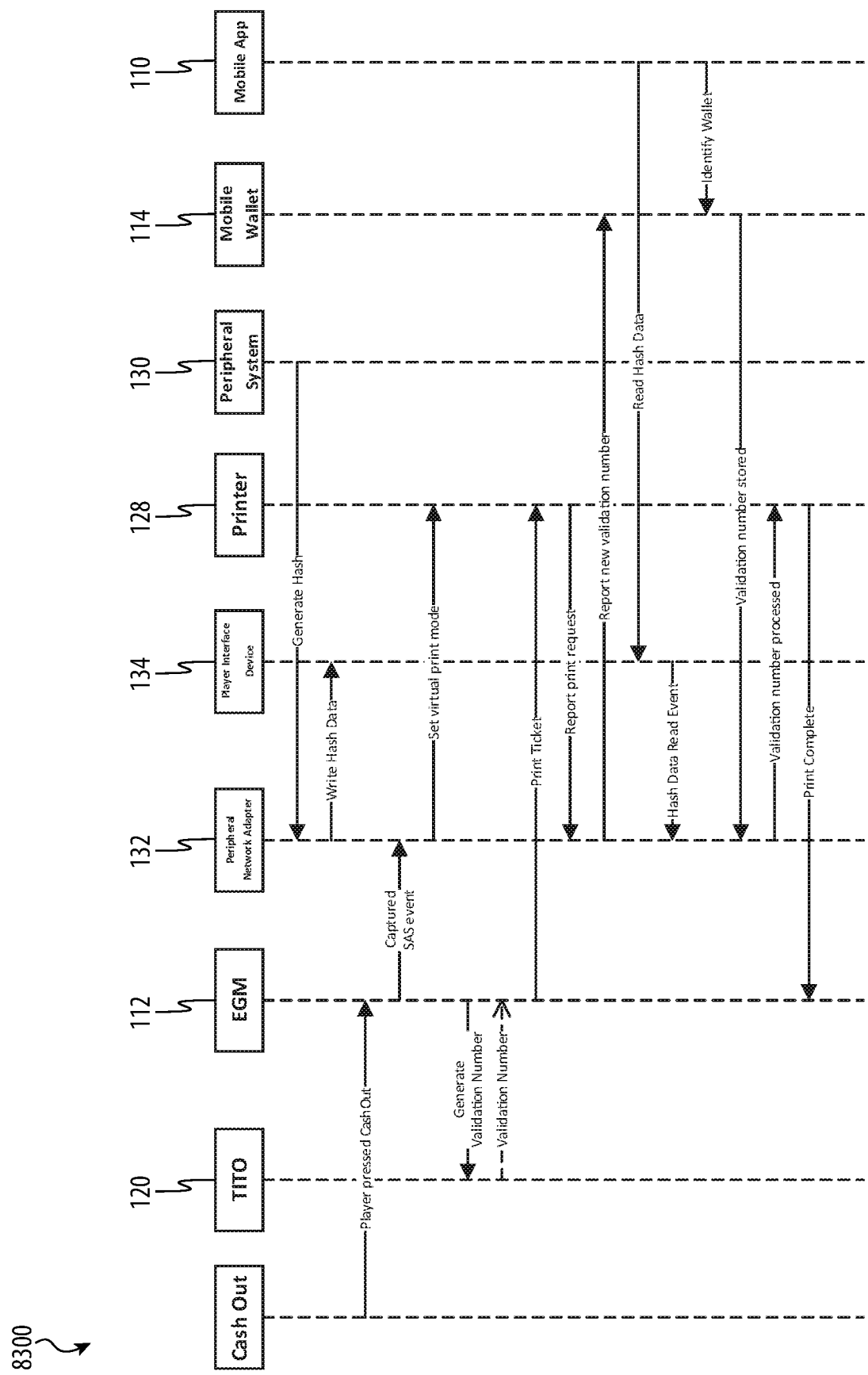
FIG. 83 illustrates a block diagram of components and signal flow for obtaining refunds, redemptions, or transfers of gaming credit from an electronic gaming machine, according to an embodiment.

FIG. 83 shows a block diagram of components and signal flows of a method or system 8300 by which a user may obtain or redeem credit available on a physical ticket to a mobile wallet 114. In this system 8300, the Peripheral Network Adapter 132 may monitor the SAS (slot accounting service) communication channel associated with an EGM 112 for a Cash Out event. Upon detecting a Cash Out event, the Peripheral Network Adapter 132 may set a virtual print mode (i.e., a mode configured to provide an electronic file version of a ticket instead of and/or in addition to printing a physical ticket) of a Printer 128 so that the Printer 128 reports the ticket validation number instead of physically printing the ticket. Then the Peripheral Network Adapter 132 may send the ticket validation number to the mobile wallet 114 for service, such as to store the ticket and/or validation number, convert the ticket to a monetary amount to store in the player's account, and so on.

In detail, the Peripheral System 130 may generate hash data and provide the hash data to a Player Interface Device 134 via a Peripheral Network Adapter 132. The EGM 112 may then determine that the player has pressed Cash Out. The Peripheral Network Adapter 132 may capture the SAS event associated with the EGM 112 determining that the player has pressed Cash Out and may instruct the Printer 128 to set the virtual print mode. The EGM 112 may then communicate with the TITO System 120 to create a new ticket, such as a virtual ticket. The EGM 112 may then instruct the Printer 128 to print the new ticket, which may include the validation number for the new ticket. The Printer 128 may report the print request to the Peripheral Network Adapter 132, which may notify the mobile wallet 114 of the virtual ticket.

A mobile app executing on a mobile device 110 associated with a player may read the hash data from the Player Interface Device 134. The Player Interface Device 134 may report the hash data read event to the Peripheral Network Adapter 132. The mobile app may identify the player to the mobile wallet 114 so that the new ticket may be appropriately stored. The mobile wallet 114 may store the validation number (or a monetary amount corresponding to the virtual ticket) in the player's account and notify the Peripheral Network Adapter 132 of such. The Peripheral Network Adapter 132 may notify the Printer 128 that the validation number has been processed. The Printer 128 may then report to the EGM 112 that printing is complete.

Figure 84:
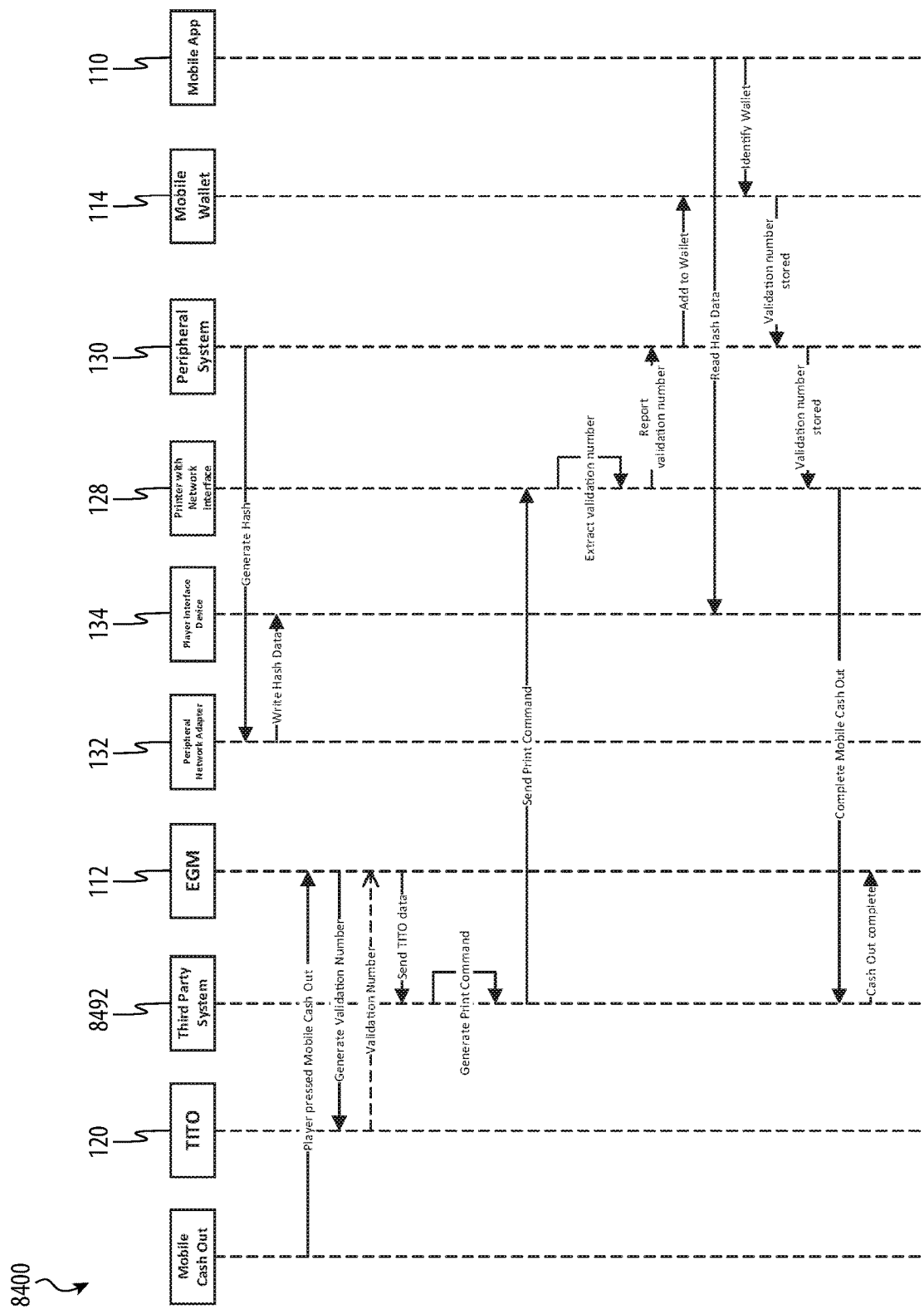
FIG. 84 illustrates a block diagram of components and signal flow for obtaining refunds, redemptions, or transfers of gaming credit from an electronic gaming machine, according to an embodiment.

FIG. 84 shows a block diagram of components and signal flows of a method or system 8400 by which a user may obtain or redeem credit available on a physical ticket to a mobile wallet 114. In this system 8400, an EGM 112 may communicate to a third party system 8492 (such as a ticket printing system, a mobile cash out processing system, and so on) to initiate a Mobile Cash Out. The third party system 8492 may directly communicate to a Printer 128 associated with the EGM 112 to have the ticket validation number be processed. The Printer 128 may have network interface capabilities to directly report the ticket validation number to a Peripheral System 130 for mobile wallet 114 storage and/or conversion to a monetary amount to store in the player's account.

In detail, the Peripheral System 130 may generate hash data and provide the hash data to a Player Interface Device 134 via a Peripheral Network Adapter 132. The EGM 112 may then determine that the player has pressed Mobile Cash Out. The EGM 112 may then communicate with the TITO System 120 to create a new ticket, such as a virtual ticket. The EGM 112 may then send the new ticket data to the third party system 8492, which may generate a corresponding print command and send the print command to the Printer 128. The Printer 128 may extract the validation number from the print command and report the validation number to the Peripheral System 130, which may notify the mobile wallet 114 to add the ticket and/or a converted monetary amount to the player's account.

A mobile app executing on a mobile device 110 associated with a player may read the hash data from the Player Interface Device 134. The mobile app may identify the player to the mobile wallet 114 so that the ticket may be appropriately stored. The mobile wallet 114 may store the validation number (or a monetary amount corresponding to the virtual ticket) in the player's account and notify the Peripheral System 130 of such. The Peripheral System 130 may notify the Printer 128 that the validation number has stored. The Printer 128 may then report to the third party system 8492 that the Mobile Cash Out is complete, which may in turn report such to the EGM 112.

FIG. 85 shows a block diagram of components and signal flows of a method or system 8500 by which a user may obtain or redeem credit available on a physical ticket to a mobile wallet 114. In this system 8500, an EGM 112 may communicate with a Printer 128 that is capable of interfacing with a network. The Printer 128 may report the ticket validation number directly to a mobile wallet 114 for storage and/or conversion to a monetary amount to store in the player's account.

In detail, the Peripheral System 130 may generate hash data and provide the hash data to a Player Interface Device 134 via a Peripheral Network Adapter 132. The EGM 112 may then determine that the player has pressed Mobile Cash Out. The EGM 112 may then communicate with the TITO System 120 to create a new ticket, such as a virtual ticket. The EGM 112 may then initiate the Mobile Cash Out by communicating the ticket data to the Printer 128. The Printer 128 may report the validation number to the mobile wallet 114 for adding the ticket and/or a converted monetary amount to the player's account.

A mobile app executing on a mobile device 110 associated with a player may read the hash data from the Player Interface Device 134. The mobile app may identify the player to the mobile wallet 114 so that the ticket may be appropriately stored. The mobile wallet 114 may store the validation number (or a monetary amount corresponding to the virtual ticket) in the player's account and notify the Peripheral System 130 of such. The Peripheral System 130 may notify the Printer 128 that the validation number has stored. The Printer 128 may then report to the EGM 112 that the Mobile Cash Out is complete.

In various implementations, a system for mobile wallet operations in a gaming environment may include a peripheral network adapter associated with an electronic gaming machine; a printer communicably connected to the peripheral network adapter and the electronic gaming machine; and a peripheral system. The peripheral system may be operable to receive a mobile cash out request associated with a mobile wallet account; identify that the electronic gaming machine is associated with the mobile wallet account based at least on a communication involving a mobile device; and instruct the peripheral network adapter to set the printer to a virtual print mode. In the virtual print mode the printer may be operable to respond to a print instruction from the electronic gaming machine by reporting the print instruction to the peripheral network adapter including ticket data that the peripheral network adapter sends to the mobile wallet account and omitting printing a physical ticket instructed by the print instruction.

In some examples, the peripheral system may receive the mobile cash out request from a mobile wallet. In various such examples, the peripheral system may receive the mobile cash out request from the mobile wallet based on a request the mobile wallet received from the mobile device.

In a number of examples, the mobile wallet account may store the ticket data. In some examples, the mobile wallet account may store a monetary amount converted from the ticket data.

In various examples, the peripheral network adapter may inform the printer that the ticket data is processed upon receipt of a validation from the mobile wallet. In a number of such examples, the printer may notify the electronic gaming machine that printing is complete after the peripheral network adapter informs the printer that the ticket data is processed.

In some implementations, a system for mobile wallet operations in a gaming environment may include a printer communicably connected to an electronic gaming machine and a peripheral network adapter communicably connected to the printer and the electronic gaming machine. The peripheral network adapter may be operable to detect an electronic gaming machine cash out event and set the printer to a virtual print mode. In the virtual print mode the printer may be operable to respond to a print instruction from the electronic gaming machine by reporting the print instruction to the peripheral network adapter including ticket data that the peripheral network adapter sends to a mobile wallet and omitting printing a physical ticket instructed by the print instruction.

In various examples, the peripheral network adapter may detect the electronic gaming machine cash out event based on a communication between the electronic gaming machine and an additional device. In some such examples, the peripheral network adapter may monitor communications between the electronic gaming machine and the additional device. In a number of such examples, the communication may relate to a slot accounting service event.

In some examples, the mobile wallet may identify a mobile wallet account for the ticket data based on information received from a mobile app executing on a mobile device. In a number of such examples, the information may be at least one hash that the mobile app received from at least one player interface device associated with the electronic gaming machine. In various such examples, the mobile wallet may identify the mobile wallet account after receiving the ticket data.

In a number of implementations, a system for mobile wallet operations in a gaming environment may include a printer, associated with an electronic gaming machine, that is operable to receive a print command generated by a ticket printing system in response to ticket data received from the electronic gaming machine; transmit ticket data extracted from the print command; and omit printing a physical ticket in response to the print command. The system may also include a peripheral system that is operable to send the ticket data received from the printer to a mobile wallet.

In some examples, the electronic gaming machine may transmit the ticket data to the ticket printing system in response to detecting that a player selected a mobile cash out. In a number of examples, the printer may communicate directly with the peripheral system.

In various examples, the printer may notify the ticket printing system to complete a mobile cash out upon receipt of information from the peripheral system that the ticket data is processed. In some such examples, the peripheral system may be informed that the ticket data is processed by the mobile wallet. In a number of such examples, the ticket printing system may confirm to the electronic gaming machine that the mobile cash out is complete.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for mobile wallet operations in a gaming environment, comprising:
   a peripheral network adapter associated with an electronic gaming machine;
   a printer communicably connected to the peripheral network adapter and the electronic gaming machine; and
   a peripheral system that is operable to:
      receive a mobile cash out request associated with a mobile wallet account;
      identify that the electronic gaming machine is associated with the mobile wallet account based at least on a communication involving a mobile device; and
      instruct the peripheral network adapter to set the printer to a virtual print mode;
   wherein in the virtual print mode the printer is operable to respond to a print instruction from the electronic gaming machine by:
      reporting the print instruction to the peripheral network adapter including ticket data that the peripheral network adapter sends to the mobile wallet account; and
      omitting printing a physical ticket instructed by the print instruction.

2. The system of claim 1, wherein the peripheral system receives the mobile cash out request from a mobile wallet.

3. The system of claim 2, wherein the peripheral system receives the mobile cash out request from the mobile wallet based on a request the mobile wallet received from the mobile device.

4. The system of claim 1, wherein the mobile wallet account stores the ticket data.

5. The system of claim 1, wherein the mobile wallet account stores a monetary amount converted from the ticket data.

6. The system of claim 2, wherein the peripheral network adapter informs the printer that the ticket data is processed upon receipt of a validation from the mobile wallet.

7. The system of claim 6, wherein the printer notifies the electronic gaming machine that printing is complete after the peripheral network adapter informs the printer that the ticket data is processed.

8. A system for mobile wallet operations in a gaming environment, comprising:
   a printer communicably connected to an electronic gaming machine; and
   a peripheral network adapter, communicably connected to the printer and the electronic gaming machine, that is operable to:
      detect an electronic gaming machine cash out event; and
      set the printer to a virtual print mode;
   wherein in the virtual print mode the printer is operable to respond to a print instruction from the electronic gaming machine by:
      reporting the print instruction to the peripheral network adapter including ticket data that the peripheral network adapter sends to a mobile wallet; and
      omitting printing a physical ticket instructed by the print instruction.

9. The system of claim 8, wherein the peripheral network adapter detects the electronic gaming machine cash out event based on a communication between the electronic gaming machine and an additional device.

10. The system of claim 9, wherein the peripheral network adapter monitors communications between the electronic gaming machine and the additional device.

11. The system of claim 9, wherein the communication relates to a slot accounting service event.

12. The system of claim 8, wherein the mobile wallet identifies a mobile wallet account for the ticket data based on information received from a mobile app executing on a mobile device.

13. The system of claim 12, wherein the information is at least one hash that the mobile app received from at least one player interface device associated with the electronic gaming machine.

14. The system of claim 12, wherein the mobile wallet identifies the mobile wallet account after receiving the ticket data.

15. A system for mobile wallet operations in a gaming environment, comprising:
- a printer, associated with an electronic gaming machine, that is operable to:
  - receive a print command generated by a ticket printing system in response to ticket data received from the electronic gaming machine;
  - transmit ticket data extracted from the print command; and
  - omit printing a physical ticket in response to the print command; and
- a peripheral system that is operable to send the ticket data received from the printer to a mobile wallet.

16. The system of claim 15, wherein the electronic gaming machine transmits the ticket data to the ticket printing system in response to detecting that a player selected a mobile cash out.

17. The system of claim 15, wherein the printer communicates directly with the peripheral system.

18. The system of claim 15, wherein the printer notifies the ticket printing system to complete a mobile cash out upon receipt of information from the peripheral system that the ticket data is processed.

19. The system of claim 18, wherein the peripheral system is informed that the ticket data is processed by the mobile wallet.

20. The system of claim 18, wherein the ticket printing system confirms to the electronic gaming machine that the mobile cash out is complete.

\* \* \* \* \*